United States Patent
Bennett

(10) Patent No.: US 11,474,271 B2
(45) Date of Patent: Oct. 18, 2022

(54) METHODS AND SYSTEMS FOR AUTOMATED SONIC IMAGING

(71) Applicant: SCHLUMBERGER TECHNOLOGY CORPORATION, Sugar Land, TX (US)

(72) Inventor: Nicholas Norman Bennett, Hamden, CT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 401 days.

(21) Appl. No.: 16/413,479

(22) Filed: May 15, 2019

(65) Prior Publication Data

US 2020/0003922 A1    Jan. 2, 2020

Related U.S. Application Data

(63) Continuation-in-part of application No. 16/349,417, filed as application No. PCT/US2018/057298 on Oct. 24, 2018.

(Continued)

(51) Int. Cl.
*G01V 1/46* (2006.01)
*G01V 1/48* (2006.01)

(52) U.S. Cl.
CPC .................. *G01V 1/46* (2013.01); *G01V 1/48* (2013.01); *G01V 2210/52* (2013.01)

(58) Field of Classification Search
CPC ........ G01V 1/46; G01V 1/48; G01V 2210/52; G01V 1/50; G01V 1/302; G01V 1/286;

(Continued)

(56) References Cited

U.S. PATENT DOCUMENTS 6,956,790 B2   10/2005  Haldorsen
7,492,664 B2    2/2009  Tang et al.
(Continued)

FOREIGN PATENT DOCUMENTS

EP      1297361 B1    6/2006
WO   2016106104 A1    6/2016

OTHER PUBLICATIONS

Bo, O. et al., "Reservoir Mapping While Drilling", Oilfield Review 2015, 27(1), pp. 38-47.
(Continued)

*Primary Examiner* — Daniel L Murphy
(74) *Attorney, Agent, or Firm* — Trevor G. Grove

(57) ABSTRACT

A sonic logging method is provided that transmits acoustic signals using a high order acoustic source and processes waveform data to identify a set of arrival events and time picks by automatic and/or manual methods. Ray tracing inversion is carried out for each arrival event over a number of possible raypath types that include at least one polarized shear raypath type to determine two-dimensional reflector positions and predicted inclination angles of the arrival event for the possible raypath types. One or more three-dimensional slowness-time coherence representations are generated for the arrival event and raypath type(s) and evaluated to determine azimuth, orientation and raypath type of a corresponding reflector. The method outputs a three-dimensional position and orientation for at least one reflector. The information derived from the method can be conveyed in various displays and plots and structured formats for reservoir understanding and also output for use in reservoir analysis and other applications.

29 Claims, 83 Drawing Sheets

Related U.S. Application Data

(60) Provisional application No. 62/576,254, filed on Oct. 24, 2017.

(58) Field of Classification Search
CPC ....... G01V 2210/1429; G01V 2210/42; G01V 2210/643; G01V 2210/671; G01V 2210/1299; G01V 2210/121; G01V 2210/6222; G01V 2210/41; G01V 2210/244; G01V 2210/47; G01V 2210/642; G01V 2210/614; G01V 2210/74
USPC .......................................................... 367/35
See application file for complete search history.

(56) References Cited

U.S. PATENT DOCUMENTS

| 9,529,109 B2 | 12/2016 | Bennett et al. |
| 2006/0031017 A1 | 2/2006 | Mathieu et al. |
| 2014/0010045 A1 | 1/2014 | Bennett et al. |
| 2016/0054464 A1 | 2/2016 | Zhou et al. |
| 2019/0361138 A1 | 11/2019 | Bennett et al. |

OTHER PUBLICATIONS

Brady, J. et al., "Electromagnetic Sounding for Hydrocarbons", Oilfield Review 2009, 21(1), pp. 4-19.

Esmersoy, C. et al., "Reducing Uncertainty Ahead of the Bit", Oilfield Review 2015, 27(1), pp. 14-25.

Hope, R. et al., "Seismic Integration to Reduce Risk", Oilfield Review, 1998, 10(3), pp. 2-15.

Haldorsen, J. B. U. et al., "Borehole acoustic reflection survey (BARS) using full waveform sonic data", First Break, 2010, 28, pp. 55-60.

Diebold, J. B. et al., "The traveltime equation, tau-p mapping, and inversion of common midpoint data". Geophysics, 1981, 46(3), pp. 238-254.

Bolshakov et al., "Deep Fracture Imaging Around the Wellbore Using Dipole Acoustic Logging", SPE Annual Technical Conference and Exhibition, SPE 146769, 2011, 14 pages.

Search Report and Written Opinion of International Patent Application No. PCT/US2018/057298 , dated Feb. 11, 2019, 10 pages.

International Preliminary Report on Patentability of International Patent Application No. PCT/US2018/057298, dated May 7, 2020 (7 pages).

Haldorsen et al., "Borehole Acoustic Waves", Mar. 2006, Oilfield Review, 11 pages.

Office Action issued in U.S. Appl. No. 16/349,417 dated Apr. 28, 2022, 23 pages.

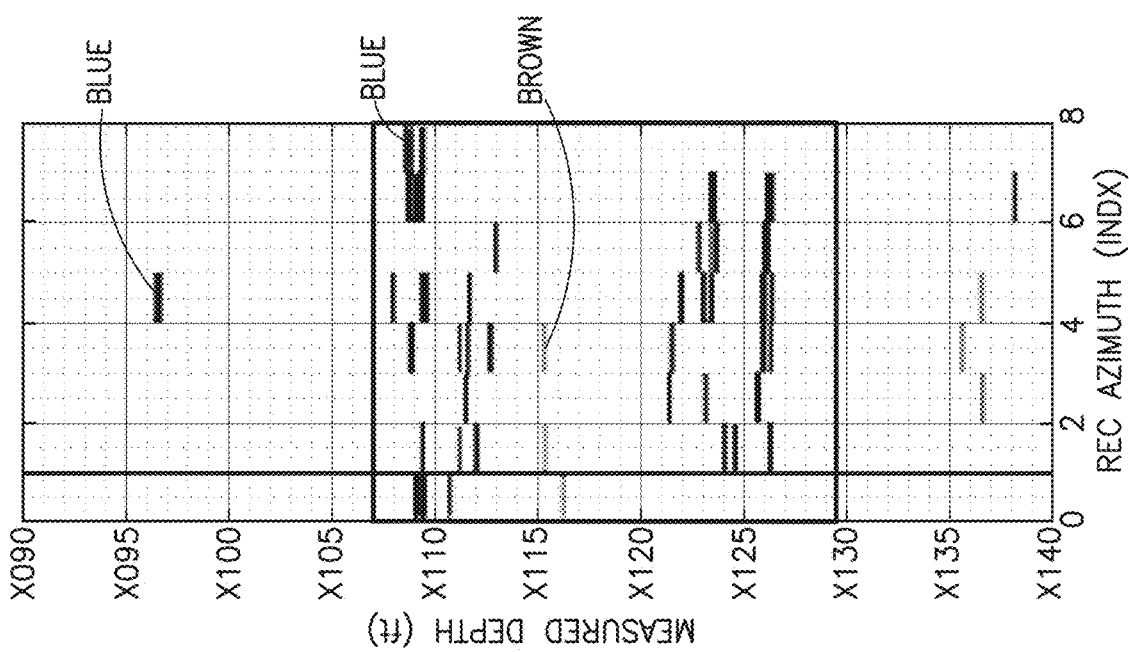
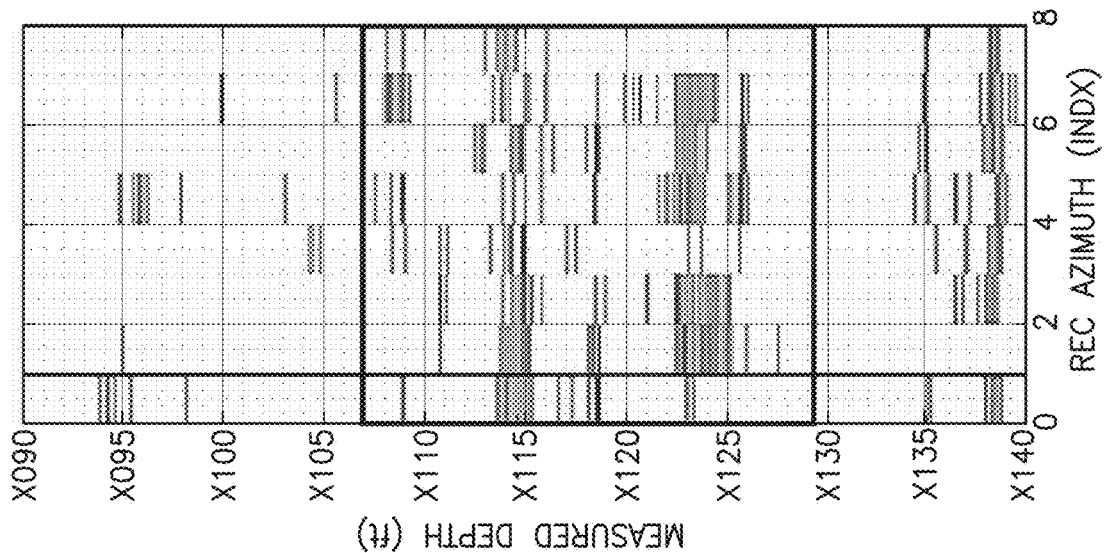
FIG. 3B
FIG. 3A

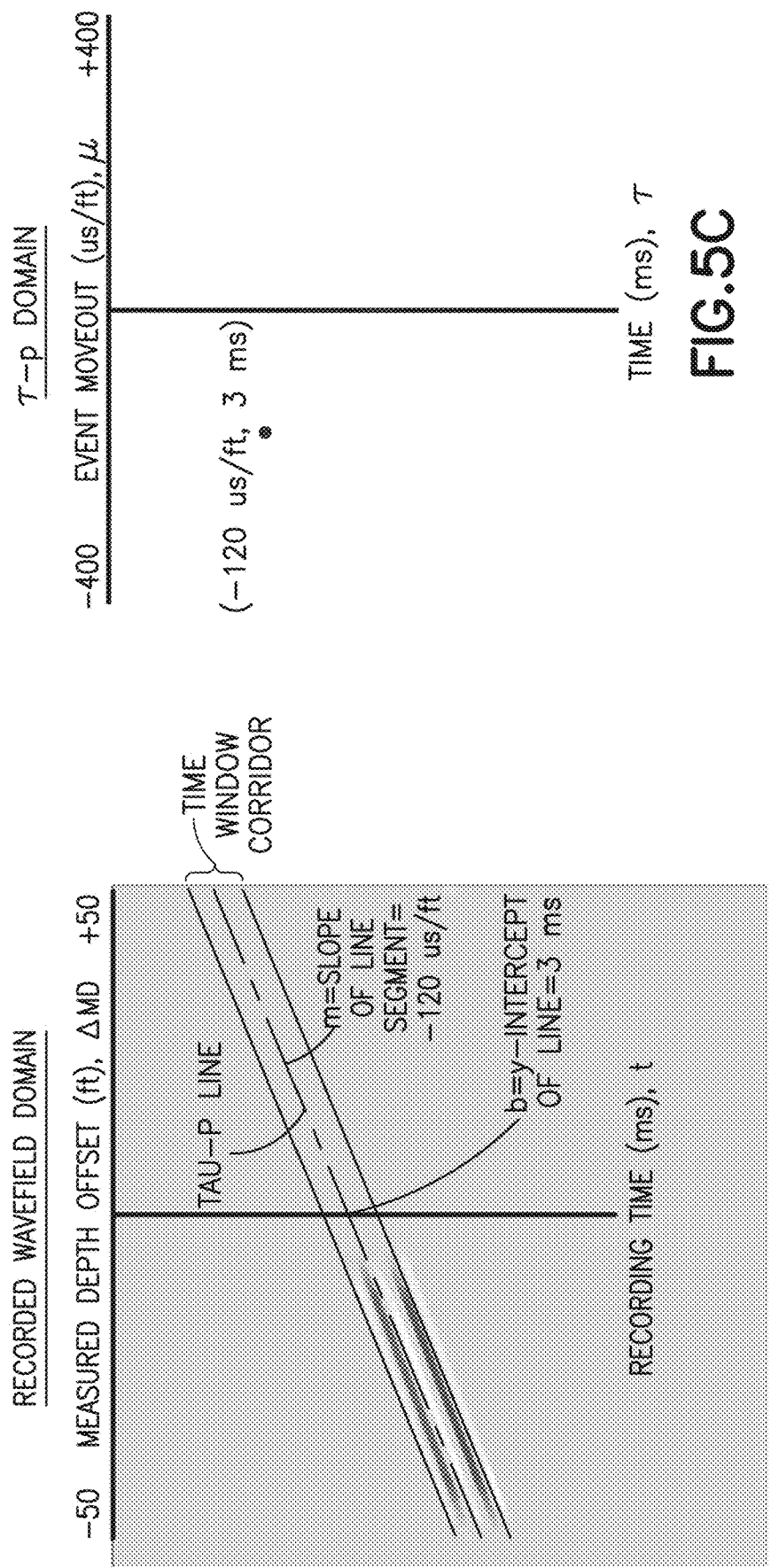

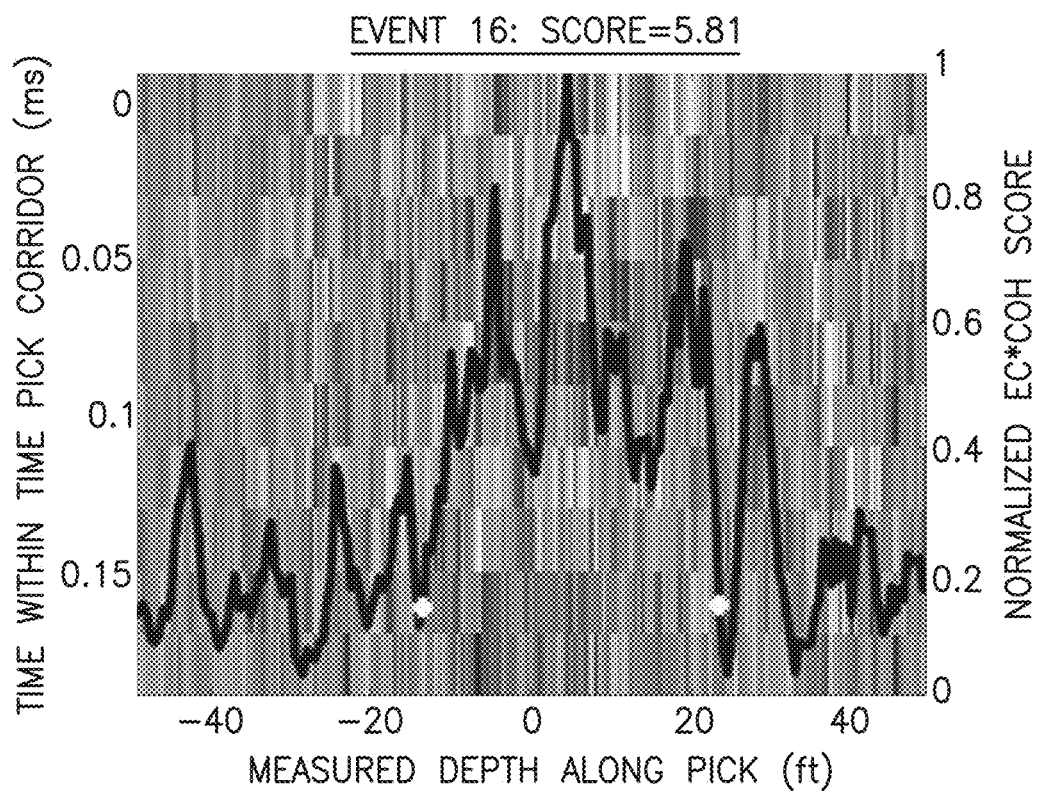
FIG.6A1
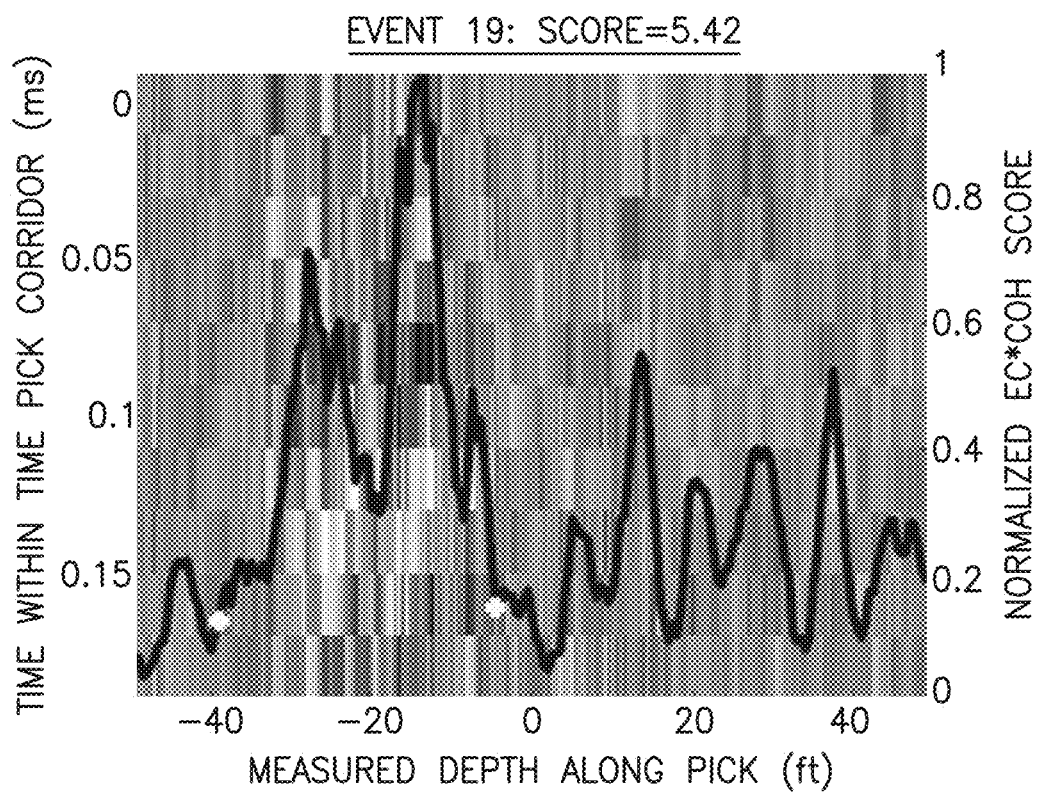
FIG.6A2

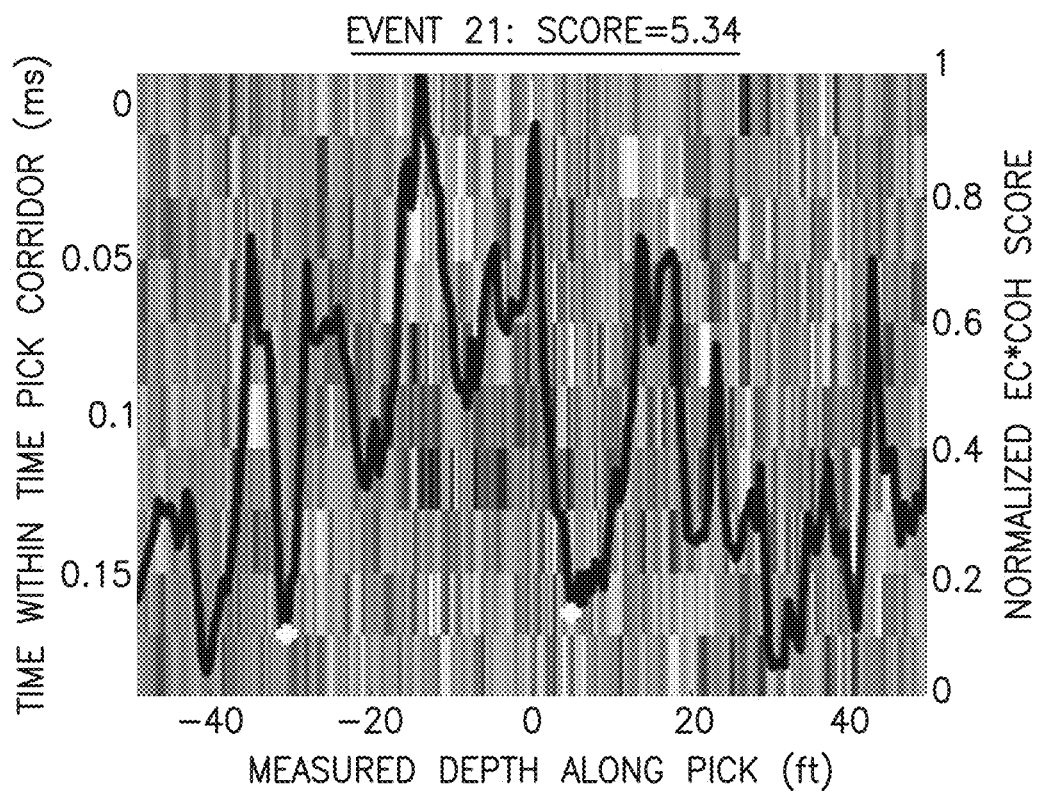
FIG.6A3
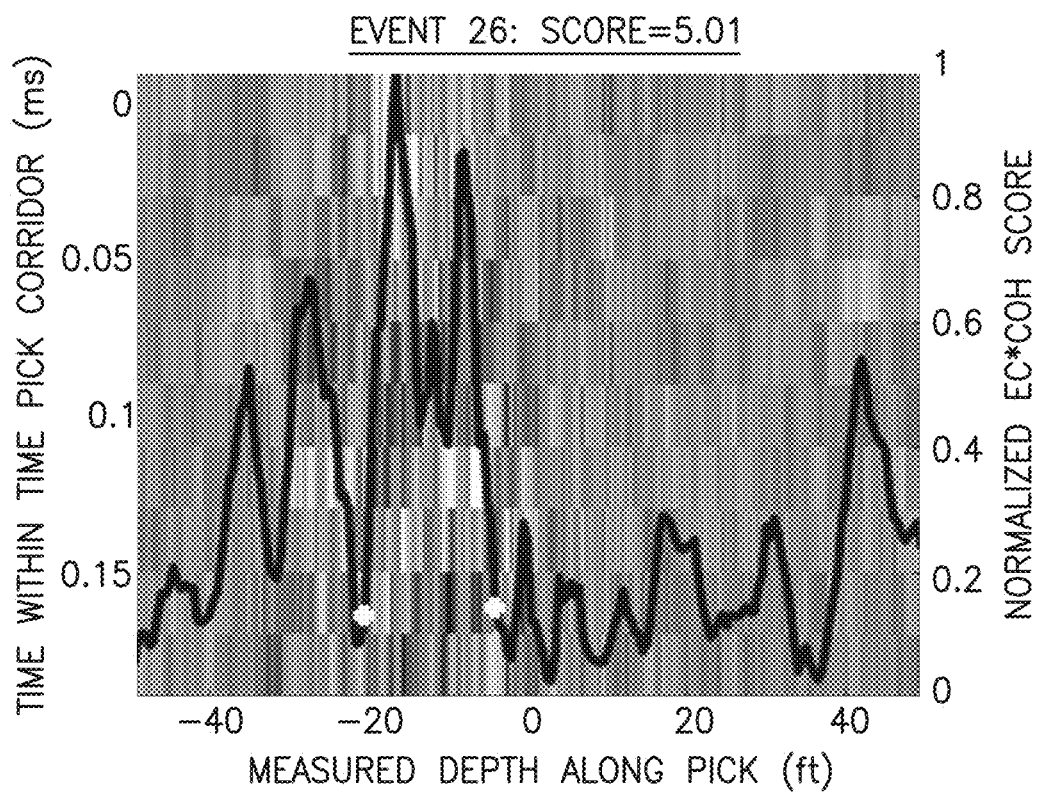
FIG.6A4

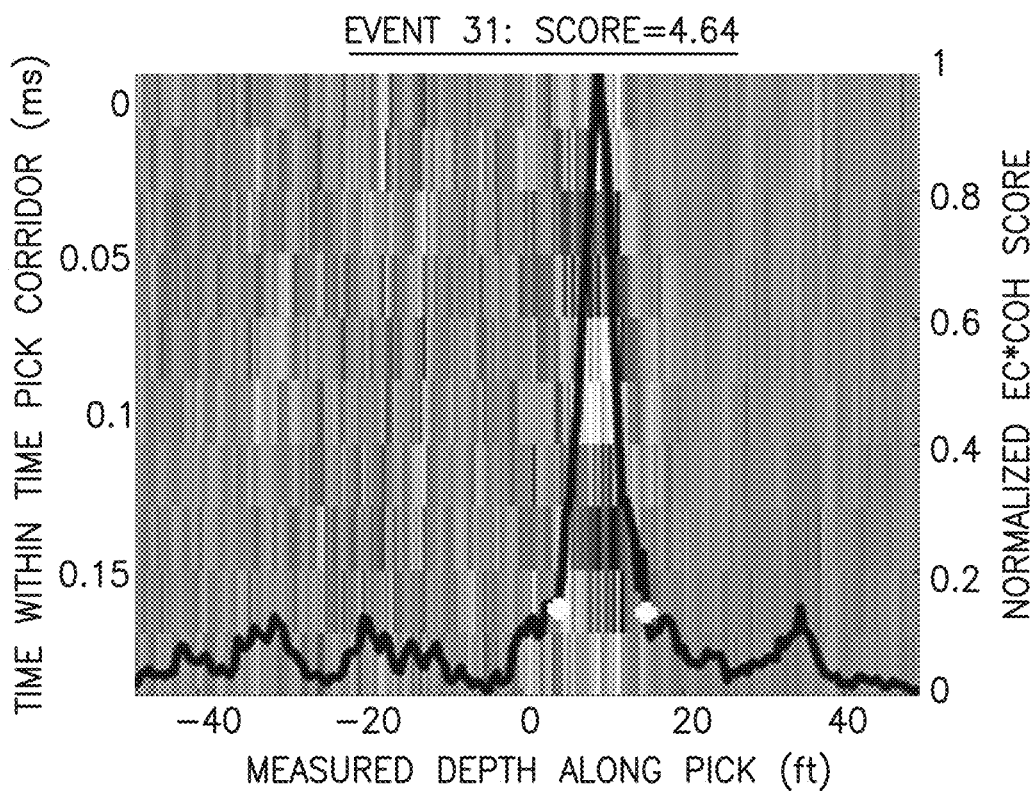
FIG.6A5
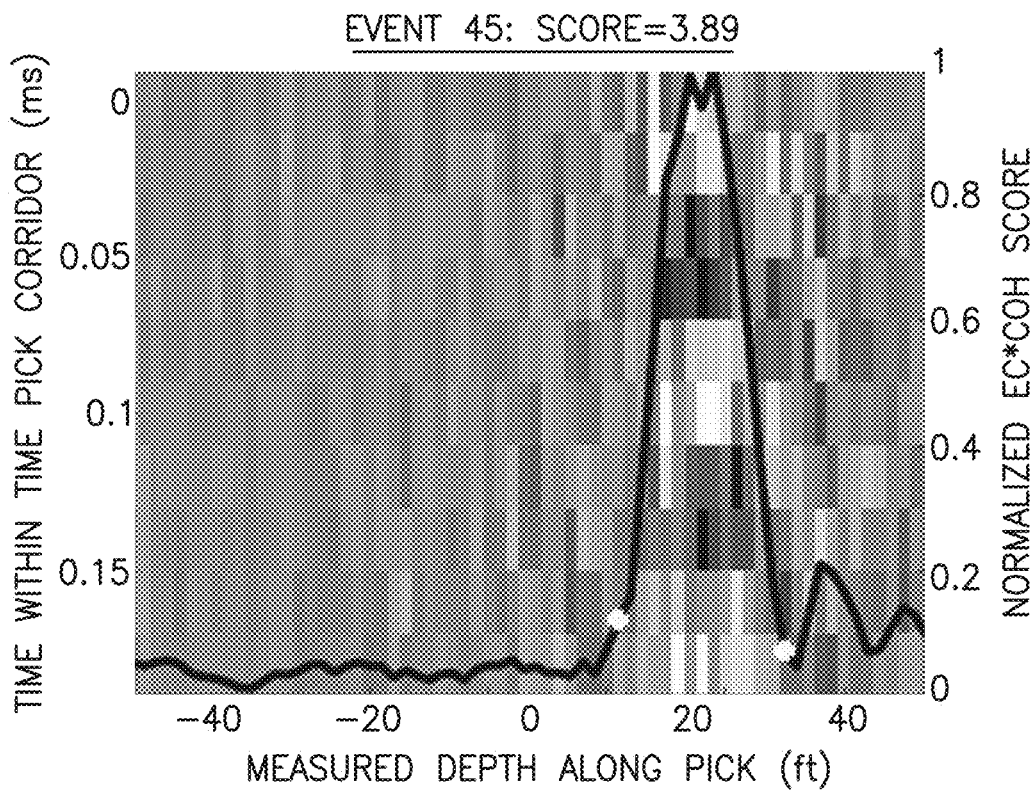
FIG.6A6

| TIME PICK MD (ft) | TIME PICK ARRIVAL TIME (ms) |
|---|---|
| X254.5 | 4.9602 |
| X255.0 | 4.9697 |
| X255.5 | 4.9792 |
| X256.0 | 4.9886 |
| X256.5 | 4.9981 |
| X257.0 | 5.0076 |
| X257.5 | 5.017 |
| X258.0 | 5.0265 |
| X258.5 | 5.036 |
| X259.0 | 5.0454 |
| X259.5 | 5.0549 |
| X260.0 | 5.0644 |
| X260.5 | 5.0738 |
| X261.0 | 5.0833 |
| X261.5 | 5.0928 |
| X262.0 | 5.1023 |
| X262.5 | 5.1117 |
| X263.0 | 5.1212 |
| X263.5 | 5.1307 |
| X264.0 | 5.1401 |
| X264.5 | 5.1496 |
| X265.0 | 5.1591 |
| X265.5 | 5.1685 |

FIG.6C

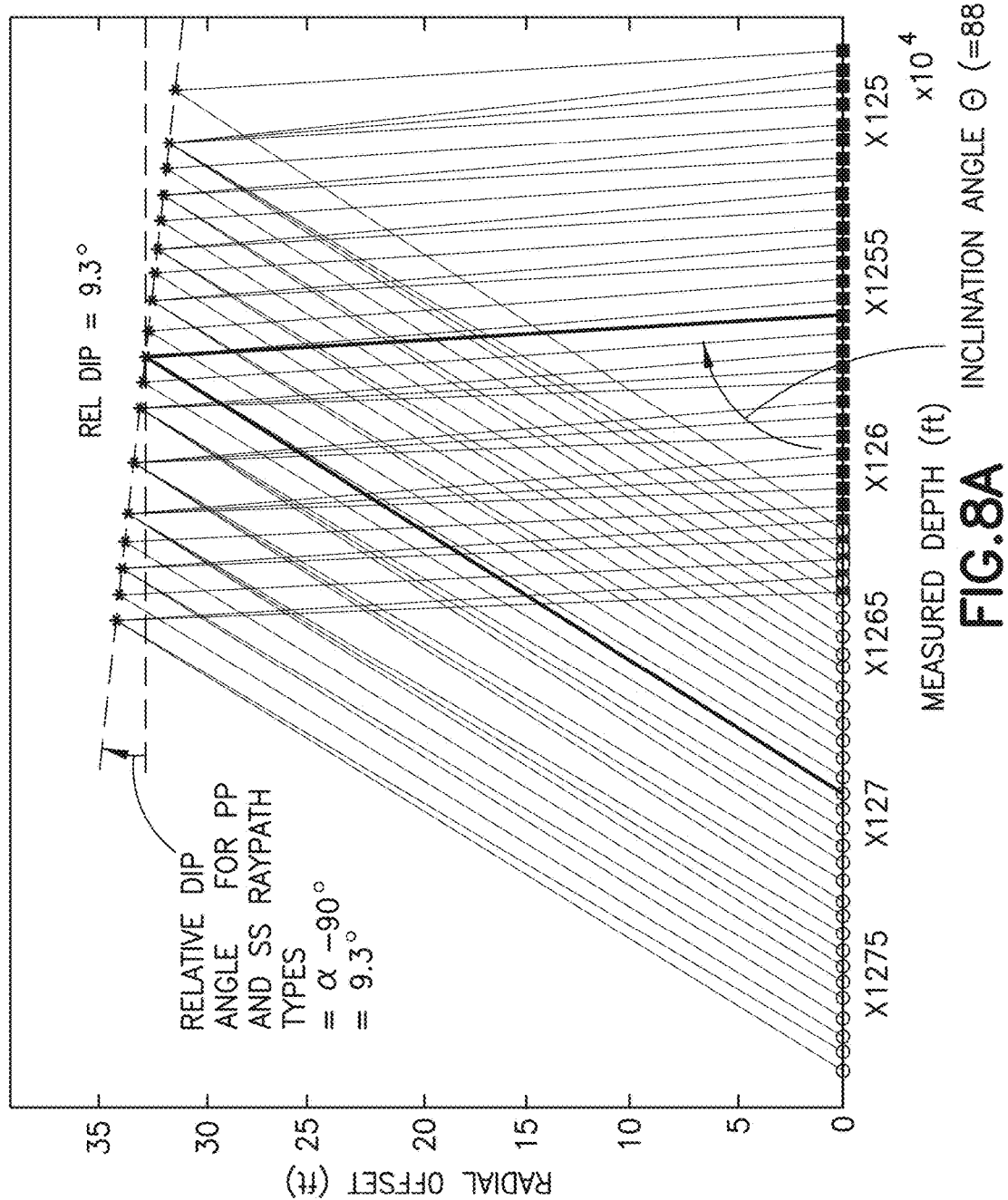

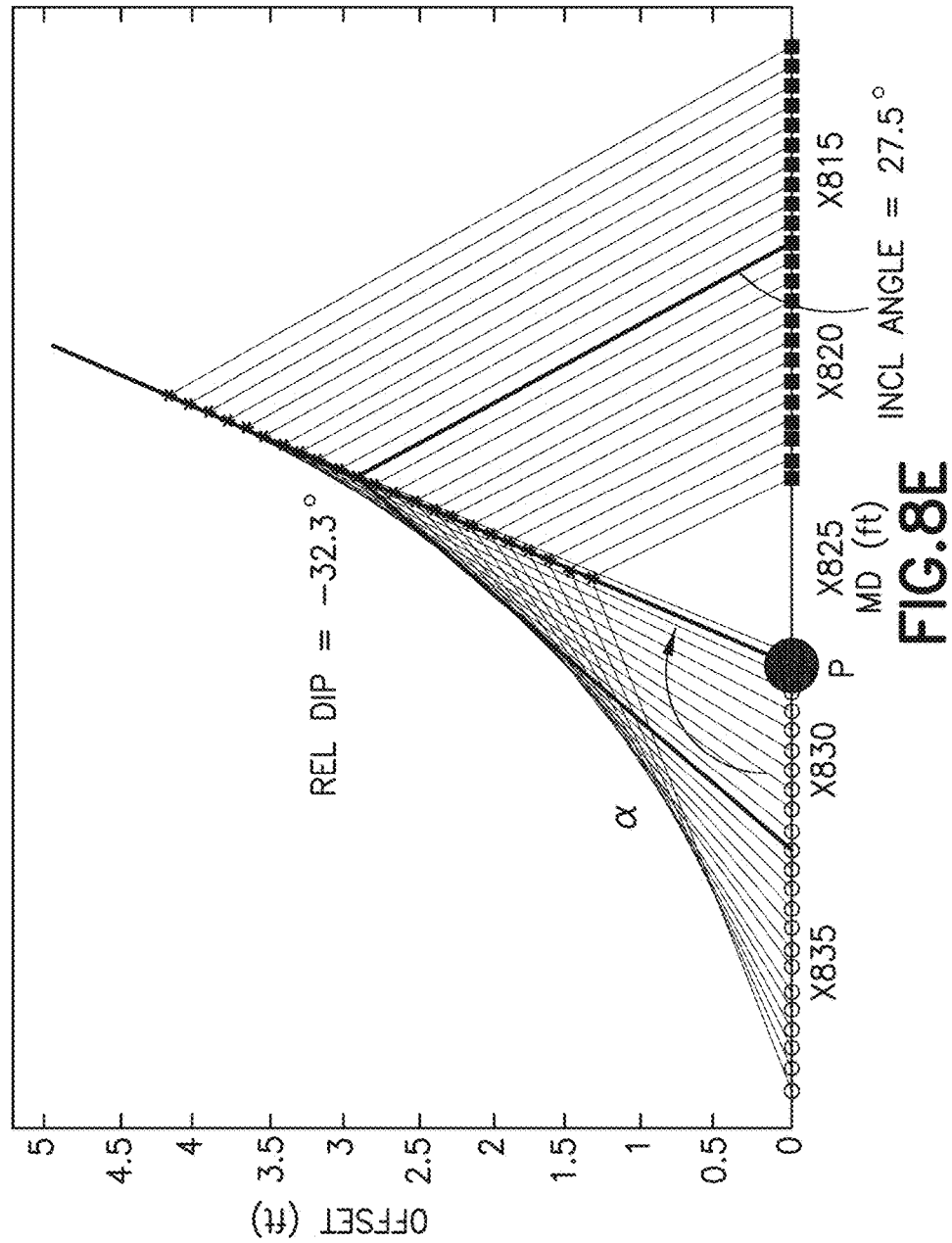

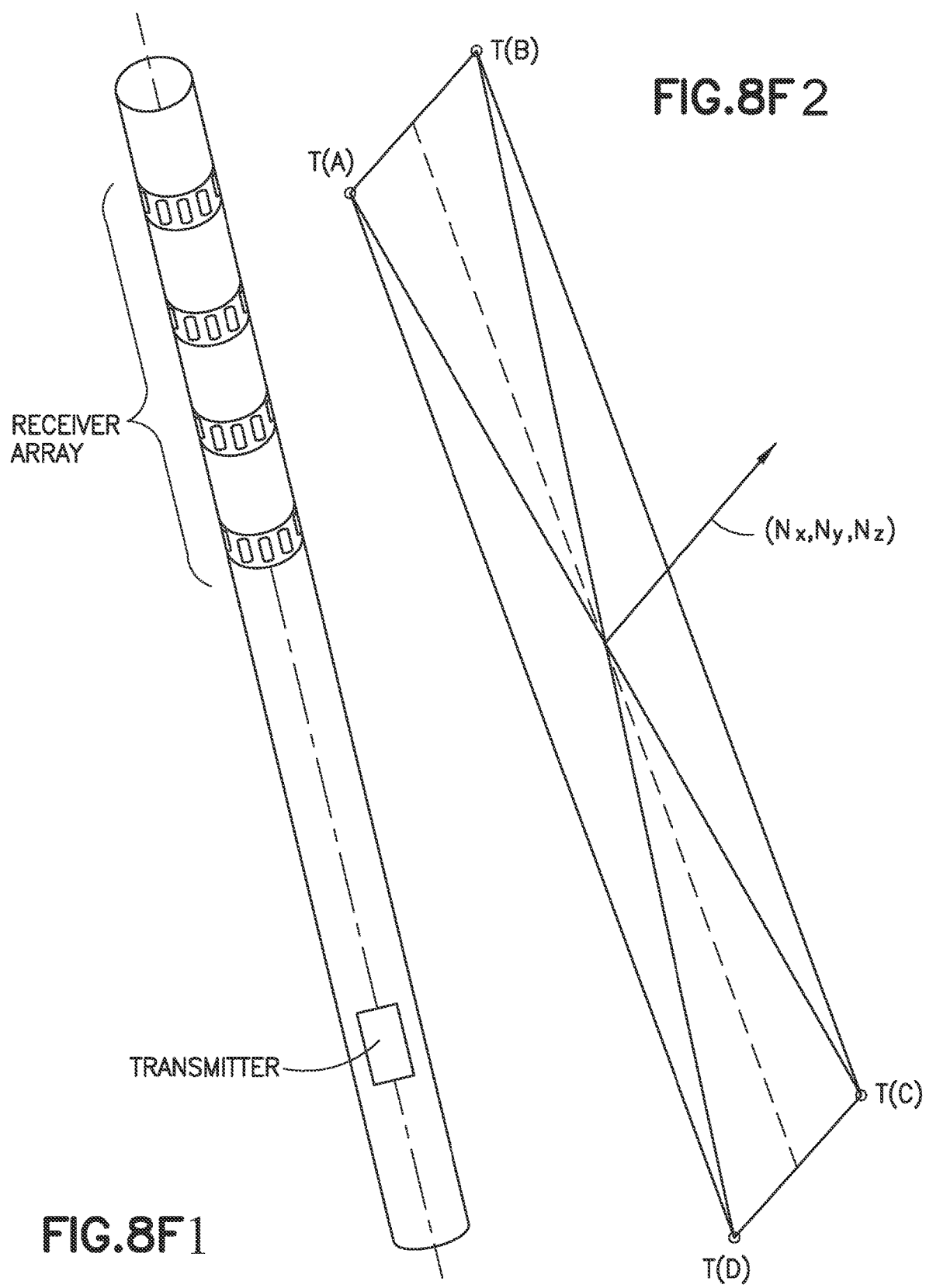

FIG.8H1

| TIME PICK MD (ft) | TIME PICK ARRIVAL TIME (ms) | MD POSITION OF 7th RECEIVER RING (ft) | MD POSITION OF SOURCE (ft) | MD POSITION OF PP RAY TRACED POINT ON REFLECTOR (ft) |
|---|---|---|---|---|
| X248.5 | 4.8003 | X248.5 | X262.25 | X249.49 |
| X249.0 | 4.8119 | X249.0 | X262.75 | X251.02 |
| X249.5 | 4.8234 | X249.5 | X263.25 | X251.02 |
| X250.0 | 4.835 | X250.0 | X263.75 | X251.02 |
| X250.5 | 4.8466 | X250.5 | X264.25 | X251.79 |
| X251.0 | 4.8581 | X251.0 | X264.75 | X252.56 |
| X251.5 | 4.8697 | X251.5 | X265.25 | X252.56 |
| X252.0 | 4.8813 | X252.0 | X265.75 | X253.32 |
| X252.5 | 4.8929 | X252.5 | X266.25 | X254.09 |
| X253.0 | 4.9044 | X253.0 | X266.75 | X254.09 |
| X253.5 | 4.916 | X253.5 | X267.25 | X254.86 |
| X254.0 | 4.9276 | X254.0 | X267.75 | X255.62 |
| X254.5 | 4.9392 | X254.5 | X268.25 | X255.62 |
| X255.0 | 4.9507 | X255.0 | X268.75 | X256.39 |
| X255.5 | 4.9623 | X255.5 | X269.25 | X257.16 |
| X256.0 | 4.9739 | X256.0 | X269.75 | X257.16 |
| X256.5 | 4.9855 | X256.5 | X270.25 | X257.92 |
| X257.0 | 4.997 | X257.0 | X270.75 | X258.69 |
| X257.5 | 5.0086 | X257.5 | X271.25 | X258.69 |
| X258.0 | 5.0202 | X258.0 | X271.75 | X258.69 |
| X258.5 | 5.0317 | X258.5 | X272.25 | X260.22 |
| X259.0 | 5.0433 | X259.0 | X272.75 | X260.22 |
| X259.5 | 5.0549 | X259.5 | X273.25 | X260.22 |
| X260.0 | 5.0665 | X260.0 | X273.75 | X261.76 |
| X260.5 | 5.078 | X260.5 | X274.25 | X261.76 |
| X261.0 | 5.0896 | X261.0 | X274.75 | X261.76 |
| X261.5 | 5.1012 | X261.5 | X275.25 | X262.53 |
| X262.0 | 5.1128 | X262.0 | X275.75 | X263.29 |
| X262.5 | 5.1243 | X262.5 | X276.25 | X263.29 |
| X263.0 | 5.1359 | X263.0 | X276.75 | X264.06 |
| X263.5 | 5.1475 | X263.5 | X277.25 | X264.83 |
| X264.0 | 5.159 | X264.0 | X277.75 | X264.83 |

| OFFSET OF PP RAY TRACED POINT ON REFLECTOR (ft) | MD POSITION OF SS RAY TRACED POINT ON REFLECTOR (ft) | OFFSET OF SS RAY TRACED POINT ON REFLECTOR (ft) |
|---|---|---|
| 31.41 | X253.29 | 16.92 |
| 31.66 | X253.83 | 16.97 |
| 31.66 | X254.36 | 17.02 |
| 31.66 | X254.9 | 17.07 |
| 31.78 | X255.43 | 17.12 |
| 31.91 | X255.97 | 17.17 |
| 31.91 | X256.5 | 17.22 |
| 32.03 | X257.03 | 17.28 |
| 32.16 | X257.57 | 17.33 |
| 32.16 | X258.1 | 17.38 |
| 32.28 | X258.64 | 17.43 |
| 32.41 | X258.64 | 17.43 |
| 32.41 | X259.71 | 17.53 |
| 32.53 | X259.71 | 17.53 |
| 32.66 | X260.78 | 17.63 |
| 32.66 | X260.78 | 17.63 |
| 32.78 | X261.31 | 17.68 |
| 32.91 | X261.84 | 17.73 |
| 32.91 | X262.38 | 17.78 |
| 32.91 | X262.91 | 17.84 |
| 33.16 | X263.45 | 17.89 |
| 33.16 | X263.98 | 17.94 |
| 33.16 | X264.52 | 17.99 |
| 33.41 | X265.05 | 18.04 |
| 33.41 | X265.59 | 18.09 |
| 33.41 | X266.12 | 18.14 |
| 33.53 | X266.12 | 18.14 |
| 33.66 | X267.19 | 18.24 |
| 33.66 | X267.19 | 18.24 |
| 33.78 | X267.72 | 18.29 |
| 33.91 | X268.26 | 18.34 |
| 33.91 | X268.79 | 18.4 |

FIG.8H2

|  | PP | SS |
|---|---|---|
| $\Lambda$ | 0.2% | 0.19% |
| $\sigma_\Theta$ | 0.89 | 0.78 |
| $\sigma_\varphi$ | 0.87 | 0.34 |
| $\sum_j p_j$ | 13.5 | 6.7 |
| SCORE | 10.43 | 1.77 |

FIG.11C

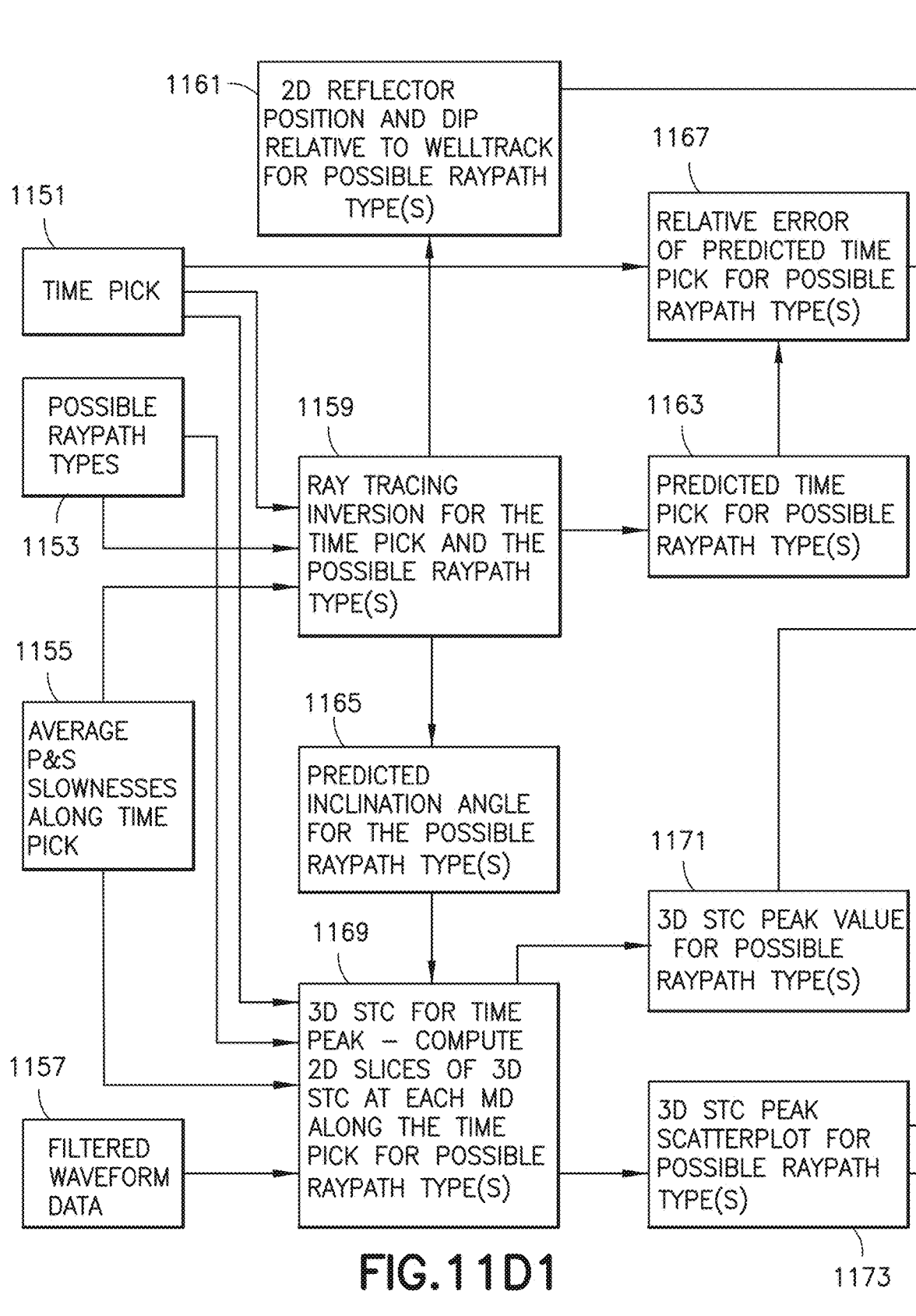
FIG.11D1

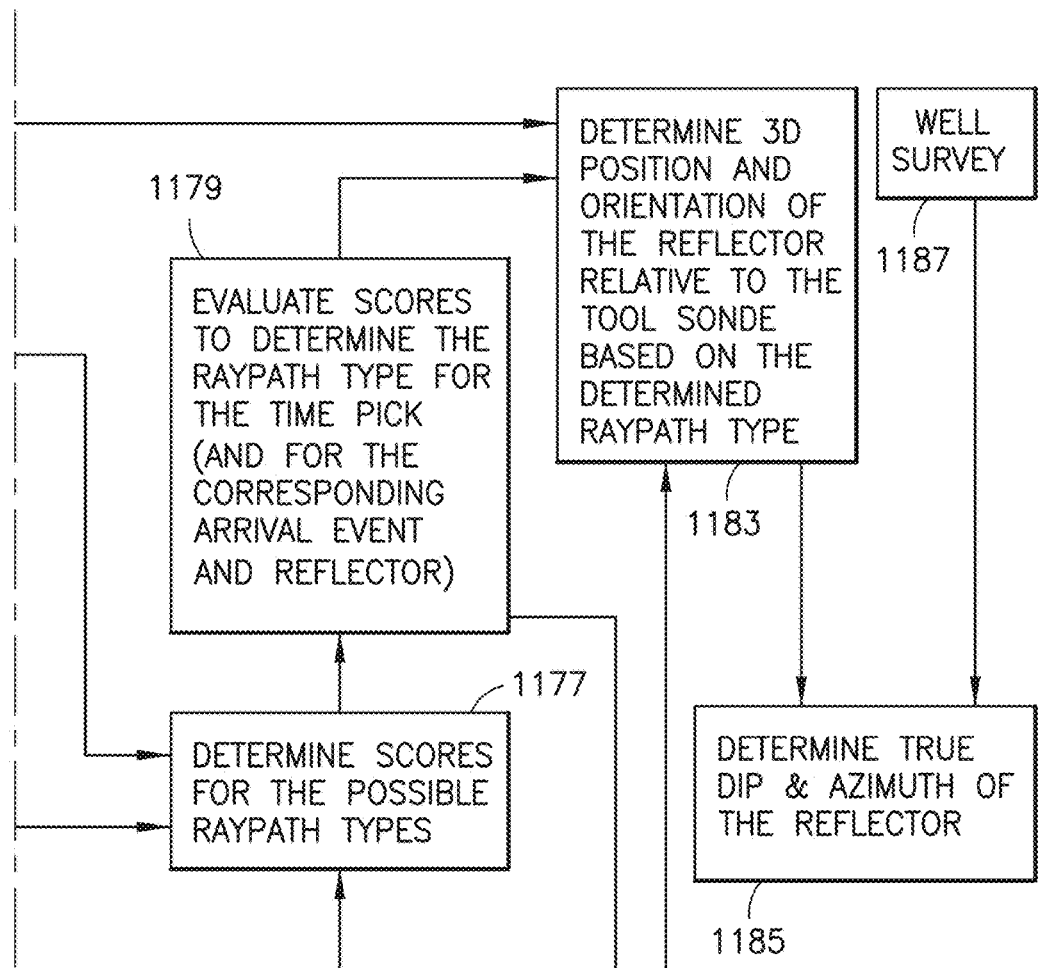
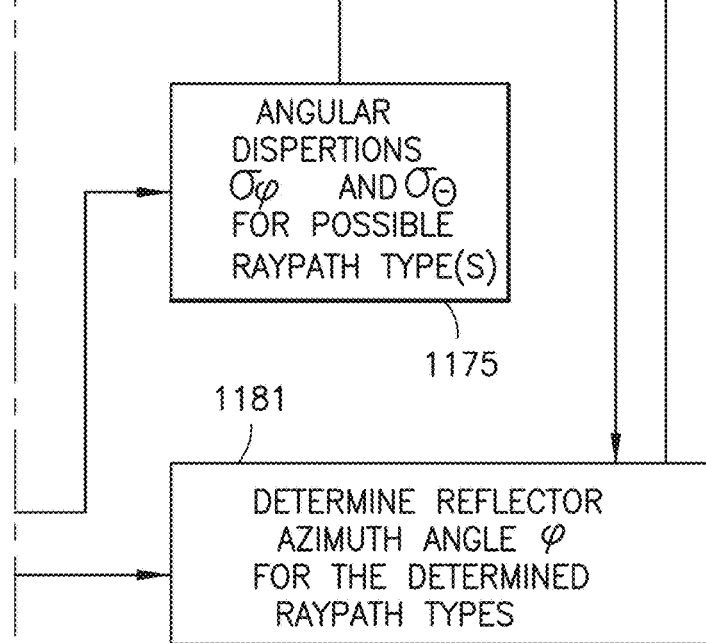
FIG.11D2
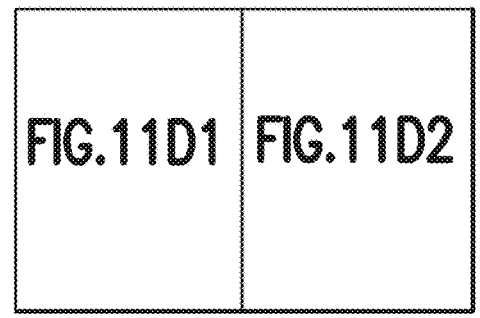
FIG.11D

SPECIFY MIGRATION DETAILS

| | |
|---|---|
| STARTING MD INDX (1=BOTTOM OF WELL)(INDX): (minSetting=530) | |
| 508 | |
| NUMBER OF MD STATIONS (INTEGER) (minSetting = 120): | |
| 163 | |
| IMPOSE DIP CONSTRAINT? (0 = FALSE, 1 = TRUE): | |
| 0 | |
| DIP CONSTRAINT (DEG) | |
| −14.8584 | |
| DIP CONSTRAINT HALF WINDOW SIZE (DEG) | |
| 10 | |
| MUTE BEFORE SELECTED MARKER? (C, S, St, I, N): | |
| S | |
| SHIFT MUTING MARKER (ms): | |
| 0 | |
| MUTE AFTER SELECTED MARKER? (C, S, St, I, N): | |
| N | |
| SHIFT MUTING MARKER (ms): | |
| 0 | |
| CURTAIN SECTION OR NORMAL SECTION? (1 = CURTAIN, 0 = NORMAL): | |
| 1 | |
| IF CURTAIN SECTION, SET AZIMUTH = (DEG): | |
| −143.6231 | |
| IF NORMAL SECTION, SET MD = (ft) (MAX = 11146.5, MIN = 11065.5: | |
| X102.2322 | |
| DISTANCE FROM BOREHOLE = (ft): (minSetting = 27.5827) | |
| 42 | |
| xSTEP = (ft): | |
| 0.125 | |
| zSTEP = (ft): | |
| 0.125 | |
| MIGRATION APERTURE = (ft): (minSetting = 10.7773) | |
| 17 | |
| USE COHERENCE WEIGHTING? (0 = NO, 1 = YES): | |
| 1 | |
| GEOMETRICAL SPREADING =: | |
| 0 | |

FIG.15

| | A | B | C | D | E | F | G |
|---|---|---|---|---|---|---|---|
| 1 | FEATURE INDEX | SLOWNESS SRC TO REFL (1=P, 2=S) | SLOWNESS REFL TO REC (1=P, 2=S) | MD INTERCEPT (m) | MEAN EVENT MD (m) | REFLECTOR START MD(m) | REFLECTOR STOP MD(m) |
| 2 | 1 | 1 | 2 | 1166.16 | 1163.57 | 1164.53 | 1165.73 |
| 3 | 2 | 1 | 2 | 1166.39 | 1163.50 | 1164.45 | 1165.99 |
| 4 | 3 | 1 | 2 | 1166.46 | 1163.50 | 1164.40 | 1166.02 |
| 5 | 4 | 2 | 1 | 1119.19 | 1117.17 | 1119.74 | 1120.96 |
| 6 | 5 | 2 | 1 | 1119.28 | 1117.02 | 1119.87 | 1120.79 |
| 7 | 6 | 2 | 1 | 1119.05 | 1117.02 | 1119.60 | 1120.84 |
| 8 | 7 | 1 | 2 | 1166.22 | 1164.03 | 1164.71 | 1165.80 |
| 9 | 8 | 1 | 2 | 1120.55 | 1118.01 | 1118.55 | 1119.85 |
| 10 | 9 | 1 | 2 | 1166.37 | 1163.95 | 1165.03 | 1166.02 |
| 11 | 10 | 1 | 1 | 1116.41 | 1101.09 | 1101.99 | 1106.00 |
| 12 | 11 | 2 | 1 | 1118.86 | 1118.16 | 1119.82 | 1122.42 |
| 13 | 12 | 1 | 2 | 1166.61 | 1164.11 | 1164.57 | 1166.08 |
| 14 | 13 | 2 | 1 | 1118.90 | 1117.02 | 1119.54 | 1120.80 |
| 15 | 14 | 2 | 1 | 1118.92 | 1116.94 | 1119.55 | 1120.70 |
| 16 | 15 | 1 | 2 | 1166.32 | 1164.18 | 1164.74 | 1165.80 |
| 17 | 16 | 1 | 1 | 1115.47 | 1100.63 | 1101.44 | 1105.78 |
| 18 | 17 | 2 | 1 | 1071.50 | 1070.38 | 1072.47 | 1075.14 |
| 19 | 19 | 1 | 1 | 1119.62 | 1121.44 | 1120.56 | 1122.57 |
| 20 | 20 | 2 | 1 | 1117.20 | 1115.87 | 1118.10 | 1120.21 |
| 21 | 21 | 1 | 2 | 1120.25 | 1117.09 | 1117.87 | 1119.62 |
| 22 | 22 | 1 | 2 | 1166.46 | 1164.18 | 1165.23 | 1166.14 |
| 23 | 23 | 2 | 1 | 1165.07 | 1162.96 | 1165.13 | 1165.16 |

FIG.16A1

| H | I | J | K | L | M | N | O |
|---|---|---|---|---|---|---|---|
| REFLECTOR START OFFSET (ft) | REFLECTOR STOP OFFSET (ft) | RELATIVE DIP (deg) | TRUE DIP (deg) | TRUE AZIMUTH (deg) | REFLECTOR AZIMUTH (deg) | SCORE | DISK CENTER X (m) |
| 3.32 | 0.88 | 33 | 51 | 92 | 188 | 7.1 | −3.28 |
| 3.95 | 0.81 | 35 | 53 | 118 | 213 | 6.1 | −3.28 |
| 4.04 | 0.87 | 38 | 53 | 116 | 211 | 5.9 | −3.31 |
| 0.96 | 3.07 | 49 | 65 | 332 | 172 | 5.8 | −5.10 |
| 1.01 | 2.60 | 50 | 65 | 336 | 176 | 5.7 | −5.04 |
| 0.94 | 3.05 | 49 | 66 | 342 | 182 | 5.7 | −5.01 |
| 2.78 | 0.78 | 39 | 54 | 80 | 178 | 5.7 | −3.16 |
| 3.02 | 1.06 | 49 | 66 | 266 | −75 | 5.2 | −4.22 |
| 3.02 | 0.79 | 32 | 50 | 117 | 212 | 5.0 | −3.12 |
| 8.21 | 5.93 | 66 | 82 | 39 | 59 | 4.9 | −6.48 |
| 1.32 | 4.89 | 53 | 70 | 325 | 165 | 4.6 | −5.35 |
| 3.20 | 0.83 | 41 | 58 | 83 | 181 | 4.6 | −3.22 |
| 1.07 | 3.17 | 51 | 66 | 350 | 191 | 4.6 | −4.93 |
| 1.05 | 3.02 | 50 | 66 | 357 | 197 | 4.5 | −4.85 |
| 2.59 | 0.85 | 39 | 57 | 77 | 175 | 4.5 | −3.13 |
| 8.41 | 5.80 | 66 | 81 | 47 | 68 | 4.5 | −6.73 |
| 0.98 | 3.68 | 62 | 78 | 343 | 154 | 4.5 | −5.60 |
| 2.22 | 6.98 | 38 | 54 | 255 | 93 | 4.3 | −6.13 |
| 1.08 | 3.62 | 55 | 73 | 0 | −159 | 4.2 | −4.83 |
| 4.32 | 1.13 | 42 | 62 | 262 | −80 | 4.1 | −4.03 |
| 2.85 | 0.73 | 31 | 50 | 124 | 218 | 4.0 | −3.04 |
| 0.42 | 0.62 | 14 | 30 | 227 | 136 | 4.0 | −2.74 |

FIG.16A2

| P | Q |
|---|---|
| DISK CENTER Y (m) | DISK CENTER Z (m) |
| −0.53 | −1165.36 |
| −0.23 | −1165.45 |
| −0.24 | −1165.44 |
| 1.20 | −1120.65 |
| 1.16 | −1120.62 |
| 1.24 | −1120.52 |
| −0.63 | −1165.47 |
| 0.77 | −1119.45 |
| −0.29 | −1165.74 |
| −0.17 | −1104.22 |
| 1.38 | −1121.43 |
| −0.61 | −1165.55 |
| 1.30 | −1120.47 |
| 1.29 | −1120.42 |
| −0.65 | −1165.49 |
| 0.07 | −1103.85 |
| 4.30 | −1074.24 |
| 0.17 | −1121.82 |
| 1.43 | −1119.45 |
| 0.88 | −1119.00 |
| −0.25 | −1165.89 |
| −0.66 | −1165.31 |

Grouping (right brace labels): M, B, M, C, B, M, B, M, C, B, C, B, M, B

M — MAGENTA  
B — BROWN  
C — CYAN

FIG.16A3

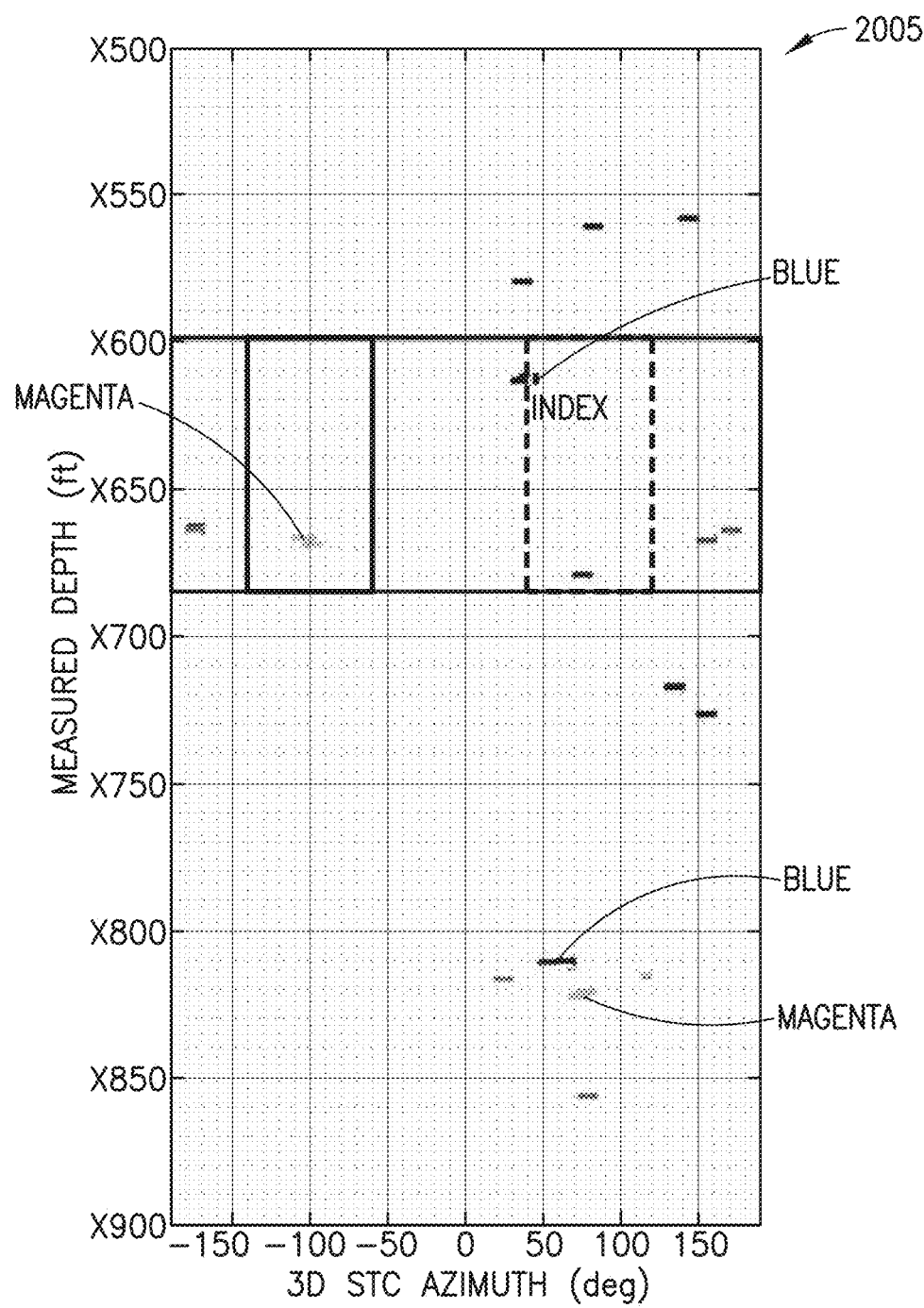
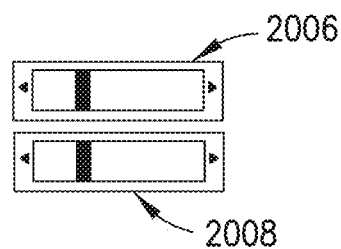
FIG.20C

METHODS AND SYSTEMS FOR AUTOMATED SONIC IMAGING

CROSS-REFERENCE TO RELATED APPLICATION(S)

The present patent application is a Continuation in Part from and claims priority to U.S. patent application Ser. No. 16/349,417 that was filed on May 13, 2019, which is the National Stage Application of and claiming priority to International Application No. PCT/US18/57298 that was filed on Oct. 24, 2018, and that claims priority to U.S. Provisional Patent Application No. 62/576,254 that was filed on Oct. 24, 2017, all being commonly assigned to assignee of the present disclosure and herein incorporated by reference in their entireties.

BACKGROUND

1. Field

The present disclosure relates to methods and systems that use downhole sonic logging measurements to derive information pertaining to subsurface formation structures.

2. State of the Art

Using downhole measurements to derive information pertaining to subsurface formation structures continues to be of increasing importance for oil and gas exploration and development. Early in the development of an oil and gas field, surface seismic and electromagnetic measurements are particularly helpful for discerning the coarse and large-scale structures of the subsurface. Furthermore, vertical seismic profile (VSP) measurements and, more recently, electromagnetics logging while drilling (LWD) measurements can be used to create images of somewhat finer scale structures relatively near the wellbore. All of this information can aid oil and gas companies to make improved exploration and development decisions.

The goal of sonic imaging is to use downhole sonic logging measurements to create high resolution images and mappings of near wellbore formation structures (e.g., fractures, faults, bedding planes, other wellbores). This information compliments the comparatively lower resolution but larger scale formation information and images that can be determined by surface seismic measurements and by VSP measurements. In addition, the downhole sonic imaging measurements can help complement similar scale measurements provided by the aforementioned LWD electromagnetics measurements.

Current state of the art sonic imaging methods can be logically partitioned into three phases as shown in FIG. 1. In the first phase, an acoustic source (or transmitter) of a downhole sonic tool is operated to emit wavefronts that probe the near wellbore structures (e.g., fractures, nearby bed boundaries and faults, etc.) by propagating, reflecting, and refracting across these structures, which are generally referred to as reflectors in the present disclosure. The downhole sonic tool also includes an array of acoustic receivers (or sensors) that receive the resulting wavefronts to obtain the sonic waveform data. In the second phase, the waveforms are processed to separate out and filter borehole modes and other interfering signals from the waveform data. In the third phase, the resultant filtered waveform data is processed to create an image that conveys the presence of the near wellbore structures. The focus of the processing of the third phase resides on reflections from acoustic impedance boundaries and mode-converted waves generated as compressional or shear waves cross acoustic impedance boundaries. When imaging an event that crosses the borehole, the geometry of the tool as well as the location and orientation of the event relative to the tool axis govern the reflected waveforms present in the data acquired. If both the transmitter and receivers are located above the event, the generated reflections received by the tool originate from the updip side of the event and the reflections from the downdip side of the event do not return to the tool. When the transmitter and receiver are below the event, the reflections measured by the tool originate from the downdip side of the event, and the updip reflections propagate away from the borehole without being detected by the tool. When the generated reflections received by the tool originate from a location between the transmitter and receiver, compressional-to-shear wave (PS) conversions are seen on the updip side of the event, and shear-to-compressional wave (SP) conversions are seen on the downdip side of the event. Using the knowledge of how the reflected waves behave, in comparison to refracted waves, the events can be classified. Then, information from the reflected and mode-converted waves can be used to create an image of the acoustic impedance boundaries that cross the borehole or that are situated within the depth of investigation for that particular case. The presence of the near wellbore structures (reflectors) can be identified from the display of the image.

The outcome of the methodology depicted in FIG. 1 is a two-dimensional (2D) migration image of the near wellbore structures that presents numerous challenges for its use with subsequent modeling and interpretation workflows. First, 2D migration images often fail to capture the 3D orientations of the near wellbore structures. The near wellbore structures could include fractures which intersect at right angles or could include fault planes which are not aligned with the formation layering. A migration image presents all the reflectors as lying in the same 2D plane. Second, the 2D migration image cannot provide quantitative information for the reflectors. Third, a 2D migration image does not provide for determining the coordinates and orientation of the reflectors in three-dimensions (3D) in a manner which can be captured in a digital subsurface model. The 2D migration is just a picture, often with significant noise and artifacts, not a collection of oriented reflectors in 3D.

The simplicity of the methodology depicted in FIG. 1 belies the complexity of the interpretation task required to execute this sonic imaging method. Among the tasks required of the interpreter are the following, all of which must be done based on the user's visual inspection of the waveforms and the imaging results.

First, the possible arrival events in the filtered waveform data are located. This can be a very labor-intensive portion of the method, as the user must typically visually inspect waveforms recorded by 4 to 8 sensors mounted around the circumference of the downhole sonic tool along hundreds, if not thousands, of feet in measured depth.

Second, the ray path type of any arrival events observed in the filtered waveform data is determined. Ray path type refers to the propagation mode (compressional or shear) of the wavefront before and after the wavefront encounters the reflector as shown in FIGS. 2A, 2B and 2C. Reflections from nearby reflectors can follow a PP or SS ray path as seen in FIGS. 2A and 2B, while mode conversion (PS or SP) is often observed when waves refract across planar fractures, as depicted in FIG. 2C.

Third, the measured depth locations and azimuths of the corresponding reflectors are determined. If the user plans to create a two-dimensional migration image along the well trajectory, choosing the correct azimuth ensures that the reflectors are in the imaging plane.

Fourth, the migration apertures required to successfully image the reflectors are estimated. Reflectors which are perpendicular to the well track typically require a long aperture to be successfully imaged.

Fifth, the migration is configured and run based on the parameters determined in the first through fourth steps. Since the imaging results can vary significantly as these parameters are changed, the user typically must engage in an iterative procedure until a "convincing" imaging result is obtained. As the migration operations are usually computationally intensive, this step can take a long time.

Sixth, the imaging results are displayed. The accuracy of the imaging results (or quality control) is often analyzed and explained using the arrival events present in the waveform measurements based on the results of the first through fifth steps. Today, there is no standard practice for providing this quality control.

Besides being time consuming, this workflow is often perceived to be very subjective. In addition, 2D images produced using this procedure do not provide the locations or orientations of the near wellbore reflectors and often do not capture the actual 3D geometry of the formation structures located along the well trajectory.

Furthermore, the downhole sonic imaging tools typically use acoustic measurements in the range of 500 Hz-20 kHz. A monopole source and/or dipole source is typically used as higher order sources (e.g., a quadrupole source) typically transmit less energy into the surrounding Earth formation. A monopole source can be used because it has a somewhat higher frequency (1-10 kHz) and thus provides somewhat higher resolution images near the wellbore for fracture analysis, while a dipole source can be used because it has a deeper depth of penetration into the surrounding Earth formation albeit with a somewhat lower resolution. Moreover, the wavefields transmitted into the formation by monopole and dipole sources tend to illuminate different Earth formation structures depending on the formation lithology and other properties.

Different processing techniques for processing reflected wavefields recorded using monopole and dipole sources have been studied and implemented commercially.

As described in Haldorsen, J. B. U., F. Zhu, N. Hirabyashi, W. H. Borland, H. Kurniawan, H. Yamamoto, K. Al-Ghammari, and R. T. Coates, "Borehole acoustic reflection survey (BARS) using full waveform sonic data," First Break, 2010, 28, pgs. 55-60, a monopole source can be used to produce migration images for each of eight sensors around the circumference of a tool sonde. Then, a geometric triangulation is used to generate a map of reflected energy versus reflector azimuth and distance of the reflector from the borehole (see FIG. 10 of Haldorsen). Maximizing this reflector energy allows one to determine the reflector azimuth and the appropriate 2D plane in which to perform the final sonic imaging migration.

As described in Bolshakov, A., D. Patterson, and C. Lan, "Deep Fracture Imaging Around the Wellbore Using Dipole Acoustic Logging," SPE Annual Technical Conference and Exhibition, 2011, paper 146769, a dipole source can be used to make inline (XX and YY) dipole measurements and crossline (XY and YX) dipole measurements that respond to the horizontally and vertically polarized reflected shear waves (SH and SV, respectively) according to the following equations:

$$XX = SH \cos^2\Phi + SV \sin^2\Phi \qquad (i)$$

$$YY = SH \sin^2\Phi + SV \cos^2\Phi \qquad (ii)$$

$$XY = YX = (SV - SH)\cos\Phi \sin\Phi \qquad (iii)$$

where $\Phi$ is the angle between the reflector strike and the azimuth direction of the X dipole transmitter or receiver.

Determining this angle $\Phi$ is typically done by minimizing the energy of the cross-dipole components XY and YX in the third equation. Having determined this angle, the first two equations can be used to solve for the SV and SH wavefield components, and a migration is then employed to produce an image of the formation. This processing amounts to implementing an azimuth rotation of the recorded inline and crossline dipole measurements prior to performing a migration.

SUMMARY

The present disclosure provides an automatic methodology that can process sonic waveform data to identify the three-dimensional location and orientation of near wellbore formation structures (reflectors) and optionally to construct an image of the acoustic impedance boundaries that shows these near wellbore formation structures (reflectors). The reflectors can be earth formation layer boundaries, fractures, faults, as well as nearby wellbores. The methodology includes a first automatic procedure (Tau-P and Event Localization Procedure) that processes the filtered waveform data to detect candidate arrival events that may or may not correspond to reflectors. The first automatic procedure can also be configured to identify the candidate arrival events that correspond to reflectors (actual arrival events) and filter out candidate arrival events that correspond to noise. The methodology also includes a second automatic procedure (ray tracing inversion and three-dimensional slowness time coherence (3D STC) procedure) that can determine the ray path type for one or more of the detected arrival events, determine the 3D position and orientation of a corresponding reflector relative to the tool sonde, determine true 3D position and orientation of the corresponding reflector, and provide an estimate of the relative prominence of the detected arrival event.

In embodiments, a sonic logging tool employs a high order acoustic source (such as a dipole acoustic source) that transmits acoustic signals that probe near wellbore formation structures. Interaction of the acoustic energy transmitted by the high order acoustic source with the near wellbore formation structures produces acoustic waveforms, including polarized shear waveforms, that return to the sonic logging tool where the returning acoustic waveforms are received by an array of receiver sensors. Waveform data derived from the received acoustic waveforms can be obtained as a function of measured depth. The waveform data can be processed to identify at least one arrival event (and corresponding time pick). A ray tracing inversion can be carried out for points in the time pick for each one of a number of possible raypath types to determine two-dimensional positions of a reflector corresponding to the arrival event (time pick) and the number of possible raypath types. The possible raypath types include at least one polarized shear raypath type. Furthermore, the waveform data is processed to determine at least one three-dimensional slowness-time coherence representation of the waveform data corresponding to the arrival event (time pick) and at least one possible raypath type. The at least one three-dimensional slowness-time coherence representation can be evaluated to determine a raypath type for the corresponding arrival event (time pick). An azimuth angle of a reflector corresponding to the arrival event (time pick) can be determined based on the three-dimensional slowness-time coherence representation corresponding to the arrival event (time pick) and the determined raypath type for the arrival event (time pick). A three-dimensional position for the reflector corresponding to the arrival event (time pick) can be determined based on the two-dimensional position of the reflector determined from the ray tracing inversion for the determined raypath type of the arrival event (time pick) and the azimuth angle of the reflector.

In embodiments, the 3D position of the reflector relative to the tool can be parameterized by a center point of the reflector defined by dimensions of measured depth, radial offset from the axis of the tool, and azimuth angle around the circumference of the tool and borehole. Orientation of the reflector relative to the tool can be parameterized by a relative dip angle and an inclination angle of the reflector.

In embodiments, the ray tracing inversion varies and solves for two-dimensional position and relative dip of a reflector having the polarized shear raypath type where the two-dimensional position and relative dip of the reflector is specified by i) a polar angle made from a position along the sonic logging tool and ii) a polar distance offset from said position.

In embodiments, the three-dimensional slowness-time coherence representation for the polarized shear raypath type employs a signum function that accounts for polarization of the acoustic energy incident on the array of receiver sensors. The signum function can be applied to a stack of wavefield data, wherein the signum function has a value of +1 for first receiver sensors on one side of the sonic logging tool orthogonal the azimuth propagation direction of the wavefield data, and wherein the signum function has a value of −1 for second receiver sensors on the opposite side of the sonic logging tool with respect to the first receiver sensors.

In embodiments, the three-dimensional slowness-time coherence representation for the polarized shear raypath type determines total energy as $$E_c(\tau, s_r, \theta, \varphi) = \int_0^{T_W} \left[ \sum_{j,k} \text{sign}(\sin(\varphi - \alpha_k)) \; w_{j,\alpha_k}(t + \tau + s_C \cdot x_{j,\alpha_k}) \right]^2 dt$$

where $\tau$ is a start time of a time window with a duration $T_W$,
$s_r$ is propagation slowness in the formation,
$\theta$ is inclination angle,
$\varphi$ is stacking azimuth,
$x_{j,\alpha_k}$ are spatial coordinates for receiver sensors of the sonic logging tool, $\alpha_k$ is the azimuth of the receiver sensor measured clockwise around the circumference of the tool,
$s_C$ is a three-dimensional slowness vector in Cartesian coordinates; and
$\text{sign}(\sin(\varphi - \alpha_k))$ is the signum function.

In embodiments, the true 3D position of the reflector can be parameterized by a center point of the reflector defined in a geographical 3D coordinate system (e.g., latitude/longitude/height with respect to the reference ellipsoid surface of the earth), a geocentric coordinate system (e.g., the Earth-Centered Earth-Fixed coordinate system, a vertical earth coordinate system (e.g., elevation or depth with regard to the geoid), or other suitable 3D earth coordinate system. The true orientation of the reflector can be parameterized by coordinates of a normal vector that extends from the reflector at its center point. The coordinates of the normal vector for the reflector can be translated to a true dip angle and true azimuth angle for the reflector.

In embodiments, the automated methodology of the present disclosure can be extended to generate and display (1) logs of the detected arrival events showing their measured depth location and any of several attributes (ray path type, reflector azimuth around the circumference of the borehole, relative dip, reflector true dip angle and true azimuth angle), (2) display maps that convey two-dimensional and three-dimensional spatial positions of the reflectors along the well track (which can be used for subsequent subsurface modeling and simulation workflows such as discrete fracture network modeling or modeling which ties these sonic imaging reflectors to the reflectors provided by VSP or seismic imaging), (3) a spreadsheet, or some other structured data object(s), that contains information describing the three-dimensional locations and orientations as well as ray path type of the reflectors, and (4) other views (such as a tadpole plot, stereonet plot or Rose diagram) that displays information that characterizes the true dip and azimuth reflectors as a function of depth along the well track. One or more of these other views can be displayed in conjunction with other logs, such as an Fullbore Micro-resistivity Imager (FMI) image of a corresponding interval of measured depth or possibly a tadpole diagram, stereonet plot or Rose diagram of true dip and azimuth that is derived from the FMI image.

The present disclosure also provides an optional procedure that automatically generates parameters for migration that can be used to configure the migration, which is executed to construct an image of acoustic impedance boundaries that shows these reflectors. In addition, an optional quality control (QC) procedure can be used to analyze and explain the migration operations, particularly the reflectors shown in the display maps.

The automated methodology of the present disclosure can address a number of shortcomings in the current state of the art processing including (A) the limited utility of 2D migration images for subsequent modeling and interpretation workflows; (B) its labor intensive quality; (C) the limited ability to characterize the reflected arrival events observed in the filtered waveforms, which leads to; (D) the very limited guidance as to how to configure the migration; (E) the limited information as to which waveform features lead to which features in the migration result (and vice versa); and finally, (F) the perception that today's sonic imaging methodology is highly subjective.

BRIEF DESCRIPTION OF THE DRAWINGS

FIGS. 3A-3D illustrate exemplary arrival event logs that can be produced by the automated workflow of operations of the present disclosure. The logs of FIGS. 3A-3D can optionally be displayed in a common display window.

FIGS. 5A-5C, 6A1-6A6, 6B and 6C are plots illustrating a Tau-P transform and an event localization procedure, which can be part of the automated workflow of operations of the present disclosure. FIG. 6B is a schematic diagram of a time pick (dashed black line) where the measured depth of a detected arrival event is shown as the midpoint of the measured depth interval for the time pick of the detected arrival event.

FIGS. 8A and 8B are exemplary visual representations of the results of ray tracing inversion and three-dimensional slowness-time-coherence (3D STC) processing for PP ray types, which can be produced by the automated workflow of operations of the present disclosure.

FIG. 8C-8E are schematic representations of exemplary parameters used to characterize the wellbore environment and reflector position for the ray tracing inversion processing as part of the automated workflow of operations of the present disclosure.

FIGS. 8F1, 8F2, and 8G are schematic representations of exemplary parameters used to characterize a reflector position and orientation in 3D space as part of the automated workflow of operations of the present disclosure.

FIGS. 8H1-8H2, is a table representation of an exemplary time pick and corresponding ray tracing inversion results for PP and SS raypath types produced as part of the automated workflow of operations of the present disclosure.

FIG. 11C is a tabular representation of the procedure to score or rank the raypath types of a particular time pick and corresponding reflectors which can be produced by the automated workflow of operations of the present disclosure.

FIG. 11D, which includes FIGS. 11D1 and 11D2, is a flowchart of the ray tracing inversion and 3D STC computation operations which are part of the automated workflow of operations of the present disclosure.

FIG. 15 is an exemplary graphical user interface that allows a user to set and adjust certain parameters used in the automated workflow of operations of the present disclosure.

FIGS. 16A1-16A3, is a spreadsheet that stores information pertaining to reflectors identified from the filtered waveform data in the automated workflow of operations of the present disclosure; the spreadsheet can be presented to a user for better understanding of the reflectors; it can also be used to supplement a reservoir model with information regarding the reflectors for reservoir analysis and/or simulation based upon the improved reservoir model.

FIGS. 20A-20F illustrate other exemplary logs that can be produced by the automated workflow of operations of the present disclosure. Some or all of the logs of FIGS. 20A-20F can optionally be displayed in a common display window.

DETAILED DESCRIPTION OF THE PREFERRED EMBODIMENTS

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show details in more detail than is necessary, the description taken with the drawings making apparent to those skilled in the art how the several forms of the subject disclosure may be embodied in practice. Furthermore, like reference numbers and designations in the various drawings indicate like elements.

Figure 1:
FIG. 1 is a flow diagram illustrating current state of the art sonic imaging methods.
Figure 6B:
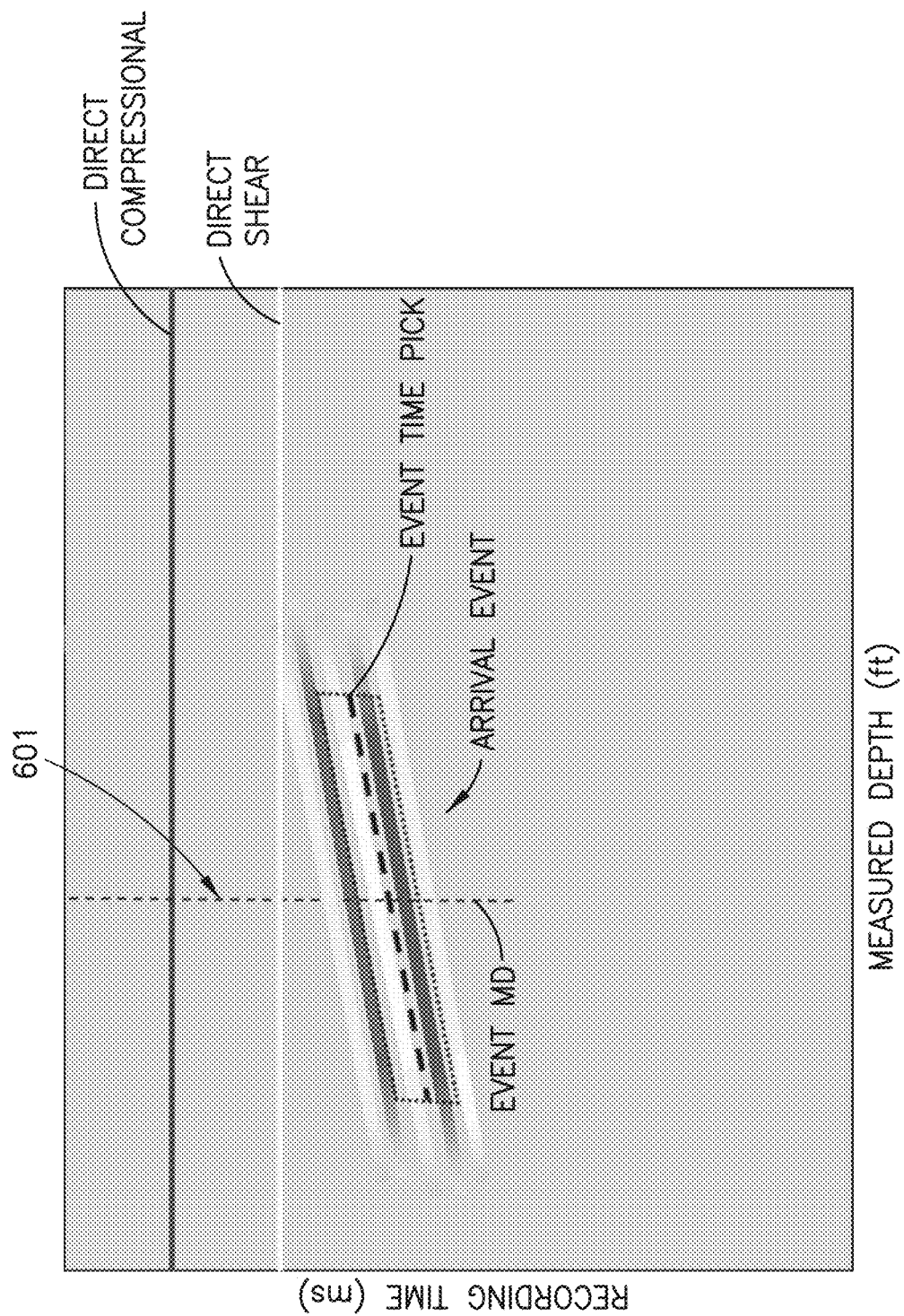

The methodology of the present disclosure presents an alternative to and can improve upon the operations of the third phase of the sonic imaging methodology shown in FIG. 1. In particular, an automated workflow is provided that includes one or more of the following operations:

(A) A first automatic procedure (Tau-P and Event Localization Procedure) that processes the filtered waveform measurements to identify candidate arrival events and to rank the candidate arrival events according to their relative prominence. The candidate arrival events may or may not correspond to near wellbore formation structures of interest (reflectors), which can be earth formation layer boundaries, fractures, faults, as well as nearby wellbores. For example, some of the candidate arrival events may correspond to noise. In embodiments, the first automatic procedure can determine a time pick for a candidate arrival event, which may consist of onset or arrival times of the candidate arrival event for an interval of measured depths as depicted in FIGS. 6B, 6C, and in panel 701 of FIG. 7A. These procedures can produce and display a log of candidate arrival events, for example as shown in the panel of FIG. 3A and in the panel 703 of FIG. 7D where the candidate arrival events are shown by markings as a function of measured depth on the vertical axis and receiver sensor azimuthal index around the tool circumference of the tool sonde on the horizontal axis. The intensity of each marking depicts the relative prominence of the corresponding candidate arrival event. The first automatic procedure can also be configured to identify the candidate arrival events produced by reflectors (referred to as "actual arrival events") and thus filter out the candidate arrival events corresponding to noise.

Figure 3D:
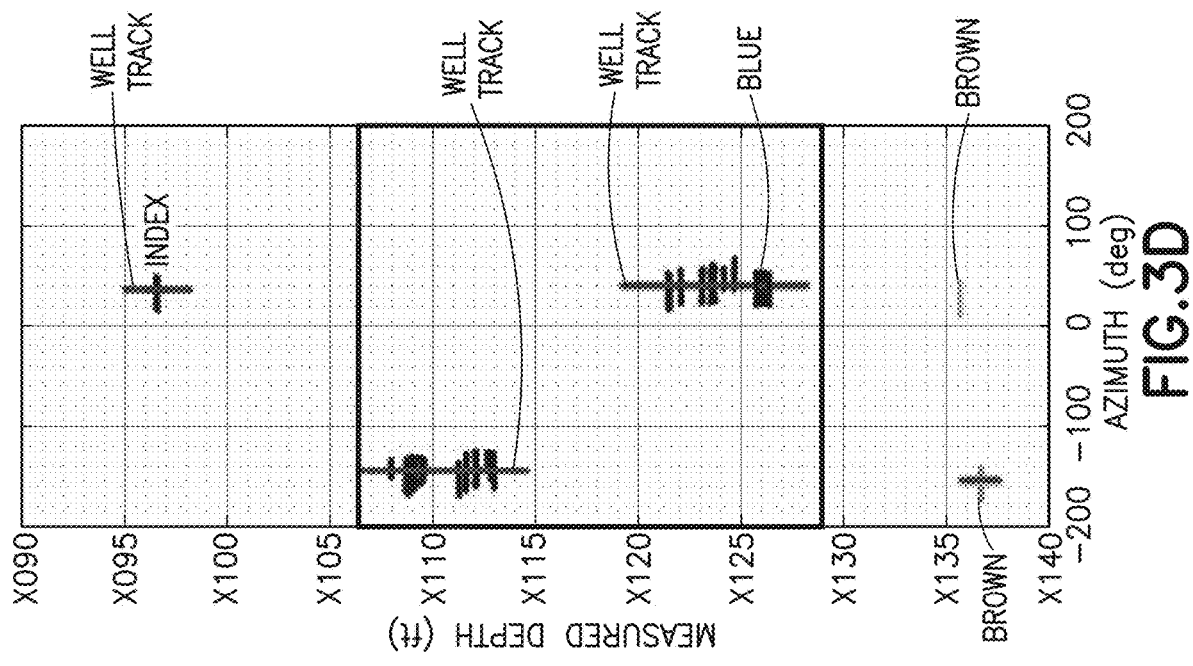
Figure 3C:
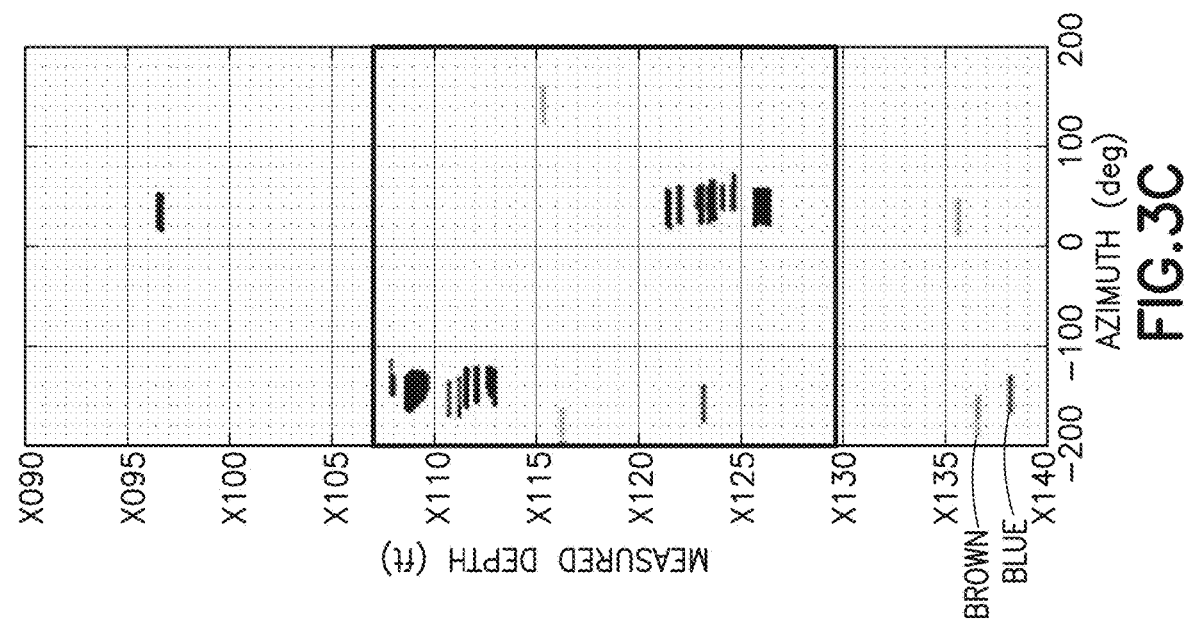
Figure 16:
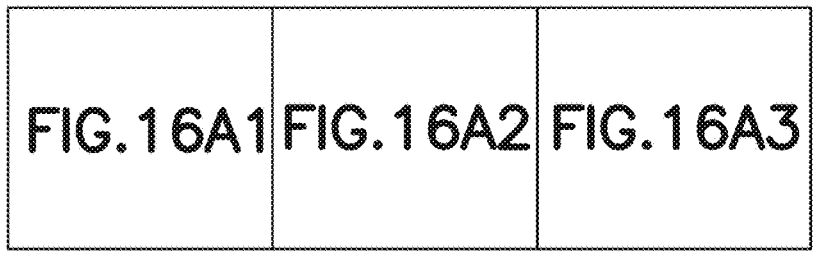
FIG. 16, which includes
Figure 16D:
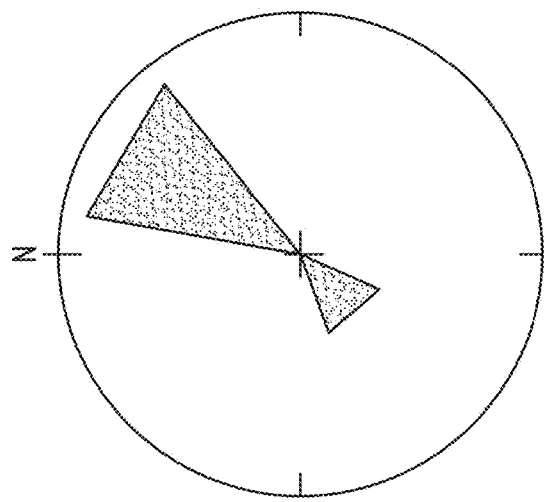
FIG. 16D is a view of an exemplary Rose diagram, which can be generated from the results of the automated workflow of operations of the present disclosure.

(B) A second automatic procedure (ray tracing inversion and three-dimensional slowness time coherence workflow) that processes the data representing the time pick and corresponding portion of the filtered wavefield for one or more detected arrival events (which are preferably one or more detected actual arrival events that are produced by reflectors and thus do not correspond to noise) using a ray tracing inversion and three-dimensional slowness time coherence workflow that characterizes the raypath types of the detected arrival event and that determines three-dimensional position and orientation of the reflector corresponding to the detected arrival event and corresponding time pick. There can be a number of possible outcomes of this procedure, such as:

a. A display log that conveys the detected arrival events as a function of measured depth and receiver azimuth index and ray path type as shown in the panel of FIG. 3B, in the panel 1203 of FIG. 12D, and in panel 1903 of FIG. 19D. The measured depth of a detected arrival event is the mean measured depth of the corresponding time pick as conveyed in FIG. 6B. Each detected arrival event can be denoted by a marking where the hue of the marking can indicate ray path type (such as a "Cyan" color representing the 'PP reflected' ray path type, a "Brown" color representing the 'SP refracted' ray path type, a "Magenta" color representing the 'PS refracted' ray path type, and an "Orange" color representing the 'SS reflected' ray path type), while the intensity of the marking can depict the relative prominence of the corresponding arrival event. The ray path type for each detected arrival event is determined by the results of the ray tracing inversion and three-dimensional slowness time coherence workflow.

b. A display log the coveys the position of the reflectors that produce the detected arrival events as a function of measured depth and azimuth angle (in degrees) as shown in the panel of FIG. 3C, in panel 405 of FIG. 4C, in FIG. 4D, panel 2005 of FIG. 20 and in FIG. 20D. Each reflector can be denoted by a marking where the hue of the marking can indicate ray path type (such as a "Cyan" color representing the 'PP reflected' ray path type, a "Brown" representing the 'SP refracted' ray path type, a "Magenta" color representing the 'PS refracted' ray path type, and an "Orange" color representing the 'SS reflected' ray path type). The ray path type for each reflector is determined by the results of the ray tracing inversion and 3D slowness time coherence workflow.

c. One or more display maps with markings that convey the three-dimensional or two-dimensional locations of the reflectors that produce the detected arrival events relative to the well track as depicted by the panels 401 and 403 of FIGS. 4A and 4B, by FIG. 4F, by the panels 2001 and 2003 of FIGS. 20A and 20B, and by FIG. 20F.

d. A spreadsheet (FIGS. 16A1-16A3), or some other structured data object(s), that contains information describing the three-dimensional locations and orientations as well as ray path type of the reflectors.

e. Other views that display information that characterizes the 3D orientation of the reflectors. Such other views can include a tadpole plot (FIGS. 4E 16B, and 20E), a stereonet plot (FIG. 16C), and/or a Rose diagram (FIG. 16D). One or more these other views can be displayed in conjunction with other logs, such as an FMI image of a corresponding interval of measured depth or possibly a tadpole diagram, stereonet plot or Rose diagram of dip that is derived from the FMI image.

(C) A third automatic procedure that groups detected arrival events together and generates the appropriate parameter choices required for the migration. This grouping can be done according to ray path type, reflector azimuth, and estimated migration aperture. The results of this grouping operation are shown in the panel of FIG. 3D. If there are detected arrival events with different ray path types present in the waveform measurements, multiple migrations can be configured automatically for the user to review. The user can review and assess the quality of the automatically generated migration parameters using a dialogue box such as is depicted in FIG. 15.

(D) A fourth automatic procedure that automatically generates markings for quality control that are associated with particular features in the migration image and with particular features in the filtered waveform data. Examples of such markings are depicted in panel 403 of FIG. 4B. Again, the hue and intensity of the QC markings, which are overlaid on the resulting image, can refer to the ray path type and relative prominence of the corresponding actual arrival event.

Note that the display logs and panels can label the detected arrival events or reflectors and associated markings with numerical indices or other labels to help users identify common arrival events or reflectors depicted across multiple logs and panels.

This automated workflow of the operations can improve the quality and efficiency of the sonic imaging interpretation. In particular, the automation can strongly reduce the interpretation's subjectivity that frequently reduces confidence in the imaging result. In addition, the display logs shown in FIGS. 3A-3D and elsewhere in this disclosure can lead the user to a whole new perspective on the interpretation and can reveal features that were previously overlooked.

Moreover, the 2D migration image typically provides limited quantitative information of the reflectors. The automated workflow of the operations can provide valuable quantitative information of the reflectors, such as true 3D positions and true 3D orientations of the reflectors. In embodiments, the true 3D position of a reflector can be parameterized by a center point of the reflector defined in a geographical 3D coordinate system (e.g., latitude/longitude/height with respect to the reference ellipsoid surface of the earth), a geocentric coordinate system (e.g., the Earth-Centered Earth-Fixed coordinate system, a vertical earth coordinate system (e.g., elevation or depth with regard to the geoid), or other suitable 3D earth coordinate system. The true 3D orientation of the reflector can be parameterized by coordinates of a normal vector that extends from the reflector at its center point. The coordinates of the normal vector for the reflector can be translated to a true dip angle and true azimuth angle for the reflector. Logs of true dip angle and true azimuth of the reflectors in the form of tadpole logs, steronets and Rose diagrams can be generated and displayed. Such logs are very valuable because they allow for a subsequent interpretation and comparison with the respective true dip angle and azimuth angle of the reflectors derived from borehole images such as FMI.

Furthermore, the automated workflow of the operations can determine the coordinates and orientation of the reflectors in 3D in a manner which can be captured in a digital subsurface model. The 2D migration is just a picture, often with significant noise and artifacts, not a collection of oriented reflectors in 3D. Collecting the reflectors in a 3D model can be very helpful for discrete fracture network modeling of fluid flow or for tying the near wellbore reflectors to the larger scale reflectors determined from VSP or seismic measurements. For these and other reasons, the automated workflow of the operations can allow the operator to avoid using a migration for sonic imaging.

FIGS. 3A-3D illustrate exemplary display logs that can be generated and displayed by the automated workflow of operations. In the panels of FIGS. 3A and 3B, the markings indicate measured depth and receiver azimuth index for detected candidate arrival events (FIG. 3A) and for detected arrival events that are produced by reflectors (FIG. 3B). In the panels of FIGS. 3C and 3D, the markings indicate measured depth and azimuth angle for the reflectors that produce the detected arrival events. In the panels of FIGS. 3A-3B, the relative prominence of the arrival event is indicated by intensity or saturation of the marking, which is given by the relative score of each arrival event. In the panels of FIGS. 3B-3D, the color hue of the markings can indicate the ray path type of the corresponding arrival event or reflector. The ray path type for each arrival event and corresponding reflector is determined by the results of the ray tracing inversion and three-dimensional slowness time coherence workflow as described herein.

FIGS. 4A-4F illustrate exemplary display logs and maps that convey two-dimensional and three-dimensional locations of reflectors that produce the detected arrival events along the well track, which can be generated and displayed by the automated workflow of operations of the present disclosure. In embodiments, the display maps of FIGS. 4A-4F can be generated and displayed side-by-side one another as part of unitary display window.

Figure 4A:
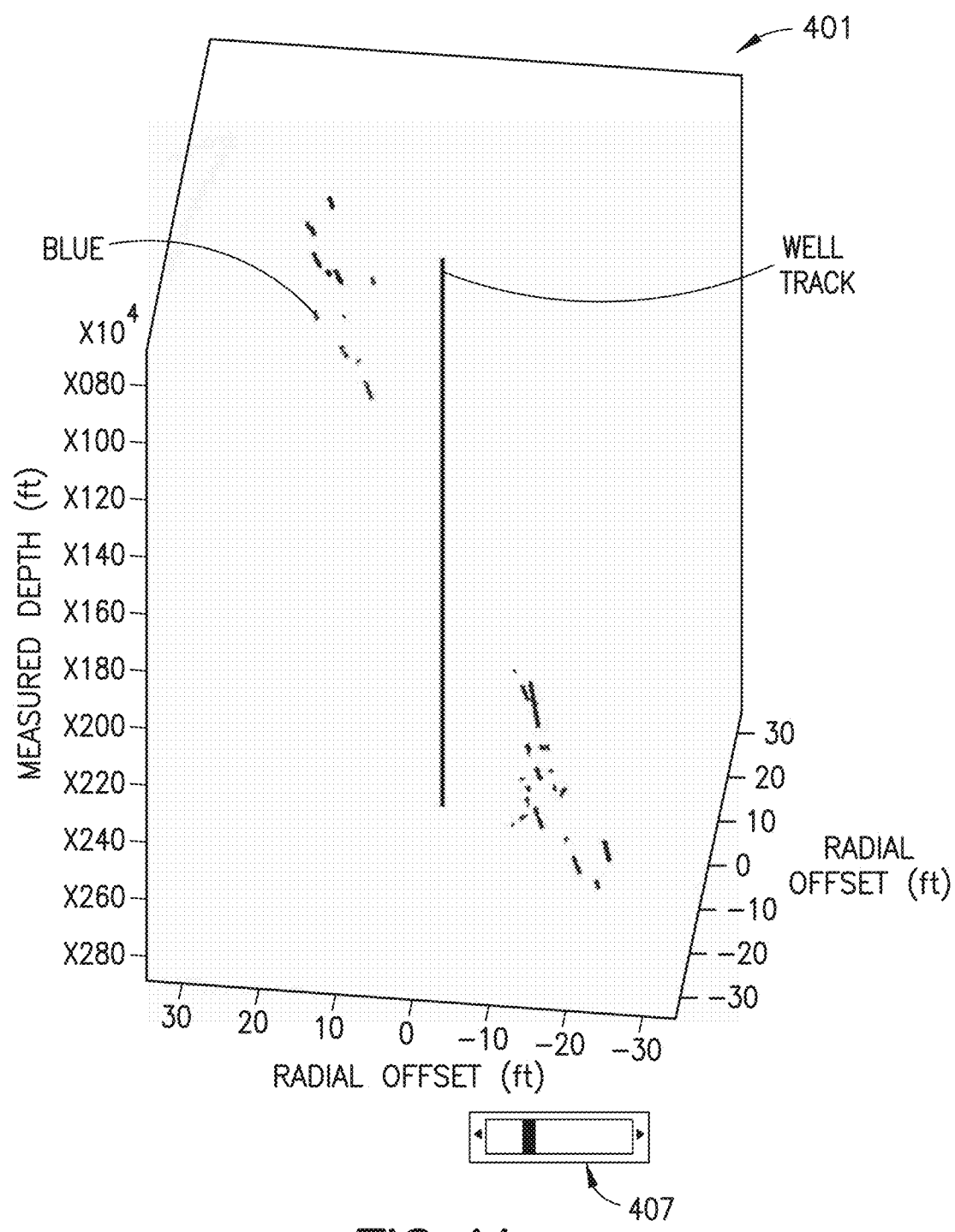
FIGS. 4A-4F illustrate exemplary display logs and maps that convey two-dimensional and three-dimensional locations of reflectors along the well track, which can be produced and displayed by the automated workflow of operations of the present disclosure. Some or all of the logs and display maps of FIGS. 4A-4F can optionally be displayed in a common display window.
Figure 4B:
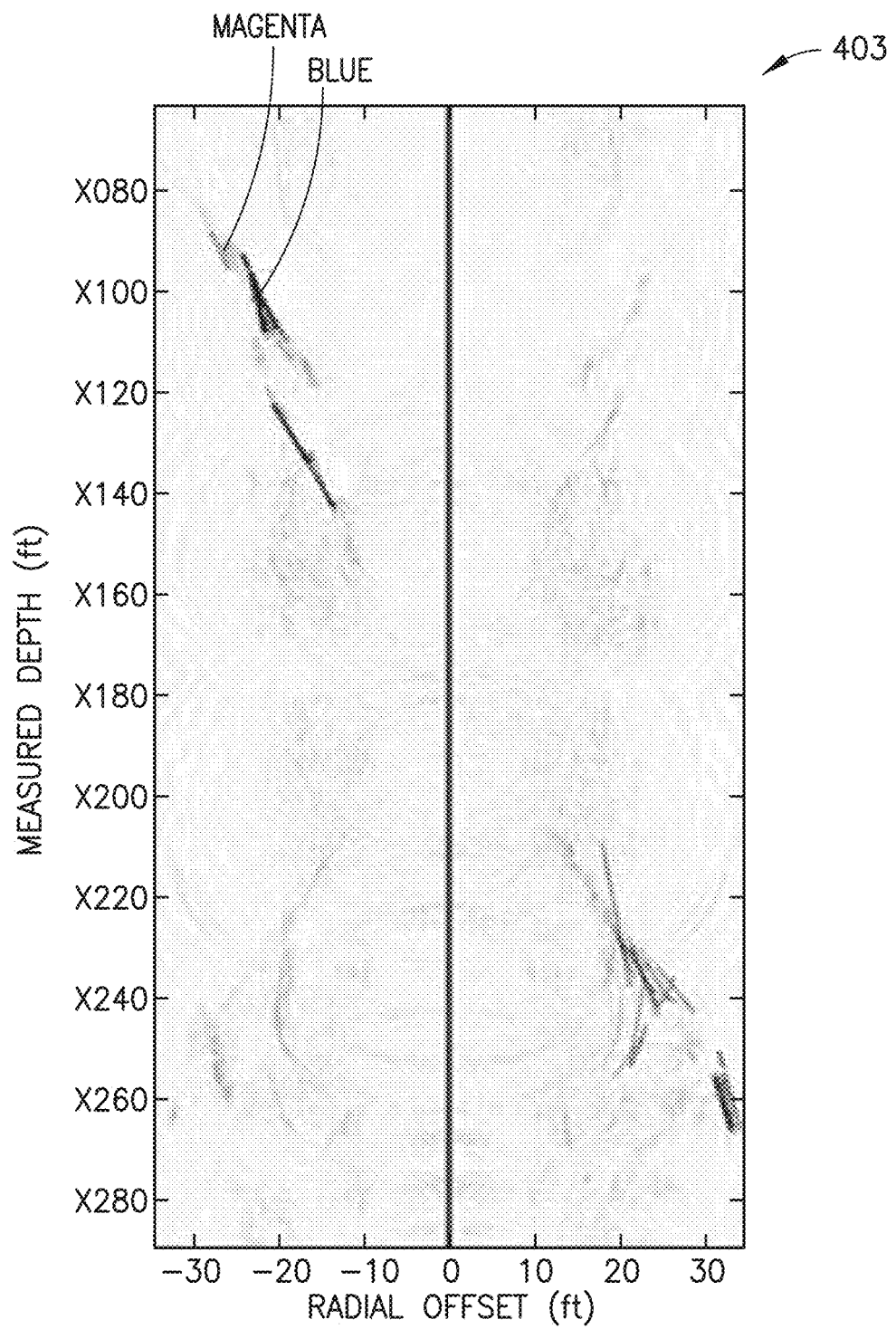
Figure 4C:
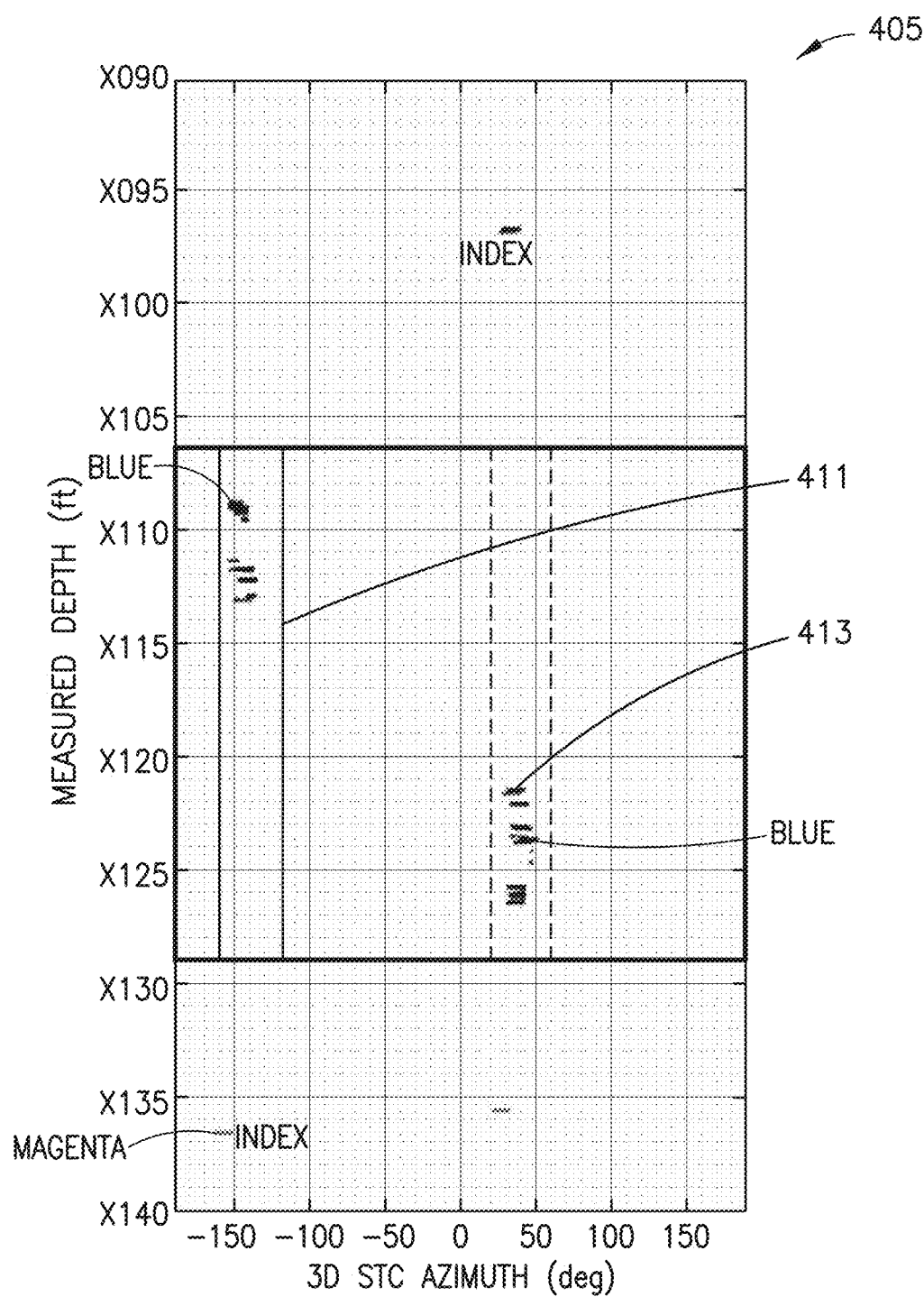
Figure 4D:
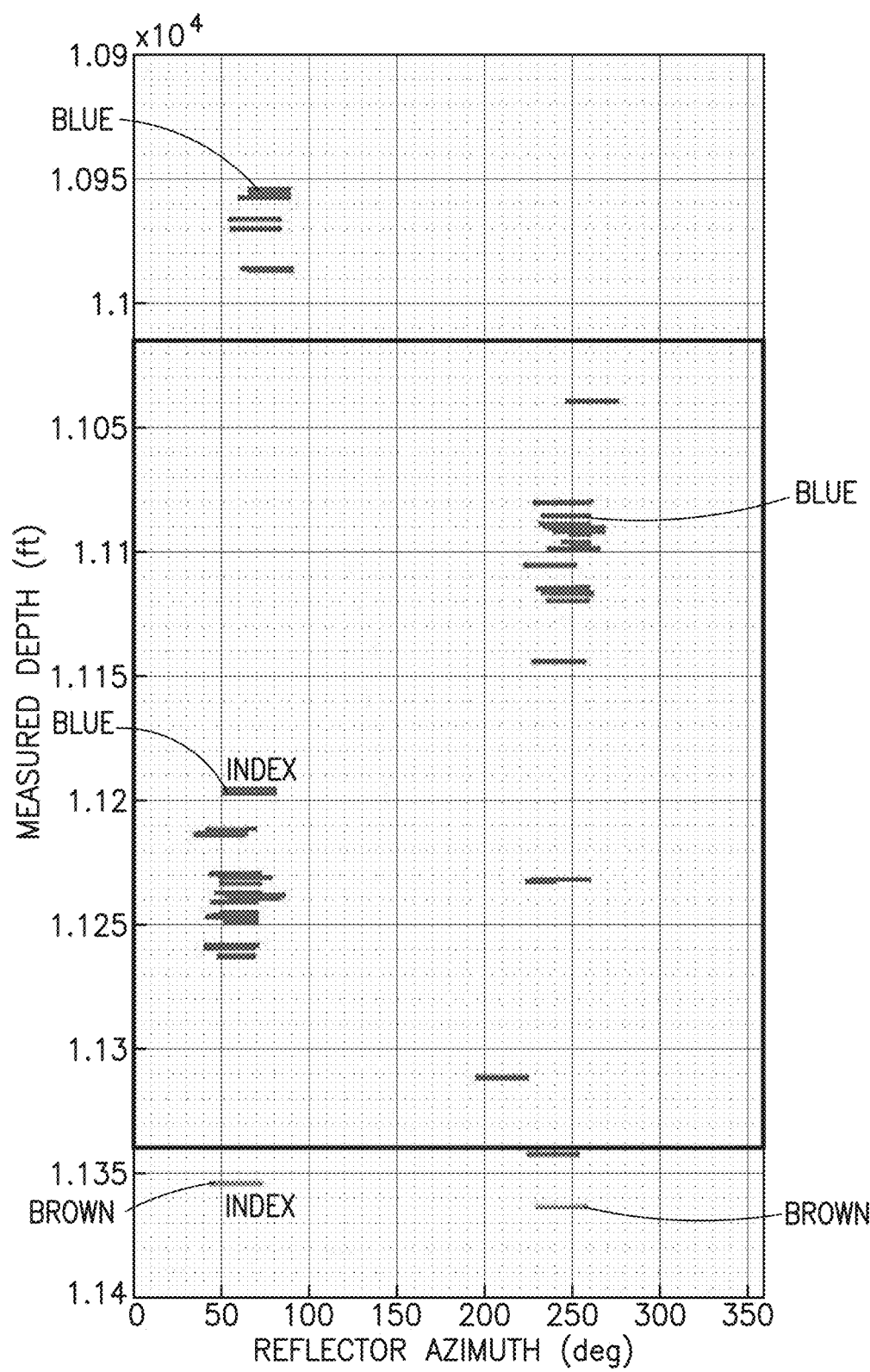
Figure 4E:
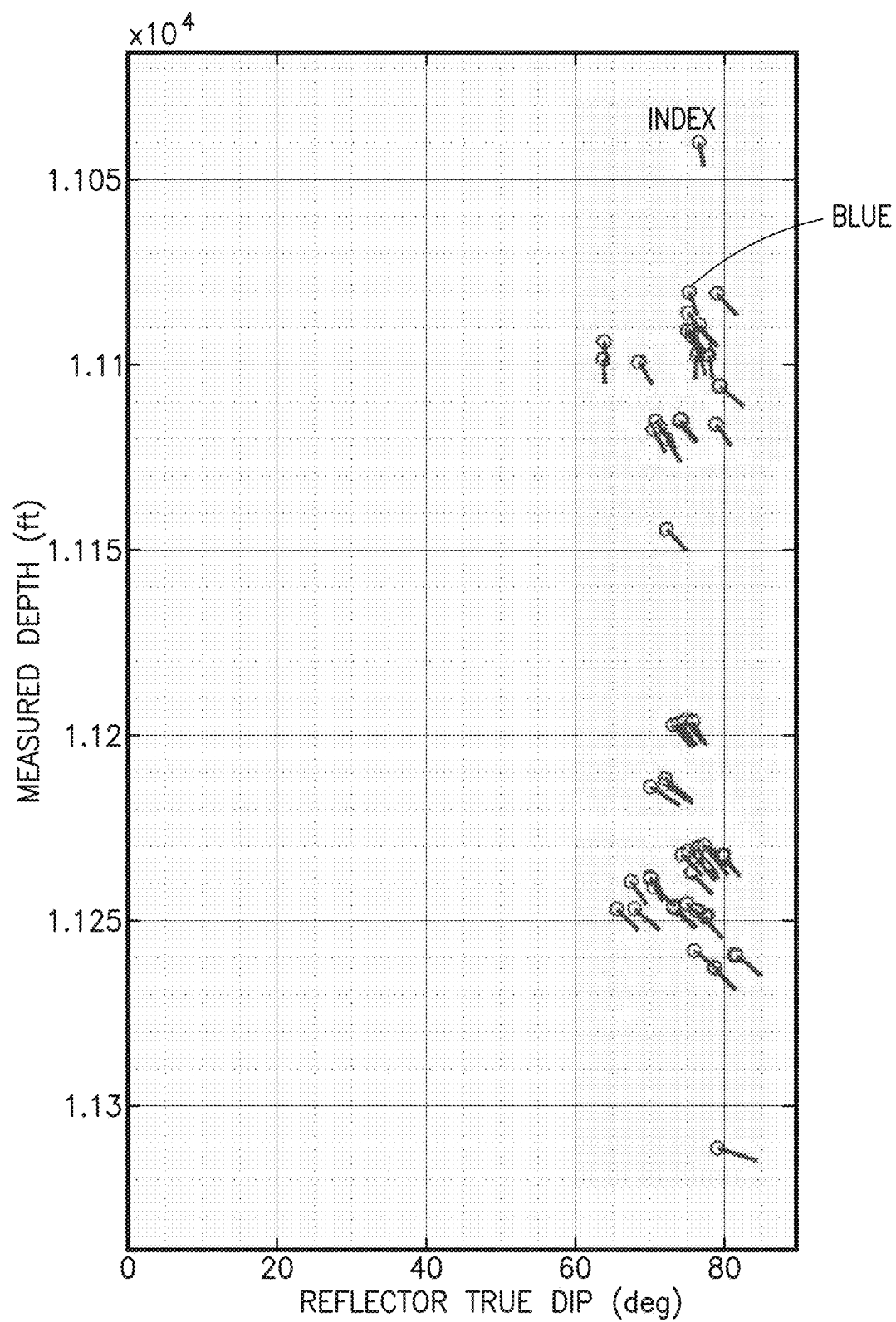
Figure 4F:
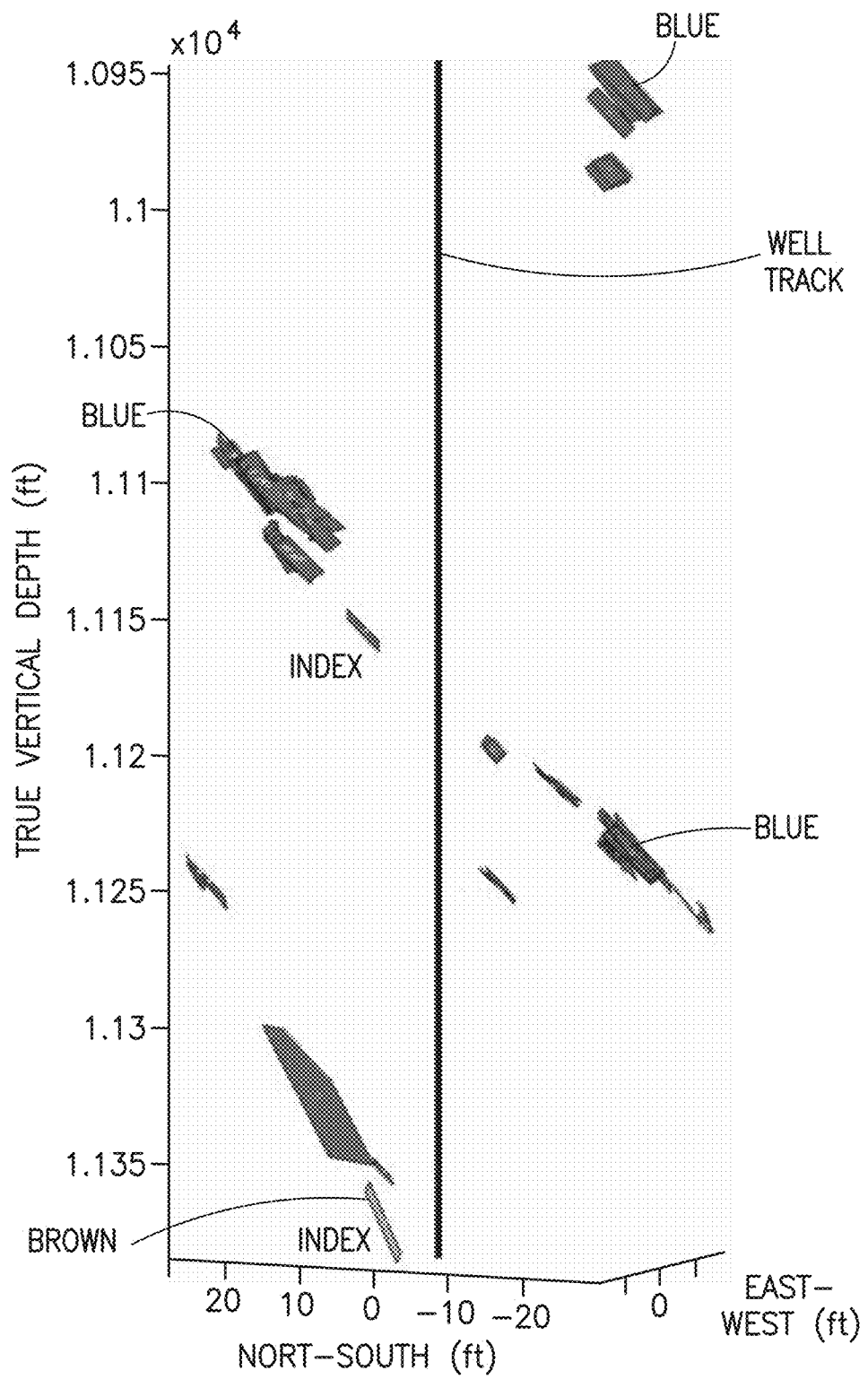

The display map of panel 401 of FIG. 4A and the display map of FIG. 4F convey the three-dimensional locations (in measured depth, radial offset, and azimuth) of the reflectors relative to the tool axis (well track). The tool axis (well track) is depicted as a solid black vertical line as shown. The display map of panel 401 of FIG. 4A displays the measured depth versus radial offset and azimuth relative to the tool axis for the reflectors.

The display map of panel 405 of FIG. 4C displays the measured depth versus azimuth angle measured relative to the tool axis (in degrees) of the reflectors that fall within a user-defined azimuthal range or window. More particularly, the user-specified azimuthal window includes two parts 411, 413 which are offset from one another by 180° of azimuth. The one part 411 is defined by a pair of solid line segments, and the other part 413 is defined by a pair of dashed vertical line segments. The width or size of each part 411, 413 (in degrees of azimuth) is a user defined parameter. Furthermore, the user can adjust the center positions for the two parts 411, 413 (which are offset from one another by 180° of azimuth) using the slider bar 406 in FIG. 4C. Each reflector that produces a detected arrival event and that is positioned within this two-part user-specified azimuthal range can be displayed as part of the 2D display map of panel 403 of FIG. 4B.

The map of panel 403 of FIG. 4B is constructing by overlaying the map of the reflectors that produce the detected arrival event(s) and that are positioned within the two-part user-specified azimuthal range (which is specified by the user in conjunction with panel 405 of FIG. 4C) on the 2D migration result relative to the tool axis (well track). The tool axis is depicted as a solid black vertical line as shown. The map of panel 403 of FIG. 4B displays the measured depth versus radial offset relative to the tool axis for the reflectors that fall within the user-defined azimuth range shown and described above with respect to the panel 405 of FIG. 4C.

FIG. 4E is a tadpole log which describes the true 3D dip and azimuth of the reflectors that produce the detected arrival event(s) as a function of measured depth along the well track. The x position of the tadpole indicates the true dip and the reflector with 0° representing a reflector which is horizontal and 90° representing a vertical reflector. The orientation of the tadpole tail represents the true azimuth of the reflector with 0° representing True North. Stereonet and Rose diagrams such as those displayed in FIGS. 16C and 16D can be used to summarize the information presented in the tadpole log of FIG. 4E.

Note that the slider bar 407 of FIG. 4A determines the start of the measured depth interval of the actual arrival events used for the panels of FIGS. 4A-4F, while the slider bar 408 determines the lower bound on the scores of the detected arrival events that are considered actual arrival events produced by reflectors (and not filtered out as corresponding to noise) and thus used for the panels of FIGS. 4A-4F. The panels of FIGS. 4A, 4C, 4D, 4E, and 4F can provide the user with a quick summary of the three-dimensional spatial positions of the reflectors that produce the detected arrival event(s) without having to migrate the waveform measurements.

Tau-P and Event Localization Procedure

Figure 5A:
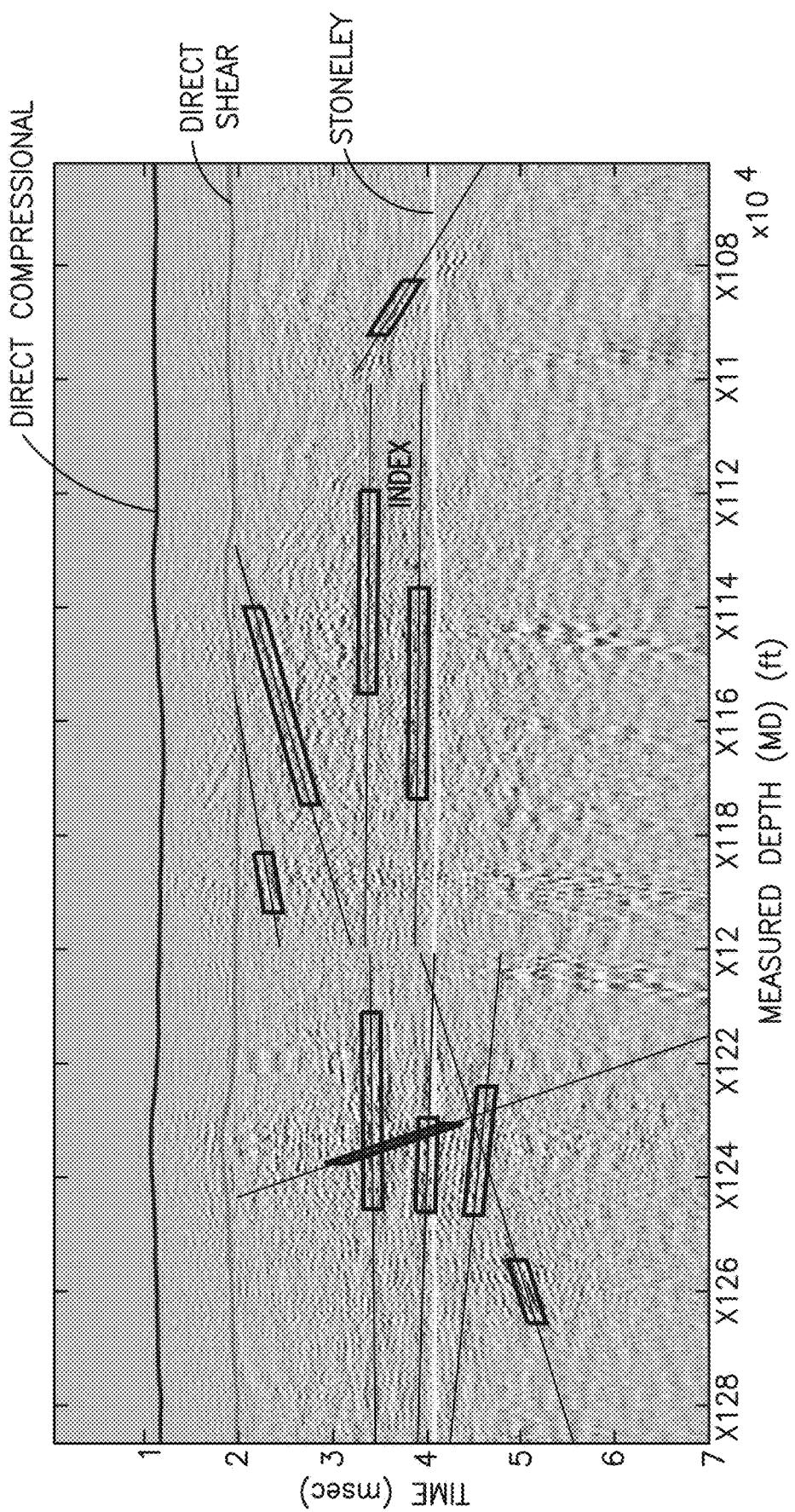

This procedure is applied to views (or selections) of the filtered waveform data that is measured by a single acoustic receiver over time such as is depicted in FIG. 5A. This procedure processes the selected waveform data to detect and collect a number of candidate arrival events (which may or may not be produced by reflectors) and to identify time picks for the detected candidate arrival events. For example, some of the candidate arrival events may not be produced by reflectors but by noise. One or more of the time picks and corresponding waveform measurements for the candidate arrival events are analyzed with the ray tracing and 3D STC procedure described later in order to determine the ray path type produced by the reflectors (and associated with the corresponding detected arrival events) and to determine the three-dimensional spatial locations and orientations of the reflectors.

The following procedure is used to construct a single sensor view of the waveform measurements. At each measured depth position of the acoustic logging tool sonde, a recording is made by a receiver sensor in the acoustic logging tool's receiver array. The signal recorded by this receiver sensor over time is placed as a column of a matrix whose columns are indexed by measured depth along the well track and whose rows are indexed by recording time. This matrix can be visualized as an image such as the image in FIG. 5A or the image 701 in FIG. 7A or the image 1201 in FIG. 12A or the image 1901 in FIG. 19A. If the tool is not rotating significantly during a particular measured depth interval, these single sensor waveform views show the response of reflectors on the side of the tool corresponding to the azimuth of this single receiver sensor. If the tool is rotating significantly, an alternative single sensor view can be constructed as follows. The 360 degrees around the circumference of the acoustic logging tool sonde can be divided into 4 or 8 or some other number of equal sectors. For each sector, a view of the waveforms can be constructed where at each measured depth location, the corresponding column is made using the trace recorded by the single sensor whose azimuth falls within that azimuth sector. This construction ensures that the "single sensor view" of the waveforms shows the response of the reflectors on the side of the tool corresponding to this particular azimuth direction.

The Tau-P and Event Localization procedure can be configured by the user according to characteristics of the events observed in the filtered waveform data. For example, the user can choose the time domain in which to conduct this portion of the workflow. For example, the user can choose to look for candidate arrival events that arrive between the onset of the direct compressional and the direct shear arrivals (indicated by the lines labeled in FIG. 5A). Alternatively, the time window commencing after the onset of the Stoneley arrival (as indicated by the line labeled in FIG. 5A) can be selected. While examining the candidate arrival events shown in FIG. 5A, the user can also specify the maximum or steepest event moveout. Typical values are 400 µs/ft, where 0 µs/ft refers to events that would appear horizontal in FIG. 5A. Lastly, the Tau-P and Event Localization procedure can be applied to fairly short measured depth windows in the single sensor views of the waveform data. The default depth value for the depth windows is 100 foot, but a shorter depth value for the depth windows can be used if the formation slowness is changing rapidly as a function of measured depth. In embodiments, the depth value for the depth windows can be specified by user input.

Following this configuration, the filtered waveform data within each measured depth window of a single sensor view is processed using a tau-P transform, which is well known in geophysics and described in Diebold, John B.; Stoffa, Paul L. (1981). "The traveltime equation, tau-p mapping, and inversion of common midpoint data," Geophysics 46 (3): 238-254. The tau-P transform is frequently used for processing seismic and VSP measurements. Note that the application of the tau-P transform converts that filtered waveform data into the time-slowness (tau-P) domain. A subset of peaks in the tau-P domain are selected according to their relative height. As part of the configuration procedure, the user can prescribe a minimum separation distance between the peaks to avoid an excessive number of peaks for any particular waveform arrival event. The results of this tau-P transform include a set of lines that correspond to selected peaks in the tau-P domain. In FIG. 5A, the long green lines correspond to various tau-P peaks, while the shorter time windows found along those lines (and marked with particular index values) designate the candidate arrival events determined from the event localization procedure which is described next.

FIG. 5A illustrates the Tau-P and Event Localization Procedure. The green lines overlaid on the displayed waveform data correspond to peaks in tau-P transform of the filtered waveform data. Boxes shown in black indicate regions along the lines where the localization procedure identifies a candidate arrival event location. These boxes can be labeled with numbers or other indices that indicate the relative rank or prominence of the candidate arrival event.

FIGS. 5B and 5C illustrate the application of the tau-P transform. FIG. 5B shows waveform data in the recorded wavefield domain, while FIG. 5C shows data in the τ-p Domain. The tau-p transform maps the waveform measurements parameterized by measured depth (ft) and recording time (ms) to the tau-p domain which is parameterized by event moveout μs/ft and time (ms). A peak in the tau-p domain corresponds to a line in the two-dimensional wavefront domain (time and measured depth). This tau-P line is specified by a slope and y-intercept time where the slope is given by the event moveout of the peak and the y-intercept time is given by the recording time of the peak. The peaks in the tau-p domain provide information as to the line along which the candidate arrival event is present, but do not identify a particular measured depth location for the candidate arrival event along the line, so that an event localization procedure is needed.

To determine the actual measured depth location of the candidate arrival events along the corresponding tau-P lines, an event localization procedure is performed as follows. A time window corridor is defined for each line in the set of lines that correspond to selected peaks in the tau-P domain. The time window corridors have a fixed time duration. For example, the time window corridors can have a duration 0.2 ms when using an 8 kHz monopole acoustic transmitter, or of duration 0.8 ms when using a lower frequency dipole acoustic transmitter. The time window corridor for a given line is defined to cover time before, at and after the y-intercept time of the line as shown in FIG. 5B. The single sensor view of the filtered waveform data is resampled at each measured depth location to select the filtered waveform data within each time window corridor and provide wavefield data arranged along two dimensions, recording time and measured depth within the time window corridor.

The wavefield data for an exemplary set of time window corridors are displayed in the subpanels of FIGS. 6A1-6A6 where such time window corridors correspond to the tau-P line segments shown as the line segments in FIG. 5A. In each subpanel of FIGS. 6A1-6A6, the recording time within each time window corridor is shown along the left-side vertical axis, while measured depth within the time window corridor is along the horizontal axis. The event localization procedure identifies location of the candidate arrival event within each time window corridor by correlating the wavefield data to a function that appears as the black curves superimposed on the subpanel images of FIGS. 6A1-6A6 as follows. If we designate the wavefield data values within this time window as w(i, j) with i being the time index and j being the measured depth index, we can define a coherent energy $E_c(j)$, incoherent energy $E_i(j)$, and coherence functions coh(j) as follows.

$$E_c(j) = \sum_{i=1}^{T} \left( \sum_{\Delta=-M/2}^{M/2} w(i, j+\Delta) \right)^2 \quad (1)$$

$$E_i(j) = \sum_{i=1}^{T} \sum_{\Delta=-M/2}^{M/2} w^2(i, j+\Delta) \quad (2)$$

$$\coh(j) = \sqrt{\frac{E_c(j)}{ME_i(j)}} \quad (3)$$

Here T is the duration of the time window (0.2 ms/20 us=10 samples in this case, as the waveforms have a 20 us sampling rate), and M is the length of a short window in measured depth along the horizontal axis of the subpanels that is much shorter than the length of the 100 foot length of the tau-P domain. The black curves overlaid in the panels are normalized versions of the curve defined as $\mathcal{L}$ (j)=$E_c$(j)coh (j). If we designate max $\mathcal{L}$ as the maximum value that $\mathcal{L}$ attains, and $j_{max}$ the measured depth index where that maximum is attained, then the event localization procedure consists of finding the last index $j_{start} < j_{max}$ for which $\mathcal{L}$ (j) <F max $\mathcal{L}$ as well as the first index $j_{stop} > j_{max}$ for which $\mathcal{L}$ (j)<F max $\mathcal{L}$ where 0<F<1 is a user defined parameter whose default value is 0.2. The two indices $j_{start}$ and $j_{stop}$ are shown as white dots in the subpanels of FIGS. 6A1-6A6 and define the interval of measured depth within each time window corridor wherein each candidate arrival event is located. This measured depth interval within the time window corridor is indicated by the black box around the arrival event in the schematic diagram of FIG. 6B and the black boxes along the line segments shown in FIG. 5A. The centerline of these boxes is described as the time pick for the associated candidate arrival event as shown in FIG. 6B, and the midpoint of the measured depth interval along the time pick is declared to be the measured depth of the candidate arrival event. FIG. 6C is a tabular representation of the time pick for event 31 in FIG. 5A. The peak value $E_c(j_{max})$coh $(j_{max})$ can be defined to be the score of the event, and this score can be used to rank the localized arrival events and specify their corresponding index value. The score for the candidate arrival event can also possibly be used to filter the localized candidate arrival events. Specifically, the score can be compared to a minimum threshold score value for the filtering. For example, if the score is greater than the minimum threshold score value, the corresponding candidate arrival can be added to a list of detected arrival events that are produced by reflectors. However, if the score is less than or equal to the minimum threshold score value, the corresponding candidate arrival event can be determined to correspond to noise, and it is filtered or removed from the list of detected arrival events.

The tau-P and event localization procedure can be applied to the filtered waveform data recorded over time by each acoustic receiver in a ring of acoustic receivers around the circumference of the downhole sonic tool. This is helpful because a reflection will sometimes appear more prominently to receivers facing the corresponding reflector than to receivers facing away from the reflector. A display log that summarizes the results of this procedure can be generated for display and displayed as shown in FIG. 3A as well as in the panel 703 of FIG. 7D. In these display logs, each acoustic receiver in a ring of acoustic receivers around the circumference of the downhole sonic tool is assigned an azimuth index number from 1 to 8 and the candidate arrival events for the respective acoustic receivers are displayed as function of measured depth along the Y-axis in separate columns that correspond to acoustic receiver indices along the X-axis. The measured depth of a candidate arrival event is defined as the average measured depth location of the corresponding time pick as shown as item 601 in FIG. 6B.

Figure 7A:
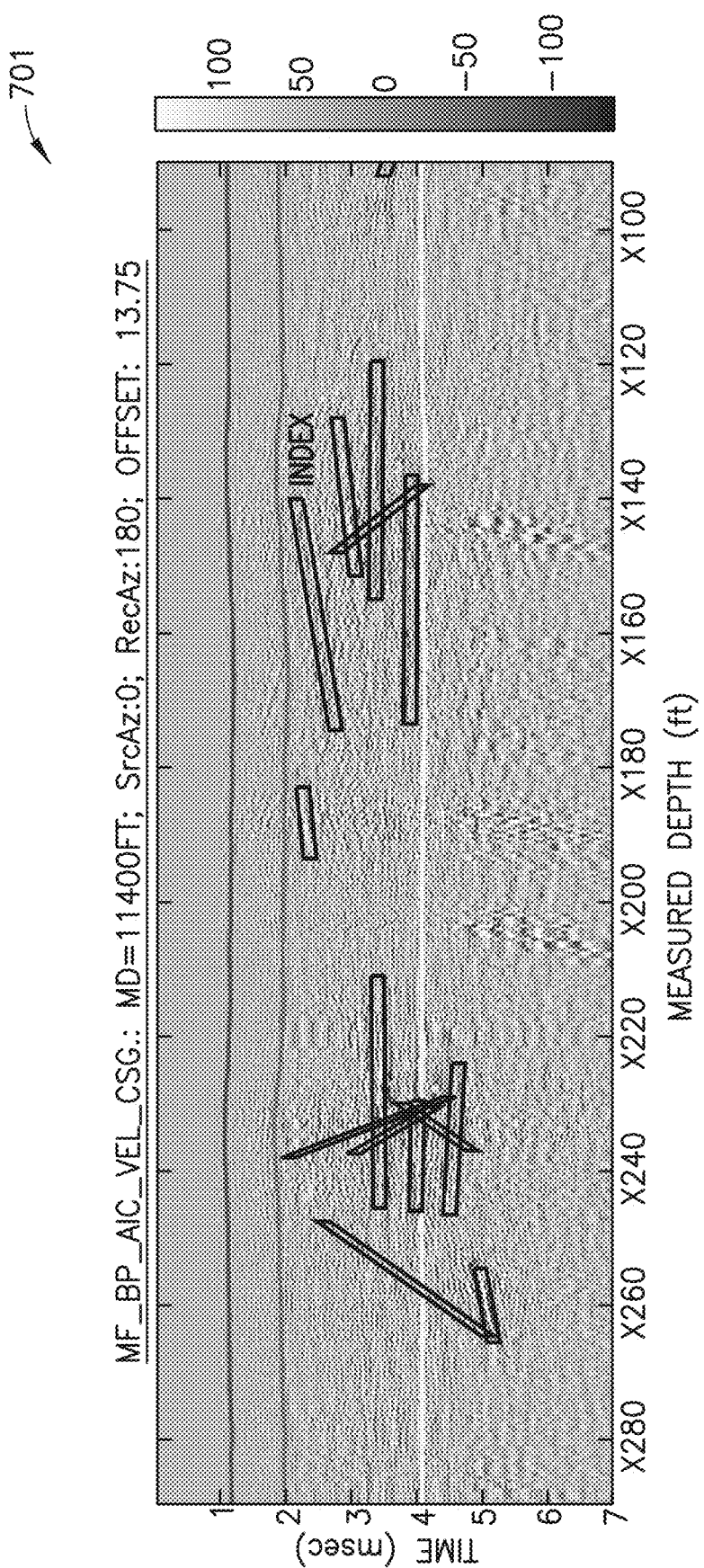
FIGS. 7A-7D are exemplary graphical user interfaces that can be produced by the results of the automated event localization procedure, which can be part of the automated workflow of operations of the present disclosure.
Figure 7B:
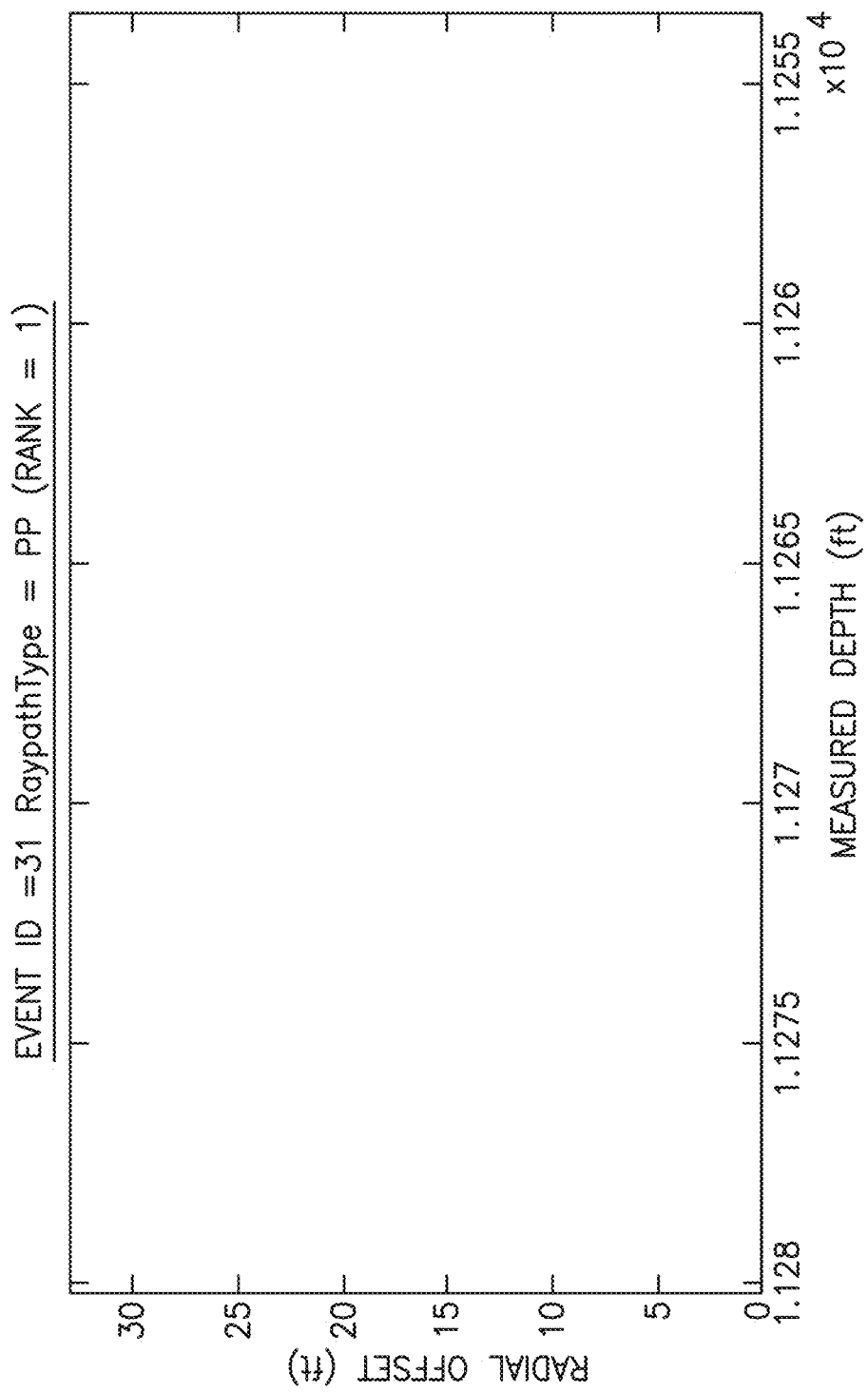
Figure 7C:
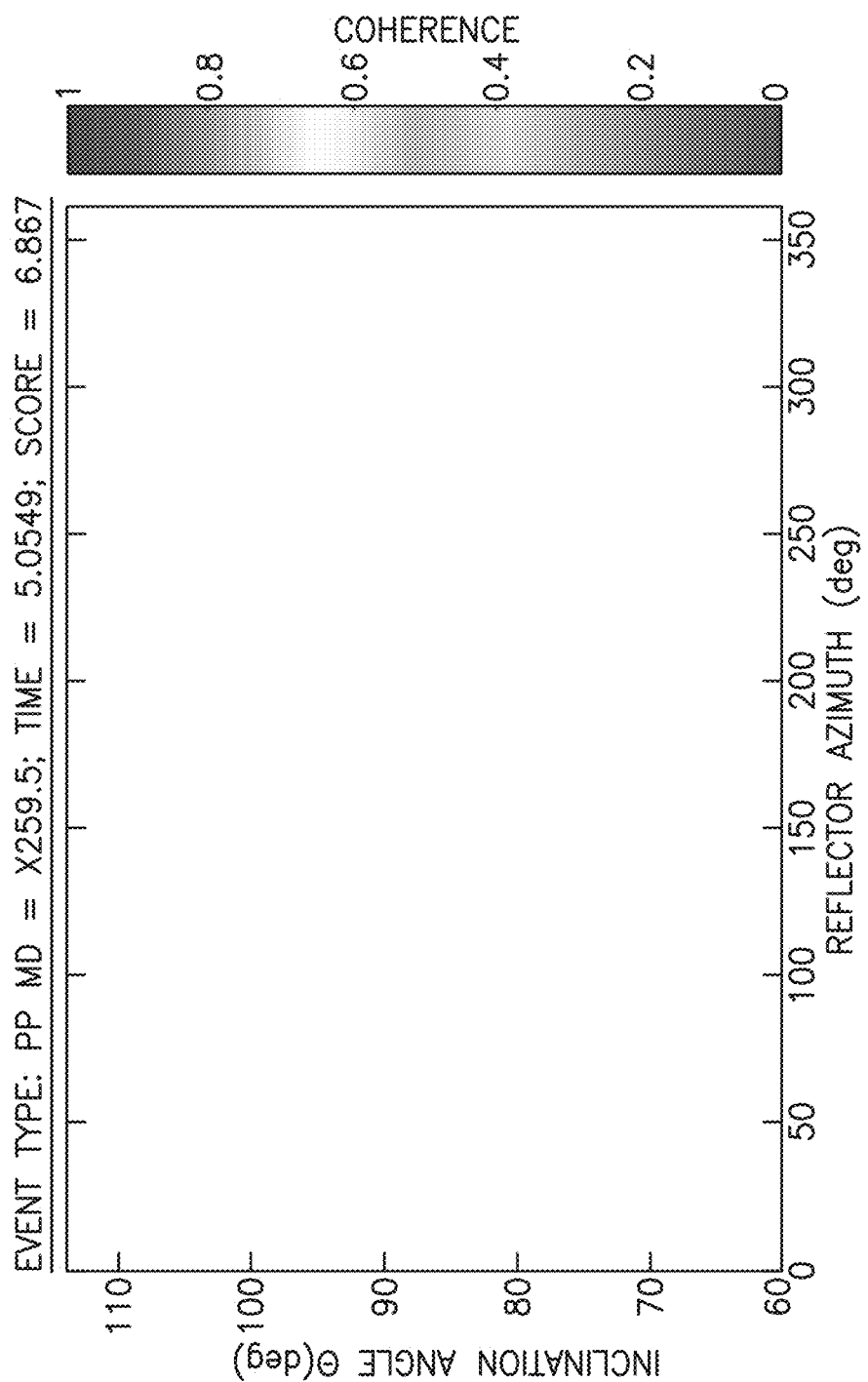
Figure 7D:
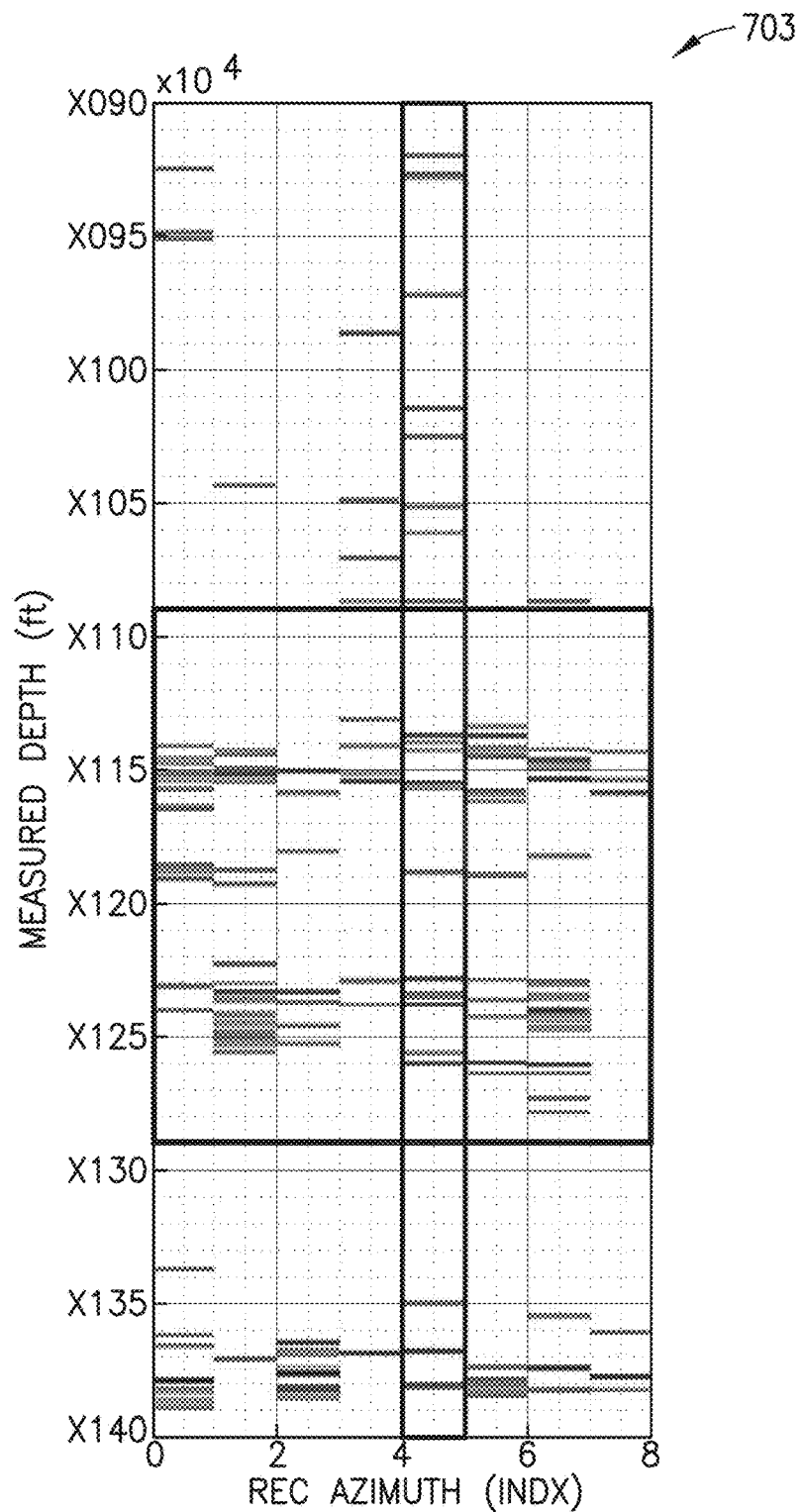

FIGS. 7A-7D show exemplary graphical user interfaces produced by the results of the automated Tau-P and Event Localization procedure. The panel 701 of FIG. 7A shows the filtered waveform data recorded by the 5th azimuth sensor in the 7th receiver ring along with the candidate arrival events determined by the Tau-P and Event Localization procedure whose score is larger than 2.63, a value that is set by the user using the slider bar 705. The panel 703 of FIG. 7D indicates the measured depth and receiver azimuth index of the candidate arrival events whose score is larger than 2.63. Note that panel 703 of FIG. 7D has one box that highlights one-fifth of eight columns in panel 703 which shows the mean measured depth locations of arrival events found in the filtered waveform data recorded by that particular sensor, and the intensity/opaqueness of the corresponding grayscale boxes is determined according to their score. Also note that panel 703 of FIG. 7D has another box that highlights a measured depth interval from X090 to X290 for all eight receiver sensors. This measured depth interval corresponds to the horizontal axis of panel 701 of FIG. 7A. The panels of FIGS. 7A and 7D can include labels that give the numerical rank of the corresponding candidate arrival event along with the score. Finally, the slider bar 705 can be adjusted by the user to set the minimum threshold score that is used to control or filter the candidate arrival events that are added to the list of detected arrival events produced from reflectors and shown in the waveform viewer of panel 701 and log panel 703.

Note that alternative and additional procedures could be employed to automatically detect and locate the candidate arrival events in the filtered waveform data. For example, in some cases it is useful to multiply the waveform values by a geometrical spreading function such as $w_{boost}(t)=w_{orig}(t) t^{1.2}$, to boost the amplitudes of arrival events. Additionally, a Hough transform instead of a Tau-P transform could alternatively be used to locate arrival events within the single sensor view of the filtered wavefield.

Automated Ray Tracing Inversion and 3D Slowness Time Coherence Procedure

The outcome of the tau-P and event localization procedure is a collection of time picks for a number of detected arrival events for one or more acoustic receivers of the tool. The time pick and corresponding wavefield of a given detected arrival event can be processed using ray tracing inversion and 3D STC processing to characterize the ray path type of the detected arrival event, determine the azimuth of the corresponding reflector relative to the well track, and determine the three-dimensional position and orientation of the corresponding reflector. This procedure can also (a) construct logs of summary characteristics of the reflectors as a function of measured depth including reflector azimuth, relative dip, true dip and azimuth, (2) construct the display maps of the two-dimensional and three-dimensional locations of the reflectors relative to the well track (including an estimate of its relative dip), (3) produce a spreadsheet (or some other structured data object(s)) that contains information describing three-dimensional location and orientation as well as ray path type of the reflectors (for example, see FIG. 16 as described below), (4) provide tadpole plots, stereonet plots, or Rose diagrams describing the true 3D orientation of the reflectors, and (5) provide an estimate of the migration aperture required to construct an image of the acoustic impedance boundaries associated with the reflectors based on the arrival events.

Figure 2A:
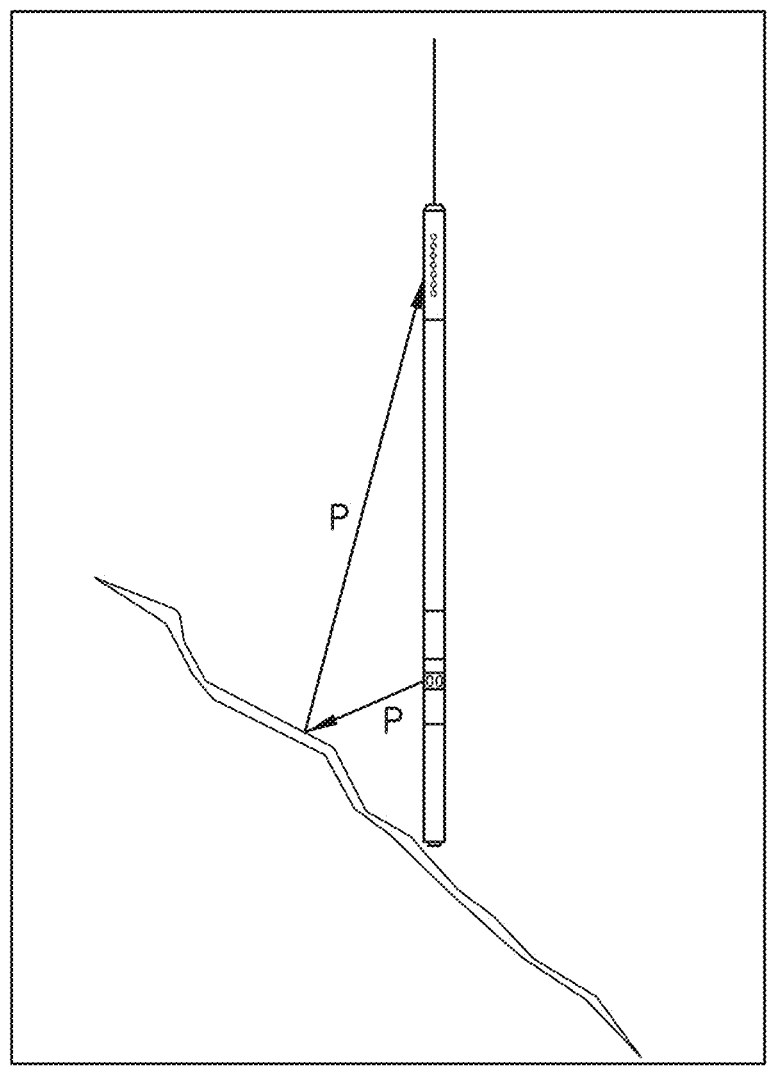
FIGS. 2A-2C are schematic illustrations of different ray path types for arrival events that can be observed as part of the filtered waveform data in the method of FIG. 1.
Figure 2C:
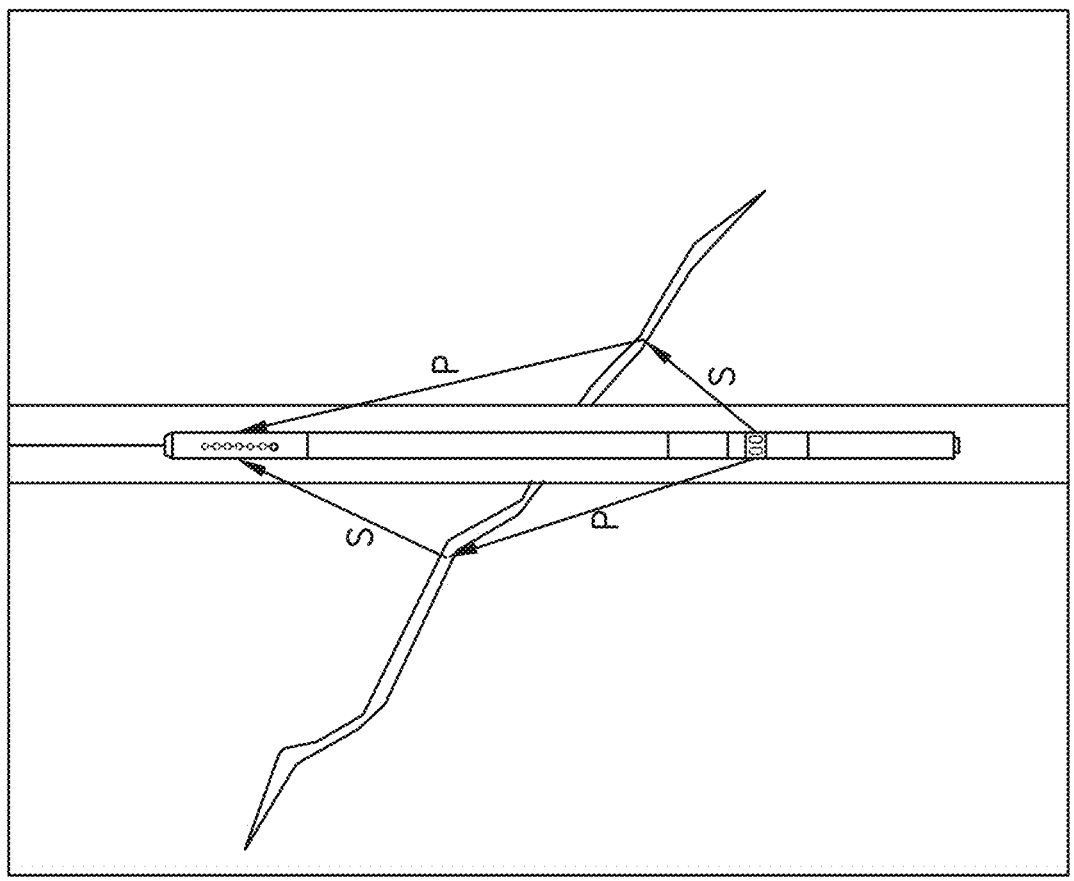
Figure 2B:
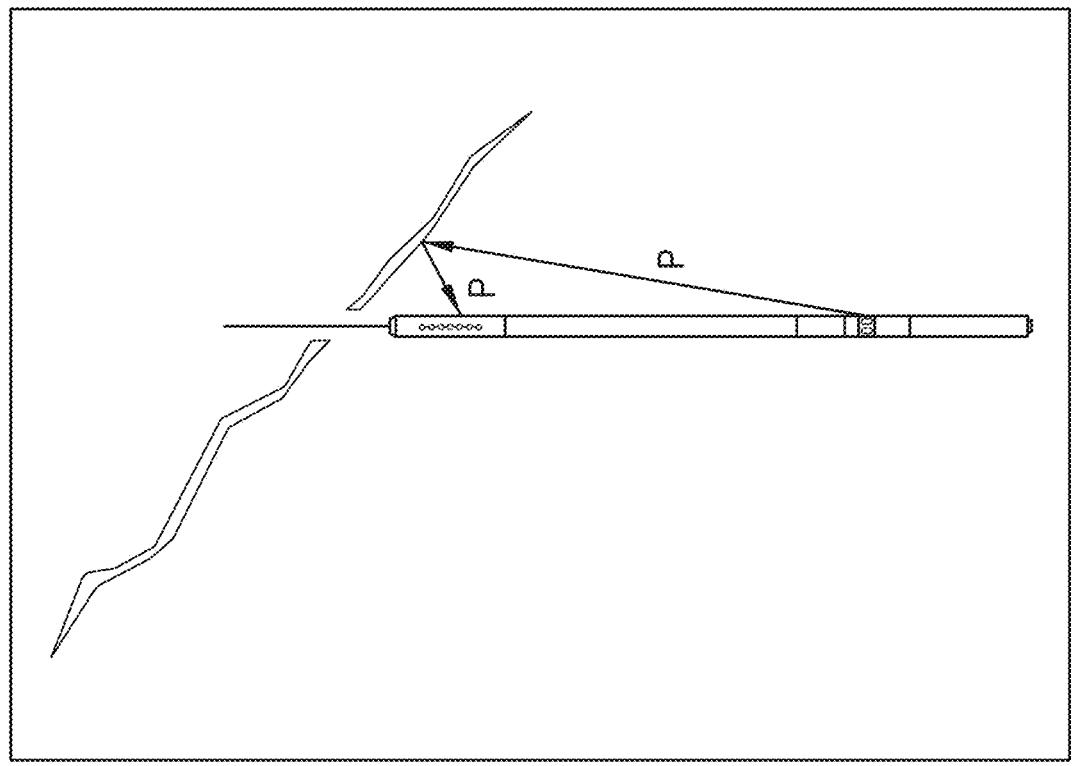

The user can configure this procedure by choosing the set of possible ray path types, such as those depicted in FIGS. 2A-2C. The default choice is to enable PP and SS reflections as well as PS and SP refractions, but if the user chooses only to look for events coming after the shear, then the user should only look for PP and SS reflections. If the time domain selected by the user in the time picking workflow was between the onset of the direct compressional and shear arrivals, then only the PP, PS, and SP ray path types would need to be included.

Figure 8B:
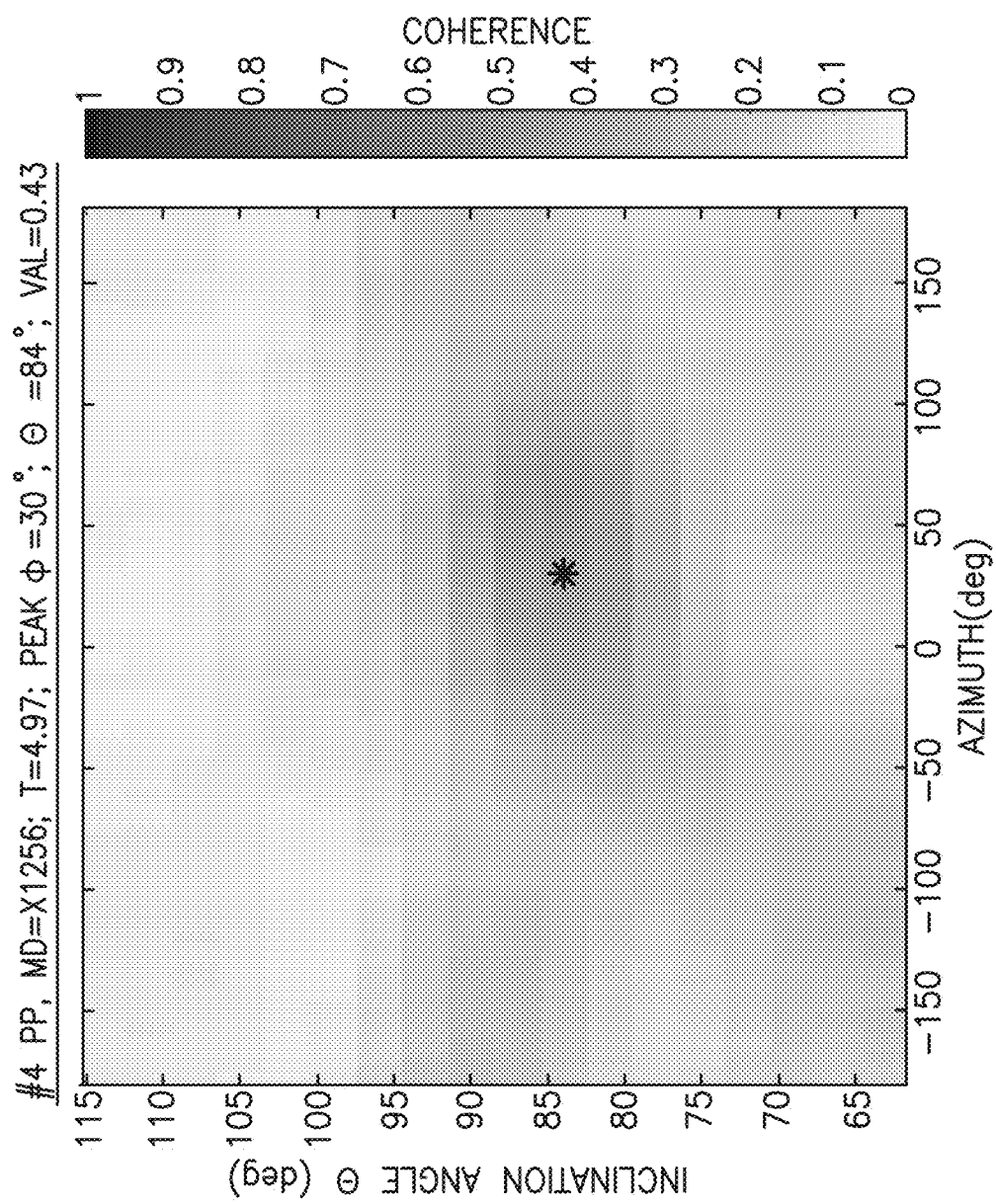

The ray tracing inversion step determines the 2D position of a reflector relative to the well track using the time pick associated with a detected arrival event and a choice of ray path type. This ray tracing inversion is repeated using the time pick associated with a detected arrival event and the set of possible ray path types. FIG. 8A shows the PP ray tracing inversion result for arrival event #4 whose time pick is shown by the line segment in 1201 of FIG. 12A and shown in the first two columns of the table in FIGS. 8H1-8H2. FIG. 9A shows the SS ray tracing inversion result for the same arrival event #4's time pick. The circles represent the measured depth positions of the acoustic logging tool's source (or transmitter) at the various measured depth locations along the time pick, while the black squares represent the measured depth position of the acoustic logging tool's seventh receiver ring at the various measured depth locations along the time pick. These locations are listed in third and fourth columns of the table in FIGS. 8H1-8H2. The black stars represent the inverted position of the reflector shown relative to the axis of the tool sonde which corresponds to the x-axes of FIGS. 8A and 9A. The raypaths connecting the source to the reflector to the receiver (for example, the ones shown as a dashed line segments in FIGS. 8A and 9A) describe the raypaths along which the reflected wave propagated. The positions of the reflection points along the reflector for each source and receiver location is determined using the raypath type and Snell's law.

Figure 8C:
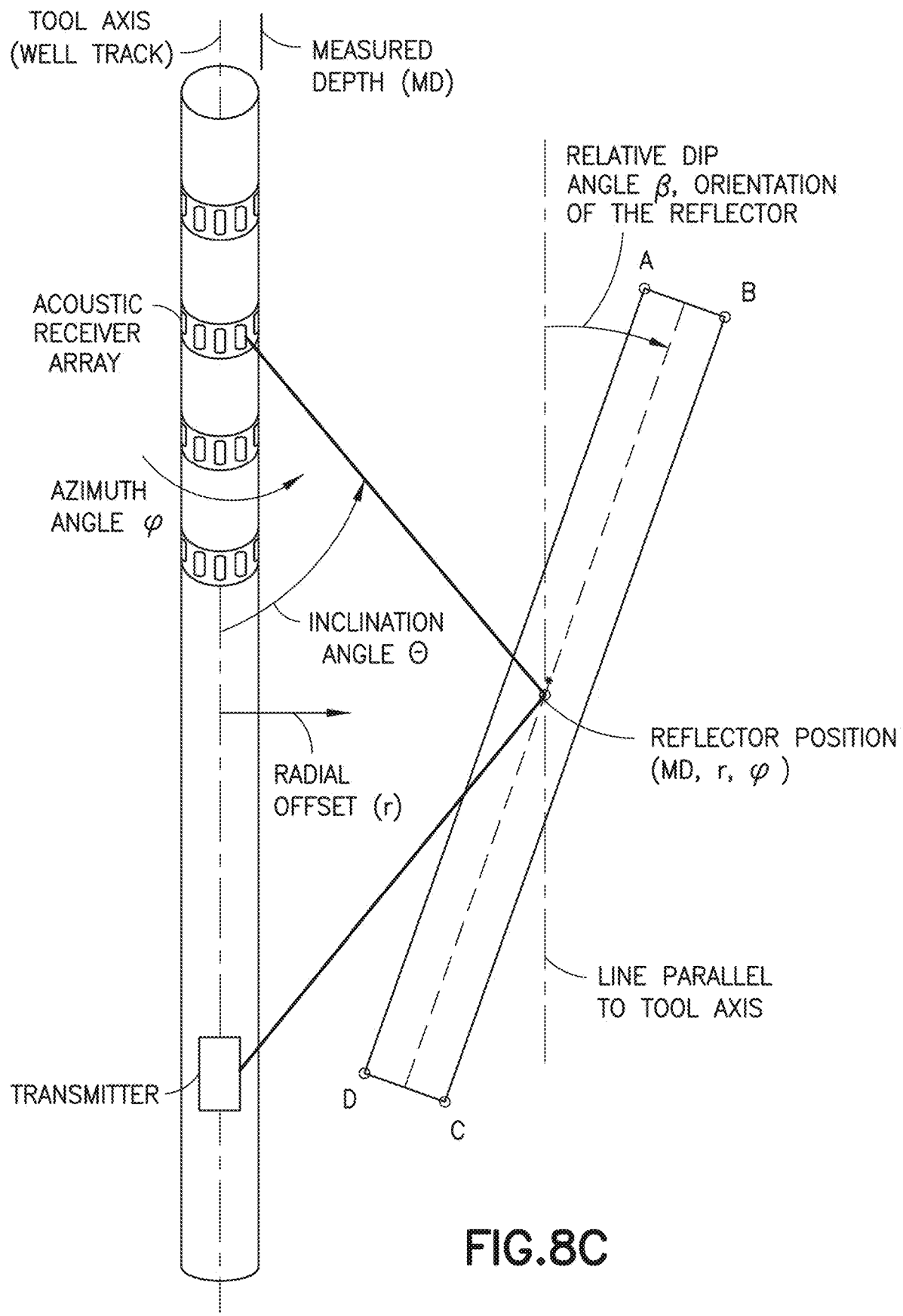
Figure 8D:
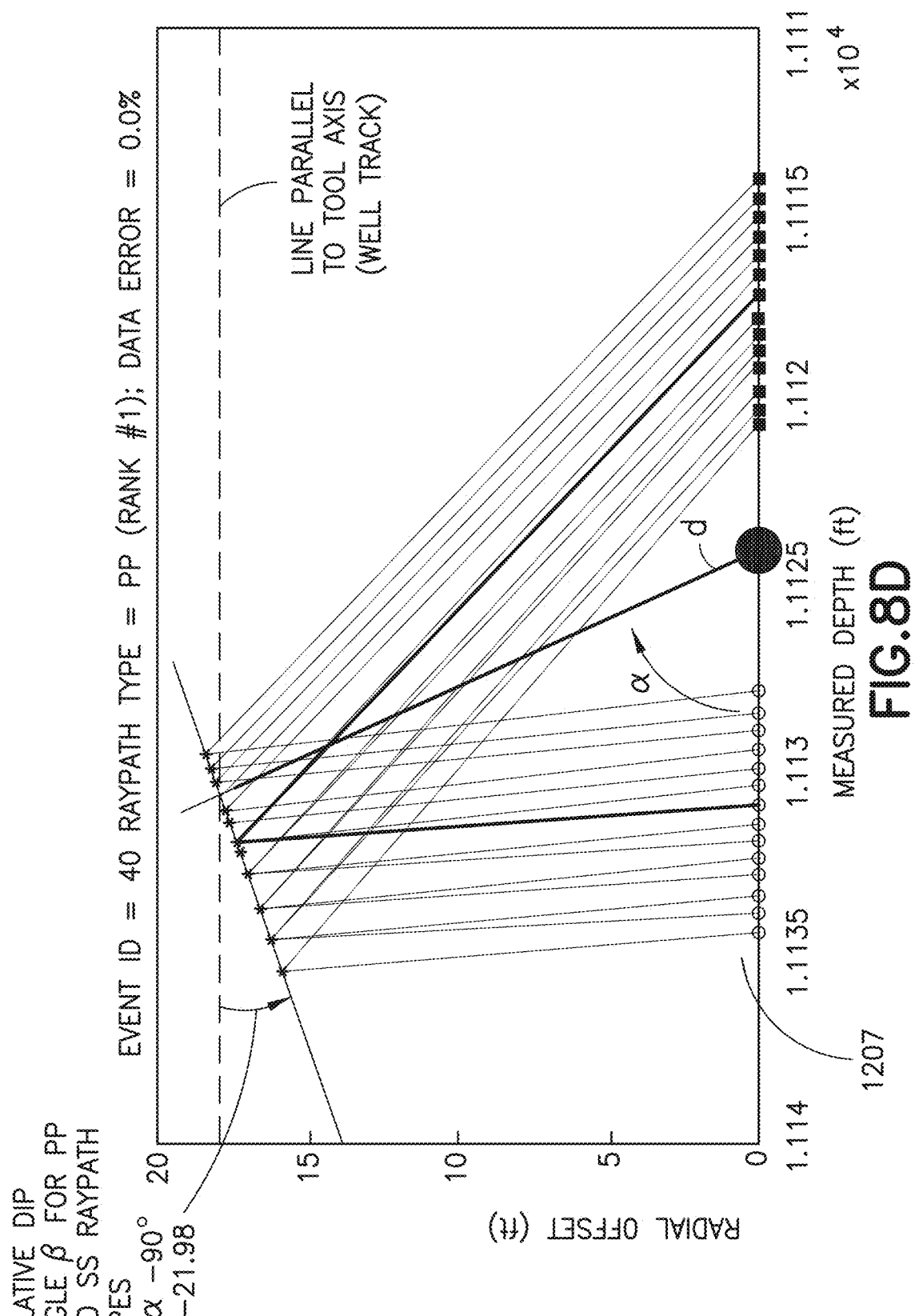
Figure 8G:
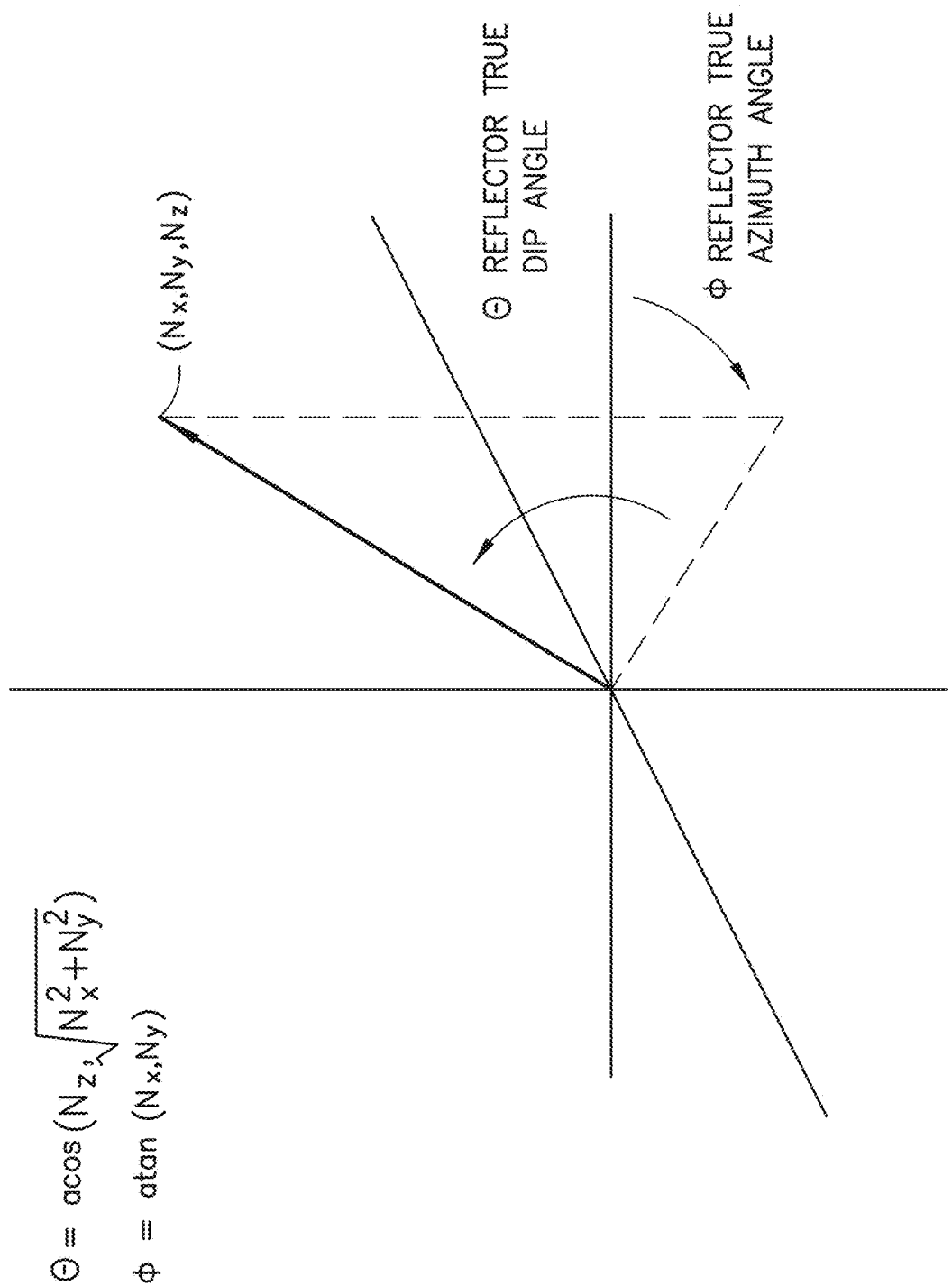

When using a PP or SS reflection ray path type, the ray tracing inversion varies the two-dimensional position of a linear reflector specified by a polar angle $\alpha$ and polar distance d from a point P computed as the average measured depth position of the source and receiver positions along the time pick as shown in FIG. 8D. For the PP and SS raypath types, the polar angle $\alpha$ of the reflector is related to the relative dip angle $\beta$ of the reflector by the relation $\beta=\alpha-90°$ as shown in FIG. 8D. Thus, the ray tracing inversion varies the relative dip angle $\beta$ by changing the two-dimensional position of the linear reflector.

When using a SP or PS mode conversion ray path type, the ray tracing inversion varies both two-dimensional position and relative dip of a linear reflector. The two-dimensional position of the reflector is specified by a point P located between the source and receiver positions along the time pick, and the relative dip of the linear reflector is specified by polar angle $\alpha$ as shown in FIG. 8E. For the PS and SP raypath types, the polar angle $\alpha$ of the reflector is related to the relative dip angle $\beta$ of the reflector by the relation $\beta=$ $$\beta = \begin{cases} \alpha & \text{when } \alpha < 90° \\ \alpha - 180 & \text{when } \alpha > 90° \end{cases}$$

as shown in FIG. 8E.

For each two-dimensional reflector position (for SS, PP, SP and PS raypath types) and possibly a number of different reflector dip angles at that 2D reflector position (for SP and PS raypath types), a ray tracing between the source, reflector, and receiver positions similar to the ray tracing shown in FIGS. 8A and 9A is performed which obeys Snell's Law. Then the predicted travel times between the source and receiver positions is calculated and compared to the travel times represented by the time pick. These predicted travel times are computed for each ray path as the sum of the travel time between the source and the predicted point on the reflector and the travel time between the predicted point on the reflector and the receiver position. For the PP raypath ray tracing inversion, these travel times are computed as the product of the distance from the source to the reflector times the P formation slowness plus the product of the distance from reflector to the receiver times the P formation slowness. For the SS raypath ray tracing inversion, computation of the predicted travel times uses the S formation slowness. The ray tracing inversion for each ray path type can utilize a gradient search or other inversion algorithm to search for a reflector two-dimensional position and relative dip angle where the predicted travel times best fits the time pick for the detected arrival event according to the minimization criterion given in Equation 4 below.

$$(\hat{\alpha}, \hat{d}) = \min_{\alpha, d} \sqrt{\frac{\sum_j (tt_{j,pick} - tt_{j,pred})^2}{\sum_j (tt_{j,pick})^2}} \quad (4)$$

where $tt_{j,pick}$ is the travel time from source to reflector to receiver based on the time pick for the detected arrival event, and $tt_{j,pred}$ is the is the predicted travel time from source to reflector to receiver.

Figure 9A:
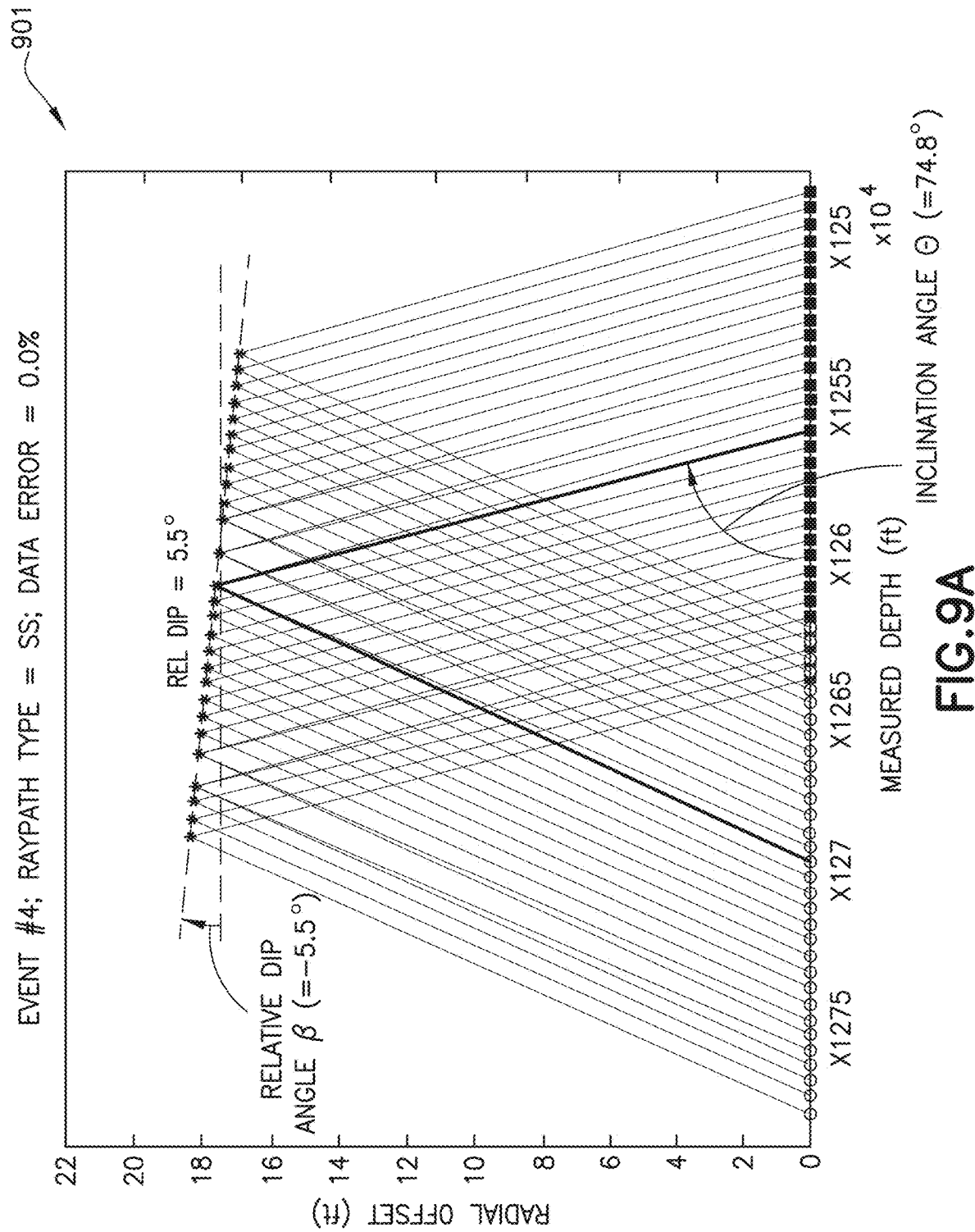
FIGS. 9A and 9B are exemplary visual representations of the results of ray tracing inversion and 3D STC processing for SS ray types, which can be produced by the automated workflow of operations of the present disclosure.
Figure 10A:
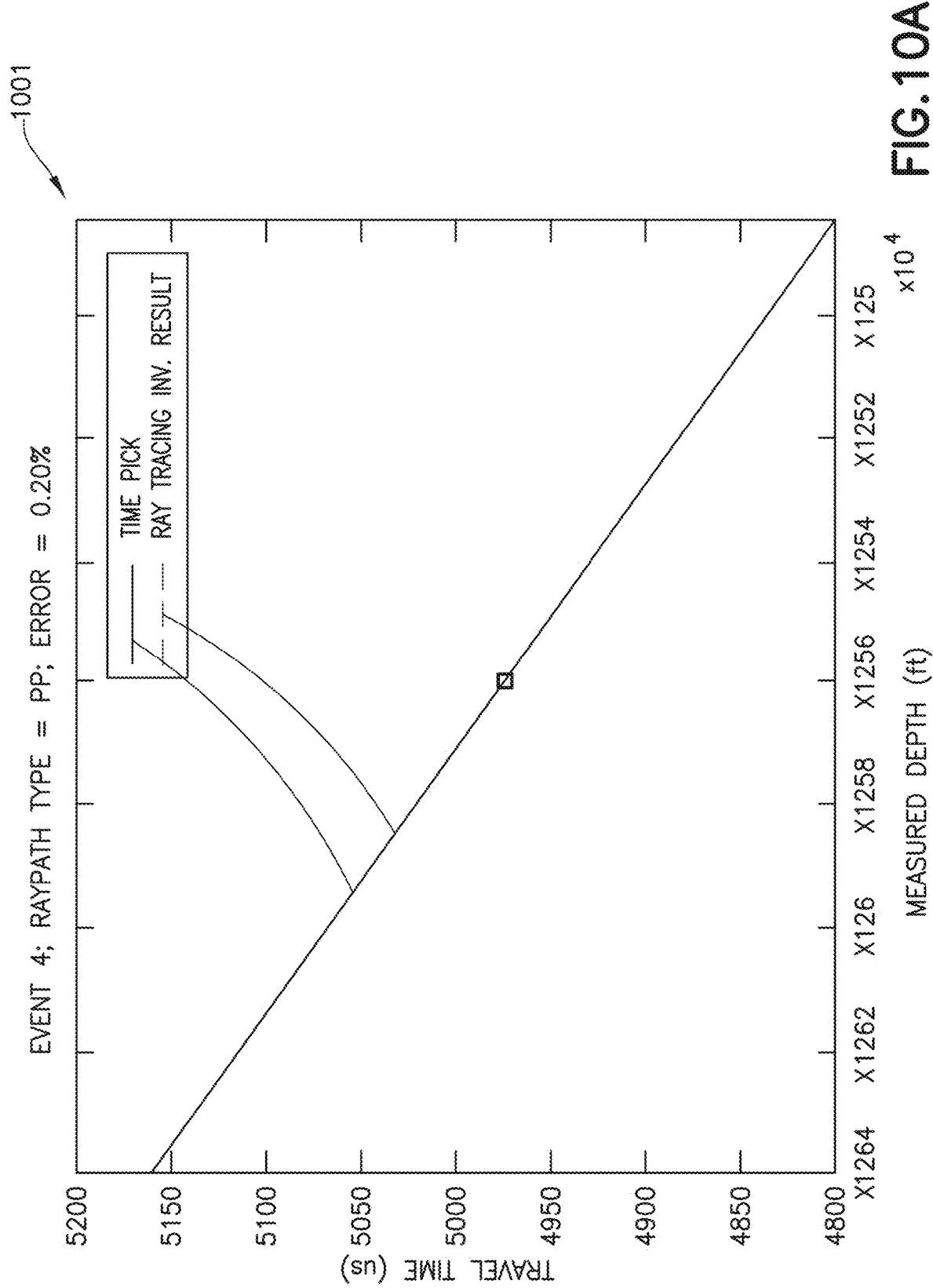
FIGS. 10A and 10B are graphical user interfaces that summarize the results of ray tracing inversion and 3D STC processing, which can be produced by the automated workflow of operations of the present disclosure.
Figure 11A:
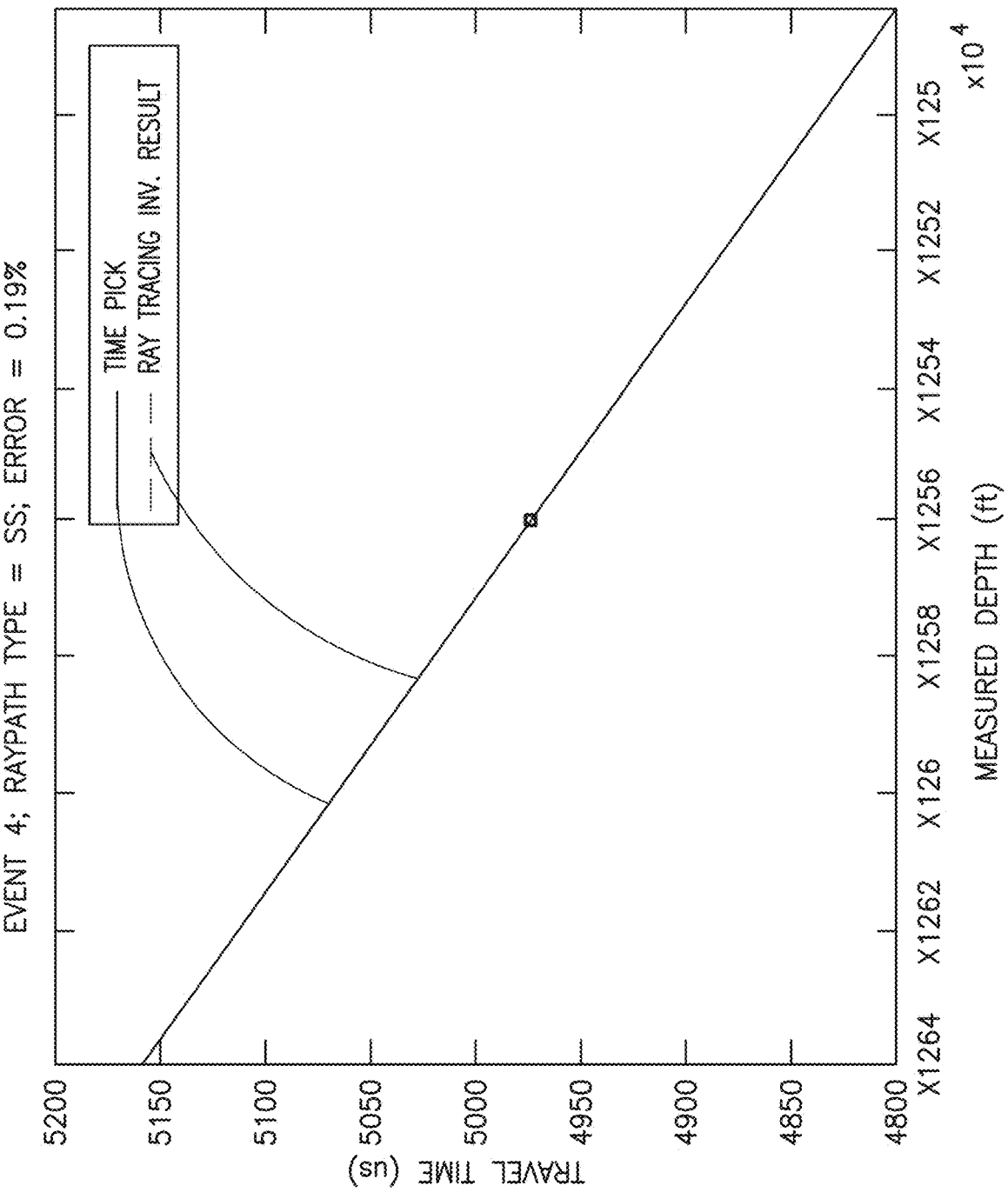
FIGS. 11A and 11B are graphical user interfaces that summarize the results of ray tracing inversion and 3D STC processing, which can be produced by the automated workflow of operations of the present disclosure.

In FIGS. 10A and 11A, the graphs of the detected time pick as a function of measured depth are compared to the graphs of the total travel times (or predicted time pick) as a function of measured depth as determined by the ray tracing inversion for the corresponding reflector positions shown in FIGS. 8A and 9A, respectively and observe that the agreement is very close. We can quantify this agreement using a relative error metric.

$$\Lambda = \Lambda(\hat{\alpha}, \hat{d}) = \sqrt{\frac{\sum_j (tt_{j,pick} - tt_{j,pred})^2}{\sum_j (tt_{j,pick})^2}} \quad (5)$$

The relative errors of the PP and SS ray tracing inversion results shown in FIGS. 10A and 11A are 0.2% and 0.19% respectively.

Figure 8H:
FIG. 8H, which includes

Note that the linear reflectors determined by the PP and SS raytracing inversions and shown in FIGS. 8A and 9A as well as in columns 5-6 and 7-8 of the table in FIG. 8H, respectively, are placed in very different spatial positions relative to the well track along the horizontal axis for the PP and SS ray path types. However, the ray tracing inversion results fit the travel time pick equally well for the PP and SS ray path types as indicated by the data error percentages in the titles of the panels 801 and 901 of FIGS. 8A and 9A. This means that the ray tracing inversion by itself may not be sufficient to determine the raypath type of the reflected arrival event. That is, the time pick information may not be sufficient to determine the raypath type of the reflected arrival event. Thus, an analysis of the wavefield along the time pick is required. We accomplish this using the 3D slowness time coherence workflow which is described next.

In other embodiments, the ray tracing inversion can also invert time picks according to refraction raypaths as illustrated in FIG. 8E where the position of the two-dimensional refractor is determined by a point P along the measured depth axis and the angle $\alpha$ made by the intersection of the refractor and the measured depth axis.

In other embodiments, the prediction of travel time can possibly account for refraction of the wavefront across a borehole fluid/borehole wall interface in the ray path of the acoustic wave between the transmitter and the reflector and for refraction of the wavefront across a borehole wall/borehole fluid interface in the ray path of the acoustic wave between the reflector and the point in the measured depth interval. Details of certain operations of the ray tracing inversion are set forth in U.S. Pat. No. 9,529,109B2, entitled "Methods and apparatus for determining slowness of wavefronts."

Note the reflector positions solved by the ray tracing inversion are specified by two-dimensional positions and relative dips of the reflector relative to the well track, and do not include azimuthal information. In order to derive azimuthal information for the reflectors and also resolve the case where separate inversions solve for different reflector locations for the different ray path types, the second stage in this automated procedure is carried out using 3D STC processing (as outlined below) to study the wavefield of the arrival event at the measured depth positions along the time pick.

While the ray tracing inversion may not determine the ray path type or provide azimuth information, it does provide valuable information as to the range of inclination angles at which the wavefield should be expected to arrive at the receiver array. FIG. 8A describes the wavefield propagation of the reflection from source to reflector to receiver array under the PP reflection raypath hypothesis. Such wavefield propagation indicates that a P wave should be expected to impinge on the receiver array with an incidence angle of 88° at the arrival time specified by the time pick. Similarly, FIG. 9A describes the wavefield propagation for the SS reflection raypath hypothesis. Such wavefield propagation indicates that a S wave should be expected to impinge on the receiver array with an incidence angle of 75° at the arrival time specified by the time pick. Thus, to distinguish the raypath type of the detected arrival event, 3D STC computations can be used to assess whether a P wave or S wave is observed at the arrival time specified by the time pick at the incidence angles prescribed by the corresponding ray tracing inversion. We shall observe that the 3D STC computations also provide azimuth information for this impinging wavefield.

As part of the 3D STC computations, 3D slowness can be parameterized in spherical coordinates, so that the 3D STC coherence function is given by coh($\tau$, $s_r$, $\theta$, $\varphi$). The parameter i is the onset time of the arrival event and is determined from the event time pick. The parameter $s_r$ is the propagation speed of the arrival event at the receiver array and is determined from the slowness logs derived from the waveforms as part of standard P&S logging at the wellsite. For the PP ray tracing inversion shown in FIG. 8A, the parameter $s_r$ is the average P formation slowness at the measured depths determined from the time pick. For the SS ray tracing inversion shown in FIG. 9A, the parameter $s_r$ is the S formation slowness at the measured depth determined from the time pick. In general, if XY is the raypath type for the arrival event, the mean Y formation slowness near the event measured depth is used for the 3D STC computation. The parameter θ is an inclination angle made between the tool axis and direction of propagation of the reflected wavefield when it arrives at the receiver array where θ of 0° represents the propagation along the tool axis from transmitter (source) to the receiver array. The center of the range of inclination angles θ is determined as the inclination angle predicted from the ray tracing inversion, while the width of the range of inclination angles is a user defined parameter whose default value is 25°. For the PP raytracing inversion shown in FIG. 8A, the range of inclination angles used is 88°−25°=63° to 88°+25°=113°, while for the SS ray tracing inversion shown in FIG. 9A, the range of inclination angles used is 75°−25°=50° to 75°+25°=100°. The parameter φ is an azimuthal angle that represents azimuth around the circumference of the tool sonde where φ of 0° is top of hole in the case of a horizontal well or True North in the case of a vertical or deviated well. Since the ray tracing inversions do not provide any azimuth information, the range of azimuth angles used is between −180° and 180° or between 0° and 360°.

Figure 9B:
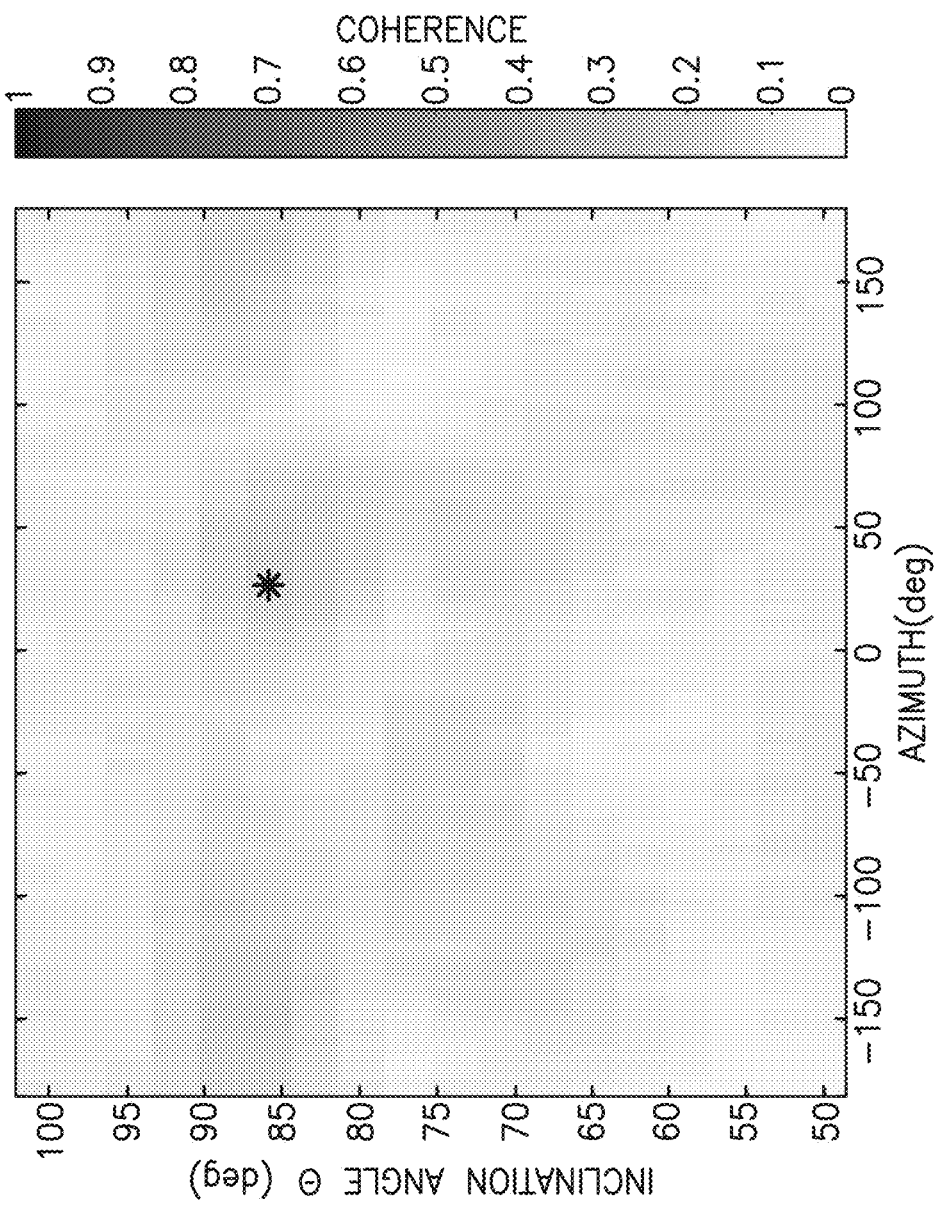

The 3D STC computations can be performed for a given detected arrival event and one or more possible raypath type (e.g., SS, PP, SP, and PS ray types) to assess the impinging wavefield at the slowness and inclination angles predicted by the corresponding ray tracing inversion for the one or more possible raypath types at each measurement station along the time pick. FIG. 8B shows the 3D STC computation result corresponding to the PP ray tracing inversion shown as FIG. 8A for the measurement station X1256 ft described by the dashed ray path. FIG. 9B shows the 3D STC computation result corresponding to the SS ray tracing inversion shown as FIG. 9A for the same measurement station X1256 ft described by the dashed ray path. We observe a well-defined peak with value of 0.43 in FIG. 8B that is located at an inclination angle 84° which is close to the inclination angle of 88° predicted from the PP ray tracing inversion, a difference of only 4°. In addition, we observe that in FIG. 8B, the azimuth angle φ of the peak is around 30°. In contrast, the peak appearing in FIG. 9B is not as well defined and has only a value of 0.2. Moreover, the inclination angle of the peak appearing in FIG. 9B is 86°, whereas the inclination angle predicted by the SS ray tracing inversion is only 75°, a difference of almost 11°. Thus, for measurement station X1256 ft, the 3D STC computations indicate that the impinging wavefield appears to be more consistent with the PP ray path interpretation at the measurement station X1256 ft along the time pick. To make a comprehensive evaluation of the raypath type for the detected arrival event and an optimal estimate for the azimuth φ of the arrival event's impinging wavefield, the 3D STC computations, specifically an assessment of the 3D STC peak location and peak values, need to be performed and summarized for each possible raypath type at all the measurement depth positions along the arrival event's time pick.

Figure 10B:
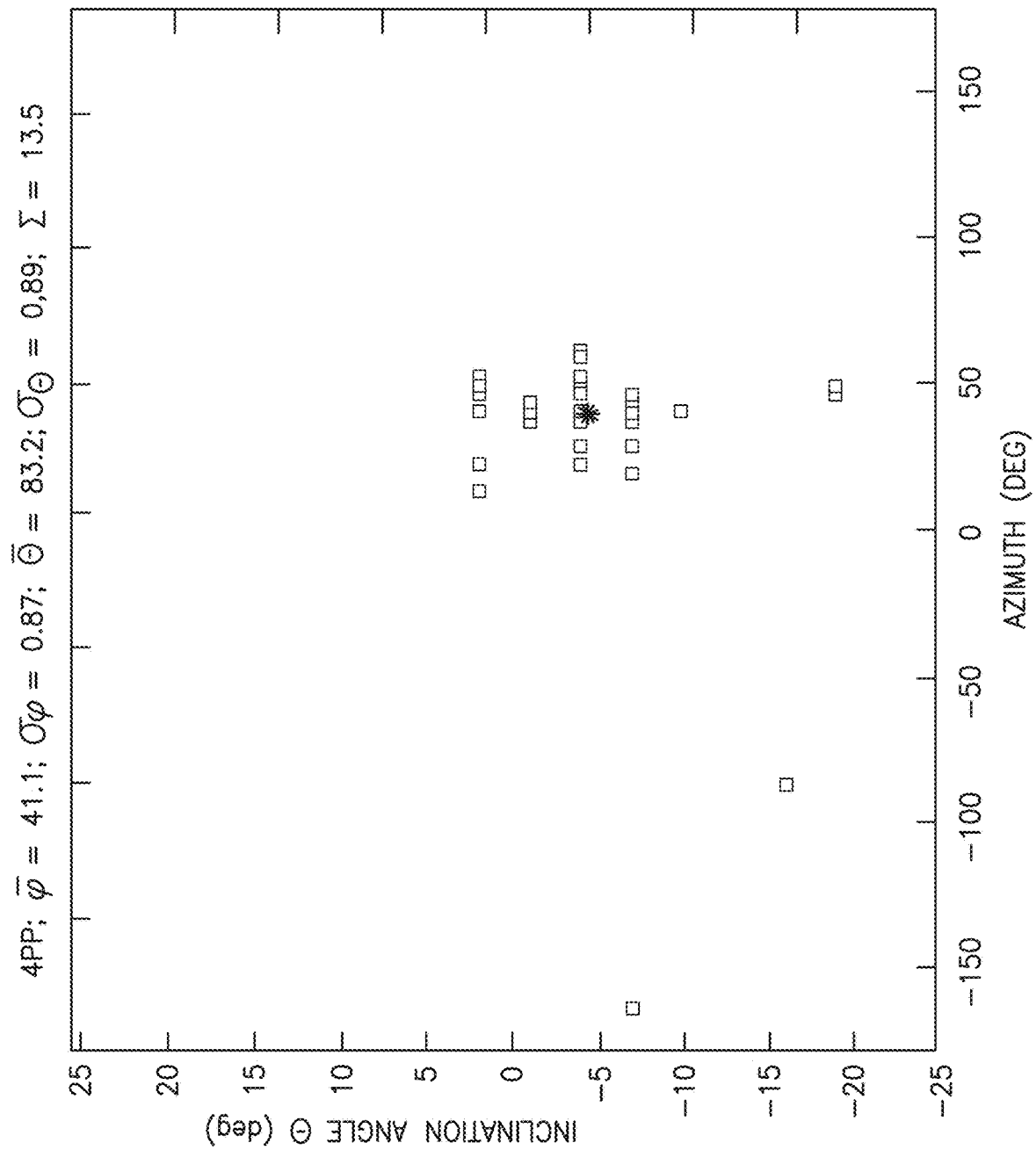
Figure 11B:
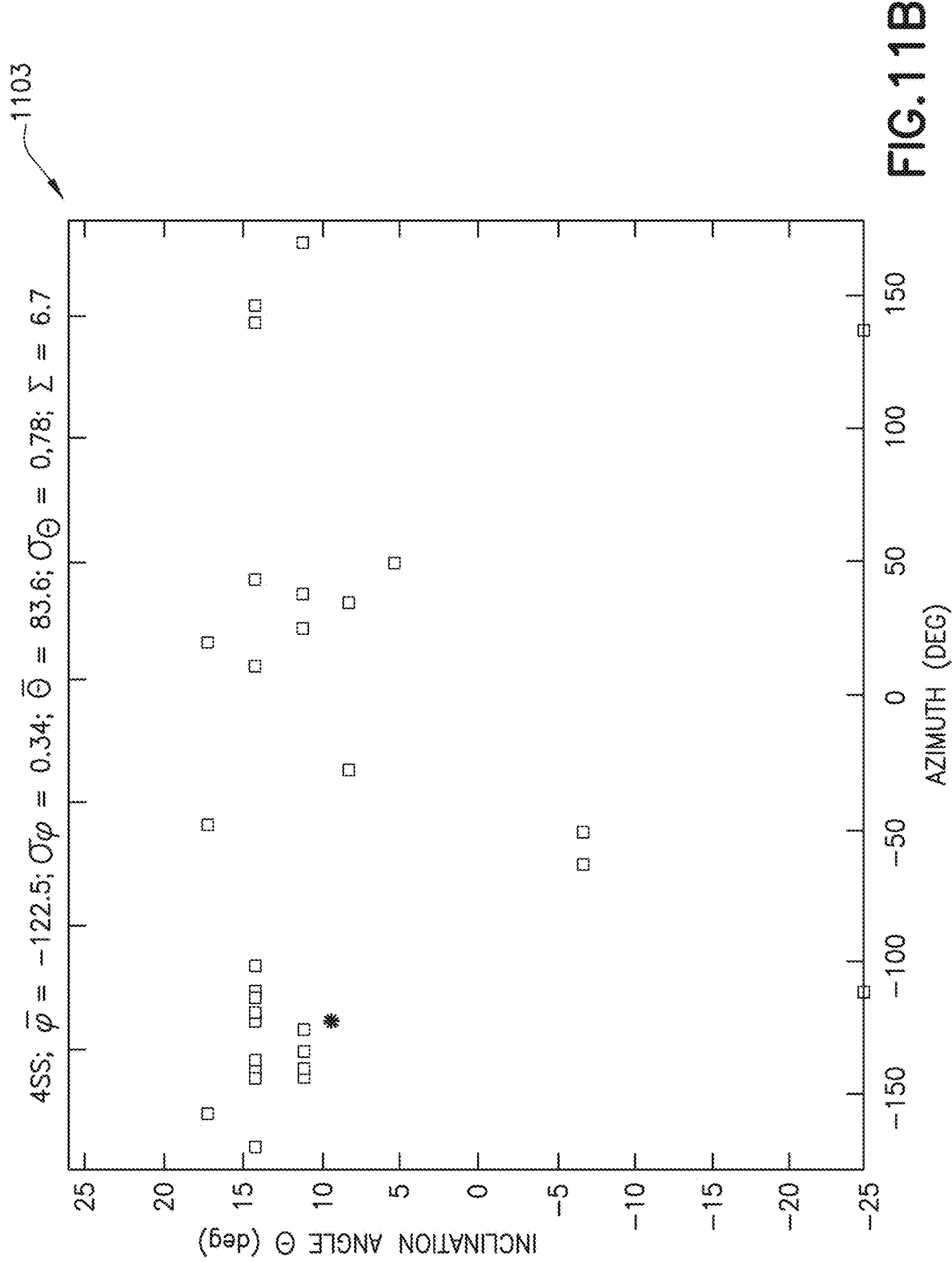

FIG. 10B and FIG. 11B show scatterplots of the 3D STC peak locations for the PP and SS raypath types for arrival event #4, respectively. The 3D STC peak locations for the PP raypath type in FIG. 10B are well localized, whereas the 3D STC peak locations for the SS raypath type shown in FIG. 11B are scattered, particularly in the azimuth direction along the horizontal axis. To quantify the measure of scatter in the 3D STC peak locations, we may use angular dispersion which for a general set of angles $\{\alpha_j\}$ is given by the following angular mean and dispersion formulas.

$$\bar{\alpha} = \frac{180}{\pi} \text{atan2}\left(\sum_j \sin\alpha_j, \sum_j \cos\alpha_j\right) \quad (6)$$

$$\sigma_\alpha = \frac{1}{N}\sqrt{\sum_j \sin^2(\alpha_j - \bar{\alpha}) + \cos^2(\alpha_j - \bar{\alpha})} \quad (7)$$

Values of $\sigma_\alpha$ are between 0.0 and 1.0 with values close to 1.0 indicating that the values of $\{\alpha_j\}$ are well localized and with values close to 0.0 indicating more scattered values of $\{\alpha_j\}$. In FIG. 10B, we observe that the angular dispersions of the 3D STC peaks for the PP raypath type for azimuth is $\sigma_\varphi$=0.87 and for inclination angle is $\sigma_\theta$=0.89. In FIG. 11B, we observe that the angular dispersions of the 3D STC peaks for the SS raypath type for azimuth is $\sigma_\varphi$=0.34 and for inclination angle is $\sigma_\theta$=0.78. These angular dispersion measures show that the 3D STC peaks for the PP raypath interpretation of arrival event #4 are much more focused than are the 3D STC peaks for the SS raypath interpretation of arrival event #4. Finally, it is also important to note that the mean azimuth estimate $\bar{\varphi}$=41.1° for the PP raypath interpretation provides the reflector azimuth corresponding to arrival event #4.

Besides using the angular dispersion to assess the 3D STC peak locations to assess the arrival event's raypath interpretation, assessing the 3D STC peak values themselves is also very helpful, because these indicate the coherence of the event's impinging wavefront at the slowness and range of inclination angles prescribed by a corresponding ray tracing inversion. In FIG. 10A, the sum of the 3D STC peak coherence values is 13.5 for the PP raypath interpretation of arrival event #4, whereas the sum of the 3D STC peak coherence values is 6.7 for the SS raypath interpretation of arrival event #4. Thus, this sum of 3D STC peak values also indicates that the PP raypath interpretation is more valid than is the SS raypath interpretation of arrival event #4.

We have used the ray tracing inversion and 3D STC computations to assess the possible SS and PP ray path type interpretations for arrival event #4. We used the relative error of Equation 5 to assess the ray tracing inversion's fit to the data (which is denoted Λ) as well as the angular dispersion estimates $\sigma_\varphi$ and $\sigma_\theta$ obtained from Equations 6 and 7 applied to the 3D STC peak locations. Finally, we have also added together the 3D STC peak amplitudes $p_j$ to assess the overall coherence of the arrival event. The information obtained from the ray tracing inversion and 3D STC analysis can be combined using the following scoring function:

$$\text{event score} = \sigma_\theta * \sigma_\varphi * \exp(-\Lambda/120) * \sum_j p_j \quad (8)$$

We can summarize this scoring procedure for event #4 in the table shown in FIG. 11C where the score for the PP raypath interpretation is 10.43 which is much higher than the corresponding score of 1.77 for the SS raypath interpretation. The highest scoring ray path type interpretation is PP and is declared to be the ray path type of the detected arrival event. This score is similarly used to rank all the detected arrival events.

A summary of the processing steps and intermediate outputs for the automated ray tracing inversion and 3D STC procedure may be seen in the flowchart displayed in FIGS. 11D1-11D2, which is executed for a number of possible raypath types for each detected arrival event. The procedure begins with the time pick of a detected arrival event (block 1151) as produced by the automated time pick procedure, a number of possible ray path types (block 1153), the average P and S formation slownesses along the time pick (block 1155) as determined from standard acoustic P&S logging at the wellsite, and the filtered waveform data corresponding to the time pick (block 1157). The possible ray path types of block 1153 may include PP or SS reflections or SP or PS mode converted refractions. The ray tracing inversion of block 1159 inverts the time pick for each of the prescribed ray path types of block 1153 using the P & S formation slownesses (block 1155) to determine the following:

- 2D position and relative dip of the reflector relative to the well track for one or more of the possible ray path types of block 1153; such 2D reflector positions and relative dip for the one or more possible raypath types is labeled as block 1161 in FIGS. 11D1-11D2; the 2D reflector position and relative dip for a given raypath type can be determined by varying the 2D position of the reflector (and possibly varying relative dip at each 2D position) and determining a predicted time pick at each varying reflector position (and possibly at each relative dip) based on the total travel times between the transmitter, reflector and receiver, and finding the 2D position and relative dip of the reflector where the predicted travel times most closely match the detected time pick of block 1151 using the relative error metric of Equation (4); the predicted travel times are based on the average acoustic formation slowness (or velocity) between the transmitter and reflector and between the reflector and receiver sensor for the given raypath type (from block 1155); the total travel times can be computed between various depth locations of source and 2D reflector position as shown in the black stars in FIG. 8A and FIG. 9A and as in columns 5-6 and 7-8 of the table in FIGS. 8H1-8H2);
- a predicted time pick for one or more possible raypath types of block 1153; such predicted time pick for the one or more possible raypath types is labeled as block 1163 in FIGS. 11D1-11D2; for a given raypath type, the predicted time pick corresponds to the 2D position and relative dip of the reflector where the predicted time pick most closely matches the detected time pick of block 1151 as solved by the ray tracing inversion;
- a range of predicted inclination angles for each measured depth station along the time pick for one or more of the possible raypath types of block 1153; such range of predicted inclination angles is labeled as block 1165 in FIGS. 11D1-11D2; an example of such a range of predicted inclination angles are indicated in the lower right corner of FIGS. 8A and 9A).

The time pick (block 1151) and the predicted time picks for a number of possible ray-path types (block 1163) can be compared using the relative error metric in Equation 5 which contributes to the factors Λ (block 1167). The factors Λ (block 1167) can be used in the scoring function of Equation 8 (block 1177) as is seen in the first row of the table in FIG. 11C.

In FIGS. 11D1-11D2, 3D STC computations (block 1169) are performed at each measurement station along the time pick (block 1151) for one or more possible raypath types. In embodiments, the 3D STC operations can be performed for each ray path type specified in 1153 irrespective of the value of the relative error $\Lambda=A(\hat{\alpha}, \hat{d})$, that is, irrespective of how well the predicted travel times match the detected time pick. However, note that if the relative error is large, the corresponding score in Equation 8 will be low for this ray path type. As part of the 3D STC computations, 3D slowness can be parameterized in spherical coordinates, so that the 3D STC coherence function is given by $coh(\tau, s_r, \theta, \varphi)$. This parameterization requires the arrival time τ from the time pick, the formation slowness $s_r$ along the time pick that corresponds to the raypath type (i.e., if "XY" represents the raypath type, we require the Y formation slowness for $s_r$), the range of inclination angles predicted by the ray tracing inversion (block 1165), and the full range of azimuth angles [−180°, 180°] since the ray tracing inversion does not provide any information pertaining to reflector azimuth φ. Note that if θ* is the inclination angle predicted by the ray tracing inversion, then [θ*−25°, θ*+25°] is used for our range of inclination angles.

In Block 1169 of FIGS. 11D1-11D2, 2D slices of the 3D STC representation of the waveforms collected at each measurement station along the detected time pick are computed for each possible ray path type. For example, the 2D slice of the 3D STC representation for the PP raypath type of the waveforms collected at the seventeenth position along the time pick specified by the first two columns of the table in FIGS. 8H1-8H2 is shown in FIG. 8B. This table entry row shows the tool measured depth location is X256.0 and corresponding reflection event arrival time τ=4.9739 ms. The waveforms collected by the receiver sensor with source-receiver offset $z_j$ and receiver azimuth $\alpha_k$ at measured depth X256.0 can be denoted $w_{j,\alpha_k}(t)$. The inclination angle predicted for the PP ray path type at measured depth X256.0 is θ*=88° as shown in FIG. 8A. The P formation slowness at measured depth X256 is $s_r$=75 μs/ft. To construct an appropriate 2D slice of the 3D STC representation of the waveforms $w_{j,\alpha_k}(t)$, we allocate a 2D array whose 25 rows are indexed by the integer p=1, . . . , 25 and correspond to the values inclination angle given by $\theta_p = \theta^* + (p-12)^*\Delta\theta$ where Δθ=2° and whose 60 columns are indexed by the integer q=1, . . . , 60 and correspond to azimuth angles given by $\varphi_q = (q-30)^*\Delta\varphi$ where Δφ=6°. Thus, for the (p, q)$^{th}$ entry of our matrix, we perform the 3D STC computation specified by $coh(\tau=4.9739, s_r=75 \mu s/ft, \theta_p, \varphi_q)$ for the waveforms $w_{j,\alpha_k}(t)$ collected at the tool measured depth position X256.0 ft. The peak 3D STC value marked by the white '*' in panel 803 of FIG. 8B is determined by searching for the maximum value in this 25-by-60 matrix.

The results of the 3D STC computations include 3D STC peak coherence values {$p_j$} as a function measured depth along the time pick for one or more different raypath types (block 1171) and possibly a scatterplot of the 3D STC peak coherence values as a function of measured depth along the time pick for one or more the different raypath types (block 1173). The scatterplot shows the peak location coordinates specified in terms of inclination and azimuth angles, such as the white '*' in 803 of FIG. 8B and the squares in 1003 of FIG. 10B and 1103 of FIG. 11B. Specifically, a peak value and peak location can be extracted from each 2D slice of the 3D STC representation of the waveforms acquired at a given measured depth. This results in a set of peak 3D STC values (1171) and peak locations for each ray path type. The peak locations are used to form the scatterplot (1173), and the sum of the peak values is used in 1177 below. Examples of such results are shown in the scatterplots of FIGS. 8B, 9B, 10B and 11B from which can be observed both the locations of the respective 3D STC coherence peaks as well as corresponding values. Angular dispersion of the 3D STC peak locations in both the azimuth and inclination angle directions ($\sigma_\varphi$ and $\sigma_\theta$, respectively) can be derived for one or more possible raypath types in block 1175.

In block 1177, scores for a number of possible raypath types can be computed, for example, using Equation 8 above. Note that the factor A (block 1167), the 3D STC peak value (block 1171) and the angular dispersion of the 3D STC peak location (block 1175) for a given ray path type contributes to the score in Equation 8 for the given ray path type as seen in the last row of the table shown in FIG. 11C.

In block 1179, the scores for the number of possible raypath types of block 1177 can be evaluated or ranked to identify the raypath type with the highest score, and the highest ranked raypath type is declared or determined to be the raypath type for the time pick and the corresponding arrival event and reflector.

In some cases, only one raypath type can be considered by the ray tracing inversion and processed by the 3D STC. For example, when performing sonic imaging using a dipole acoustic source or some other high order acoustic source, the ray tracing inversion and 3D STC processing can possibly only consider the SS raypath type under the assumption that only SS reflections will arise from formation fractures and faults. In this case, the scoring operations of blocks 1177 can be avoided and block 1179 can declare the one raypath type be the raypath type for the time pick and the corresponding arrival event and reflector.

In block 1181, a mean azimuth $\bar{\varphi}$ computed from the 3D STC peak scatterplot of the raypath type determined in block 1179 can be equated to the value of the reflector azimuth $\varphi$ relative to the acoustic logging tool sonde. Details of an exemplary reflector azimuth angle $\varphi$ and inclination angle $\theta$ relative to the acoustic logging tool sonde is shown in FIG. 8C.

In block 1183, the automated ray tracing and 3D STC procedure determines the 3D position and orientation of the reflector relative to the axis of the acoustic logging tool sonde in terms of the reflector azimuth $\varphi$ (block 1181) and the two-dimensional reflector position relative to tool sonde as solved by the ray tracing inversion (block 1161) for the raypath type determined in block 1179. In this embodiment, the 3D position of the reflector relative to the tool sonde can be parameterized by a center point of the reflector defined by dimensions of measured depth MD, radial offset r from the axis of the tool sonde, and the azimuth angle $\varphi$ around the circumference of the tool sonde and borehole as shown in FIG. 8C. Furthermore, the orientation of the reflector relative to the tool sonde can be parameterized by a relative dip angle $\beta$ and an inclination angle $\theta$ of the reflector as shown in FIG. 8C. In this case, where the 2D reflector position relative to tool sonde (block 1161) is provided by a point P, an offset d and inclination angle $\alpha$, such 2D parameters can be translated to dimensions of measured depth MD and radial offset r as part of the 3D position of the reflector relative to the tool sonde as follows. For $0 \le \alpha$ (in degrees) $\le 90$, MD=MD (for point P)$-d^*\cos(\alpha)$ and $r=d^*\sin(\alpha)$; and for $90 < \alpha$ (in degrees)$\le 180$, MD=MD (for point P)$+d^*\cos(180-\alpha)$ and $r=d^*\sin(180-\alpha)$.

The determination of the 3D position of the reflector relative to the axis of the acoustic logging tool sonde can be satisfactory for vertical wells. However, for many applications, it is useful to determine the 3D position and orientation of the reflector in a true (or real-world) 3D space (without reference to the well trajectory) in block 1185. In embodiments, the true 3D position of the reflector can be parameterized by a center point of the reflector defined in a geographical 3D coordinate system (e.g., latitude/longitude/height with respect to the reference ellipsoid surface of the earth), a geocentric coordinate system (e.g., the Earth-Centered Earth-Fixed coordinate system, a vertical earth coordinate system (e.g., elevation or depth with regard to the geoid), or other suitable 3D earth coordinate system. The true 3D orientation of the reflector can be parameterized by coordinates $N_x$, $N_y$, $N_z$ of a normal vector that extends from the reflector at its center point. The coordinates $N_x$, $N_y$, $N_z$ of the normal vector for the reflector can be translated to a true dip angle $\Theta$ and true azimuth angle $\Phi$ for the reflector as shown in FIGS. 8F1, 8F2, and 8G.

In embodiments, the 3D position and orientation of a reflector true (or real-world) 3D space can be determined by defining points A, B, C, and D are defined in the plane of the reflector at a fixed offset (the default setting is 5 feet) from the centerline of the reflector marked as the dashed line in FIG. 8C. Using well survey information (block 1187), which can include hole inclination and azimuth information, one can derive a series of three linear rotations and a translation to compute the 3D positions of the points T(A), T(B), T(C), and T(D) and the actual well trajectory as illustrated in the FIGS. 8F1 and 8F2. One can then compute the normal vector $(N_x, N_y, N_z)$ to the surface by computing the cross product of the vectors $\overrightarrow{T(A)T(C)}$ and either $\overrightarrow{T(B)T(D)}$ or $\overrightarrow{T(D)T(B)}$ so that $N_z > 0$. From the normal vector $(N_x, N_y, N_z)$, one can derive the reflector true dip $\Theta$ and true azimuth $\Phi$ via the Equations 9 and 10 as follows:

$$\Theta = \arctan(N_z, \sqrt{N_x^2 + N_y^2}). \tag{9}$$

$$\Phi = \arctan(N_x, N_y). \tag{10}$$

In one embodiment, the 3D STC computations involve processing waveforms $w_{j,\alpha_k}$ recorded by acoustic receivers located at positions around the circumference of a sonic tool with coordinates $$x_{j,\alpha_k} = (r_{tool} \cos \alpha_k, r_{tool} \sin \alpha_k, z_j - z_1). \tag{11}$$

The coherent energy for a time window of duration $T_W$ starting at time $\tau$ and slowness vector $s=(s_x, s_y, s_z)$ in 3D Cartesian coordinates with z being the direction along the axis of the tool sonde is given by:

$$E_c(\tau,s) = \int_0^{T_W} [\Sigma_{j,k} w_{j,\alpha_k}(t-\tau-s \cdot x_{j,\alpha_k})]^2 dt. \tag{12}$$

The use of the inner product $s \cdot x_{j,\alpha_k}$ in Equation (12) means that the waveforms $w_{j,\alpha_k}$ are being stacked with a linear moveout corresponding to the source-receiver offset according to $s_z^*(z_j-z_1)$ and with a sinusoidal moveout corresponding to the receiver azimuth according to $r_{tool}^*(s_x \cos \alpha_k + s_y \sin \alpha_k)$.

The corresponding incoherent energy $E_i(\tau, s)$ and coherence $\coh(\tau, s)$ arrays are then defined using $$E_i(\tau, s) = \sum_{j,k} \int_0^{T_W} w_{j,\alpha_k}^2 (t - \tau - s \cdot x_{j,\alpha_k}) dt \tag{13}$$

$$\coh(\tau, s) = \sqrt{\frac{E_c(\tau, s)}{M|\Omega|E_i(\tau, s)}} \tag{14}$$

Here $\Omega$ represents the set of the receiver sensor angles $\alpha_k$, and M is the number of receivers in the receiver array.

When using a high order acoustic source (such as dipole acoustic source), one must observe that the polarity of the wave reflected from a nearby boundary is a function of the source polarity. To process acoustic waveform data generated by the use of a high order acoustic source at multiple source azimuths using the 3D STC, a sign term $\sgn(\cos(\varphi_s - \beta))$ that accounts for the polarity of the acoustic source with azimuth #l relative to the stacking azimuth, $\varphi_s$ can be added.

This modification allows the reflected and refracted arrivals to be stacked in a coherent manner.

$$E_c(\tau, s) = \int_0^{T_W} \left[ \sum_{\substack{(\alpha,\beta)\in\Omega \\ \text{offset } j}} \text{sgn}(\cos(m(\varphi_s - \beta))) w_{j,\alpha,\beta}(t - \tau - s \cdot x_{j,\alpha}) \right]^2 dt. \quad (15)$$

Here m is dependent on the number of poles in the acoustic source (monopole m=0, dipole m=1, etc.).

Note that the signum function is not a function of the receiver azimuth α but rather a function of the source azimuth #1, so the direct arrivals remain largely incoherent in this 3D STC representation. The corresponding incoherent energy $E_i(\tau, s)$ and coherence $\text{coh}(\tau, s)$ functions are defined for multipole sources in an entirely analogous fashion.

$$E_i(\tau, s) = \sum_{j,k} \int_0^{T_W} w_{j,\alpha,\beta}^2 (t - \tau - s \cdot x_{j,\alpha}) dt, \quad (16)$$

$$\text{coh}(\tau, s) = \sqrt{\frac{E_c(\tau, s)}{M|\Omega|E_i(\tau, s)}}. \quad (17)$$

Here Ω now represents the set of the source (β) and receiver sensor (α) angles.

The 3D STC coherence functions coh(τ, s) described Equations 14 and 17 are parameterized here using an arrival time τ and Cartesian slowness vector s=($s_x$, $s_y$, $s_z$), whereas the function used for the 3D STC computations described above uses a function coh(c, $s_r$, θ, φ) which is the same function but parameterized in spherical coordinates. Specifically, for values ($s_r$, θ, φ) the corresponding $s_x$, $s_y$, $s_z$ values are given by:

$$s_x = s_r \sin\theta \cos\varphi \quad (18)$$

$$s_y = s_r \sin\theta \sin\varphi \quad (19)$$

$$s_z = s_r \cos\theta \quad (20)$$

Note that the formation slowness $s_r$ corresponds to the propagation mode (or raypath type) under consideration. Thus, if "XY" represents the propagation mode (or raypath type) under consideration, then the Y formation slowness is used for $s_r$. For example, if the PP raypath type is under consideration, then the P-type formation slowness is used for $s_r$.

The information derived from this second automated procedure can be summarized in a variety of ways.

Figure 12A:
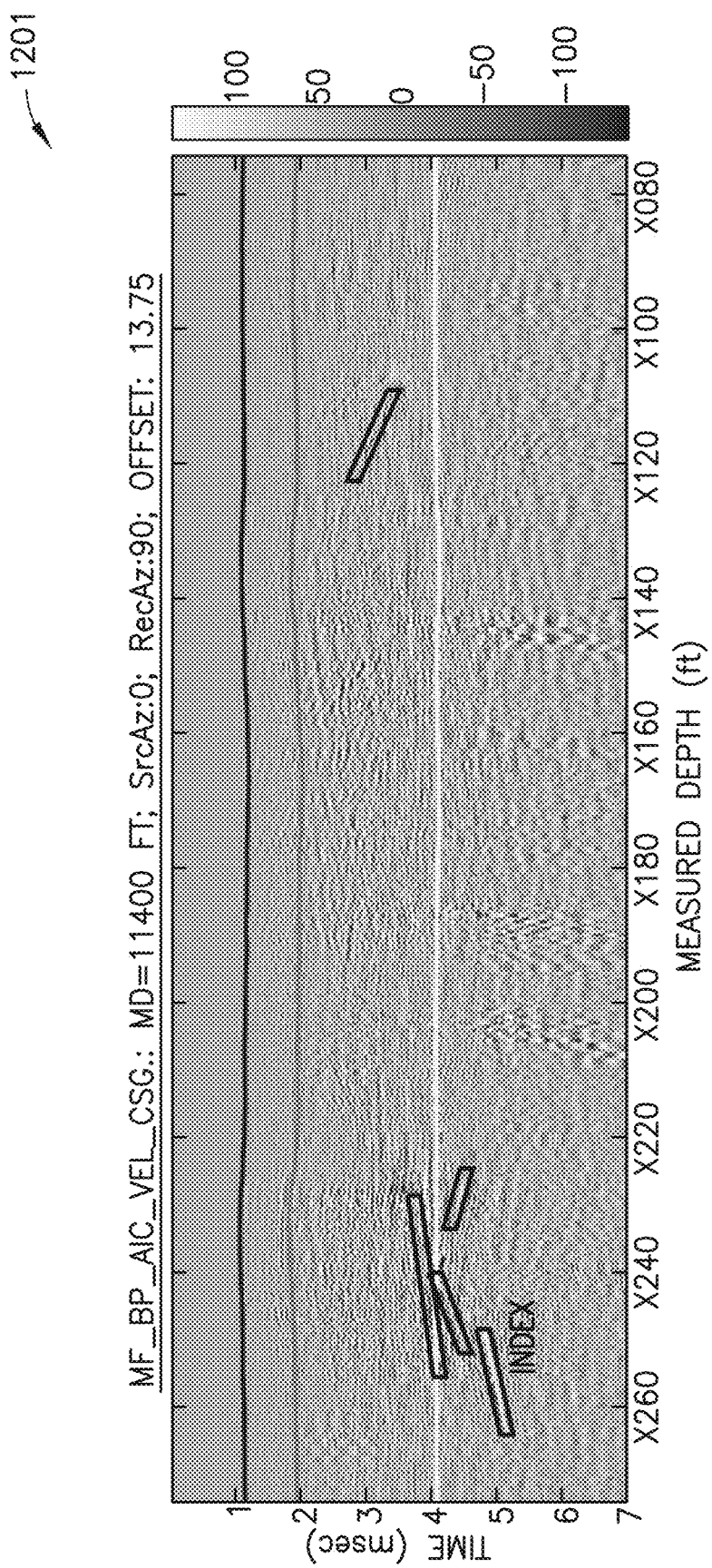
FIGS. 12A-12D are exemplary graphical user interfaces that summarize the results of an event localization procedure and ray tracing inversion and 3D STC processing, which can be produced by the automated workflow of operations of the present disclosure. The graphical user interfaces of FIGS. 12A-12D can optionally be displayed in a common display window.
Figure 12B:
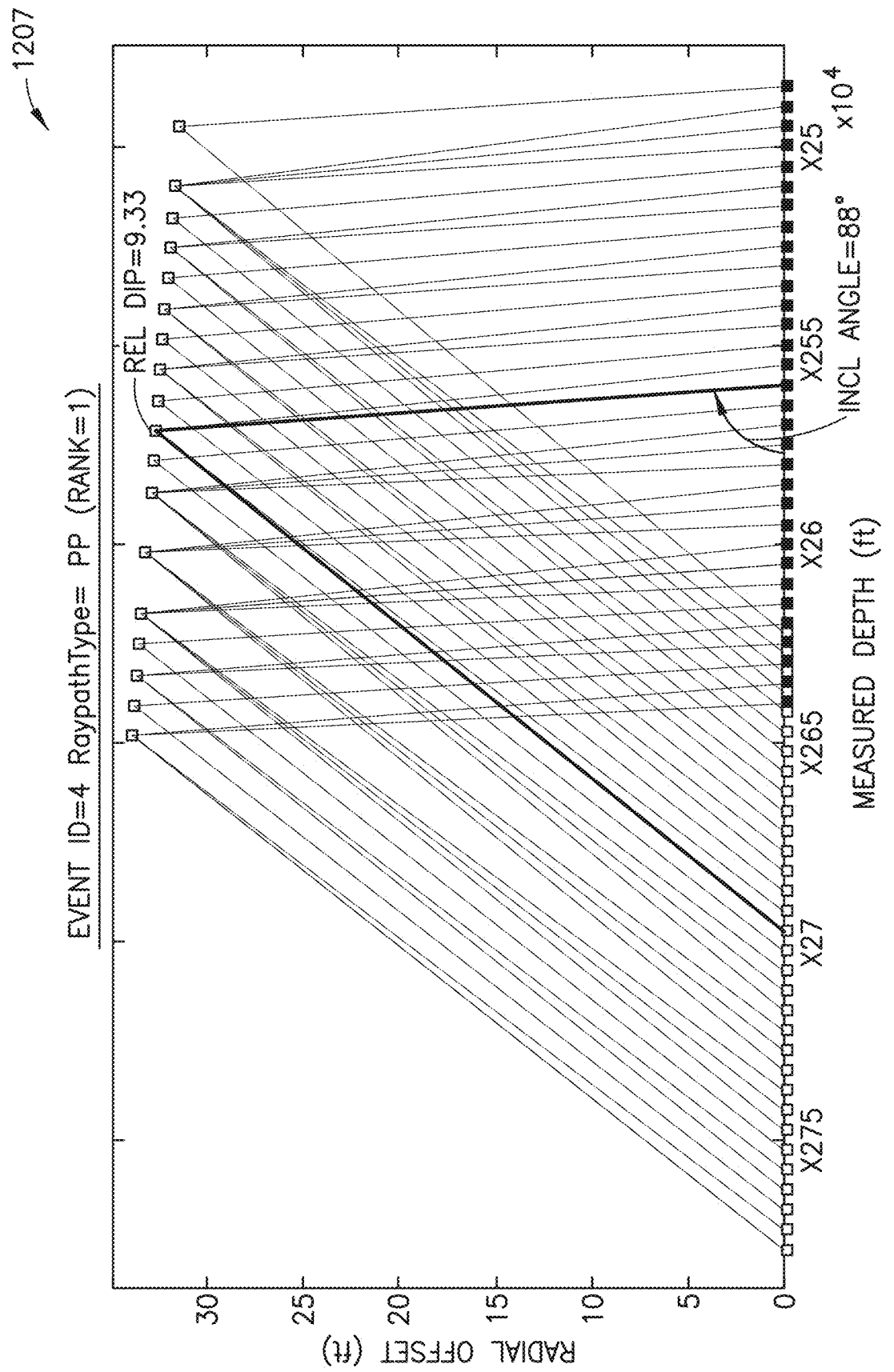
Figure 12C:
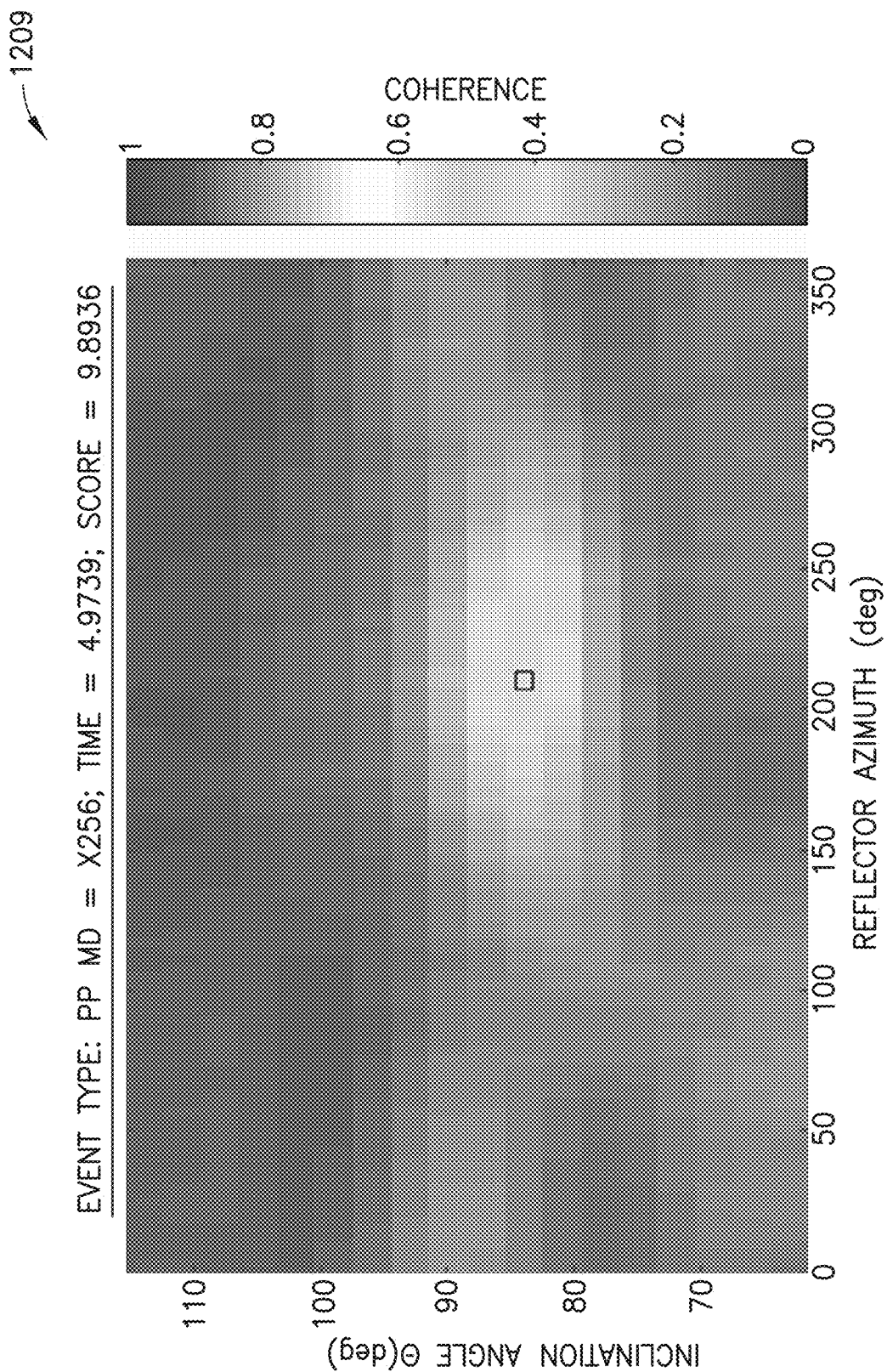

Example graphical user interfaces are illustrated in FIGS. 12A-12D, which includes a panel 1201 of FIG. 12A that shows the filtered waveform data recorded on the 3rd receiver sensor in the 7th ring of receivers. The overlay indicates the position of several arrival events whose score is at least 2.24. Each event can be labeled with an index value that uniquely identifies the event from the other events. For example Event #4, which is labeled by "Index" as shown, is a PP reflection and has been selected from the waveform viewer. Its corresponding ray tracing inversion result is shown in panel 1207 of FIG. 12B, while panel 1209 of FIG. 12C shows the 3D STC analysis at the measured depth station indicated by the dark ray path in panel 1207 and by the two horizontal black time gates along Event #4 in the waveform viewer panel 1201 of FIG. 12A.

Figure 12D:
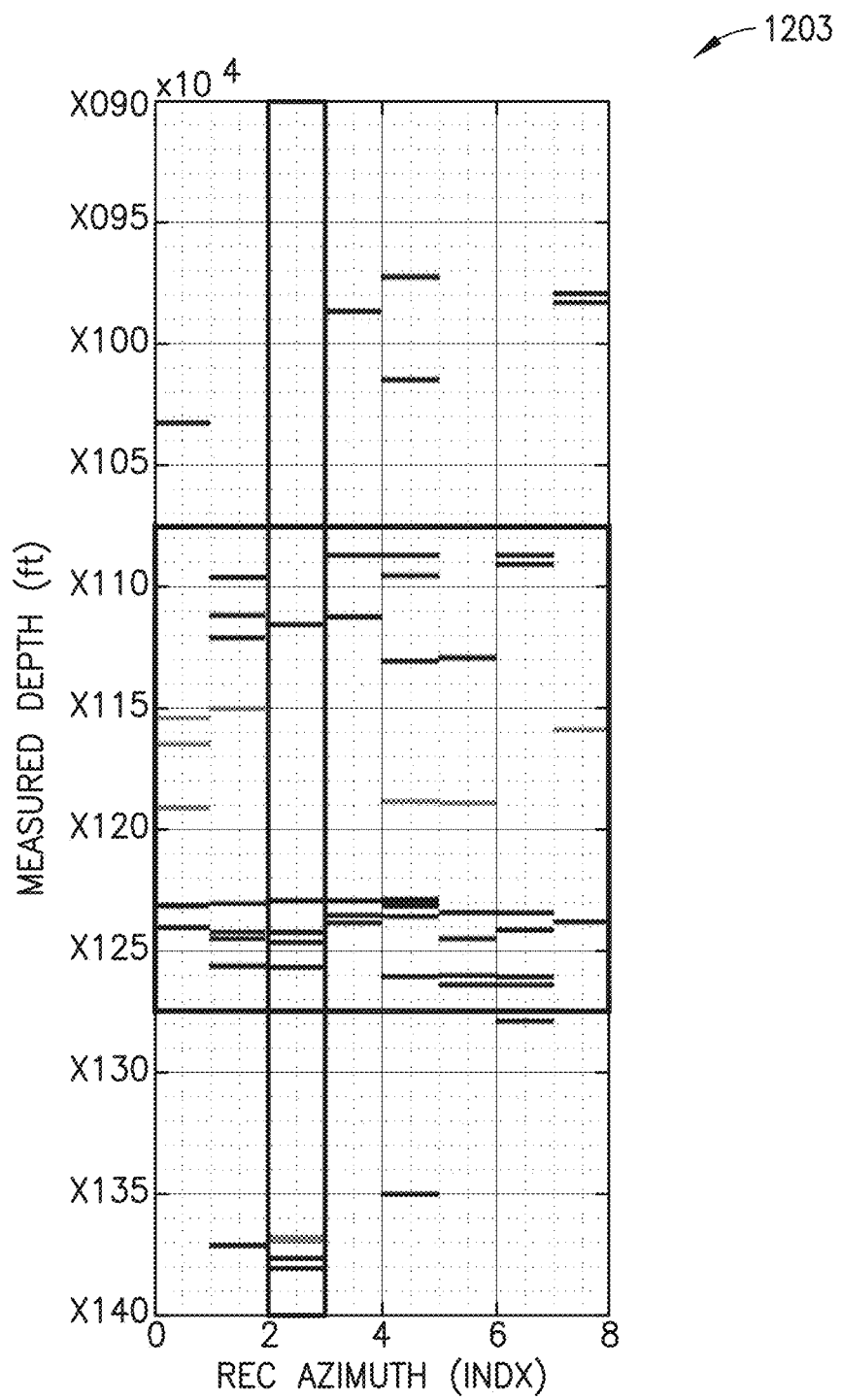

Note that in FIG. 12A, the waveform viewer panel 1201 can have an overlay of the arrival events color-coded according to their ray path type. The hue of the boxes that describe each arrival event can be determined according to the highest scoring ray path type. Cyan color represents the 'PP reflected' ray path type; 'Brown' represents 'SP refracted'; 'Magenta' represents 'PS refracted'; while 'Orange' represents 'SS reflected'. Optionally, the intensity of the color can be determined according to the scoring rank or relative score derived from Equation 8. In addition, a log panel 1203 of FIG. 12D depicts the ray path type, receiver index, and measured depth of the arrival events using the same color scheme, which is similar to FIG. 3B.

Figure 13:
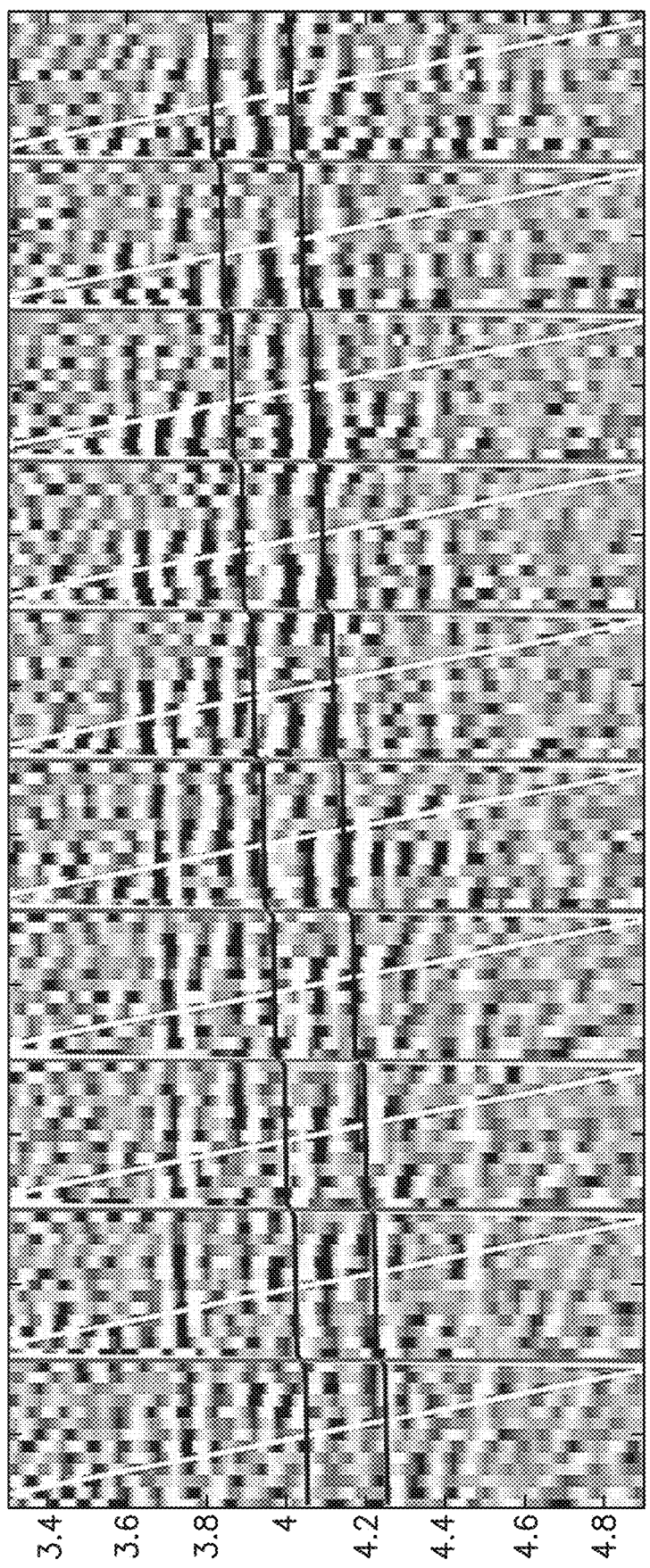
FIGS. 13 and 14 are visual representations of the results of the ray tracing inversion and 3D STC processing for certain detected arrival events selected from the filtered waveform data.
Figure 14:
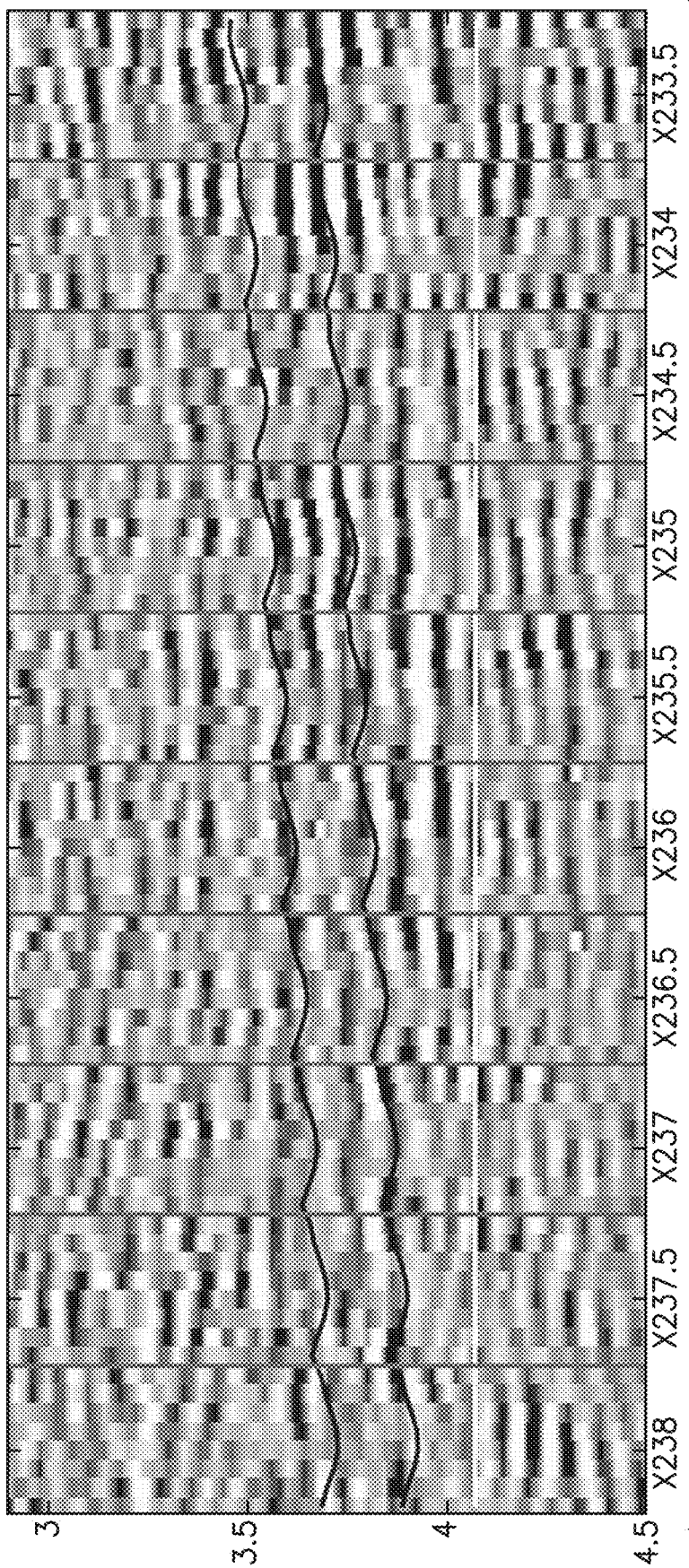

FIG. 13 shows the common receiver azimuth view of the filtered waveform data (receiver index #1) with highlighted event #8. FIG. 14 shows the common ring view of the filtered waveform data (ring #7) with highlighted event #8. Note that the moveouts of the arrival events shown in FIGS. 13 and 14 are determined from the time pick and the estimated values for event #8's 3D STC azimuth and inclination angles.

Several different log panels can be used to show different attributes of the arrival events and corresponding near wellbore formation structures. These include the panels of FIG. 3C and FIG. 4D where the azimuth of the reflectors is shown where said azimuth is determined by the mean azimuth of the 3D STC peaks shown in FIGS. 10B and 11B. The horizontal position of these boxes can be determined by other parameters derived by the proposed workflow. For example, we could choose to use the mean inclination of the 3D STC peaks shown in FIGS. 10B and 11B or to use the estimated relative reflector dip derived using the ray tracing inversion shown in the panels 801 and 901 of FIGS. 8A and 9A and shown in the log panel 1207 of FIG. 12B.

All of these log displays give the user a quick assessment of the possible location and characteristics of the various arrival events that may be present in the filtered waveform measurements. These color codings show the various ray path types and the relative prominence of the corresponding arrival events, while the spatial positions of the boxes in the display give a valuable summary view of the spatial location of the corresponding reflector.

In addition to using the waveform viewer and log panels to depict the arrival events and their attributes, we can summarize the structural (reflector) information derived from the automated procedures using the display maps of the reflectors as shown in FIGS. 4A to 4C. The display map of the reflectors shown in panel 401 of FIG. 4A shows the three dimensional positions of the reflectors relative to the tool axis (well track), which are obtained using the reflector positions determined by the ray tracing inversions (as depicted in the panels 801 and 901 of FIGS. 8A and 9A) and mean 3D STC azimuths (as depicted in the panels 1003 and 1103 of FIGS. 10B and 111B). The color-coding of the reflectors allows the user to observe the mode of the ray path that is used to image the reflectors. The display map of the reflectors shown in panel 405 of FIG. 4C illustrates the two-dimensional position (e.g., measured depth and azimuth) for the reflectors within a user-specified azimuthal range or window. More particularly, the user specified azimuthal window shown in the panel 405 includes two parts which are offset from one another by 180° of azimuth. One part is defined by a pair of solid vertical line segments, and the other part is defined by a pair of dashed vertical line segments. The width or size of each part (in degrees of azimuth) is a user defined parameter. Furthermore, the user can adjust the center positions for the two parts (which are offset from one another by 180° of azimuth) using the slider bar 406 in FIG. 4C. The reflectors positioned with this two-part user-specified azimuthal range or window are displayed as part of the display map of panel 401 as shown in FIG. 4A. The first slider bar 407 (from the left-hand side) in FIG. 4A determines the start of the measured depth interval of the arrival events used for the display maps, while the slider bar 408 determines the lower bound on the scores of the arrival events used for the display maps. These display maps provide the user with a quick summary of the spatial positions of the near wellbore formation structures without having to migrate the waveform measurements.

While we have emphasized the automatic nature of this ray tracing and 3D STC-based portion of the workflow, the user is able to assess the quality of the interpretation and modify (or tune) the parameters of the procedure if desired. In the waveform panel 1201 of FIG. 12A, the user has manually selected event #4 and selected one of the menu items to assess the quality of the imaging results for that event. The panels 1207 and 1209 of FIGS. 12B and 12C, respectively, show the ray tracing inversion result and 3D STC slice for the measurement station highlighted by the line segments in the ray tracing diagram and by the two horizontal black line segments along the time pick associated with the label "INDEX" as shown in the waveform display 1201 of FIG. 12A. The user can shift the measurement station along the time pick to examine the 3D STC slices as well as review the graphs of the ray tracing results fit to the data and 3D STC peak histograms as shown in FIGS. 10B and 11B. The user can examine all of these results for different choices of ray path type by user input, as well as manually promote/demote the rankings of the ray path types for the selected arrival event by user input. This facility gives the user a very important means of examining and modifying the details of this portion of the automated workflow.

Automated Migration Configuration Procedure

As we mentioned earlier, the task of configuring the migration requires determining several important parameters: (a) the ray path type of the arrival events of interest; (b) the azimuth of the arrival events; and (c) the migration aperture. In addition, to reduce the number of artifacts in the migration imager, many users will choose to impose a constraint on (d) the relative dip of the reflectors. We note that all of these parameters have been determined for the each of the arrival events processed by the first two stages of our automated workflow. To allow the user to configure the migration in an automated fashion, we (1) group the arrival events according to proximity and ray path type; (2) allow the user to review the migration parameters that have been automatically prepared for each group, for example as shown in FIG. 15; and then (3) allow the user to select the arrival events that will be migrated.

Very frequently there are many arrival events associated with the same reflected wavefront received by the acoustic sensors of the downhole sonic tool. For example, in the waveform panel 1201 of FIG. 12A, we observe that certain events near 4 msec and between X260 and X220 in measured depth very clearly belong to the same wavefront arrival. In addition, since the same wavefront arrival event is very often observed at different receiver sensors around the circumference of the tool sonde, additional arrival events also will correspond to the same wavefront arrival event. To help organize the task of configuring the migration, the arrival events are grouped according to proximity in measured depth and according to ray path type. Two arrival events are considered close in measured depth if they are closer than their corresponding migration apertures.

The results of grouping the arrival events in this way can be seen in the panel of FIG. 3D where vertical blue bars highlight four groups of arrival events. The length of these blue bars includes the arrival events themselves plus the largest migration aperture found among the group. To review the migration parameters that are automatically generated for a candidate migration, the user can select the corresponding blue bar. A dialogue box such as what appears in FIG. 15 allows the user to review the measured depth of the waveform measurements used for the migration, a relative dip constraint for the migration which the user may wish to impose, a suggestion for muting the waveforms used in the migration based on the time window selected to configure the automatic time picking procedure, options for generating a 2D migration image normal to or along the well track, the size of the canvas used for the migration, the pixel resolution of the migration, as well as options for weighting the migration according to the 3D STC coherence of the arrival event and/or according to a more standard geometric spreading.

Finally, the user can select a group of migrations that will contribute to the final migration image.

Migration and Results QC

The migration procedure performs the migration, adds together the contributions from each of the migration groups defined in the previous section and provides the migration result along with a map of reflectors that is used to QC the migration result. The results of this procedure are shown in panel 403 of FIG. 4B. As with the generation of the display map of the reflectors shown in panel 403 of FIG. 4B, the ray tracing inversion and mean 3D STC azimuth estimate can be used to determine the position of the QC reflectors in the migration image. Many users gain confidence in the results from seeing these QC reflectors. These QC reflectors help to avoid becoming confused by artifacts that can appear in sonic imaging migration results. Again, the labels or indices of the QC events can correspond to the labels or indices of the arrival events shown in the waveform viewer panel 1201 of FIG. 12A, so that the user can indeed associate particular features in the migration image with particular waveform features.

Output of Mapped Reflectors for Downstream Workflows

While we have demonstrated that we can visualize the mapped reflectors (near wellbore formation structures) in three-dimensions and two-dimensions as seen in panels 401, 403 and 405 of FIGS. 4A, 4B, and 4C for purposes of confirming migration results and further understanding the sonic imaging response, these mapped reflectors can be of significant independent interest for processing with several downstream applications. Thus, it is often very helpful to output these mapped reflectors in the form of a spreadsheet or other structured data object that contains information that describes the 3D position and orientation as well as ray path type of each reflector. An example spreadsheet is displayed in FIGS. 16A1-16A3 where each row corresponds to a particular reflector and includes an identifier (ID), ray path type, measured depth intercept, relative dip $\beta$, azimuth $\varphi$, true dip $\Theta$ and true azimuth $\Phi$, and information related to the spatial offset of the reflector relative to the tool axis (or well track). The rows of the spreadsheet follow the event color coding used in the viewer logs as noted by the row color scheme defined adjacent the last column in FIG. 16A3. In the scheme, reflectors with PP ray path types are highlighted in cyan, reflectors with SS ray path types are highlighted in orange, reflectors with SP refracted ray path types are highlighted in brown, and reflectors with PS refracted ray types are highlighted in magenta.

In the spreadsheet of FIGS. 16A1-16A3, the first column shows the index or identifier (ID) that corresponds to indices used for events following automated ray tracing and 3D STC procedure. The second and third columns indicate ray path type of the reflectors. The last three columns and columns K and L provide information that can be used to specify the three-dimensional position and orientation of each reflector relative to the tool axis (well track).

Note that the reflectors with SP refracted ray path types that are highlighted in brown as well as the reflectors with PS refracted ray types that are highlighted in magenta are typically indicative of particular formation features of interest (such as fractures, bed boundaries or faults).

The workflow can generate and display other views that display information that characterizes the orientation of the reflectors as a function of depth along the well track. Such other views can include a tadpole plot as shown in FIG. 16B where measured depth is plotted along the y axis, the magnitude of reflector's true dip is plotted along the x axis, and the direction of the tadpole tail indicates the true azimuth of the reflector. The position of the points along the x axis in the tadpole plot convey the magnitude of true dip Θ for the reflectors as a function of measured depth, while the direction of the tadpole tail conveys the true azimuth Φ for the reflectors relative to True North.

Figure 16C:
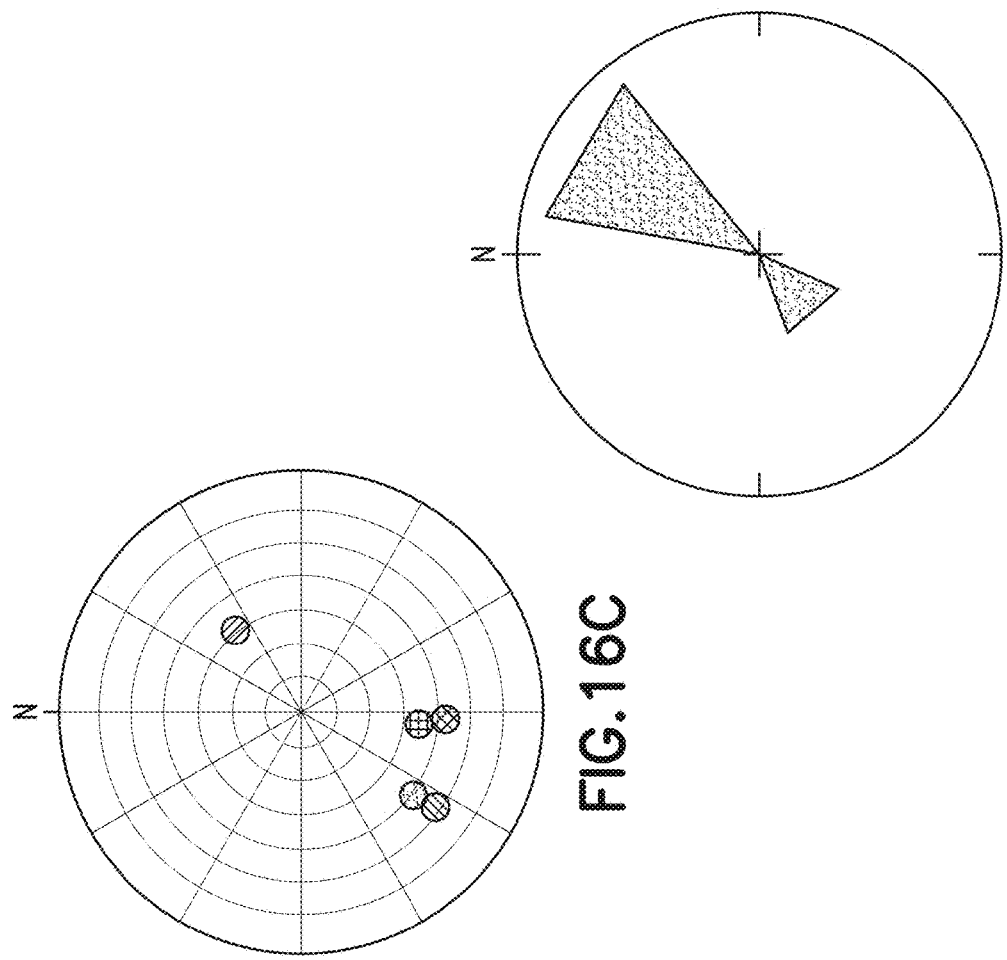
FIG. 16C is a view of an exemplary stereonet plot, which can be generated from the results of the automated workflow of operations of the present disclosure.
Figure 16B:
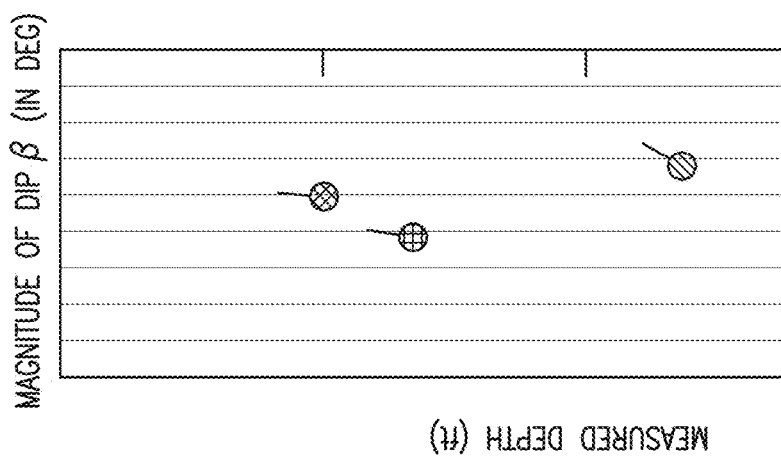
FIG. 16B is a view of an exemplary tadpole plot, which can be generated from the results of the automated workflow of operations of the present disclosure.

Such other views can also include views that display the information that characterizes the orientation of the reflectors without reference to depth along the well track such as an upper hemisphere stereonet plot as shown in FIG. 16C. Inside the circle shown in FIG. 16C, the radial positions of the points convey the true dip directions Θ for the reflectors, while the angular positions of the points convey the true azimuth Φ directions for the reflectors.

Such other views can also include a Rose diagram as shown in FIG. 16D, which shows frequency of true azimuth directions Φ of the reflectors inside a circle.

Figures 16E, 16F:
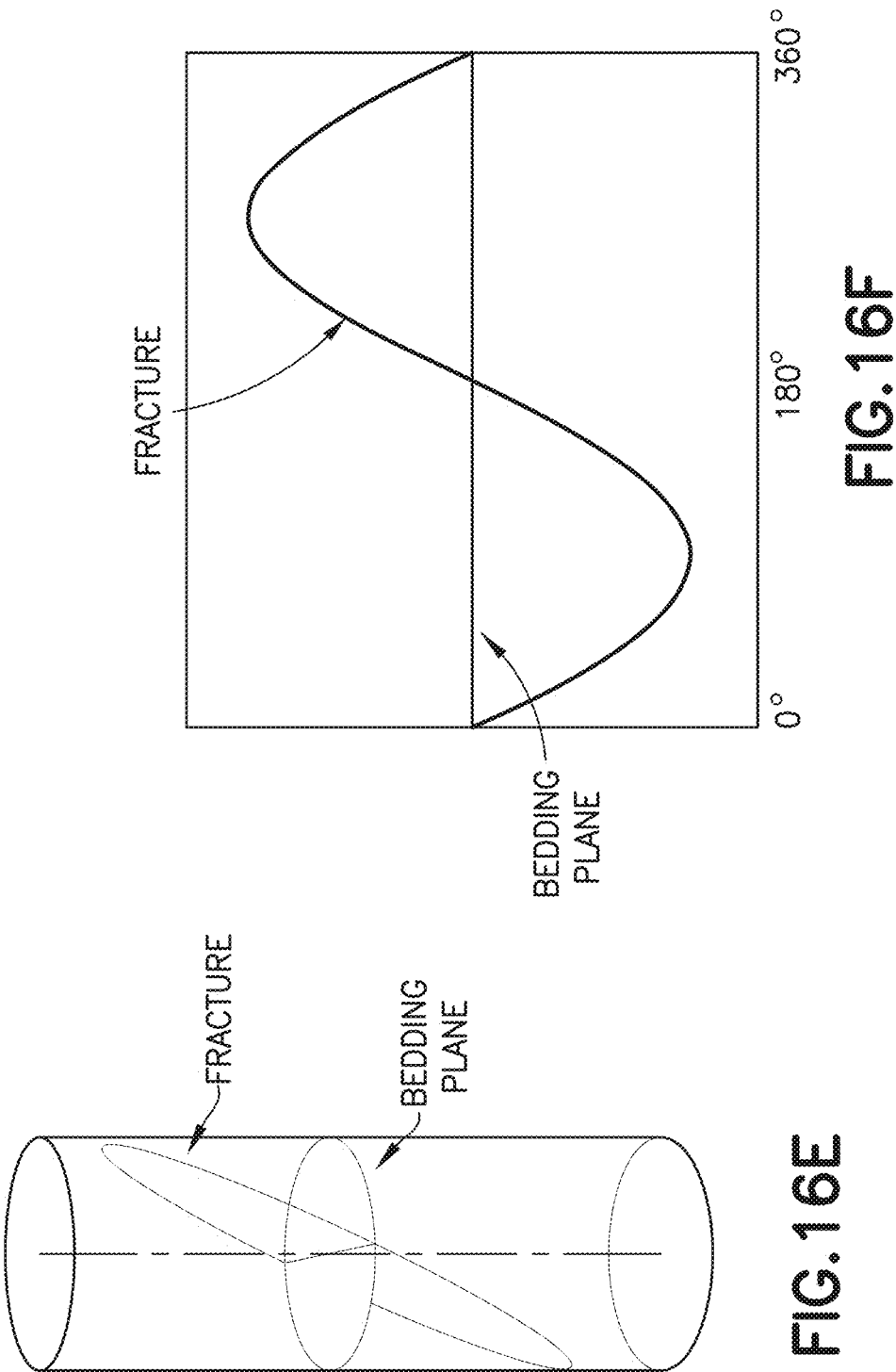
FIGS. 16E, 16F and 16G are schematic illustrations that describe the generation of an FMI image based on resistivity measurements of a formation.
Figure 16G:
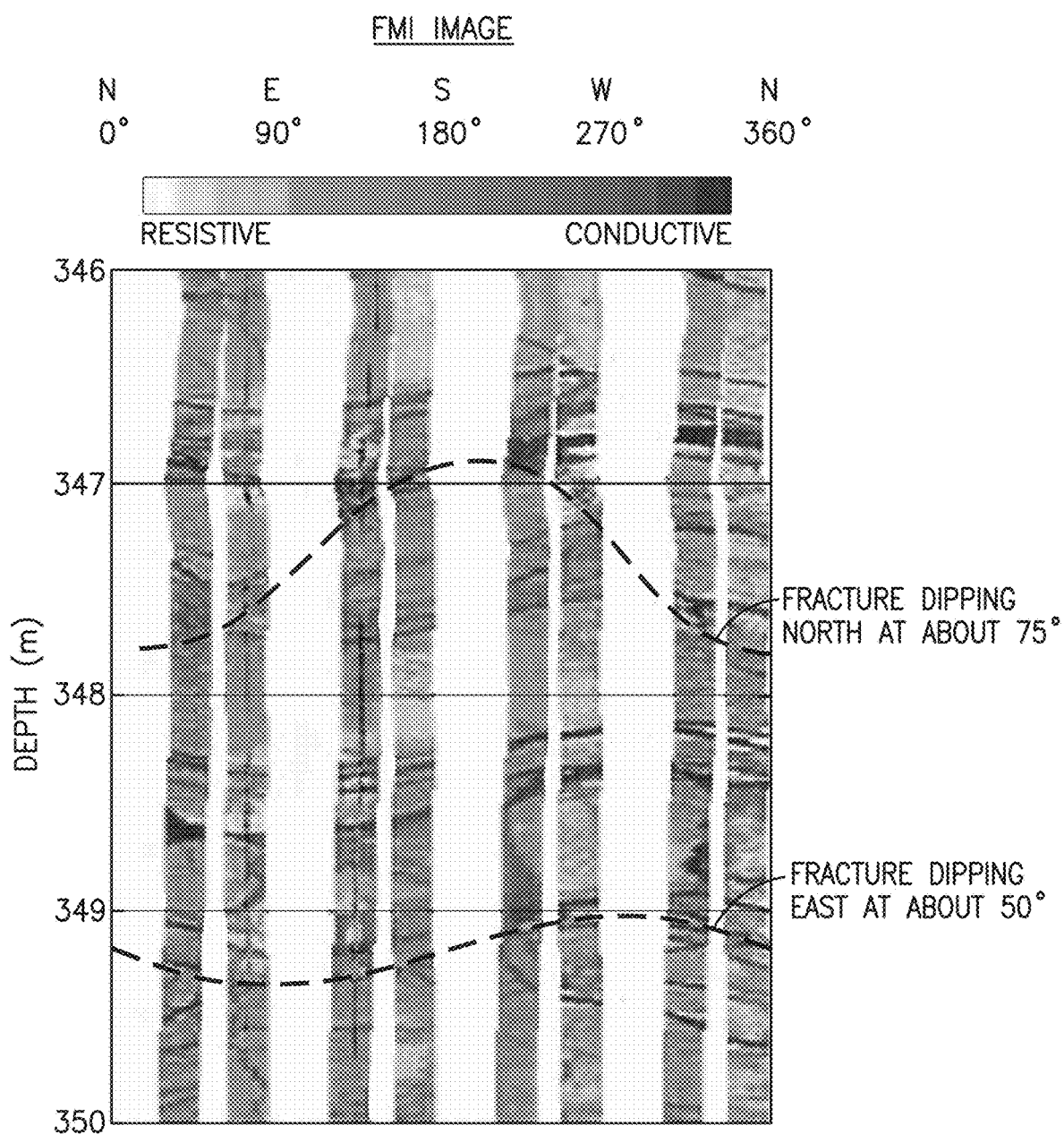

One or more these other views can be displayed in conjunction with other logs, such as an FMI image of a corresponding interval of measured depth or possibly a tadpole diagram, stereonet plot or Rose diagram of true dip and azimuth that is derived from the FMI image. In this case, the FMI image is derived from resistivity measurements of the formation as shown in FIGS. 16E, 16F and 16G. When a fracture or bedding plane intersects the borehole as in FIG. 16E, the FMI image will show a corresponding change in resistivity along a sinusoidal curve as seen in the features of FIG. 16F. The phase and amplitude of these detected sinusoidal feature in the FMI image can be used to calculate the true dip and azimuth of the corresponding fracture plane. This calculated true dip and azimuth can then be displayed in a corresponding tadpole diagram, stereonet plot or Rose diagram.

Figure 17:
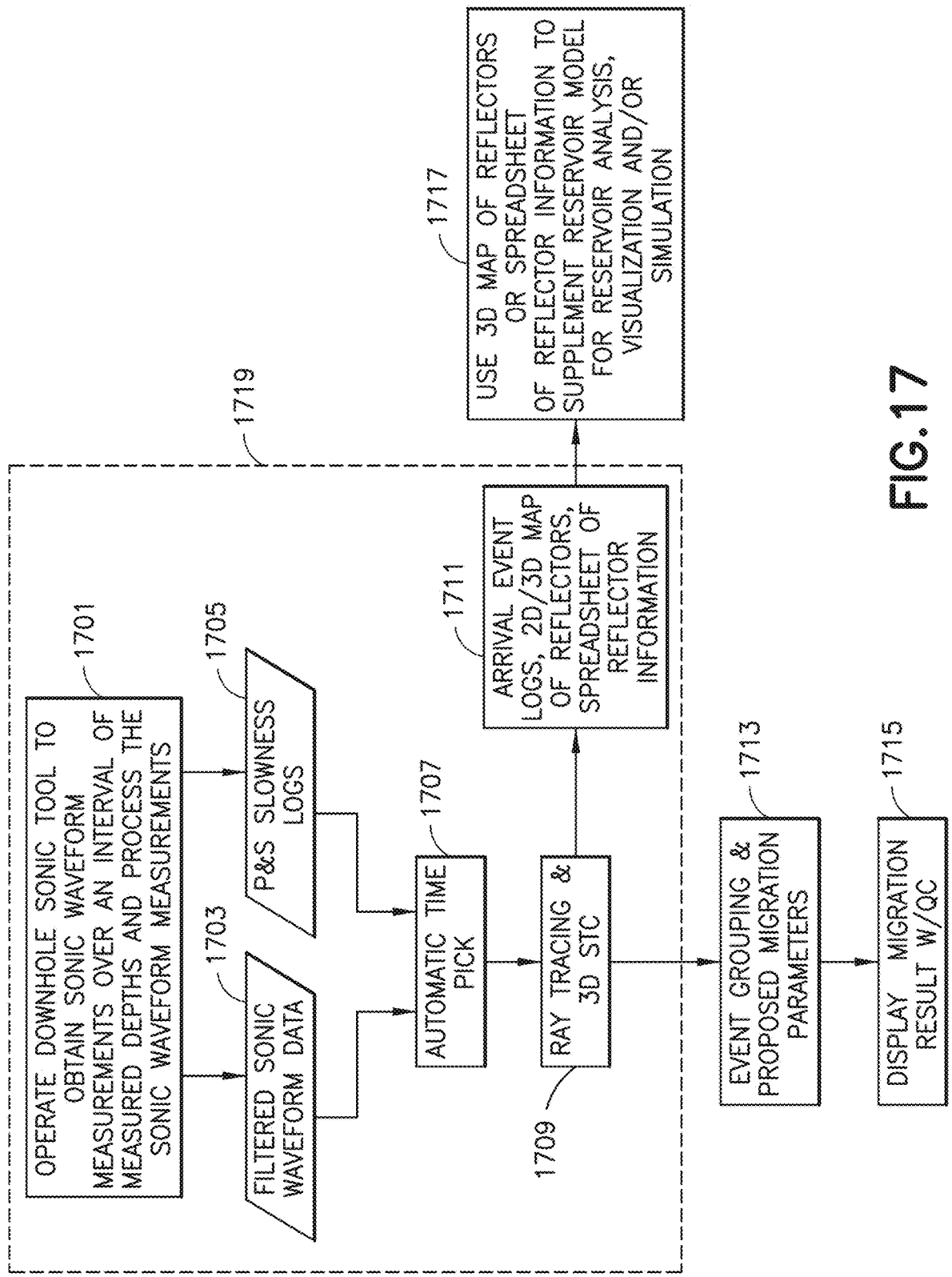
FIG. 17 is a high-level flow chart of the automated workflow of operations of the present disclosure.

FIG. 17 is an example flow diagram that illustrates the operations of the improved workflow described above. Note that elements 1707, 1709, 1711, 1713, 1715 and 1717 represent novel workflow elements compared to current state of the art processing. The operations of FIG. 17 may be performed using a processor, a controller and/or any other suitable processing device, such as a computer processing system described below with respect to FIG. 22. In embodiments, the computer processing system can be located on the surface at the wellsite (or at a remote location) and coupled to the processing system of the downhole sonic tool that records the sonic waveform data obtained by the downhole sonic tool by a suitable telemetry subsystem. Other system architectures can also be used.

In block 1701, the downhole sonic tool is operated in a wellbore to transmit sonic signals that probe or interact with near wellbore formation structures and receive sonic waveform measurements over an interval of measured depths in the wellbore. The resulting sonic waveform data is processed to obtain filtered sonic waveform data (block 1703) as well as compressional (P) and shear (S) slowness logs (block 1705).

In block 1707, the filtered sonic waveform data (block 1703) and the compressional (P) and shear (S) slowness logs (block 1705) are used as part of the automatic time pick and event localization procedure as described herein.

In block 1709, the results of the automatic time pick and event localization procedure are used as part of the ray tracing and 3D STC processing as described herein, which can produce arrival event logs, display maps of reflectors and a spreadsheet (or other structured data object(s)) of reflector information (block 1711).

In block 1713, parameters are determined for configuring the migration in an automated fashion. This involves grouping arrival events according to proximity and ray path type, allowing the user to review the migration parameters that have been automatically prepared for each group, and allowing the user to select the arrival events that will be migrated.

In block 1715, the migration is performed based on the parameters determined in 1713 and the image resulting from the migration is displayed for viewing. The displayed image includes QC marking for the reflectors as described above.

In block 1717, the information contained in the display maps of reflectors or the spreadsheet (or other structured data object(s)) of reflector information of block 1711 can be used to supplement a reservoir model for reservoir analysis, visualization and/or simulation. The reservoir model can be based on surface seismic measurements, VSP measurements, LWD electromagnetics measurements and possibly other measurements as well. In particular, the three-dimensional position and orientation of a particular reflector relative to the tool axis (or well track) can be used to supplement the information of the reservoir model that corresponds to the three-dimensional position and orientation of that reflector. In this manner, the improved reservoir model can be subject to reservoir analysis, visualization and/or simulation operations, which are typically performed to gain a better understanding of the subsurface formation structures that leads to informed well placement, reserves estimation and production planning. The supplemental information of the reservoir model related to the reflector information can provide valuable information that confirms or otherwise identifies the possibility of formation structures of interest (such as fractures, bed boundaries and faults). The knowledge and understanding of the location and orientation of these formation structures can be an important part in making well informed decisions with regard to well placement, reserves estimation, production planning, and possibly other applications as well.

Note that in embodiments the workflow can derive the display maps of reflectors or the spreadsheet (or other structured data object) of reflector information (blocks 1701-1711) and use such information to supplement the reservoir model for reservoir analysis, visualization and/or simulation (block 1717). In this case, the operations of block 1713 and 1715 of the flow diagram of FIG. 17 can be omitted from the workflow or bypassed as part of the workflow.

Also note that operation of blocks 1701-1711 can accurately characterize reflected arrival events with the different ray path types (PP, SP, SP, SS) and map the corresponding reflectors without resorting to any kind of migration (which is really not feasible or practical downhole). In addition, the reflector information collected in block 1711 is a very compact representation of the reflectors along the well trajectory.

Note that blocks 1701-1711 can be part of operations outlined by the dotted line 1719 that can take place downhole in the tool sonde. In embodiments, the processing (filtering) of the sonic waveform measurements that generate the filtered sonic waveform data of block 1703 can be configured to be a median filter. The automatic time pick procedure of block 1707 can be configured to look for events coming before direct shear wavefronts, and the automatic ray tracing and 3D STC processing of block 1709 can be configured to look for PP, PS, and SP type mode converted arrival events. The operations of blocks 1701-1711 can be carried out on a buffered collection of sonic waveforms acquired during the most recent interval of measured depths (such as the most recent 100-200 feet of measured depth). The reflector information collected in block 1711 can be organized in decreasing order of their score according to Equation 8 above. In this case, depending on the bandwidth of the telemetry system between the downhole tool sonde and the surface-located processing system, the reflector information for a subset of the top-ranked reflectors (for example, the top ranked 10-20 reflectors) can be communicated to the surface-located processing system for storage and/or output and use in the reservoir analysis, visualization and/or simulation of block 1717.

Figure 18A:
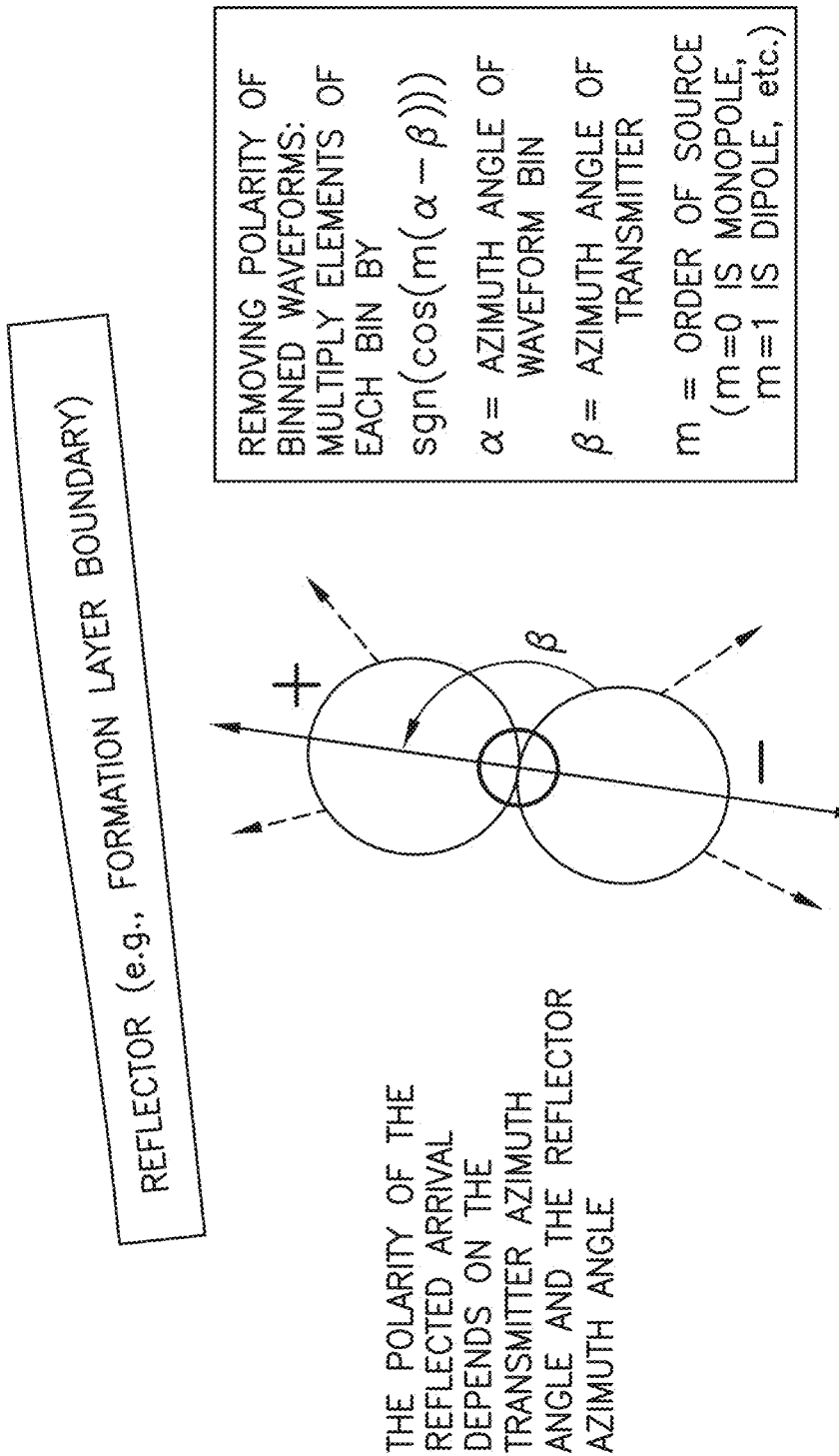
FIGS. 18A and 18B are schematic diagrams that illustrate the effect of polarity of the transmitter of the downhole sonic tool on the polarity of the borehole modes acquired by the receiver array of the downhole sonic tool.
Figure 18B:
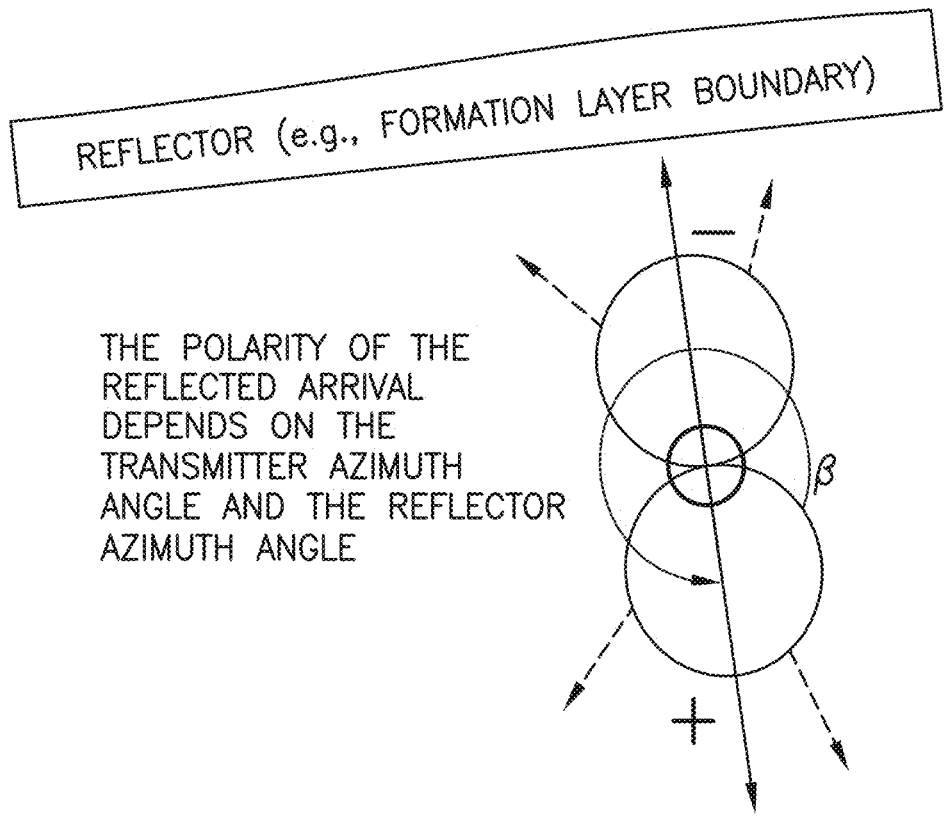

Note that in logging-while drilling applications, the downhole sonic tool rotates during acquisition of the sonic waveforms and often employs a dipole or other higher order multipole acoustic transmitter. Independent of the transmitter type, the acquired sonic waveforms can be organized according to source-receiver offset and actual receiver azimuth (instead of organized according to source-receiver offset and nominal receiver index used for wireline applications). That is, at each measured depth position, the acquired sonic waveforms can be binned according to the azimuth of the tool receiver. Furthermore, when using a dipole or other higher order multipole transmitter, the binning procedure can be adapted to account for the polarity of the transmitter. This arises because the polarity of the reflected wave depends upon whether the positive or negative pole of the transmitter is facing the reflector as the tool rotates. In addition, the polarity of the borehole modes is also a function of the polarity of the transmitter as illustrated in FIGS. 18A and 18B. In order to remove the signature of the polarity of the transmitter from the binned sonic waveforms, the waveform data that goes into each bin can be multiplied according to the formula shown in FIG. 18A. In effect, this reverses the effects of the negative polarity. Note that without this compensation, the median filtering performed on the binned waveform data to remove the borehole modes will be ineffective, because the borehole modes will be multiplied by a possibly highly oscillatory polarity function of the transmitter as a function of measured depth. In addition, the same will be true of the underlying reflected signals, so that the automatic time pick procedure (block 1707) will be ineffective. In logging-while drilling applications, the reflector information can be used to generate and display a real time mapping of fractures, faults, bed boundaries, and other acoustic reflectors relative to the well trajectory while drilling. Such real-time mapping can be used to dynamically adjust the trajectory of the drilling operation (or stop the drilling operation) as deemed optimal for the geometry of the formation structures with knowledge of the location of the fractures, faults, bed boundaries, and other acoustic reflectors.

Additional Field Data Examples

Figure 19A:
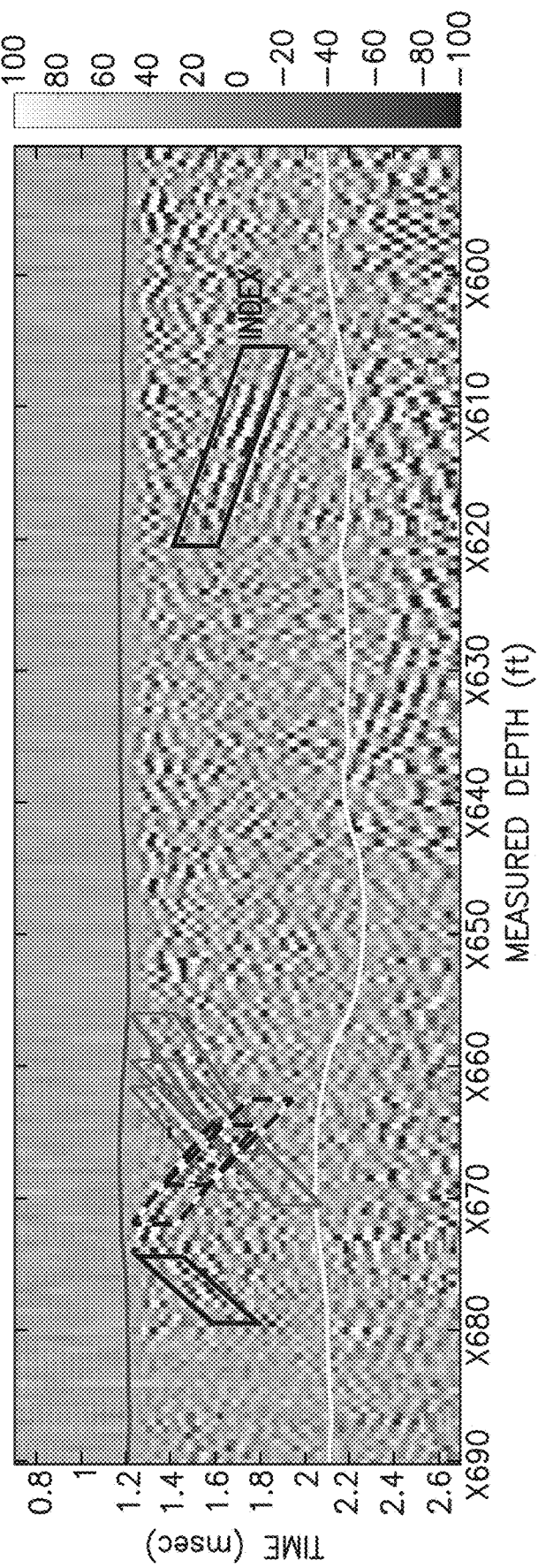
FIGS. 19A-19D are other exemplary logs of the results of ray tracing inversion and 3D STC processing, which can be produced by the automated workflow of operations of the present disclosure. The logs of FIGS. 19A-19D can optionally be displayed in a common display window.
Figure 19B:
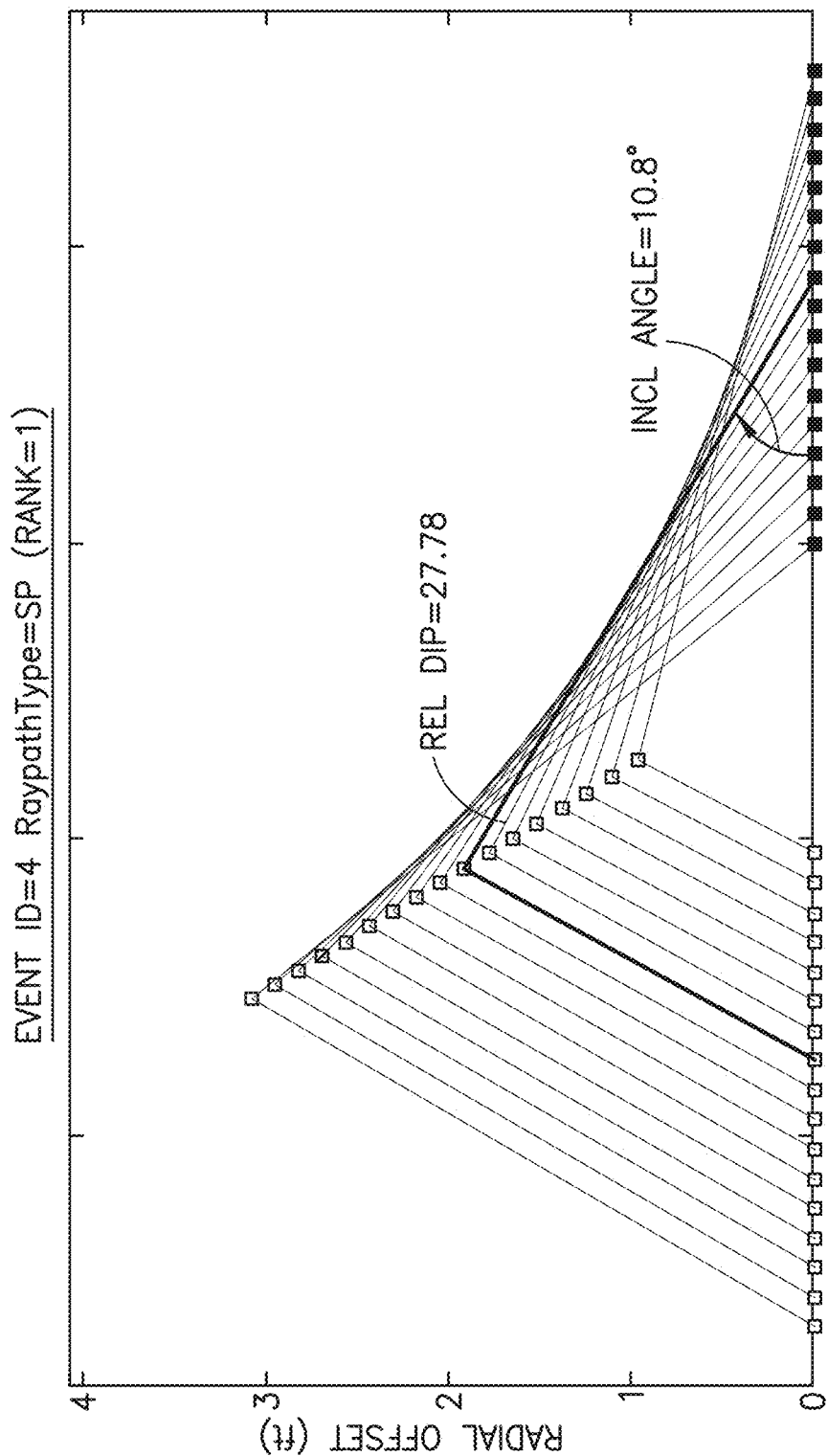
Figure 19C:
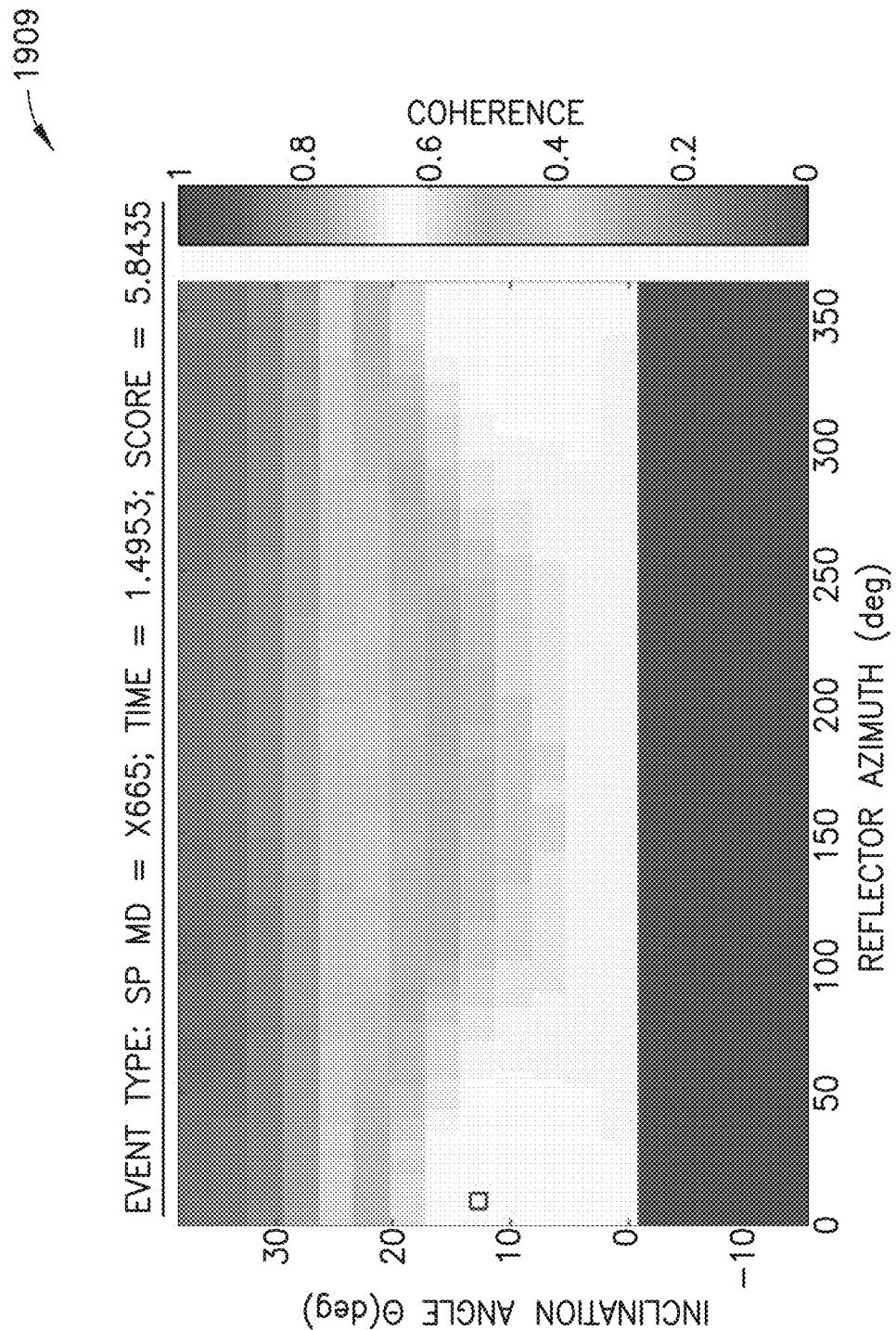
Figure 19D:
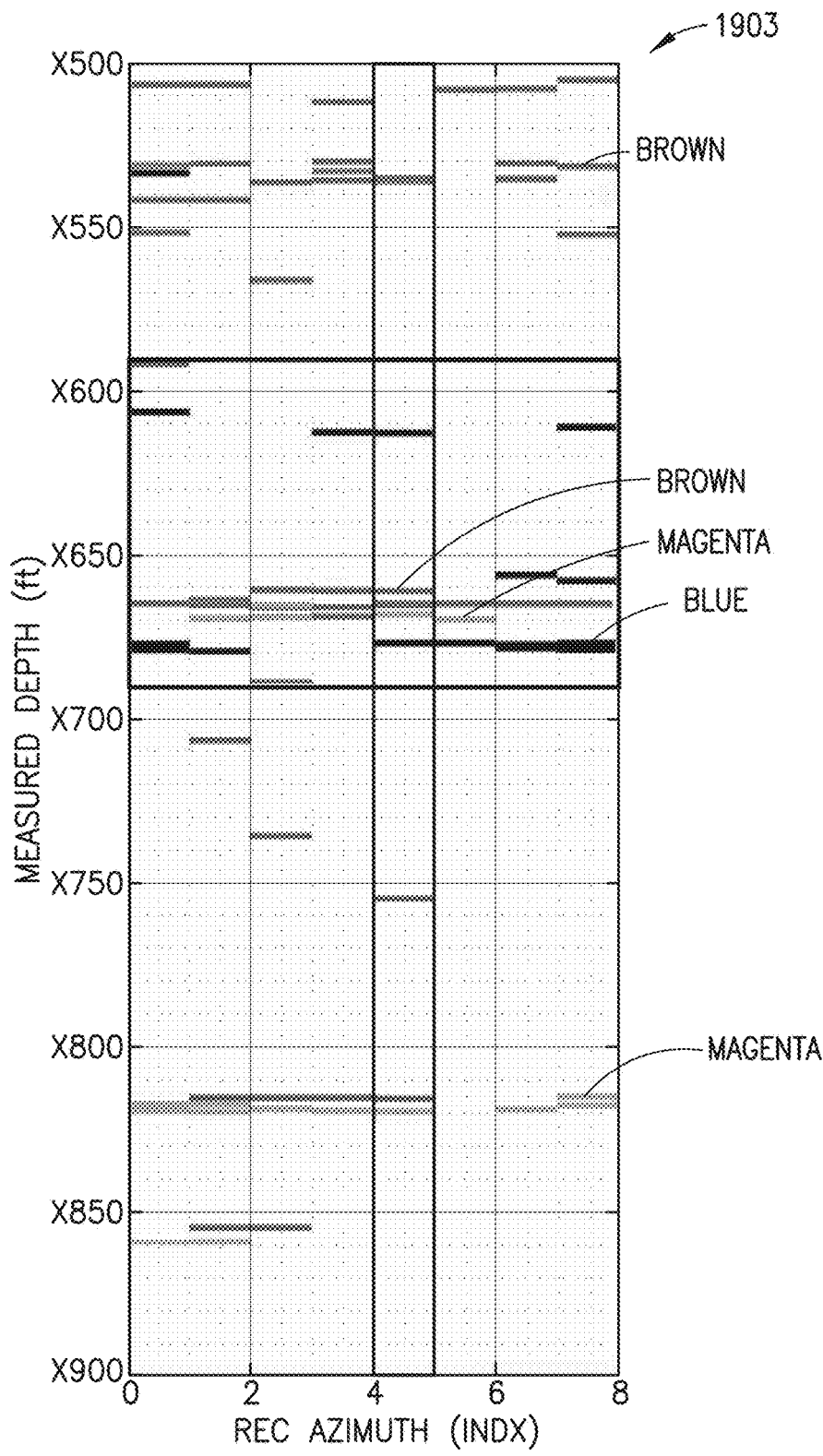

In a field data example shown in FIGS. 19A-19D, fractures near the well track with events give rise to arrival events with different ray path types. The waveform viewer panel 1901 of FIG. 19A shows the filtered waveform data with overlay of four reflectors characterized by automated ray tracing and 3D STC procedure. The panels 1907 and 1909 of FIGS. 19B and 19C, respectively, allow for quality control for a certain arrival event. Panel 1907 of FIG. 19B shows ray tracing inversion with the SP ray path model, while panel 1909 of FIG. 19C shows 3D STC analysis at measured depth station indicated by dark ray path in panel 1907 of FIG. 19B. The event log viewer panel 1903 of FIG. 19D gives mapping of relative reflector dip versus measured depth for all events with scores greater than 2.05.

The waveform viewer panel 1901 of FIG. 19A shows arrival events and reflectors as a function of measured depth (x axis) and time (y axis). The event log viewer 1903 of FIG. 19D shows the reflectors as a function of dip angle (x axis) and measured depth (y axis). The waveform viewer panel 1901 of FIG. 19A and the event log viewer 1903 of FIG. 19D can use the same color-coding as the spreadsheet of FIGS. 16A1-16A3 where cyan corresponds to PP reflectors, brown corresponds to SP reflectors, and magenta corresponds to PS reflectors. Note that the presence of a PS reflector (magenta-colored) crossing an SP reflector (brown-colored) as part of the waveform viewer panel 1901 of FIG. 19A, which is shown in the depth interval between X670 and X660 in FIG. 19A, is typically indicative of formation features of interest (such as fractures, bed boundaries or faults). The two panels 1907 and 1909 of FIGS. 19B and 19C, respectively, can be used to access the quality of the interpretation of the SP mode converted arrival around measured depth X663 ft. The event log viewer 1903 of FIG. 19D indicates the SP and PS mode converted arrivals seem to be separated in azimuth by about 90° instead of 180°, as we might otherwise expect from visually inspecting the waveforms.

Figure 20A:
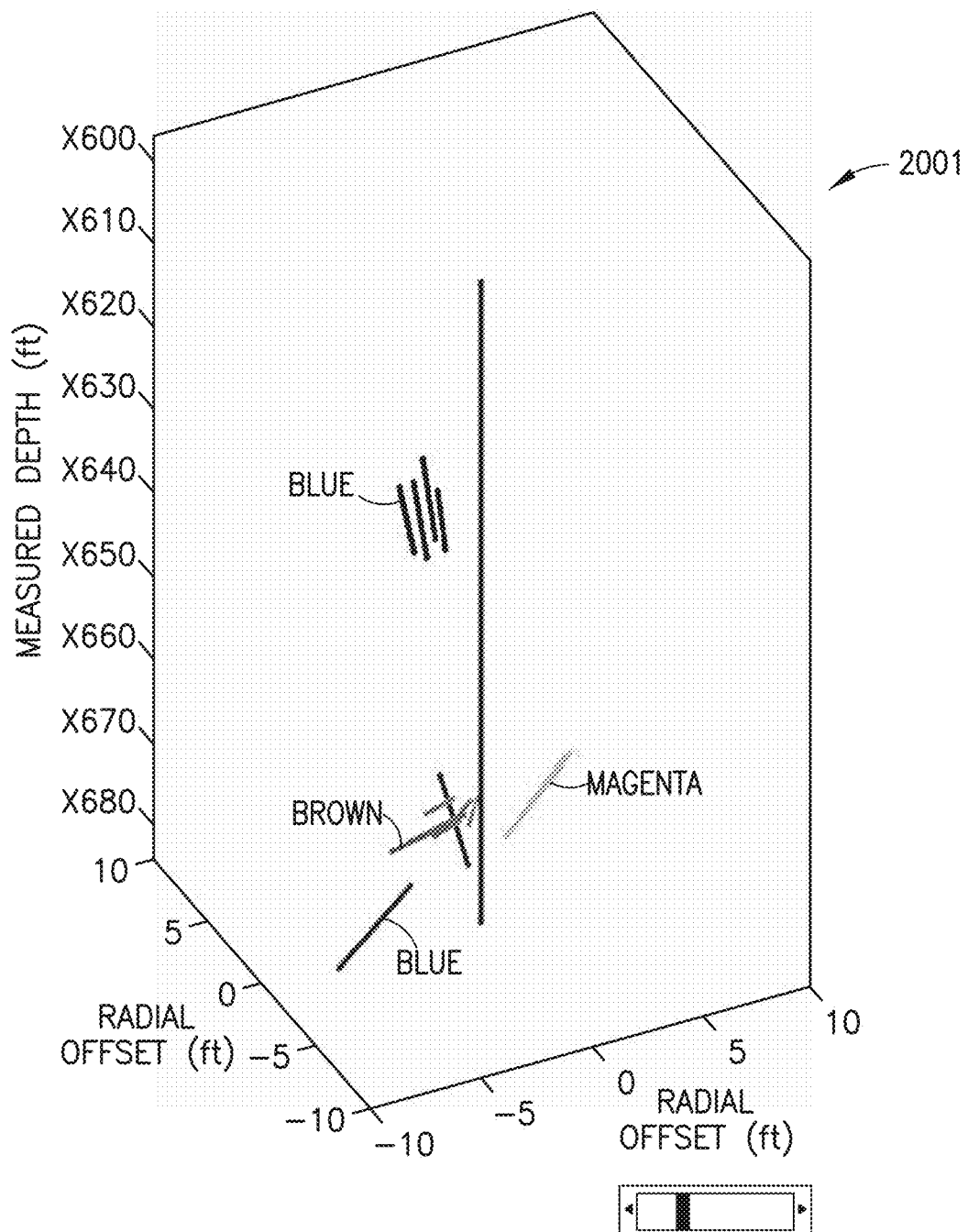
Figure 20B:
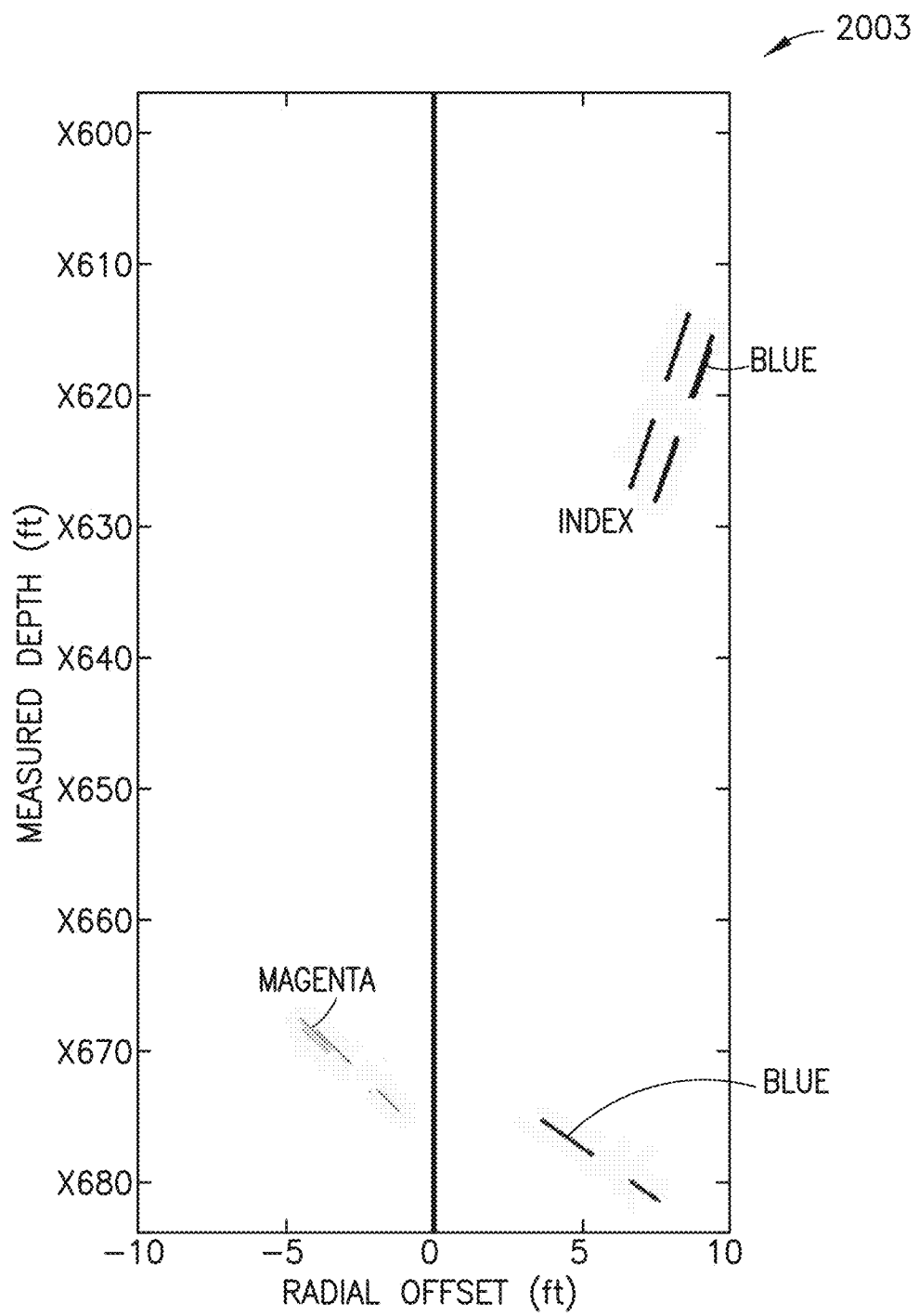
Figure 20D:
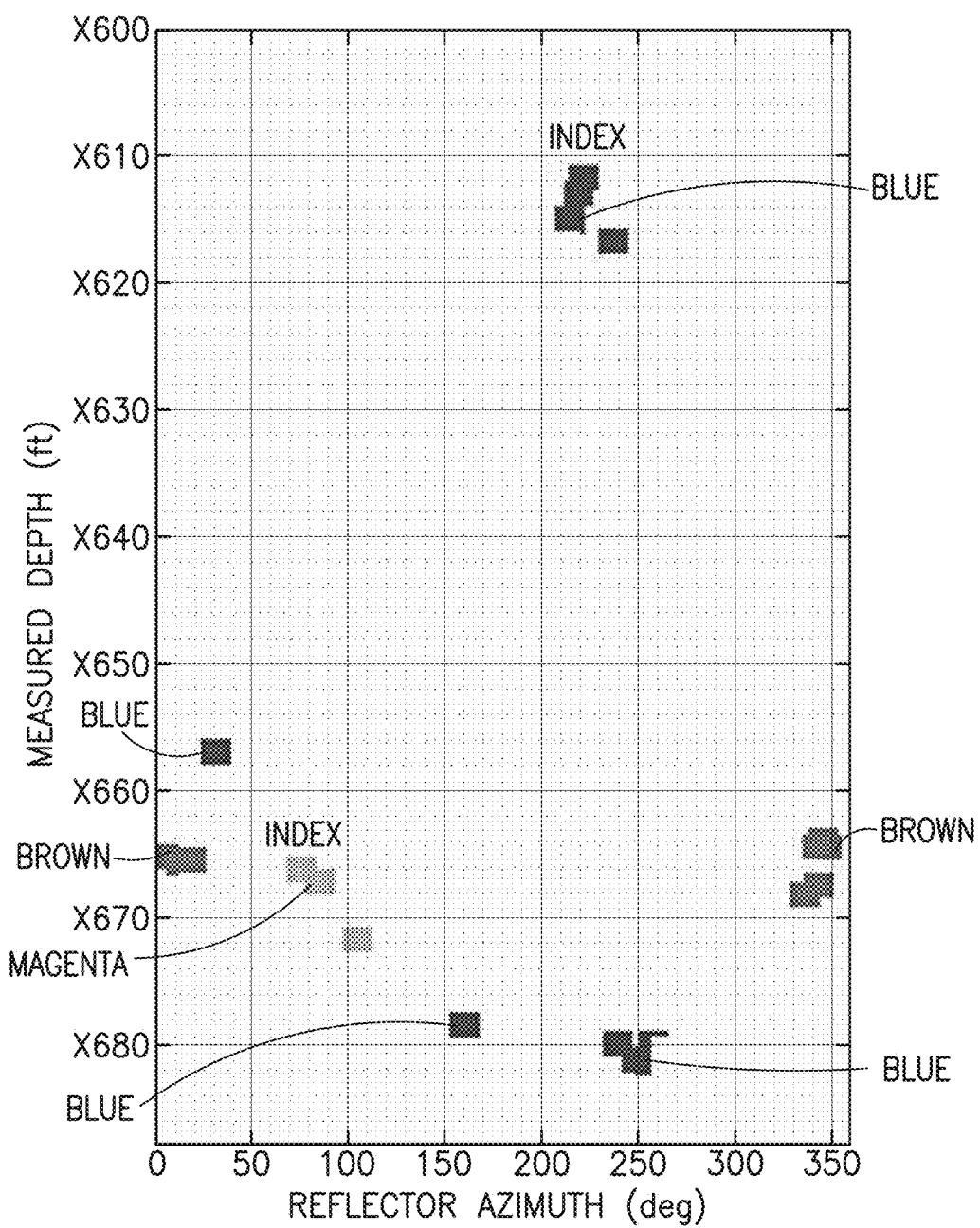
Figure 20E:
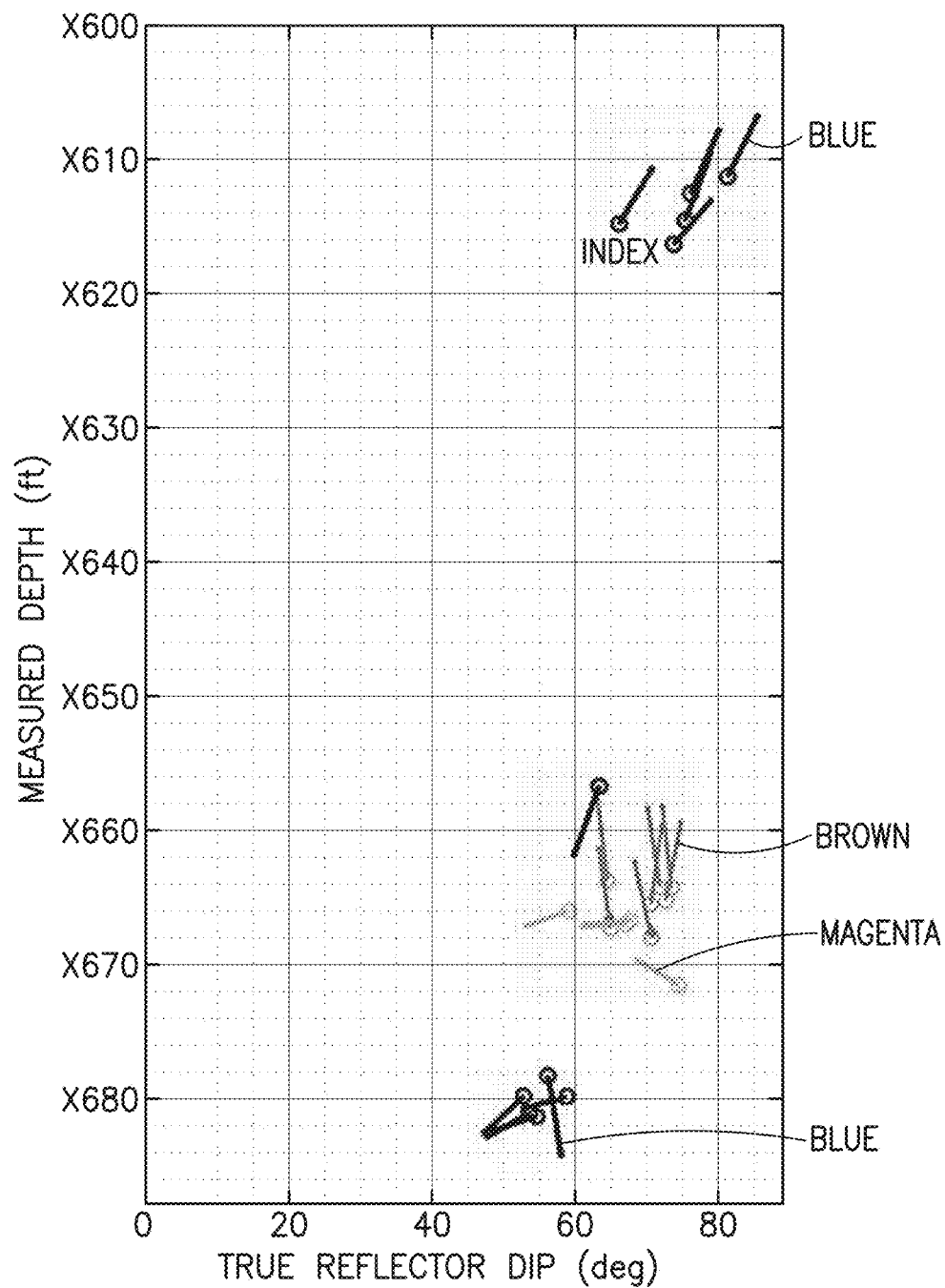
Figure 20F:
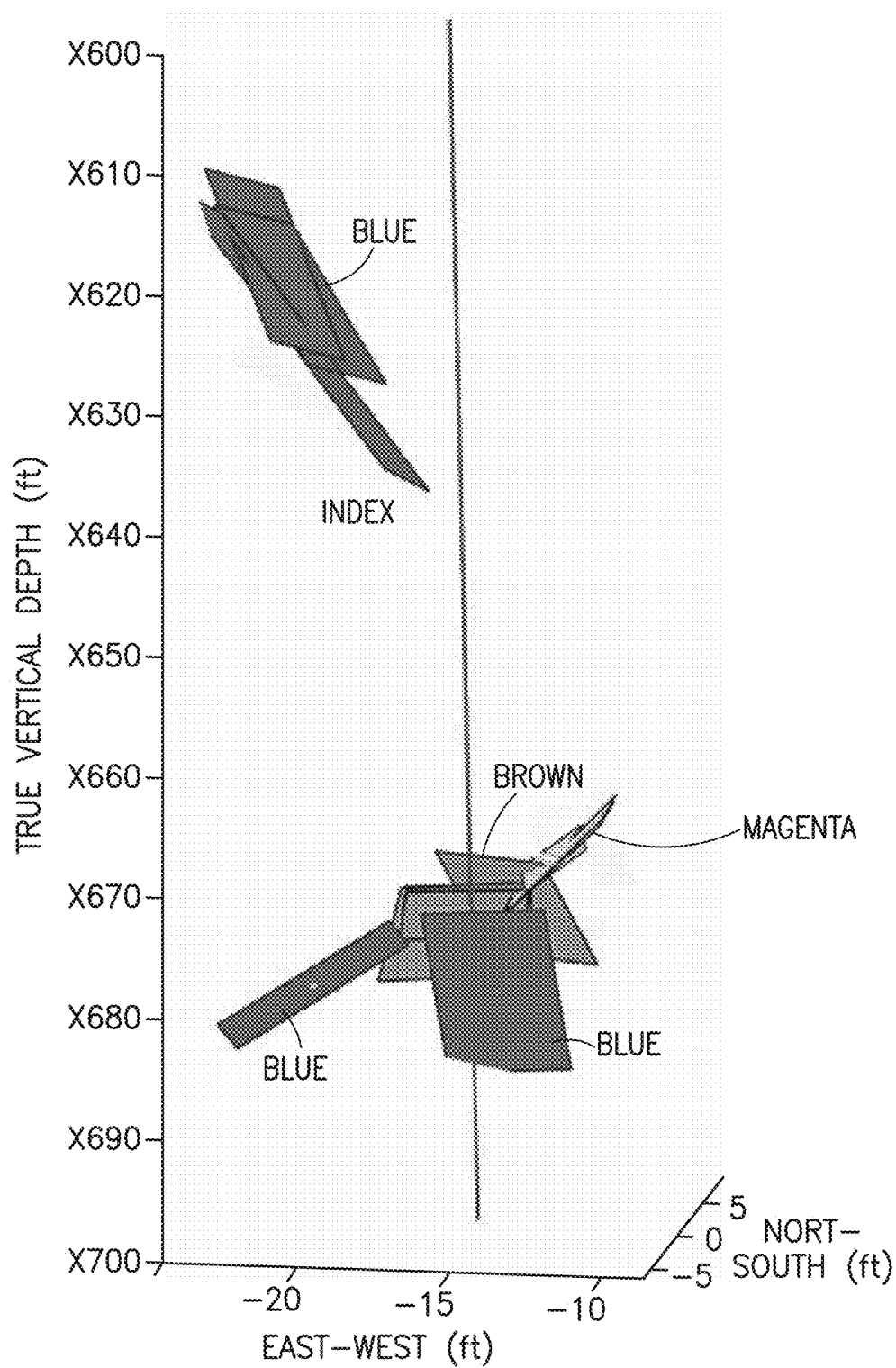

Similar to FIGS. 4A-4C, the panels of FIGS. 20A-20F summarize the structural information derived from the automated procedures using the 2D and/or 3D mapping of the reflectors relative to the tool axis (or well track). The 3D map of the reflectors shown in panel 2001 of FIG. 20A and in the panel of FIG. 20F is obtained using the 3D position and orientations of the reflectors determined by the ray tracing inversions and mean 3D STC azimuths together with the well survey information. The color-coding of the reflectors allows the user to observe the mode of the ray path that is used to image the reflector. The 2D map of the reflectors shown in panel 2003 of FIG. 20B is shown for the arrival events selected in the panel 2005 of FIG. 20C by the two pairs of dashed and solid vertical pink line segments. Panel 2005 of FIG. 20C and the panel of FIG. 20D show reflector azimuth $\varphi$ as a function of measured depth. In panel 2005 of FIG. 20C, the user selects the positions of these line segments using the slider bar 2006. The selected azimuth value determines the azimuth center of the two solid line segments, and the azimuth position of the two dashed line segments offset by 180°. The azimuth window size of the two pairs of line segments is a user defined parameter. The arrival events selected by the two solid line segments appear with positive lateral offset in the 2D display of panel 2003 of FIG. 20B. The slider bar 2007 determines the start of the measured depth interval of the arrival events used for the 3D and 2D displays of panels 2001 and 2003 of FIGS. 20A and 20B, while the slider bar 2008 determines the lower bound on the scores of the arrival events used for the 3D and 2D displays of panels 2001 and 2003 of FIGS. 20A and 20B. FIG. 20E is a tadpole diagram representing the true dip and azimuth of the reflectors as a function of measured depth. The 3D and 2D displays of panels 2001 and 2003 of FIGS. 20A and 20B and the panel of FIG. 20F along with the tadpole log shown in FIG. 20E provide the user with a quick summary of the spatial positions of the reflectors without having to migrate the waveform measurements.

FIGS. 20A-20F show the structural information derived for the field data example of FIGS. 19A-19D. Panel 2001 of FIG. 20A and the panel of FIG. 20F shows 3D ray tracing for all events in green window selected in panel 2005 of FIG. 20C, while panel 2003 of FIG. 20B shows 2D ray tracing results that also fall within the azimuth sub-windows. The labels or indices of the reflectors can correspond to waveform arrival events labeled in FIGS. 19A-19C. We note, in particular, the mode converted arrivals near measured depth (MD) X660 ft represent mode converted arrivals possibly corresponding to fractures. We observe that the reflectors generating the PS and SP mode converted arrivals are not in the same 2D plane, possibly indicating two fractures intersecting at 90° angles, as is clear from FIG. 20D. This orthogonal structure is also evident in (a) the tadpole log in FIG. 20E where the angular orientation of the tadpoles are perpendicular to one another and in (b) the visual 3D representations of the fractures themselves in FIG. 20F and panel 2001 of FIG. 20A. Mapping of near wellbore reflectors in 3D and deriving this structural information without requiring a migration step is very helpful, particularly when the arrival events exhibit multiple raypath types and reflector azimuths, as is common for fracture imaging.

In the exemplary workflows described above, reflected arrival events are located in the filtered wavefield and then characterized to map near wellbore reflectors directly without resorting to a migration workflow. The characterization of the arrival events employs ray tracing inversion and a 3D slowness time coherence analysis of the filtered wavefield which stacks the filtered wavefield according to a 3D slowness vector. The outcomes of the workflows include a (1) 3D map of the reflectors which can be integrated into the other interpreted formation structures in the customer reservoir model and (2) logs of the reflectors true dip and azimuth which can be interpreted alongside the logs of true dip and azimuth provided by borehole image logs such as FMI and Microscope.

The field data examples described above employ a monopole source to map a fault structure which produced PP reflections in the filtered wavefield and to map a fracture structure which produced an SP refraction in the filtered wavefield.

Figure 21:
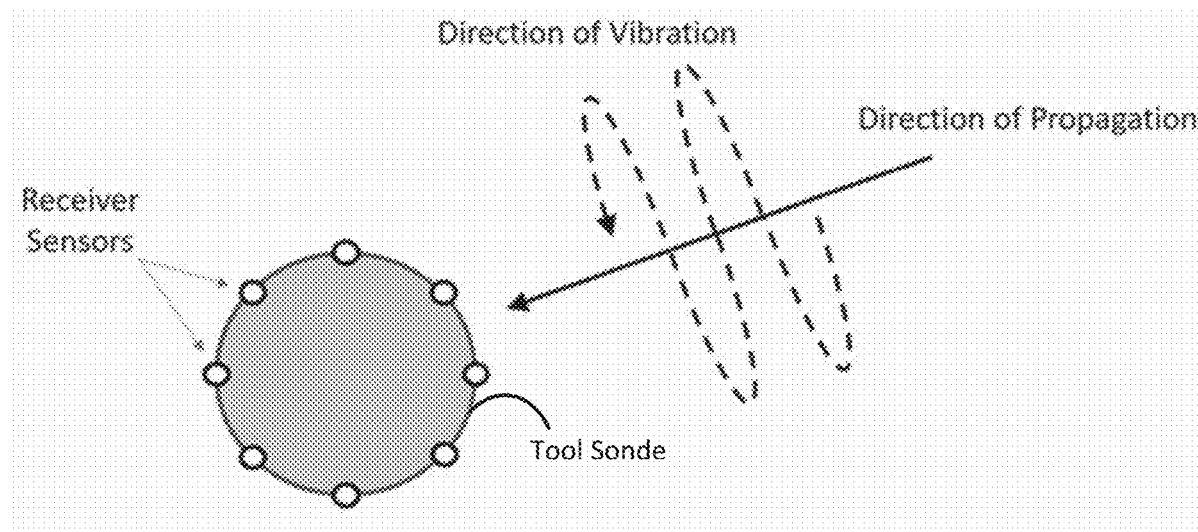
FIG. 21 is a schematic illustration of a polarized shear reflection or SS-Pol raypath type that arises from interaction of acoustic energy transmitted by a high order acoustic source (such as a dipole acoustic source) with near wellbore structures.

In another field example described below, the workflow is adapted to use a high order acoustic source in a deviated well with −60° inclination angle (where 90° inclination would correspond to a horizontal well). As used herein, a high order acoustic source employs more than one pole or source point for the acoustic energy transmitted by the source. The high order acoustic source does not radiate acoustic energy in all directions equally. For example, a dipole acoustic source is a high order acoustic source that employs two poles or source points separated by a small distance compared with the wavelength of the acoustic energy emitted by the source. A quadrupole acoustic source is a high order acoustic source that employs four poles or source points. Other multipole acoustic sources also fall within the category of a high order acoustic source. In this configuration, the use of the high order acoustic source (such as a dipole acoustic source) can produce polarized shear reflections that arise from interaction of the acoustic energy transmitted by the source with the near wellbore structures. FIG. 21 illustrates a polarized shear reflection in a plane orthogonal to the axis of the tool sonde. Note the direction of vibration of the polarized shear reflection is orthogonal to the direction of propagation of the polarized shear reflection.

Figure 22:
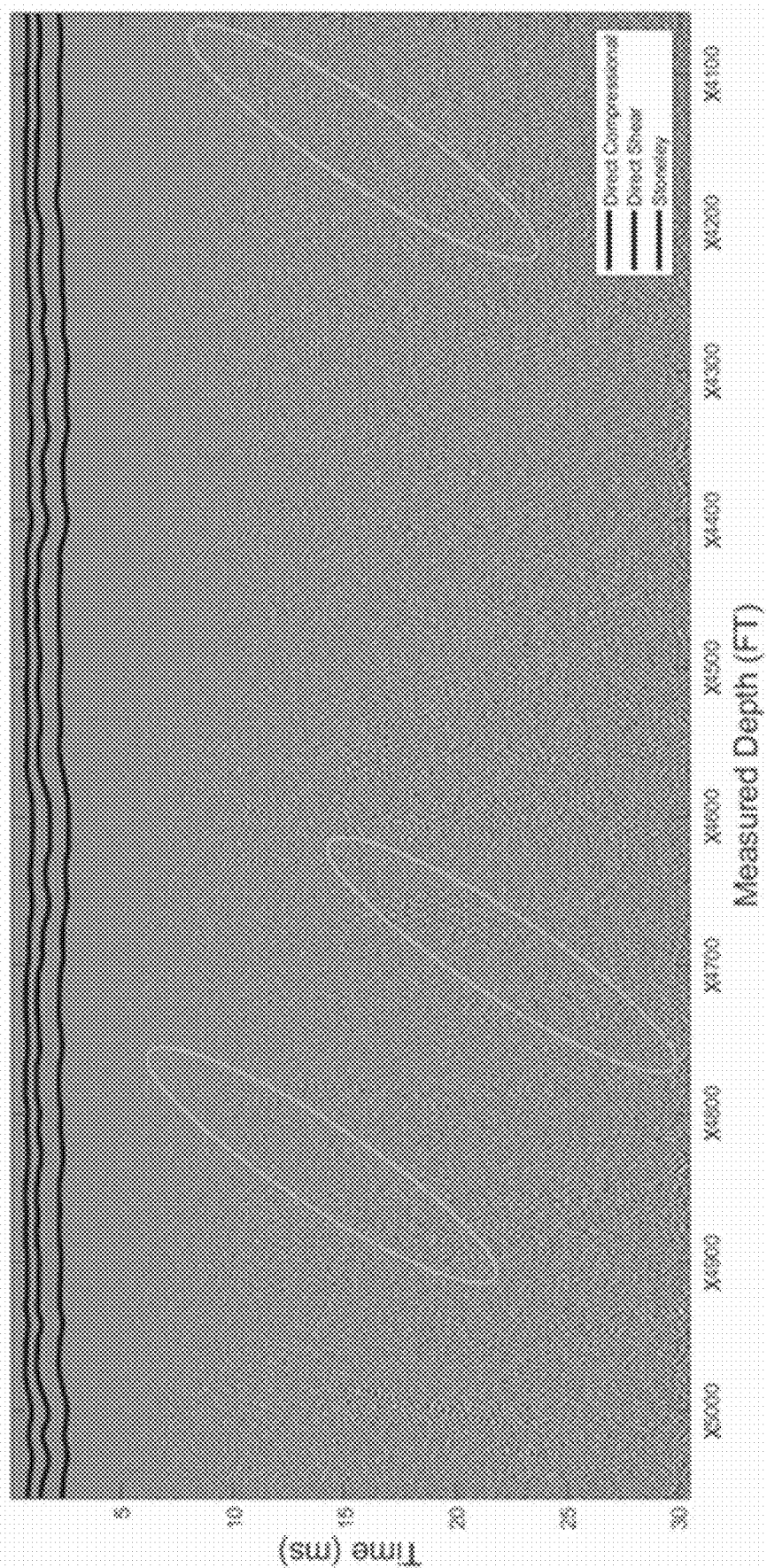
FIG. 22 illustrates an exemplary log of a filtered wavefield recorded by a single acoustic receiver or sensor of a downhole acoustic imaging tool.

FIG. 22 shows the filtered wavefield recorded by a single receiver of the tool's 3D array of acoustic sensors. This 3D array consists of thirteen rings each with eight sensors equally distributed around the tool sonde's circumference. FIG. 22 shows the filtered wavefield recorded by the seventh azimuthal receiver in the seventh ring of sensors. Note that the light grey circles highlight the most visible reflected arrival events and the wavy black lines in the top portion of the wavefields correspond to the arrival times of the direct compressional and shear modes as well as the Stoneley.

In embodiments, the processing workflow can inspect single sensor views of the filtered wavefield for all eight sensors around the circumference of a selected receiver ring, so reflected arrivals from all 360° around the tool sonde circumference may be observed. The light gray ovals in FIG. 22 highlight arrival events which are observed to be very prominent, although closer inspection shows that there are numerous other linear signatures in the waveform data which could correspond to reflected arrivals. Also note that additional arrival events are observed in the single sensor views of the waveforms for receiver sensors 2-4 and 6-8. If these events were reflected P waves or unpolarized reflected S waves, this would be somewhat unusual, because such arrival events typically have higher amplitudes on the side of the tool sonde facing the reflectors, not on opposing sides of the tool sonde.

Figure 23:
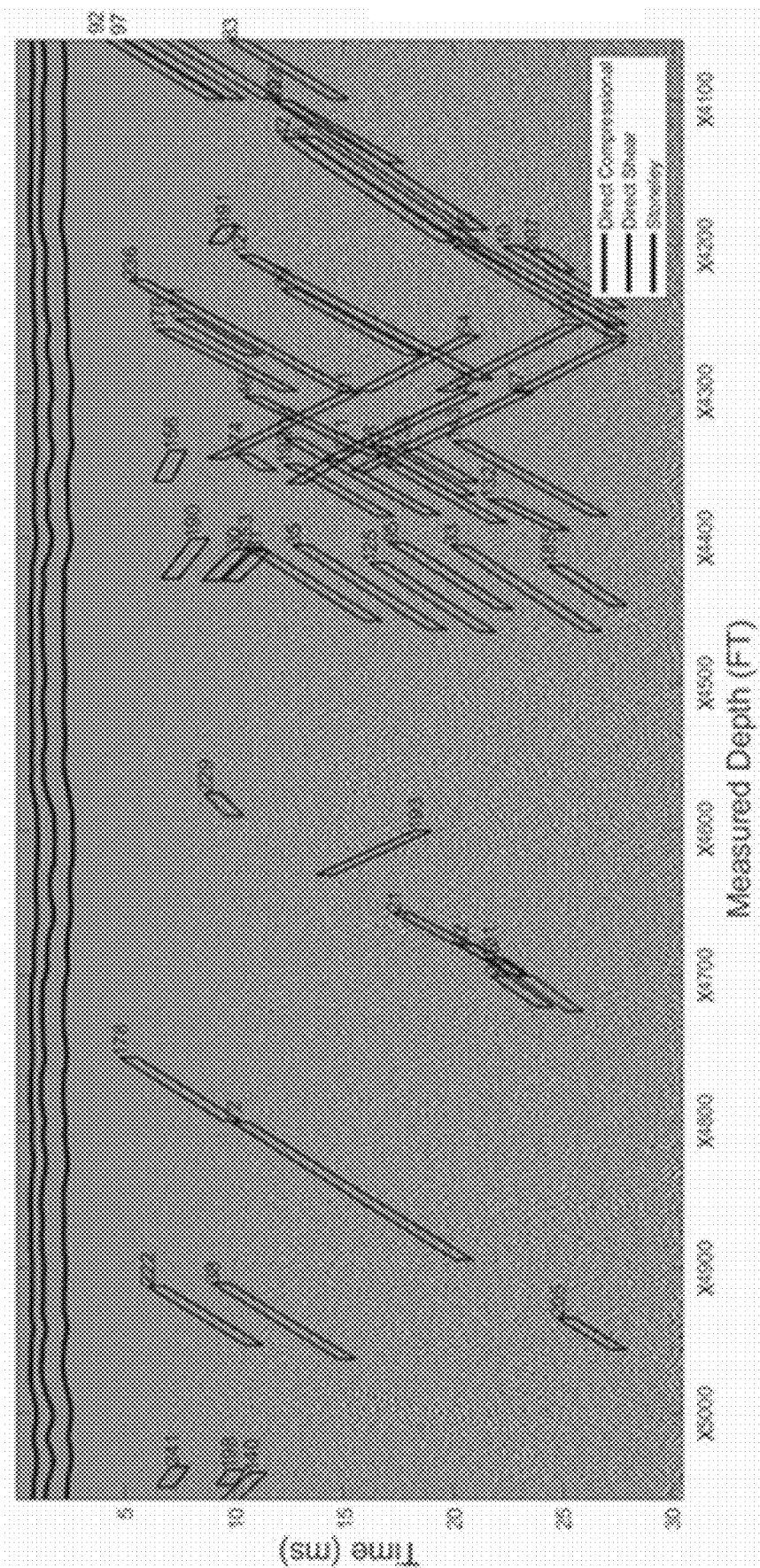
FIGS. 23 and 24 are exemplary graphical user interfaces that can be produced by the results of the automated event localization procedure on the filtered wavefield of FIG. 22, which can be part of the automated workflow of operations of the present disclosure.

As part of the processing workflow, a manual or automated time pick can be applied to each of the wavefields recorded by the receiver sensors mounted in a user-selected ring of the tool's acoustic sensor array (block 1151 of FIG. 11D). The time pick procedure locates linear signatures in the filtered wavefield as candidate arrival events and identifies them using an overlay of boxes as shown in FIG. 23.

Figure 24:
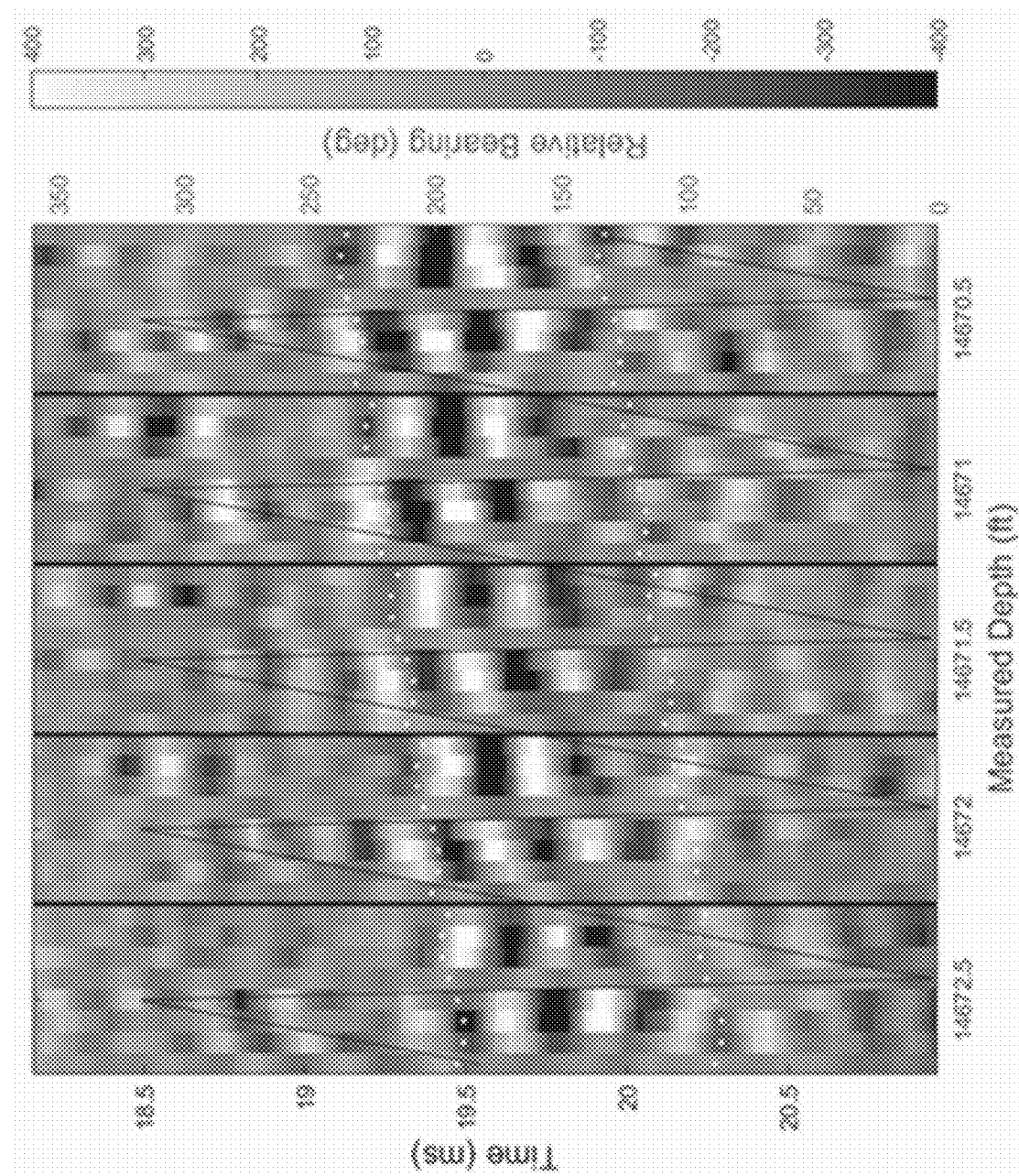

The response of the acoustic receiver array to a polarized shear reflection is described below with respect to FIG. 24, which shows a common ring view of the wavefield arrival event #21 from FIG. 23, which is located at a measured depth at or near X4700 ft. Each of the five panels shows the waveform recorded by the eight receiver sensors in the seventh ring of receivers of our 3D acoustic array, and the arrival event #21 is marked off by the dotted white lines in the panels. The arrival event #21 is observed in columns 2-4 and 6-8 of each panel, while the arrival event #21 is not very evident in columns 1 and 5 of each panel. What is even more striking is the arrival event's change in sign from positive to negative between columns 2-4 and columns 6-8 in each panel. This is a classical sign of polarization. Also note that the receiver sensors' relative bearings are shown as the thin black line in each panel and that the fifth receiver sensor is pointing towards the top of the hole in this case. Since it is known from prior information that all the reflectors in the near wellbore region are either above or below the well trajectory, the workflow can characterize arrival event #21 as a polarized shear type arrival event (i.e., an arrival event arising from polarized shear reflection) where the direction of the oscillation is from side-to-side in the direction of sensors 2-4 and 6-8, while the direction of wavefield propagation is either coming from above or below the well trajectory.

Figure 25:
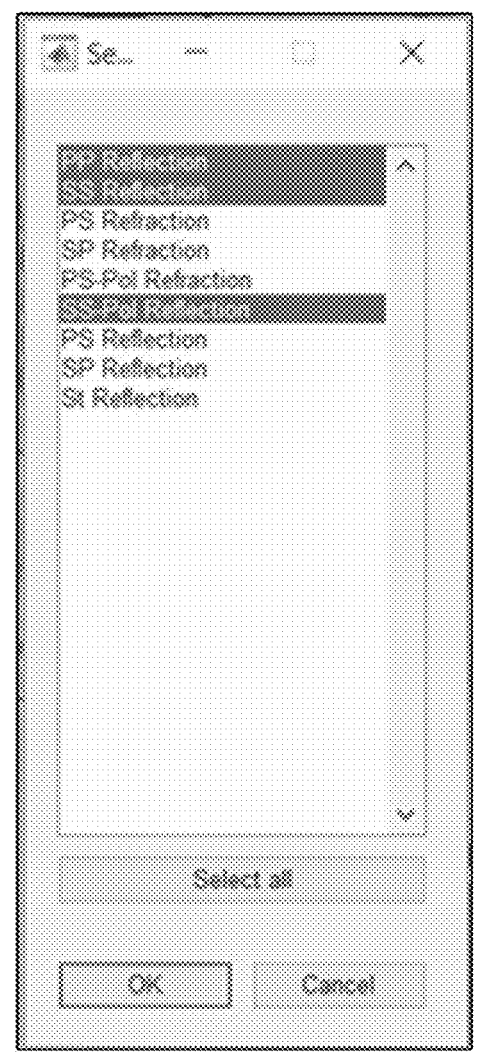
FIG. 25 illustrates a graphical user interface that allows a user to select one or more candidate raypath types from a set of candidate raypath types, which can be part of the automated workflow of operations of the present disclosure.

Furthermore, as part of the processing workflow, the user can select one or more raypath types from a set of candidate raypath types (block 1153 of FIG. 11D). In embodiments, the set of candidate raypath types includes a PP reflection type, an SS reflection type, a PS refraction type, an SP refraction type, a PS-Pol refraction type, an SS-Pol reflection type, a PS reflection type, a, SP reflection type, and an St reflection type as shown in FIG. 25. Note that the item labeled 'SS-Pol Reflection' refers to a polarized shear reflection that arises from the use of a high order acoustic source (such as a dipole acoustic source) as described above.

In this example, the user selects the SS and PP raypath types and also the SS-Pol raypath type as shown in FIG. 25. Note that the set of candidate raypath types refers to the different propagation modes of a reflected arrival event as it travels first between the source and the reflector and then second between the reflector and the receiver array. The SS-Pol raypath type means that the wavefield propagates between the source and reflector as a shear wave and then from the reflector to the receiver array as a shear wave whose direction of vibration is orthogonal to the plane made by the slowness vector and the axis of the well track. Note that FIG. 25 also has an entry for a PS-Pol raypath type, which represents P-to-S polarized shear refractions. The processing workflows described herein that handle polarized shear reflections (SS-Pol raypath type) can also be used to characterize P-to-S polarized refracted waves (PS-Pol raypath type).

Figure 26A:
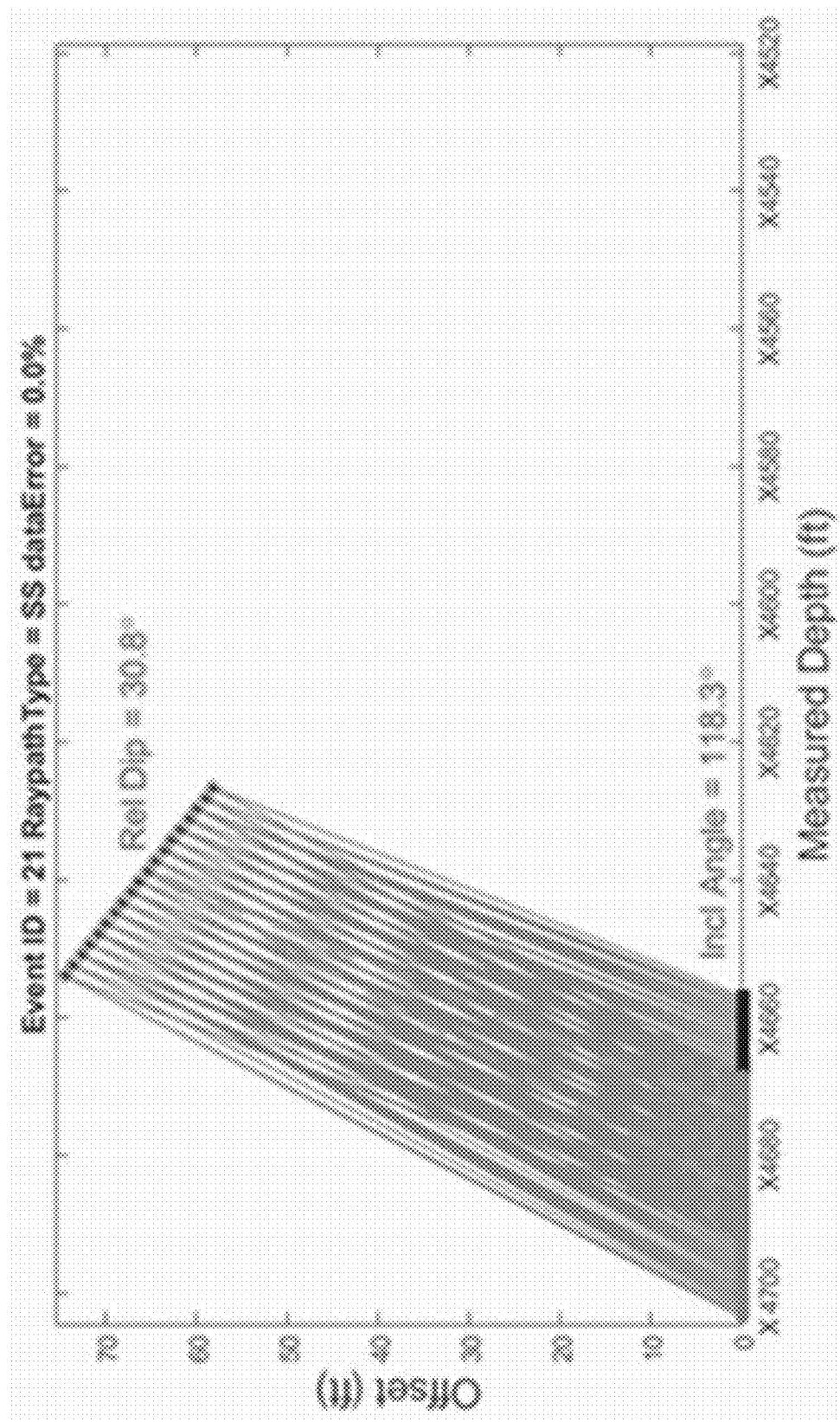
FIG. 26A is an exemplary visual representation of the results of ray tracing inversion for the SS and SS-Pol raypath types for the arrival event labeled #21 as depicted in FIG. 23, which can be produced by the automated workflow of operations of the present disclosure.
Figure 26B:
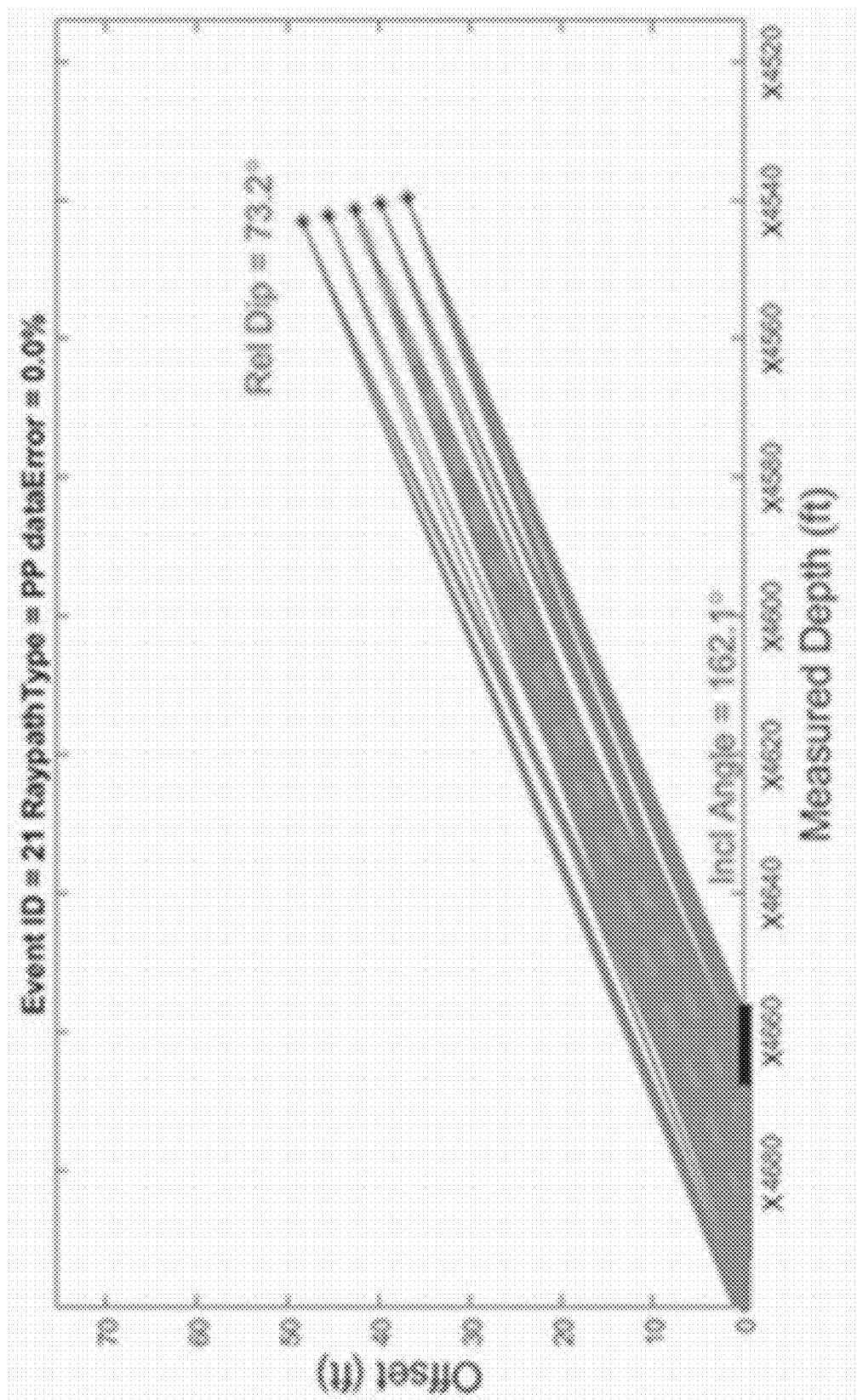
FIG. 26B is an exemplary visual representation of the results of ray tracing inversion for the PP raypath type for the arrival event labeled #21 as depicted in FIG. 23, which can be produced by the automated workflow of operations of the present disclosure.

Furthermore, as part of the processing workflow, a ray tracing inversion can be performed that inverts time picks for possible 2D positions of the reflector relative to the well track according to the selected candidate raypath types (block 1159 of FIG. 11D). The panels of FIGS. 26A and 26B show the possible positions of the reflector (block 1161) for the inversion of the time pick labeled as arrival event #21 in FIG. 23 according to the SS and PP raypath types, respectively. Note that the source and receiver sensor positions (shown in gray circles and black squares, respectively), and estimated reflector position (black stars) in FIGS. 26A and 26B are shown relative to the measured depth along the well track on the horizontal axis. The relative dip of the reflector is shown along with the estimated inclination angle of the arrival event at the receiver array (block 1165). As indicated by the panel titles, there is nearly perfect agreement (0.0% data error—block 1167) between the time pick and the travel times computed along the raypaths drawn in the panels of FIGS. 26A and 26B. While the 2D spatial positions of the reflectors relative to the well track are very different (note that the X and Y axes of the top and bottom figures are the same), the agreement between the time pick and the travel times along the raypaths (see block 1167) for the arrival event #21 is nearly perfect for both raypath types. This indicates that the ray tracing inversion by itself is not sufficient to determine the raypath type of the arrival event. Note that for the purposes of this disclosure, the ray tracing inversion shown in FIG. 26A can be used for both the SS and the SS-Pol raypath types, although a more sophisticated implementation could use the formation SH and SV velocities for the ray tracing inversion.

Note that ray tracing inversions shown in FIGS. 26A and 26B indicate that if the arrival event were an SS arrival event, then the wavefield recorded by the receiver array should be a S-wave with an inclination angle of ~120° (block 1165) when it impinges on the receiver array. Such inclination angle is the angle made by the raypath and the axis of the tool sonde where 0° corresponds to a wavefront propagating down the axis of the tool sonde from the source to the receiver array. If the arrival event were a PP arrival event, then the receiver array should record a P wave impinging on the receiver array in an inclination angle of nearly ~175° (block 1165).

Figure 27A:
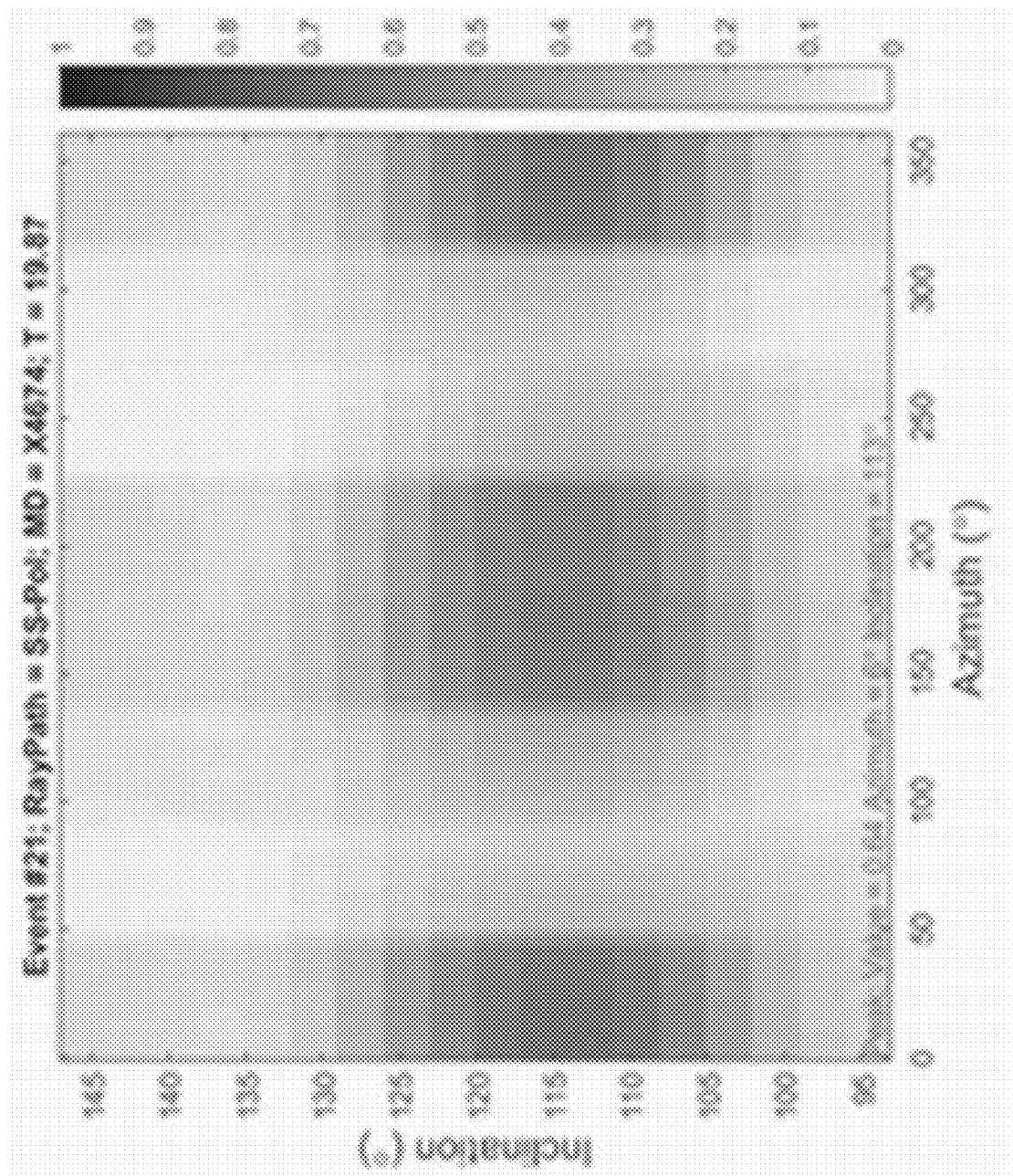
FIGS. 27A and 27B are exemplary visual representations of the results of three-dimensional slowness-time-coherence (3D STC) processing for the SS-Pol raypath type for the arrival event labeled #21 as depicted in FIG. 23, which can be produced by the automated workflow of operations of the present disclosure.
Figure 28A:
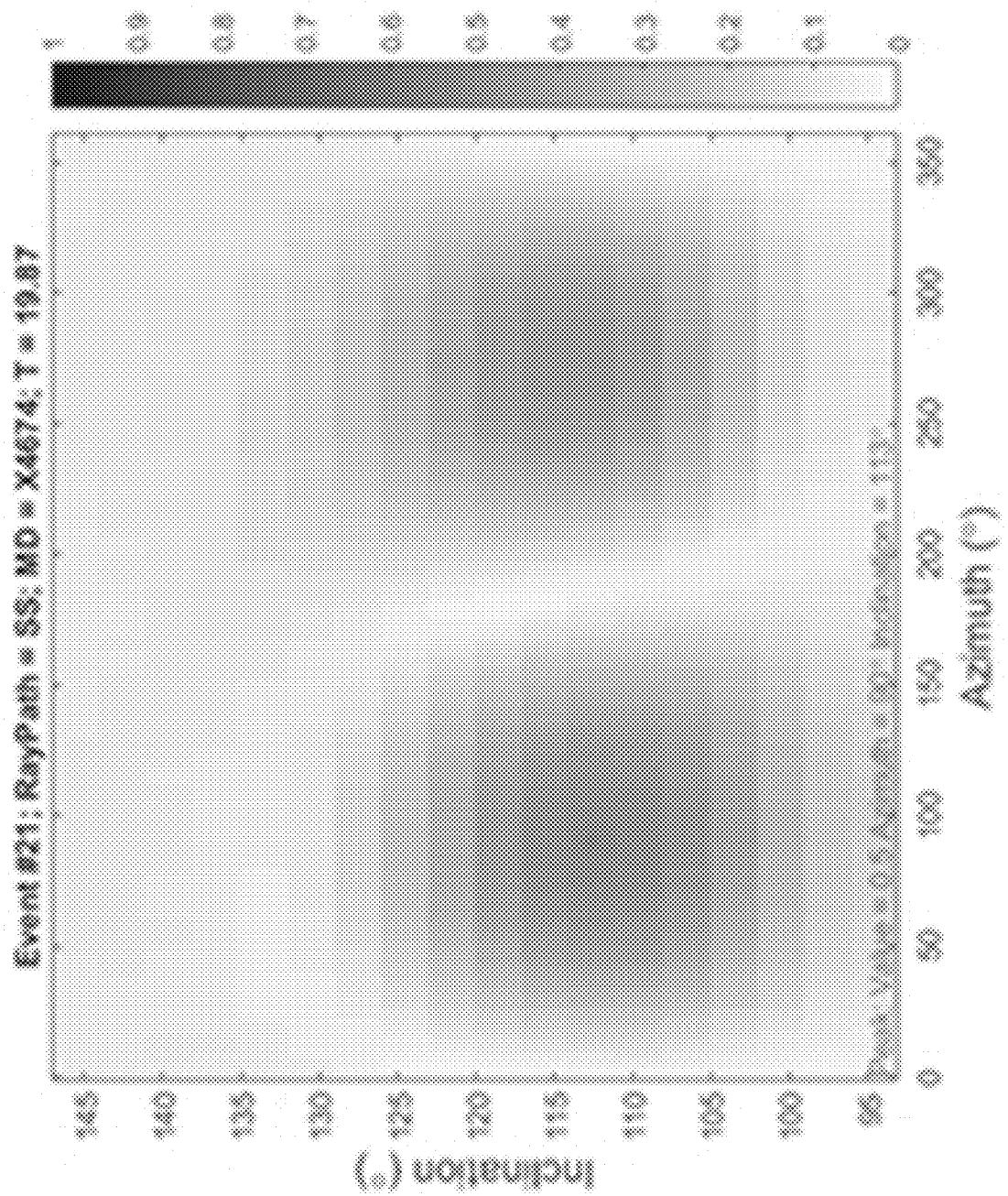
FIGS. 28A and 28B are exemplary visual representations of the results of three-dimensional slowness-time-coherence (3D STC) processing for the SS raypath type for the arrival event labeled #21 as depicted in FIG. 23, which can be produced by the automated workflow of operations of the present disclosure.
Figure 28B:
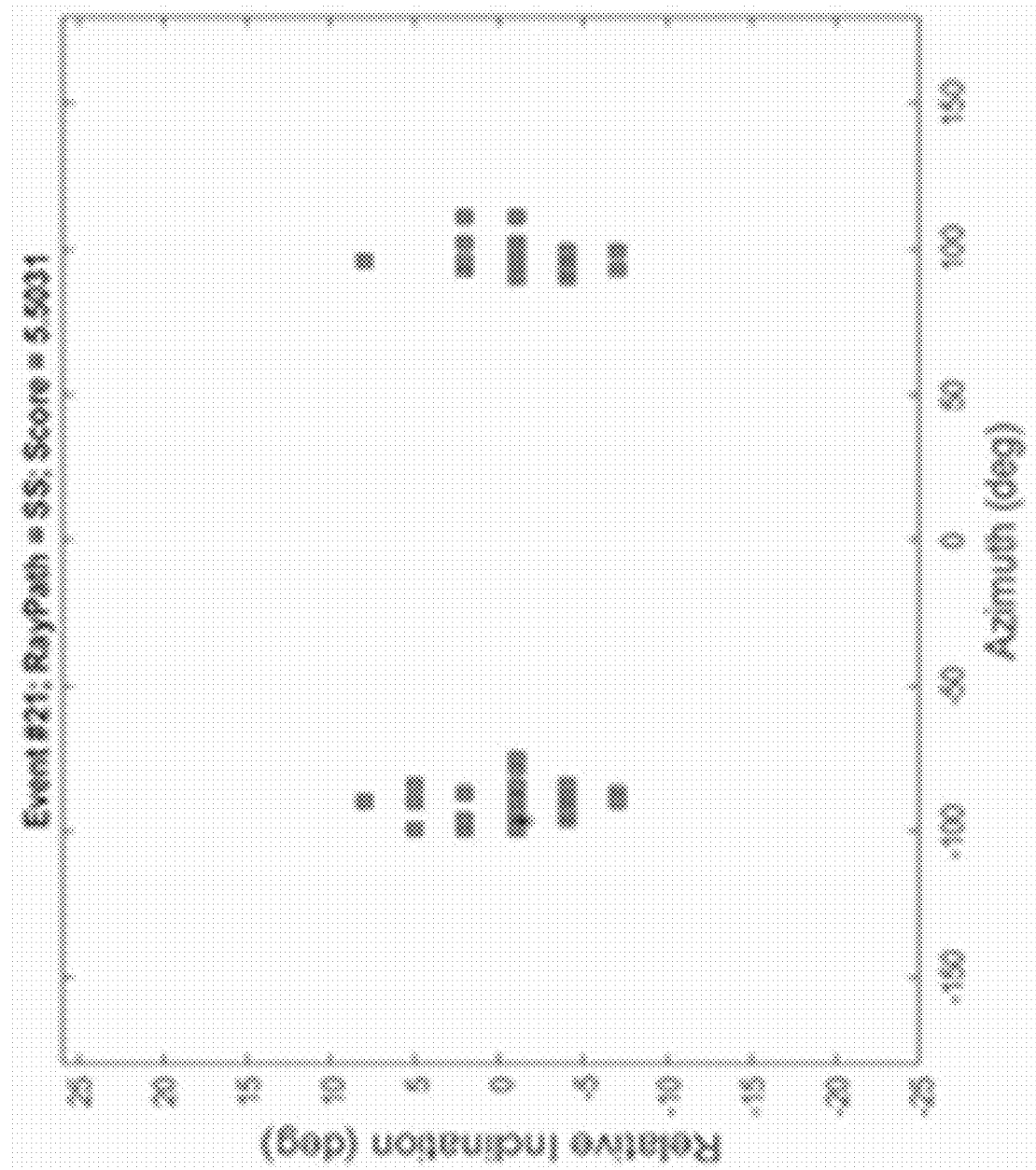
Figure 29A:
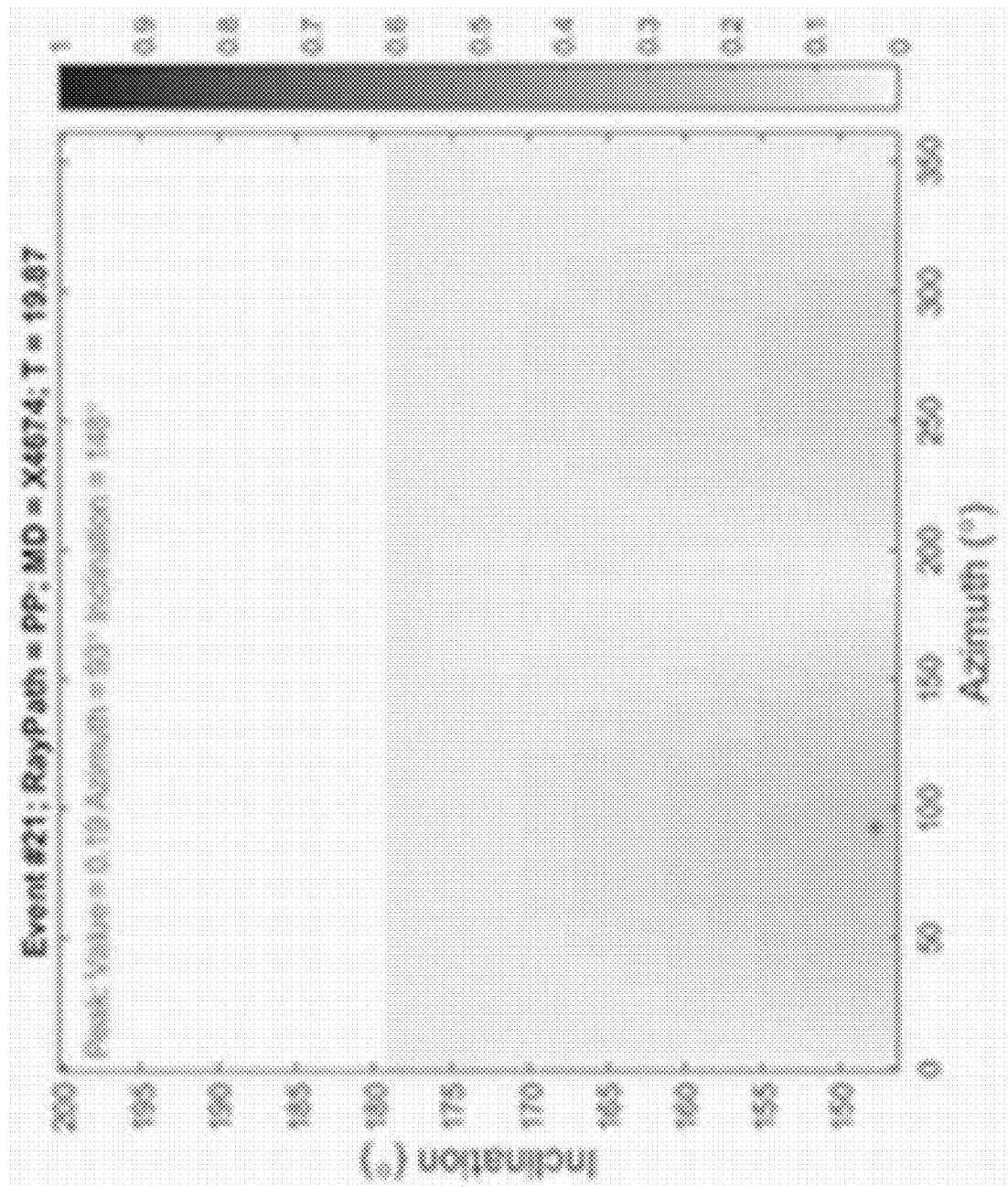
FIGS. 29A and 29B are exemplary visual representations of the results of three-dimensional slowness-time-coherence (3D STC) processing for the PP raypath type for the arrival event labeled #21 as depicted in FIG. 23, which can be produced by the automated workflow of operations of the present disclosure.

Furthermore, as part of the processing workflow, for each time pick identified by the time pick procedure (block 1151), 3D STC representations of the underlying filtered wavefield can be computed at each measurement depth station along the time pick for each one of the selected candidate raypath types using the range of inclination angles determined using the ray tracing inversion (block 1165). The panels of FIGS. 27A, 28A and 29A show 3D STC representations at a single measurement depth station along the time pick for the arrival event #21 in FIG. 23. For the SS and PP raypath types, the formulation for the 3D STC computation shown below in Equations (22), (23), and (24) can be used, while for the SS-Pol raypath type, the formulation for the 3D STC computation shown in Equations (25), (23), and (24) can be used. The location where the peak 3D STC value is located is marked with a star '*' (block 1171). Scatterplots of all 3D STC peak locations are shown in the corresponding panels of FIGS. 27B, 28B and 29B (block 1173).

Figure 27B:
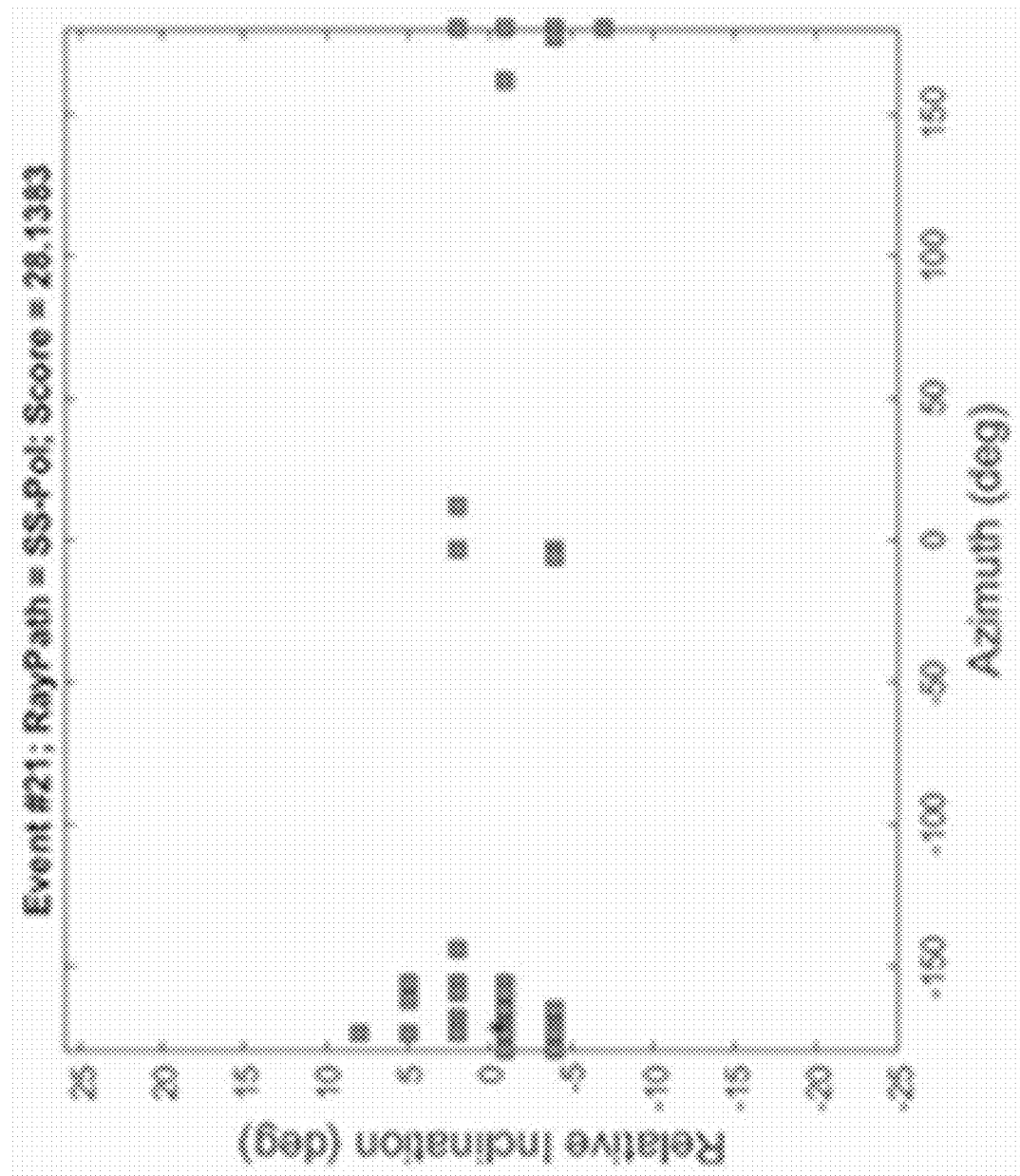
Figure 29B:
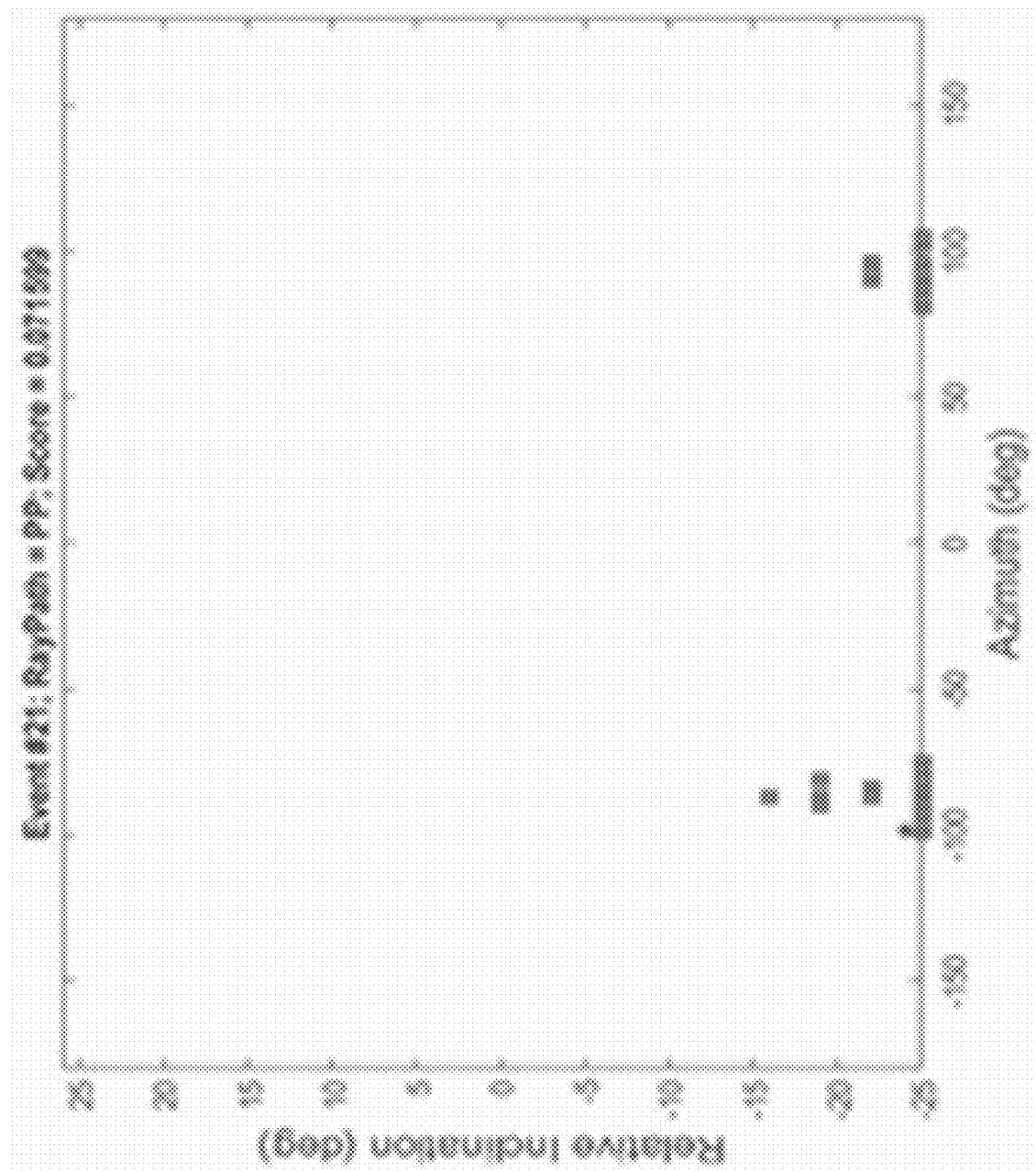

FIG. 27A shows the results of the 3D STC processing at a measured depth of X4674 ft. according to the SS-Pol raypath type, and FIG. 27B is a scatterplot of 3D STC peak positions for all measured depth positions along the time pick. FIG. 28A shows the results of the 3D STC processing at a measured depth of X4674 ft. according to the SS raypath type, and FIG. 28B is a scatterplot of 3D STC peak positions for all measured depth positions along the time pick. FIG. 29A shows the results of the 3D STC processing at a measured depth of X4674 ft. according to the PP raypath type, and FIG. 29B is a scatterplot of 3D STC peak positions for all measured depth positions along the time pick. The scores for each raypath type interpretation for arrival event #21 can be computed as per the procedures described above (block 1177). The score for the SS-Pol raypath type interpretation was calculated to be approximately 28.1 as shown in FIG. 27B. The score for the SS raypath type interpretation was calculated to be approximately 5.5 as shown in FIG. 28B. The score for the PP raypath type interpretation was calculated to be approximately 0.07 as shown in FIG. 29B. Thus, the SS-Pol raypath type interpretation score of 28.1 is over five times higher than is the score of 5.5 for the SS raypath interpretation, so the automated procedure determines that arrival event #21 is a polarized shear reflection or SS-Pol raypath type.

Figure 30:
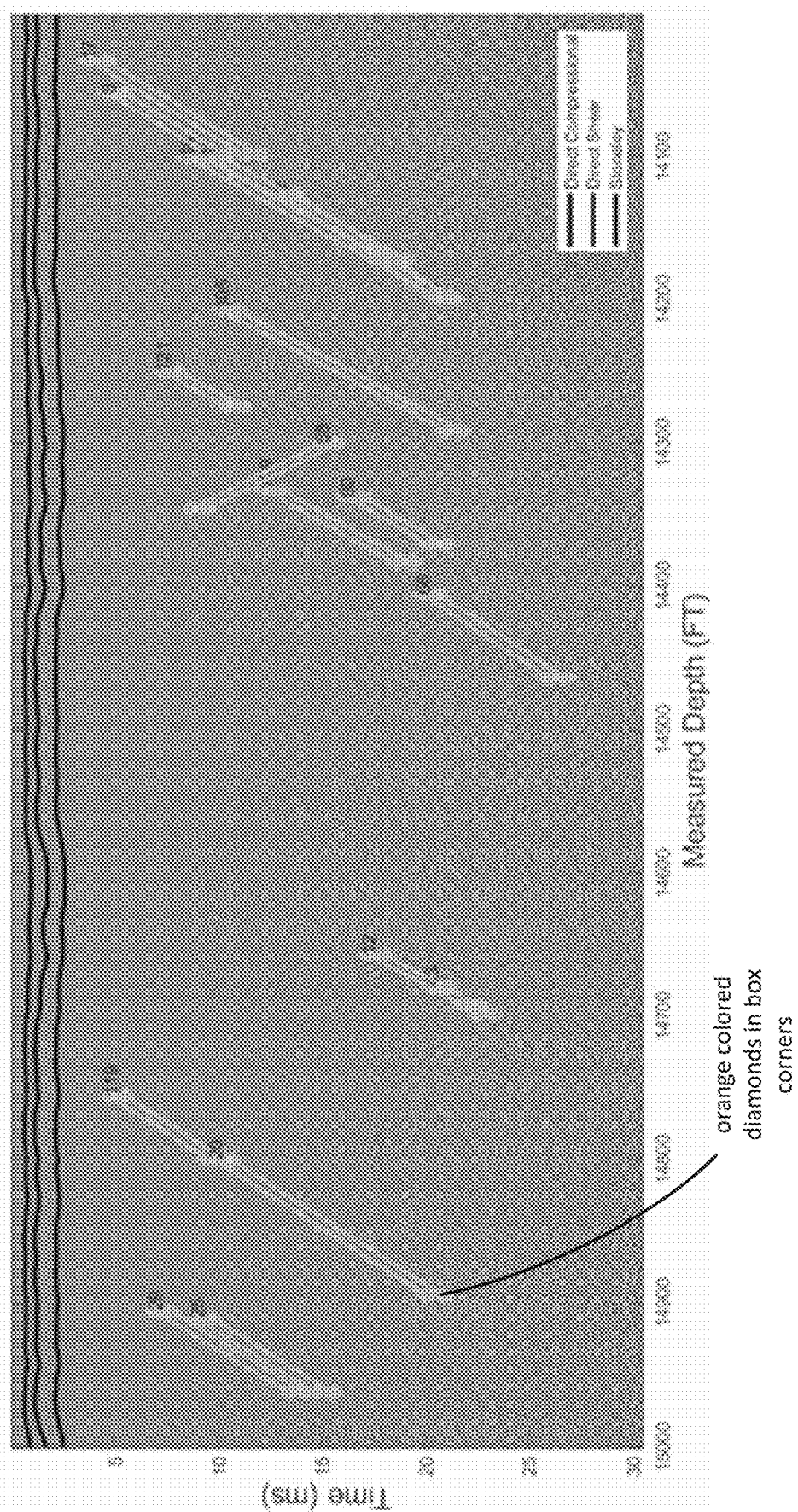
FIG. 30 illustrates an exemplary log of the results of ray tracing inversion and 3D STC processing, which can be produced by the automated workflow of operations of the present disclosure.

In embodiments, the visualization of the results of the processing workflow can be adapted to provide a specific visual indication of the polarized reflections. For example, the polarized reflections can be marked by a distinguishing shape or color marker. For example, FIG. 30 shows a single sensor view of the waveform measurements recorded by the seventh receiver sensor in the seventh ring of the tool sonde's acoustic receiver array (similar to that shown in FIG. 23) where orange diamond markers on the corners of the overlay boxes are used to indicate that these events are polarized reflections.

Figure 31:
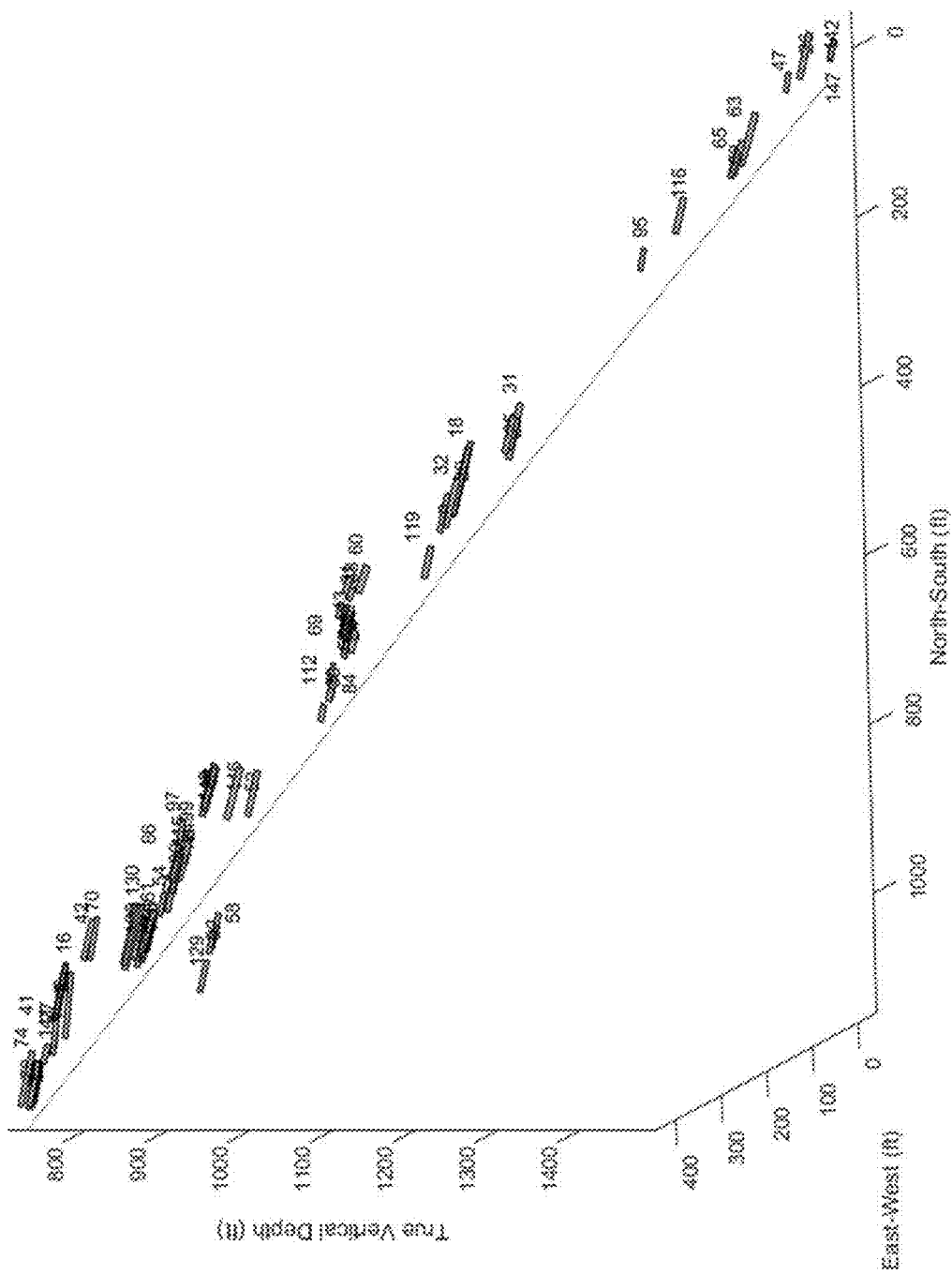
FIG. 31 illustrates an exemplary display log or map that conveys three-dimensional locations of reflectors along the well track, which can be produced and displayed by the automated workflow of operations of the present disclosure.
Figure 32:
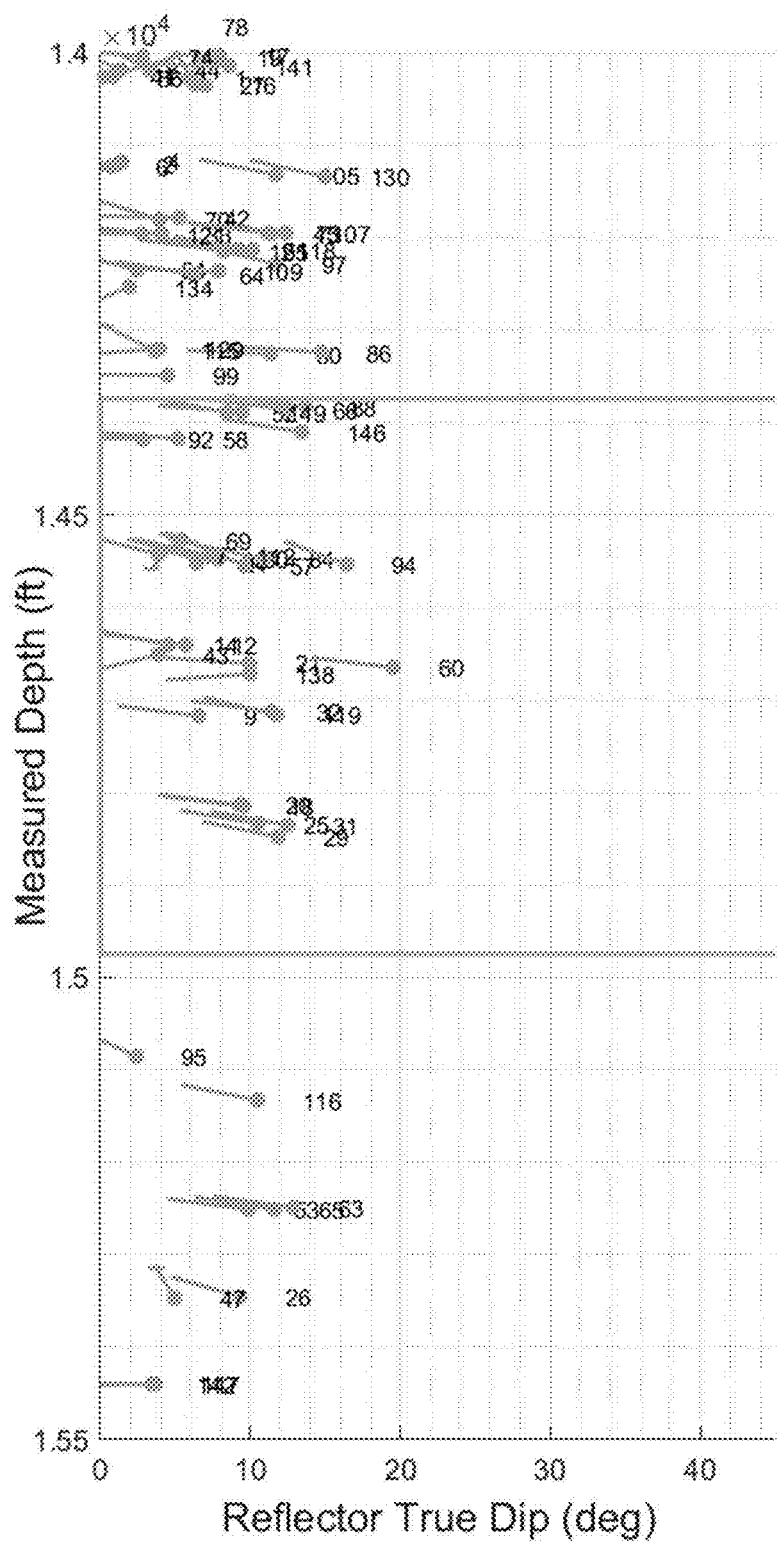
FIG. 32 is a view of an exemplary tadpole plot, which can be generated from the results of the automated workflow of operations of the present disclosure.

In another example where a 3D map of reflectors produced by the automated sonic imaging workflow (block 1183) is constructed as shown in FIG. 31, a log of true dip and azimuth (block 1185) can be constructed as shown in FIG. 32 where the center of the tadpole circle is filled in to indicate that these are polarized shear reflections or SS-Pol raypath types (instead of leaving a hollow tadpole circle to represent SS raypath type reflections).

Figure 33:
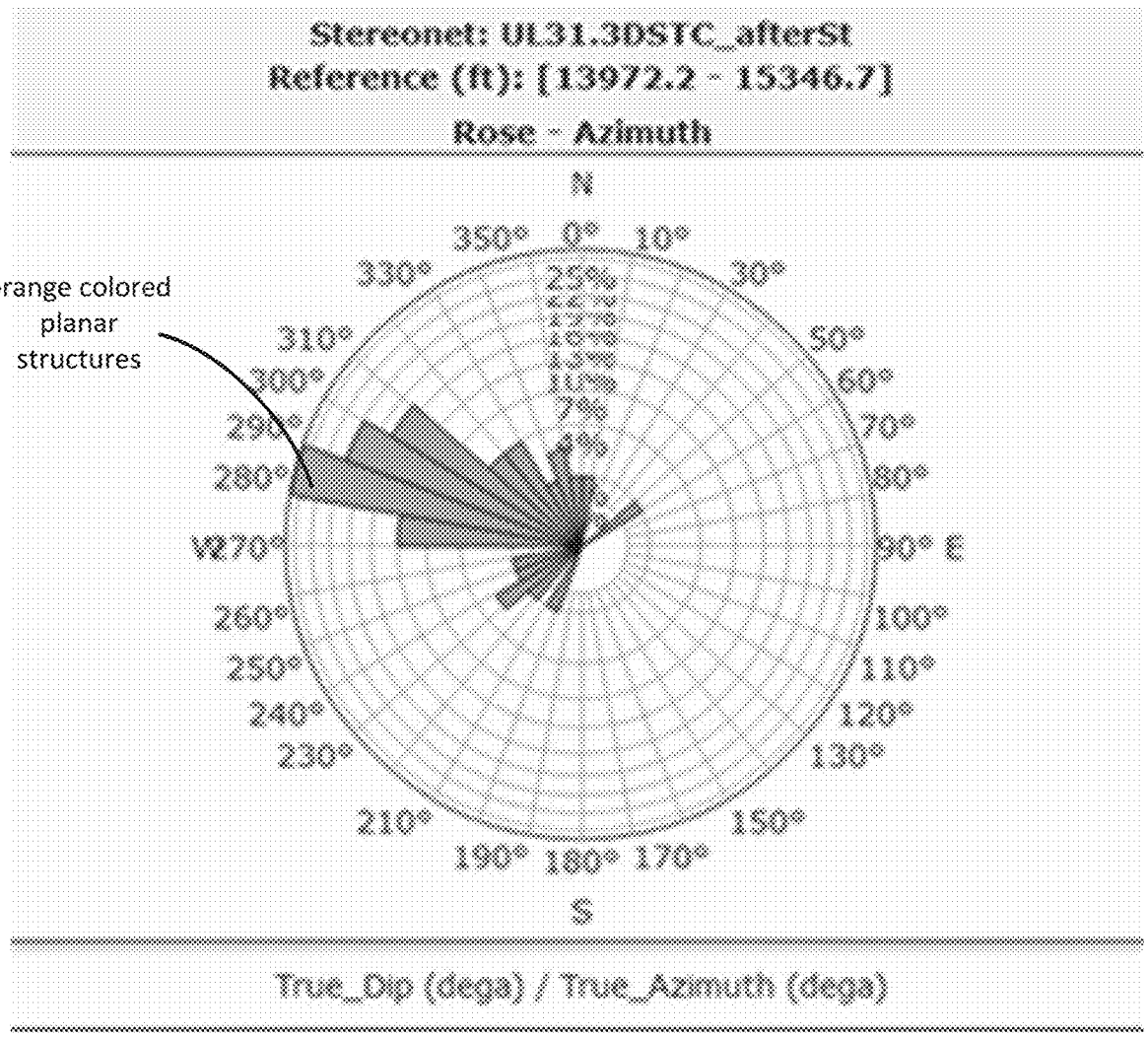
FIG. 33 is a view of an exemplary stereonet plot, which can be generated from the results of the automated workflow of operations of the present disclosure.

In yet another example where a Stereonet plot of true dip and azimuth for 3D reflectors is produced from automated sonic imaging workflow (block 1183), the SS and SS-Pol reflectors can both be represented by single-color (such as orange) planar structures as shown in FIG. 33. In other embodiments, type-specific shapes or colors can be used to distinguish between the SS and SS-Pol reflector types in the display plots.

In embodiments, the 3D STC processing can employ a model of the receiver array of the tool where the receiver sensors are located at positions around the circumference of the tool sonde with spatial coordinates $x_{j,\alpha_k}$:

$$x_{j,\alpha_k} = (r_{tool} \sin \alpha_k, r_{tool} \cos \alpha_k, z_j - z_1). \quad (21)$$

Here $r_{tool}$ is the radius of the sonde, $z_j$ is the source-receiver offset along the axis of the sonde, and $\alpha_k$ is the azimuth of the sensor measured clockwise around the circumference of the tool sonde where $\alpha = 0°$ corresponds to Northing for vertical wells or to the top of the wellbore in the case of horizontal or deviated wells. We label the waveforms recorded by these sensors as $w_{j,\alpha_k}(t)$. The three-dimensional slowness vector in Cartesian coordinates is $s_C = (s_x, s_y, s_z)$, and the 3D STC coherent energy functional $E_c(\tau, s)$ is constructed via its inner product with the 3D spatial coordinates of our receiver sensors $x_{j,\alpha_k}$.

$$E_c(\tau, s) = \int_0^{T_W} \left[ \sum_{j,k} w_{j,\alpha_k}(t + \tau + s_C \cdot x_{j,\alpha_k}) \right]^2 dt. \quad (22)$$

The corresponding total energy function $E_i(\tau, s)$ and coherence $coh(\tau, s)$ are then defined using $$E_i(\tau, s) = \int_0^{T_W} w_{j,\alpha_k}^2 \left[ \sum_{j,k} w_{j,\alpha_k}(t + \tau + s_C \cdot x_{j,\alpha_k}) \right]^2 dt \quad (23)$$

and $$coh(\tau, s) = \sqrt{\frac{E_c(\tau, s_C)}{M|\Omega|E_i(\tau, s_C)}}. \quad (24)$$

Here $\Omega$ represents the set of the receiver sensor azimuths $\alpha_k$, and M is the number of source-receiver offsets j in the receiver array.

The implementation of the 3D STC processing as described above (block 1169) parameterizes 3D slowness in spherical coordinates $s_S = (s_r, \theta, \varphi)$ where $s_r$ is propagation slowness in the formation, $\theta$ is inclination angle where $\theta = 0°$ refers to a wavefront propagating from the source down the axis of the tool sonde to the receiver array, and azimuth $\varphi$ is measured clockwise around the circumference of the sonde where $\varphi = 0°$ is either the North direction in the case of vertical wells or the top of the borehole for horizontal and deviated wells.

To modify the 3D STC processing to account for the shear polarization a signum function is introduced into the stacking mechanism of the coherent energy. While the 3D STC processing still stacks the wavefield according to the 3D slowness vector $s_c$, the signum function reverses the effect of the polarization. The signum function is +1 for the receiver sensors on one side of the tool orthogonal the azimuth propagation direction of the wavefield p and −1 on the other side of the tool.

$$E_c(\tau, s_r, \theta, \varphi) = \qquad (25)$$
$$\int_0^{T_W} \left[ \sum_{j,k} sign(sin(\varphi - \alpha_k)) \; w_{j,\alpha_k}(t + \tau + s_C \cdot x_{j,\alpha_k}) \right]^2 dt$$

The total energy and coherence functions defined in Equations (23) and (24) remain unchanged.

Figure 34:
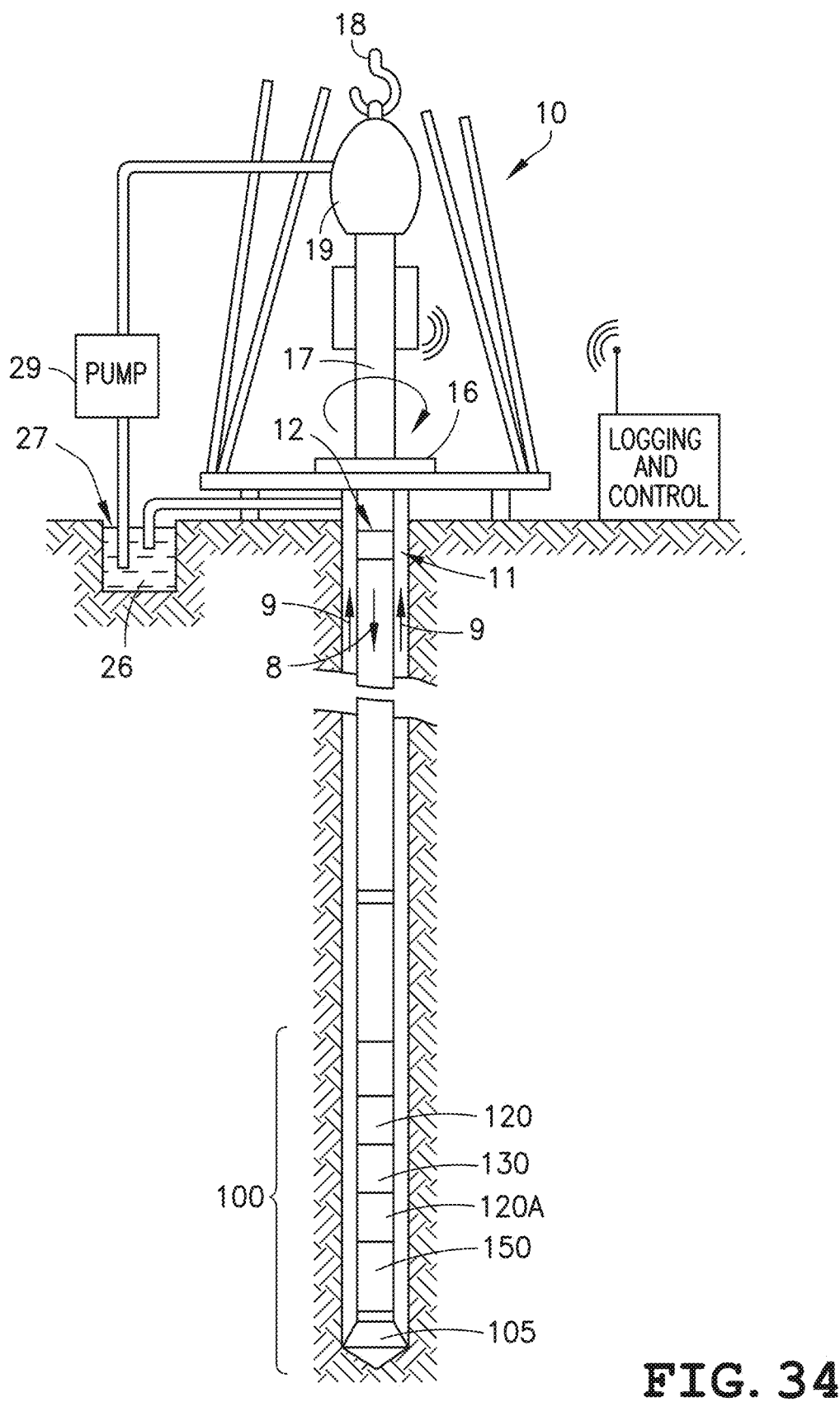
FIG. 34 illustrates an example wellsite which can embody parts of the methodology of the present disclosure.

FIG. 34 illustrates a wellsite system in which the examples disclosed herein can be employed. The wellsite can be onshore or offshore. In this example system, a borehole 11 is formed in subsurface formations by rotary drilling. However, the examples described herein can also use directional drilling, as will be described hereinafter.

A drill string 12 is suspended within the borehole 11 and has a bottom hole assembly 100 that includes a drill bit 105 at its lower end. The surface system includes a platform and derrick assembly 10 positioned over the borehole 11. The assembly 10 includes a rotary table 16, a kelly 17, a hook 18 and a rotary swivel 19. The drill string 12 is rotated by the rotary table 16. The rotary table 16 may be energized by a device or system not shown. The rotary table 16 may engage the kelly 17 at the upper end of the drill string 12. The drill string 12 is suspended from the hook 18, which is attached to a traveling block (also not shown). Additionally, the drill string 12 is positioned through the kelly 17 and the rotary swivel 19, which permits rotation of the drill string 12 relative to the hook 18. Additionally or alternatively, a top drive system may be used to impart rotation to the drill string 12.

In this example, the surface system further includes drilling fluid or mud 26 stored in a pit 27 formed at the well site. A pump 29 delivers the drilling fluid 26 to the interior of the drill string 12 via a port in the swivel 19, causing the drilling fluid 26 to flow downwardly through the drill string 12 as indicated by the directional arrow 8. The drilling fluid 26 exits the drill string 12 via ports in the drill bit 105, and then circulates upwardly through the annulus region between the outside of the drill string 12 and the wall of the borehole 11, as indicated by the directional arrows 9. In this manner, the drilling fluid 26 lubricates the drill bit 105 and carries formation cuttings up to the surface as it is returned to the pit 27 for recirculation.

The bottom hole assembly 100 of the example illustrated in FIG. 34 includes a logging-while-drilling (LWD) module 120, a measuring-while-drilling (MWD) module 130, a roto-steerable system and motor 150, and the drill bit 105.

The LWD module 120 may be housed in a special type of drill collar and can contain one or more logging tools. In some examples, the bottom hole assembly 100 may include additional LWD and/or MWD modules. The LWD module 120 may include capabilities for measuring, processing, and storing information, as well as for communicating with the surface equipment.

The MWD module 130 may also be housed in a drill collar and can contain one or more devices for measuring characteristics of the drill string 12 and/or the drill bit 105. The MWD tool 130 further may include an apparatus (not shown) for generating electrical power for at least portions of the bottom hole assembly 100. The apparatus for generating electrical power may include a mud turbine generator powered by the flow of the drilling fluid. However, other power and/or battery systems may be employed. In this example, the MWD module 130 includes one or more of the following types of measuring devices: a weight-on-bit measuring device, a torque measuring device, a vibration measuring device, a shock measuring device, a stick slip measuring device, a direction measuring device and/or an inclination measuring device.

Although the components of FIG. 34 are shown and described as being implemented in a particular conveyance type, the examples disclosed herein are not limited to a particular conveyance type but, instead, may be implemented in connection with different conveyance types including, for example, coiled tubing, wireline, wired drill pipe and/or any other conveyance types known in the industry.

In embodiments, the LWD module 120 includes a sonic measuring device or tool that includes at least one acoustic source or transmitter spaced from an array of acoustic receivers or sensors. The at least one acoustic transmitter can include a monopole transmitter and/or a dipole transmitter and/or a multipole transmitter as is well known in the arts. The transmitter is operated to emit wavefronts that probe the near wellbore structures (e.g., fractures, nearby bed boundaries and faults, etc.) by propagating, reflecting, and refracting across these structures. The acoustic receivers can cooperate with at least one processing system (FIG. 35) of the tool to receive and record the resulting wavefronts in synchronization with the firing of the signal to obtain the sonic waveform data at varying depths in the borehole 11 as is well known. The recorded sonic waveform data at varying depths in the borehole can then be filtered and processed further for sonic imaging, for example by a surface-located data processing system, according to the details of the improved workflow as described above.

Figure 35:
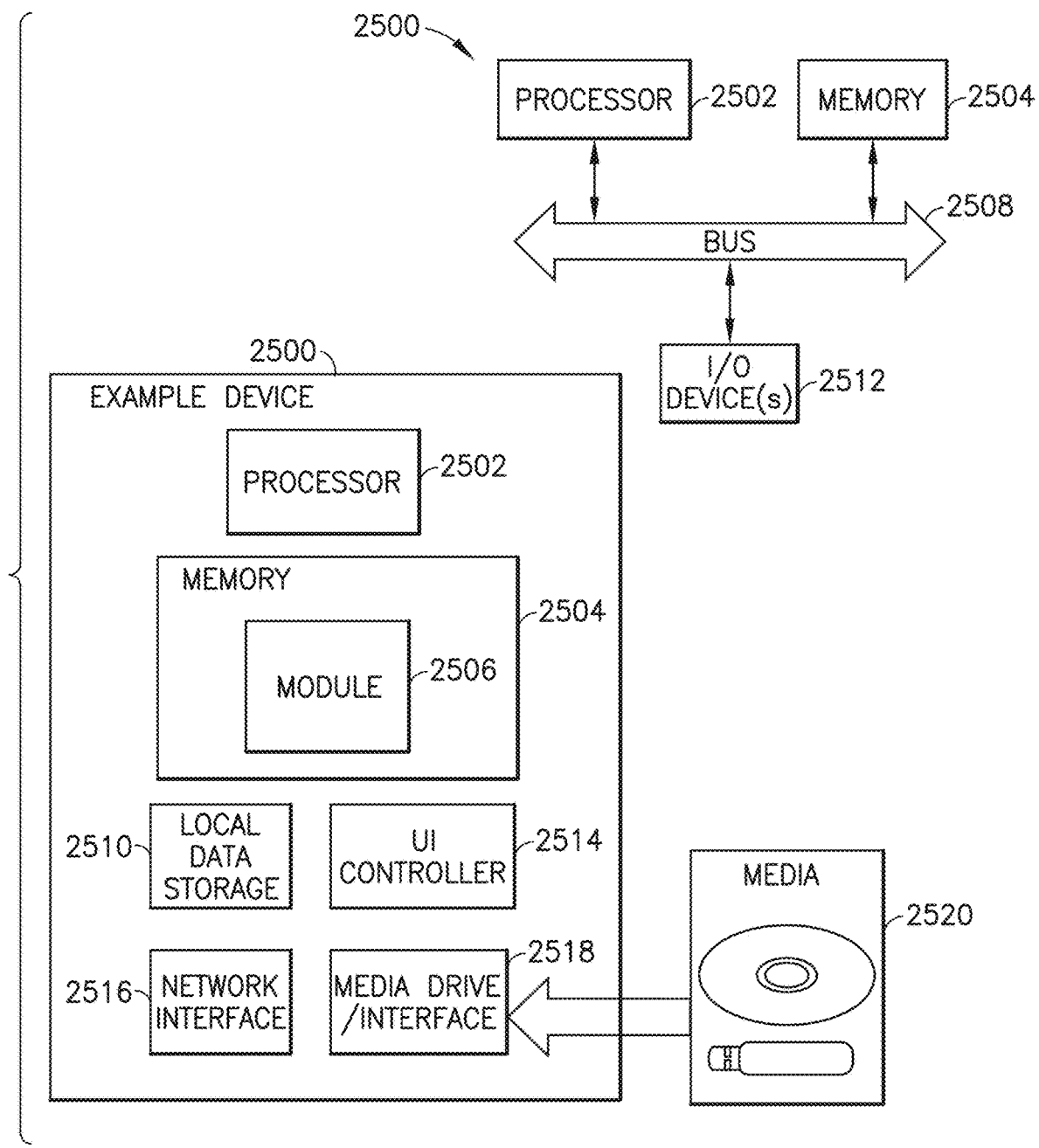
FIG. 35 illustrates an example computing device that can be used to embody parts of the methodology of the present disclosure.

FIG. 35 illustrates an example device 2500, with a processor 2502 and memory 2504 that can be configured to implement various embodiments of methods as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device, and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of a computer, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

The present disclosure provides a number of new features, including
1. Use of time pick, ray tracing inversion, and 3D STC to determine ray path type of a selected arrival event.
   a. Time pick of selected event may be performed manually or via an automated procedure
   b. For each ray path type, ray tracing inversion determines position of reflector relative to well track and inclination angle made between ray from reflector to receiver array and the well track.
      i. Error in ray tracing fit to time pick can be used to help determine ray path type
      ii. Ray tracing results can be used to determine relative dip of the reflector.

c. 3D STC used to analyze coherence and consistency of waveforms at measured depth positions along selected event time pick for range of inclination angles determined in step b.
  i. Variance of 3D STC peak locations and sum of 3D STC peak values can also be used to help determine ray path type.
  ii. Mean 3D STC peak location values can be used to determine azimuth of the reflector.
2. Results of time pick, ray tracing inversion, and 3D STC analysis can be used to
  a. Create overlay of single sensor, common ring, and common azimuth views of the waveforms with color-coded markings indicating the position of the reflected arrival events. Color-coding indicates the ray path type.
  b. Create log panels showing color coded arrival event attributes (reflector azimuth, true dip and azimuth (via tadpoles), relative dip of reflector, receiver index) as a function of measured depth. Tadpole logs, in particular, can be compared with those produced via borehole image logs such as FMI.
    i. Group arrival events according to their ray path type, measured depth position, and reflector azimuth and to configure their corresponding migration parameters.
  c. Create summaries of reflector true 3D dip and azimuth in the form of stereonet plots, Rose diagrams which can be compared to similar diagrams produced using FMI or other borehole image logs.
  d. Create display maps that convey the two-dimensional and three-dimensional locations of the reflectors relative to the well trajectory. The information conveyed by the display maps can be overlaid on a migration result in order to confirm the validity of specific migration image features and to associate them with particular waveform features.
  e. Output a display map conveying three-dimensional position of the reflectors and/or information describing three-dimensional position and orientation of the reflectors (such as relative dip, azimuth, offset from borehole, measured depth of reflector's intercept with wellbore) which is included in a spreadsheet (or other structured data object(s)) to be used for reservoir modeling, visualization and/or simulation applications.
  f. Group arrival events together according to their ray path type, migration aperture, 3D STC azimuth and other parameters. Automatically generate migration parameters for each group of arrival events for review by the user.
3. User can interactively review results of automated time picking and ray tracing/3D STC procedures for a number of possible ray path types and interactively promote/demote certain ray path type interpretation.

Although a few example embodiments have been described in detail above, those skilled in the art will readily appreciate that many modifications are possible in the example embodiments without materially departing from this disclosure. Accordingly, such modifications are intended to be included within the scope of this disclosure. Moreover, embodiments may be performed in the absence of any component not explicitly described herein.

What is claimed is:

1. A method of identifying and characterizing structures of interest in a formation traversed by a wellbore, comprising:

a) operating a sonic logging tool in the wellbore to transmit acoustic signals that probe near wellbore formation structures and to receive acoustic signals that result from interaction with the near wellbore formation structures, wherein the acoustic signals are transmitted by a high order acoustic source;
b) generating waveform data associated with the received acoustic signals as a function of measured depth in the wellbore;
c) processing the waveform data of b) to identify at least one arrival event, wherein the arrival event is associated with a time pick;
d) using a ray tracing inversion of points in the time pick of c) for each one of a number of possible raypath types to determine two-dimensional positions of a reflector corresponding to the time pick and the number of possible raypath types, wherein the possible raypath types include at least one polarized shear raypath type;
e) processing waveform data corresponding to the time pick of c) for at least one possible raypath type of d) to determine at least one three-dimensional slowness-time coherence representation of the waveform data corresponding to the time pick and the at least one possible raypath type;
f) evaluating the at least one three-dimensional slowness-time coherence representation of e) to determine a raypath type for the time pick and corresponding arrival event;
g) determining an azimuth angle of a reflector corresponding to the time pick based on the three-dimensional slowness-time coherence representation of e) corresponding to both the time pick and the raypath type for the time pick as determined in f); and
h) determining and outputting a three-dimensional position for the reflector corresponding to the time pick, wherein the three-dimensional position of the reflector is based on the two-dimensional position of the reflector determined from the ray tracing inversion of d) for the raypath type of the time pick as determined in f) and azimuth angle of the reflector as determined in g).

2. A method according to claim 1, wherein:
the at least one polarized shear raypath type corresponds to polarized shear waveforms that result from interaction of the acoustic energy transmitted by the high order acoustic source with the near wellbore formation structures.

3. A method according to claim 1, wherein:
the operations of c) identify a set of arrival events, wherein each arrival event is associated with a corresponding time pick; and
the operations of d) through g) are repeated for the time picks corresponding to the set of arrival events to determine and output three-dimensional positions for reflectors that correspond to the set of arrival events.

4. A method according to claim 1, wherein:
the ray tracing inversion of d) varies and solves for two-dimensional position and relative dip of a reflector having a polarized shear raypath type where the two-dimensional position and relative dip of the reflector is specified by i) a polar angle made from a position along the sonic logging tool and ii) a polar distance offset from said position; and/or
the ray tracing inversion of d) varies and solves for two-dimensional position and relative dip of a reflector having a PP or SS reflection raypath type where the two-dimensional position and relative dip of the reflector is specified by i) a polar angle made from a position along the sonic logging tool and ii) a polar distance offset from said position; and/or the ray tracing inversion of d) varies and solves for two-dimensional position and relative dip of a reflector having a PS or SP mode conversion raypath type where the two-dimensional position and relative dip of the reflector is specified by i) a position along the sonic logging tool and ii) a polar angle made from said position.

5. A method according to claim 1, wherein:

the sonic logging tool includes an array of receiver sensors; and the three-dimensional slowness-time coherence representation of e) for the polarized shear raypath type employs a signum function that accounts for polarization of acoustic energy incident on the array of receiver sensors.

6. A method according to claim 5, wherein:

the signum function is applied to a stack of wavefield data, wherein the signum function has a value of +1 for receiver sensors on one side of the sonic logging tool orthogonal the azimuth propagation direction of the wavefield data, and wherein the signum function has a value of −1 for receiver sensors on the opposite side −1 on the sonic logging tool.

7. A method according to claim 6, wherein:

the three-dimensional slowness-time coherence representation of e) for the polarized shear raypath type determines total energy as $$E_c(\tau, s_r, \theta, \varphi) = \int_0^{T_W} \left[ \sum_{j,k} \text{sign}(\sin(\varphi - \alpha_k)) \ w_{j,\alpha_k}(t + \tau + s_C \cdot x_{j,\alpha_k}) \right]^2 dt$$

where τ is a start time of a time window with a duration $T_W$, $s_r$ is propagation slowness in the formation, θ is inclination angle, φ is stacking azimuth, $x_{j,\alpha_k}$ are spatial coordinates for receiver sensors of the sonic logging tool, $\alpha_k$ is the azimuth of the receiver sensor measured clockwise around the circumference of the tool, $s_C$ is a three-dimensional slowness vector in Cartesian coordinates; and sign(sin(φ−$\alpha_k$)) is the signum function.

8. A method according to claim 1, wherein:

the evaluating of f) involves generating scores for a plurality of possible ray path types of the time pick based on at least three-dimensional slowness-time coherence representations of e), and evaluating the scores to determine a raypath type for the given time pick and corresponding arrival event.

9. A method according to claim 8, wherein:

the three-dimensional slowness-time coherence representations of e) include peak coherence values for the plurality of possible raypath types; and the scores for the plurality of possible ray path types of the time pick is based on the peak coherence values for the plurality of possible raypath types.

10. A method according to claim 8, wherein:

the three-dimensional slowness-time coherence representations of e) include peak inclination angles and peak azimuth angles for the plurality of possible raypath types; and the scores for the plurality of possible ray path types of the time pick is based on the peak inclination angles and peak azimuth angles for the plurality of possible raypath types.

11. A method according to claim 8, wherein:

the ray tracing inversion of d) for the time pick and a particular raypath type solves for a predicted time pick; and the scores for the plurality of possible ray path types of the time pick is based on error values between the time pick and the predicted time picks for the plurality of possible raypath types.

12. A method according to claim 1, wherein:

the processing of e) determines three-dimensional slowness-time coherence representations over a range of inclination angles and azimuth angles; and the determining of g) determines an inclination angle and azimuth angle that characterizes orientation of the reflector that is used in determining the three-dimensional position of the reflector in h).

13. A method according to claim 1, wherein:

the waveform data of b) is filtered to reduce the interference of the direct borehole modes and other signals.

14. A method according to claim 1, wherein:

in the event that the ray tracing inversion of d) produces a plurality of two-dimensional reflector positions and raypath type pairs, the evaluating of f) selects one of the plurality of two-dimensional reflector positions and raypath type pairs.

15. A method according to claim 1, wherein:

the arrival event is selected manually by user-input or automatically by an automatic procedure.

16. A method according to claim 15, wherein the automatic procedure involves:

applying a tau-P transform to the waveform data;

selecting a set of peaks in resulting data in the Tau-P domain, wherein each peak in the set of peaks corresponds to a line in the waveform data for a candidate arrival event; and for each peak or corresponding candidate arrival event, defining a time corridor window corresponding to the candidate arrival event and associated line, and correlating the waveform data within the time corridor window with a function to identify a time pick for the candidate arrival event.

17. A method according to claim 1, wherein:

the ray racing inversion of d) is performed on waveform data corresponding to the time pick of a candidate arrival event and derived from received signals for a given acoustic receiver of the sonic logging tool, or the ray racing inversion of d) is performed on waveform data corresponding to the time pick of a candidate arrival event and derived from received signals for a plurality of acoustic receivers of the sonic logging tool that are spaced in azimuth about the circumference of the sonic logging tool.

18. A method according to claim 1, further comprising:

generating at least one display that conveys azimuth position for the arrival event.

19. A method according to claim 1, further comprising:

generating at least one display that conveys ray-path type for the arrival event as determined in f).

20. A method according to claim 19, wherein:

the display includes features to convey ray-path type for the arrival event.

21. A method according to claim 1, further comprising:
generating at least one display that conveys attributes of the reflector or arrival event as a function of measured depth.

22. A method according to claim 21, wherein:
the display includes features to convey ray-path type for the reflector or arrival event.

23. A method according to claim 1, further comprising:
generating least one display that conveys two-dimensional or three-dimensional location of at least one reflector relative to well trajectory.

24. A method according to claim 23, wherein:
the display includes features to convey ray-path type for the at least one reflector.

25. A method according to claim 1, further comprising:
outputting three-dimensional position and/or orientation of the reflector in a structured format selected from the group consisting of a spreadsheet, tadpole plot, stereonet view, Rose diagram, and combination thereof.

26. A method according to claim 25, further comprising:
the three-dimensional position and/or orientation of the reflector is specified in a true earth coordinate system.

27. A method according to claim 1, further comprising:
outputting three-dimensional position and/or orientation of the reflector for reservoir modeling, visualization and/or simulation applications.

28. A method according to claim 1, wherein:
the reflectors represent formation structures of interest selected from the group consisting of fractures, bed boundaries and faults.

29. A method according to claim 1, wherein:
the high order acoustic source comprises a dipole acoustic source.

* * * * *